United States Patent
Ono et al.

(10) Patent No.: US 9,880,438 B2
(45) Date of Patent: Jan. 30, 2018

(54) LIQUID CRYSTAL DISPLAY AND METHOD OF MANUFACTURING THE SAME

(71) Applicant: PANASONIC LIQUID CRYSTAL DISPLAY CO., LTD., Hyogo (JP)

(72) Inventors: Kikuo Ono, Ibaraki (JP); Daisuke Kajita, Hyogo (JP); Ryutaro Oke, Hyogo (JP)

(73) Assignee: PANASONIC LIQUID CRYSTAL DISPLAY CO., LTD., Hyogo (JP)

(*) Notice: Subject to any disclaimer, the term of this patent is extended or adjusted under 35 U.S.C. 154(b) by 112 days.

(21) Appl. No.: 14/929,097

(22) Filed: Oct. 30, 2015

(65) Prior Publication Data
US 2016/0062203 A1     Mar. 3, 2016

Related U.S. Application Data

(63) Continuation of application No. PCT/JP2014/001417, filed on Mar. 12, 2014.

(30) Foreign Application Priority Data

May 9, 2013   (JP) .................................. 2013-099342
Jun. 7, 2013   (JP) .................................. 2013-121319
(Continued)

(51) Int. Cl.
G02F 1/1333        (2006.01)
G02F 1/1362        (2006.01)
(Continued)

(52) U.S. Cl.
CPC ...... *G02F 1/136286* (2013.01); *G02F 1/1368* (2013.01); *G02F 1/13439* (2013.01);
(Continued)

(58) Field of Classification Search
CPC ......... G02F 1/136286; G02F 1/133345; G02F 1/133512; G02F 1/134363; G02F 1/13439;
(Continued)

(56) References Cited

U.S. PATENT DOCUMENTS

2003/0086045 A1   5/2003  Ono et al.
2009/0059110 A1*  3/2009  Sasaki ............... G02F 1/134363
                                                                 349/39
(Continued)

FOREIGN PATENT DOCUMENTS

JP    2009-058913 A    3/2009
JP    2009-122569 A    6/2009
(Continued)

OTHER PUBLICATIONS

Final U.S. Office Action dated Dec. 2, 2016 issued in U.S. Appl. No. 14/199,443.
(Continued)

*Primary Examiner* — Nathanael R Briggs
(74) *Attorney, Agent, or Firm* — McDermott Will & Emery LLP

(57) ABSTRACT

A liquid crystal display device includes a plurality of pixel regions. Each of the pixel regions includes a thin-film transistor, a transparent conductive pixel electrode connected to the thin-film transistor, a first common electrode, a first insulating film disposed between the pixel electrode and the first common electrode, a second insulating film, a second common electrode that includes a plurality of slits, and a third insulating film. A space between two closely adjacent boundaries of a pair of pixel electrodes that are adjacent to each other in a longitudinal direction of the plurality of gate lines overlaps the first common electrode and the second common electrode in a plan view.

8 Claims, 101 Drawing Sheets

(30) Foreign Application Priority Data

| | | |
|---|---|---|
| Jun. 7, 2013 | (JP) | 2013-121320 |
| Jun. 7, 2013 | (JP) | 2013-121321 |
| Aug. 5, 2013 | (JP) | 2013-162272 |

(51) Int. Cl.
 *G02F 1/1343* (2006.01)
 *G02F 1/1335* (2006.01)
 *G02F 1/1368* (2006.01)

(52) U.S. Cl.
 CPC .. *G02F 1/133345* (2013.01); *G02F 1/133512* (2013.01); *G02F 1/134363* (2013.01); *G02F 1/136213* (2013.01); *G02F 1/136227* (2013.01); *G02F 2001/134318* (2013.01)

(58) Field of Classification Search
 CPC ......... G02F 1/136213; G02F 1/136227; G02F 1/1368; G02F 2001/134318
 See application file for complete search history.

(56) References Cited

U.S. PATENT DOCUMENTS

| | | |
|---|---|---|
| 2009/0128757 A1 | 5/2009 | Koshihara et al. |
| 2011/0085121 A1 | 4/2011 | Jeon et al. |
| 2011/0205478 A1 | 8/2011 | Nakahara et al. |
| 2012/0086654 A1 | 4/2012 | Song |
| 2012/0112213 A1* | 5/2012 | Lee ............... G02F 1/134363 257/88 |
| 2012/0127142 A1 | 5/2012 | Yoo et al. |
| 2012/0257156 A1 | 10/2012 | Hiratsuka et al. |
| 2012/0268679 A1 | 10/2012 | Song et al. |
| 2012/0280240 A1 | 11/2012 | Sasaki et al. |
| 2012/0293756 A1 | 11/2012 | Matsumoto et al. |
| 2013/0107151 A1 | 5/2013 | Sasaki et al. |
| 2015/0055044 A1 | 2/2015 | Sasaki et al. |

FOREIGN PATENT DOCUMENTS

| | | |
|---|---|---|
| JP | 2011-081385 A | 4/2011 |
| JP | 2012-027046 A | 2/2012 |

OTHER PUBLICATIONS

International Search Report issued in corresponding International Patent Application No. PCT/JP2014/001417, dated Jun. 10, 2014; with English translation.

Non-Final Office Action issued in related U.S. Appl. No. 14/199,443, dated Apr. 12, 2016.

* cited by examiner

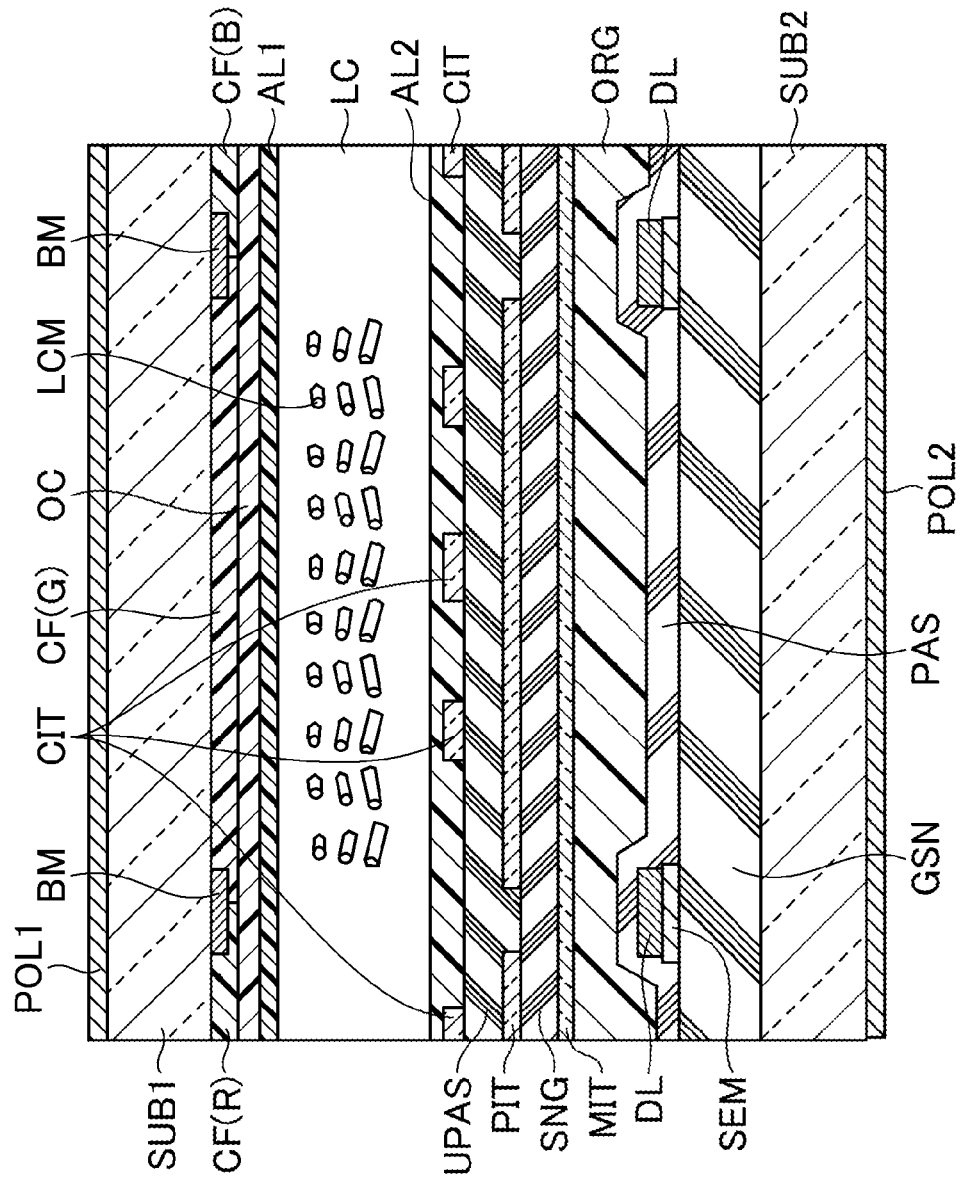

FIG.6A
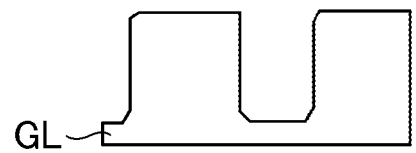
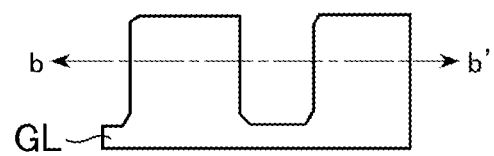
FIG.6B
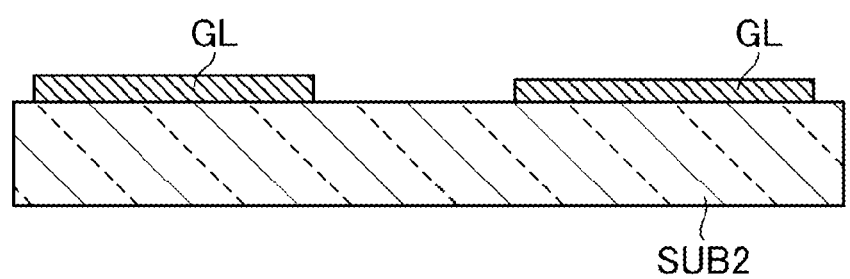

FIG.13A
FIG.13B
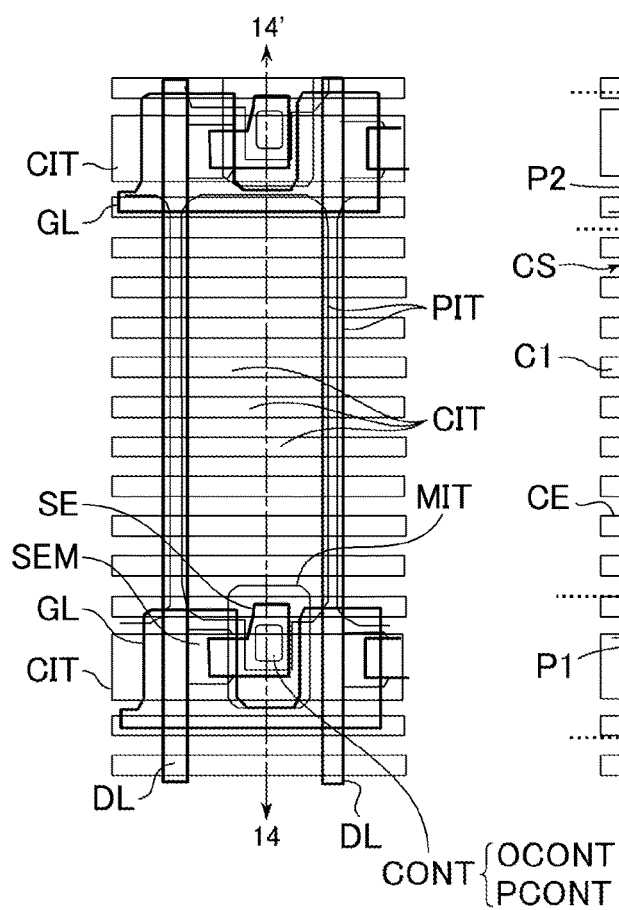
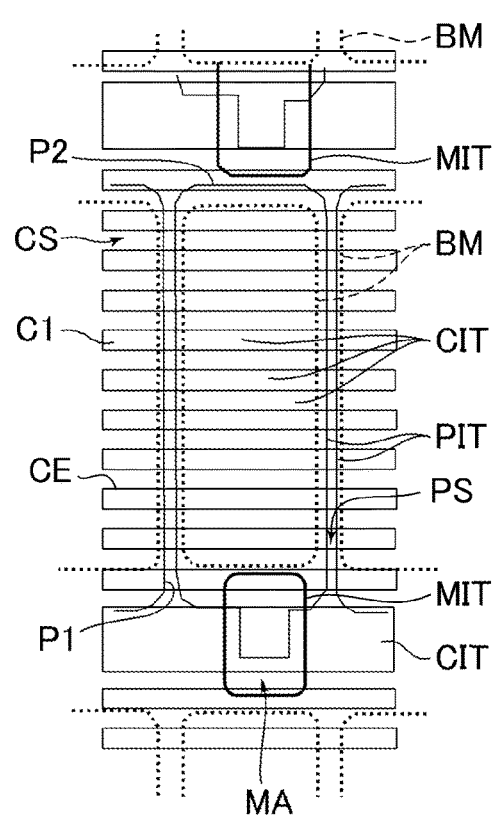

(a)

FIG.93A
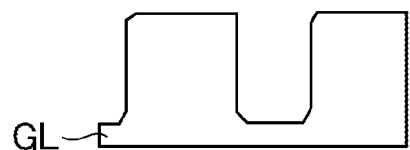
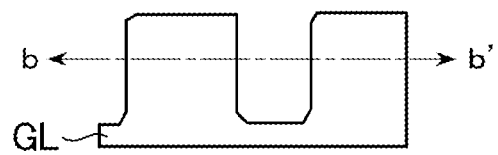
FIG.93B
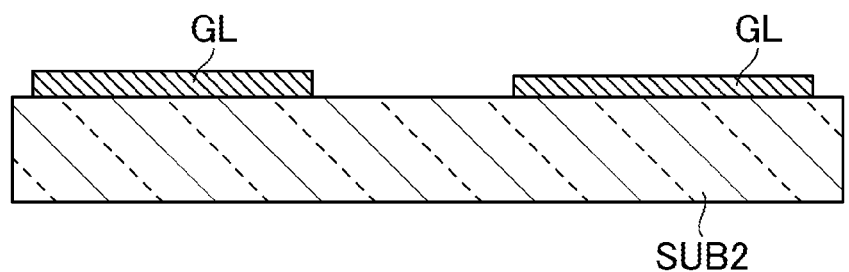

LIQUID CRYSTAL DISPLAY AND METHOD OF MANUFACTURING THE SAME

CROSS-REFERENCE TO RELATED APPLICATION

This application is bypass continuation of international patent application PCT/JP14/001417, filed: Mar. 12, 2014 designating the United States of America, the entire disclosure of which is incorporated herein by reference. Priority is claimed based on Japanese patent applications JP2013-121319, filed: Jun. 7, 2013, JP2013-099342, filed: May 9, 2013, JP2013-121320, filed: Jun. 7, 2013, JP2013-121321, filed: Jun. 7, 2013 and JP2013-162272, filed: Aug. 5, 2013. The entire disclosures of these Japanese patent applications are incorporated herein by reference in its entirety.

TECHNICAL FIELD

This present disclosure is related to a liquid crystal display, especially including pixel structures realizing IPS (In Plane Switching) mode, and the method of manufacturing the same.

BACKGROUND

In a liquid crystal display device of an IPS mode, a pixel electrode and a common electrode are disposed in a pixel region of one of two substrates sandwiching a liquid crystal layer, and a transverse electric field parallel to the substrates is generated between the pixel electrode and the common electrode. It has been known that this type of liquid crystal display device has less display deterioration even by being observed obliquely relative to a display surface, i.e., has excellent wide viewing angle characteristics.

Since an area of a pixel region has been more and more decreasing, a storage capacitance between the pixel electrode and the common electrode is likely to be insufficient. In this point, a prior art describes that a common electrode is disposed above and below a pixel electrode to increase a storage capacitance between the pixel electrode and the common electrode (See Japanese Unexamined Patent Application Publication No. 2009-58913).

However, the pixel structure described in this prior art still has room for improvements from the viewpoints of increasing a storage capacitance between the pixel electrode and the common electrode, increasing a quantity of light passing through the pixel region, and reducing a parasitic capacitance between the pixel electrode and other conductive members.

SUMMARY

The present application is made in view of the above circumstances, and aims to provide a liquid crystal display device that can enhance display characteristics, and a method for manufacturing a liquid crystal display device.

In one general aspect, the present application describes a liquid crystal display device. The liquid crystal display device includes a first substrate, a second substrate, and a liquid crystal layer sandwiched between the first substrate and the second substrate. A plurality of data lines, a plurality of gate lines, and a plurality of pixel regions, each of which is enclosed by adjacent two data lines and adjacent two gate lines are disposed on the first substrate. Each of the pixel regions includes a thin-film transistor connected to a data line, a transparent conductive pixel electrode connected to the thin-film transistor, a first insulating film disposed on a first substrate side of the pixel electrode, a first common electrode that is transparent and conductive, and disposed between the first insulating film and the first substrate, a second insulating film disposed on a liquid crystal layer side of the pixel electrode, and a second common electrode that is transparent and conductive, is disposed between the second insulating film and the liquid crystal layer, and includes a plurality of slits formed therein, a pair of longitudinal edges of the plurality of slits crosses an outer boundary of the pixel electrode in a plan view, the pair of longitudinal edges extending in a longitudinal direction of the second common electrode, and the first common electrode overlaps a portion of the pair of longitudinal edges, which is located outside the outer boundary of the pixel electrode, and a portion of the outer boundary of the pixel electrode, which is located between the pair of longitudinal edges, in a plan view.

The above general aspect may include one or more of the following features. A widthwise edge of the slit is located outside the outer boundary of the pixel electrode, the widthwise edge of the slit extending in a widthwise direction of the second common electrode.

The second common electrode includes a plurality of band-shaped portions that extend in the longitudinal direction and are disposed in the widthwise direction; and a plurality of connection portions that extend in the widthwise direction for connecting the band-shaped portions, and the plurality of connection portions are located outside the outer boundary of the pixel electrode.

The pair of longitudinal edges may cross two closely adjacent outer boundaries of two pixel electrodes that are adjacent to each other in the longitudinal direction in a plan view.

The first common electrode may overlap an entire region enclosed by the pair of longitudinal edges and the two closely adjacent outer boundaries in a plan view.

Two closely adjacent outer boundaries of two pixel electrodes that are adjacent to each other in the widthwise direction may be located inside one of the plurality of slits in a plan view.

Two closely adjacent outer boundaries of two pixel electrodes that are adjacent to each other in the widthwise direction may not overlap the second common electrode in a plan view.

An opening may be formed on the first common electrode, and the pair of longitudinal edges cross an edge of the opening in a plan view.

The pixel region may include a third insulating film disposed between the first common electrode and the first substrate, and the plurality of data lines and the thin-film transistor may be disposed on a first substrate side of the third insulating film.

The third insulating film may include an organic insulating film made of an organic material having a dielectric constant lower than a dielectric constant of the first insulating film or the second insulating film.

In another general aspect, the liquid crystal display device of the present application includes a first substrate, a second substrate; and a liquid crystal layer sandwiched between the first substrate and the second substrate. A plurality of data lines, a plurality of gate lines, and a plurality of pixel regions, each of which is enclosed by adjacent two data lines and adjacent two gate lines are disposed on the first substrate. Each of the pixel regions may include a thin-film transistor connected to a data line, a transparent conductive pixel electrode connected to the thin film transistor, a first insulating film disposed on a first substrate side of the pixel electrode, a first common electrode that is transparent and conductive, and disposed between the first insulating film and the first substrate, a second insulating film disposed on a liquid crystal layer side of the pixel electrode, and a second common electrode that is transparent and conductive. The second common electrode is disposed between the second insulating film and the liquid crystal layer. The second common electrode includes a plurality of slits formed therein, the slits extending along the data lines. A pair of first edges of the plurality of slits may cross an outer boundary of the pixel electrode in a plan view. The first common electrode overlaps a portion of the pair of first edges and a portion of the outer boundary, in a plan view, the portion of the pair of first edges being located outside the outer boundary, and the portion of the outer boundary being located between the pair of first edges.

In another general aspect, a liquid crystal display device of the present application includes a first substrate, a second substrate, and a liquid crystal layer sandwiched between the first substrate and the second substrate. A plurality of data lines, a plurality of gate lines, and a plurality of pixel regions, each of which is enclosed by adjacent two data lines and adjacent two gate lines may be disposed on the first substrate. Each of the pixel regions may include a thin-film transistor connected to a data line, a transparent conductive pixel electrode connected to the thin-film transistor, a first insulating film disposed on a first substrate side of the pixel electrode, a first common electrode that is transparent and conductive, and disposed between the first insulating film and the first substrate, a second insulating film disposed on a liquid crystal layer side of the pixel electrode, and a second common electrode that is transparent and conductive, is disposed between the second insulating film and the liquid crystal layer. The second insulating film may include a plurality of slits formed therein, the plurality of slits extending along the plurality of gate lines. A pair of first edges of the plurality of slits may cross an outer boundary of the pixel electrode in a plan view. The pair of first edges may extend along the plurality of gate lines. The outer boundary may extend along the plurality of data lines. The first common electrode may overlap a portion of the pair of first edges and a portion of the outer boundary, in a plan view. The portion of the pair of first edges may be located outside the outer boundary. The portion of the outer boundary may be located between the pair of first edges.

In another general aspect, a liquid crystal display device of the present application includes a first substrate, a second substrate, and a liquid crystal layer sandwiched between the first substrate and the second substrate. The first substrate may include a plurality of data lines, a plurality of gate lines, and a plurality of pixel regions. Each of the plurality of pixel regions may be enclosed by adjacent two data lines and adjacent two gate lines. The plurality of data lines, the plurality of gate lines and the plurality of pixel regions are disposed on the first substrate. Each of the pixel regions includes a thin-film transistor connected to a data line, a transparent conductive pixel electrode connected to the thin-film transistor, a first insulating film disposed on a first substrate side of the data line and the pixel electrode, a first common electrode that is transparent and conductive, and disposed between the first insulating film and the first substrate, a second insulating film disposed on a liquid crystal layer side of the data line and the pixel electrode, and a second common electrode that is transparent and conductive. The second common electrode may be disposed between the second insulating film and the liquid crystal layer, and may include a plurality of slits formed therein. The first common electrode and the second common electrode may overlap a space disposed between the data line and the pixel electrode in a plan view.

The above general aspect may include one or more of the following features. An edge of the first common electrode overlaps the space, in a plan view.

When larger one in width of the data line and a black matrix that is disposed on the second substrate to correspond to the data line is defined as a light shielding region, an edge of one of the plurality of slits of the second common electrode is located outside the light shielding region and overlaps the pixel electrode, in a plan view. A distance between the edge of one of the plurality of slits of the second common electrode and an edge of the light shielding region in a plan view may be smaller than a half of a width of the one of the plurality of slits of the second common electrode.

A slit may be disposed in the first common electrode. A space may be formed between an edge of the slit of the first common electrode and the boundary of the pixel electrode. The first common electrode may overlap the space, in a plan view.

A pair of pixel regions adjacent to each other in a longitudinal direction of the data line may be disposed between a pair of plurality of gate lines. A common line parallel to the plurality of gate lines may be disposed between the pair of pixel regions. The common line may be connected to the first common electrode included in each of the pair of pixel regions.

A space between two closely adjacent boundaries of the pair of pixel electrodes adjacent to each other in the longitudinal direction of the data line may overlap the first common electrode, the second common electrode, and the common line in a plan view.

A first common electrodes included in the plurality of pixel regions arrayed in a longitudinal direction of the plurality of gate lines may be continuously formed. A common line that overlaps the data line in a plan view and being connected to the first common electrode may be disposed.

A via conductor that is connected to the first common electrode and the second common electrode may be disposed through a hole formed in the first insulating film and the second insulating film in some pixel regions out of the plurality of pixel regions arrayed in a longitudinal direction of the gate line.

In another general aspect, a liquid crystal display device of the present application includes a first substrate, a second substrate; and a liquid crystal layer sandwiched between the first substrate and the second substrate. A plurality of data lines, a plurality of gate lines, and a plurality of pixel regions, each of which is enclosed by adjacent two data lines and adjacent two gate lines may be formed on the first substrate. Each of the pixel regions may include a thin-film transistor connected to a data line, a transparent conductive pixel electrode connected to the thin-film transistor, a first insulating film disposed between the data line and the pixel electrode, and the first substrate, a second insulating film disposed between the data line and the pixel electrode, and the liquid crystal layer, a third insulating film disposed between the first insulating film and the first substrate, a first common electrode that is transparent and conductive, and disposed between the first insulating film and the first substrate, and a second common electrode that is transparent and conductive, is disposed between the second insulating film and the liquid crystal layer, and includes a plurality of slits formed therein. One of a gate line and the first common electrode may be disposed between the first insulating film and the third insulating film. The other may be disposed between the third insulating film and the first substrate.

The above general aspect may include one or more of the following features. The gate line and the first common electrode may overlap with each other in a plan view.

Two first common electrodes adjacent to each other in the longitudinal direction of the plurality of data lines may be connected to each other via a connection portion across the gate line. The connection portion may overlap the gate line in a plan view.

The connection portion may be thinner than the first common electrode in a longitudinal direction of the plurality of gate lines.

Two first common electrodes adjacent to each other in a longitudinal direction of the plurality of gate lines may be connected to each other via a connection portion across the data line. The connection portion may overlap the data line in a plan view.

The connection portion may be thinner than the first common electrode in a longitudinal direction of the plurality of data lines.

An edge of the first common electrode may be located between the pixel electrode and a gate line in a plan view.

An edge of the first common electrode may be located between the pixel electrode and the data line in a plan view.

The data line may include a transparent conductive film made of a material identical to a material of the pixel electrode and a metal film disposed on the transparent conductive film.

The pixel electrode may be sandwiched between a source electrode or a drain electrode and a semiconductor layer of the thin-film transistor.

In another general aspect, a method for manufacturing a liquid crystal display device of the present application, the liquid crystal display device may include a first substrate, a second substrate, and a liquid crystal layer sandwiched between the first substrate and the second substrate. A plurality of data lines, a plurality of gate lines, and a plurality of pixel regions, each of which is enclosed by adjacent two data lines and adjacent two gate lines are disposed on the first substrate. Each of the pixel regions may include a thin-film transistor connected to a data line, a transparent conductive pixel electrode connected to the thin-film transistor, a first insulating film disposed between the data line and the pixel electrode, and the first substrate, a second insulating film disposed between the data line and the pixel electrode, and the liquid crystal layer; and a common electrode disposed between the first insulating film and the first substrate or between the second insulating film and the liquid crystal layer. The method may include forming a semiconductor layer of the thin-film transistor by using a first mask, and forming the pixel electrode, the data lines, and a source electrode and a drain electrode of the thin-film transistor by using a second mask different from the first mask.

In another general aspect, a liquid crystal display device of the present application may include a first substrate, a second substrate, and a liquid crystal layer sandwiched between the first substrate and the second substrate. A plurality of data lines, a plurality of gate lines, and a plurality of pixel regions, each of which is enclosed by adjacent two data lines and adjacent two gate lines may be disposed on the first substrate. Each of the pixel regions may include a thin-film transistor connected to a data line, a transparent conductive pixel electrode connected to the thin-film transistor, a first common electrode that is transparent and conductive, and disposed between the pixel electrode and the first substrate, a first insulating film disposed between the pixel electrode and the first common electrode to cover the first common electrode, a second insulating film that covers the pixel electrode, a second common electrode that is transparent and conductive, is disposed on the second insulating film, and includes a plurality of slits formed therein, and a third insulating film disposed between the data line and the thin-film transistor, and the first common electrode to cover the data line and the thin-film transistor. The pixel electrode may be connected to the thin-film transistor through a contact hole formed in the first insulating film and the third insulating film. A space between two closely adjacent boundaries of a pair of pixel electrodes that are adjacent to each other in a longitudinal direction of the plurality of gate lines may overlap the first common electrode and the second common electrode in a plan view.

The above general aspect may include one or more of the following features. A thickness of the first insulating film and a thickness of the second insulating film may be smaller than a distance in the space between the two boundaries.

A boundary of the pixel electrode, the first common electrode, and the second common electrode may overlap the data line in a plan view.

The two closely adjacent boundaries of the pair of pixel electrodes that are adjacent to each other in the longitudinal direction of the plurality of gate lines may overlap the data line in a plan view. The first common electrode and the second common electrode may overlap the space between the two boundaries in a plan view.

The third insulating film may be made of an organic material having a dielectric constant lower than a dielectric constant that of the first insulating film or the second insulating film.

The third insulating film may include an organic insulating film that is made of an organic material and that is thicker than the first insulating film or the second insulating film.

When larger one in a width of the data line and a black matrix that is disposed on the second substrate to correspond to the data line is defined as a light shielding region, an edge of one of the plurality of slits of the second common electrode may be located outside the light shielding region in a plan view. The distance between the edge of the one of the plurality of slits of the second common electrode and an edge of the light shielding region in a plan view may be smaller than a half of a width of the one of the plurality of slits of the second common electrode.

When larger one in a width of the data line and a black matrix that is disposed on the second substrate to correspond to the data line is defined as a light shielding region, an edge of the one of the plurality of slits of the second common electrode may be located inside the light shielding region in a plan view.

The liquid crystal display device may further include a common line that overlaps the data line in a plan view, may be connected to the first common electrode, and may have a higher conductivity than the first common electrode.

In another general aspect, a liquid crystal display device of the present application may include a first substrate, a second substrate, and a liquid crystal layer sandwiched between the first substrate and the second substrate. A plurality of data lines, a plurality of gate lines, and a plurality of pixel regions, each of which is enclosed by adjacent two data lines and adjacent two gate lines may be disposed on the second substrate. Each of the pixel regions may include a thin-film transistor connected to a data line, a transparent conductive pixel electrode connected to the thin-film transistor, a first common electrode that is transparent and conductive, and disposed between the pixel electrode and the first substrate, a first insulating film disposed between the pixel electrode and the first common electrode to cover the first common electrode, a second insulating film that covers the pixel electrode, a second common electrode that is transparent and conductive, is disposed on the second insulating film, and includes a plurality of slits formed therein, and a third insulating film disposed between the data line and the thin-film transistor, and the first common electrode to cover the data line and the thin-film transistor. The pixel electrode may be connected to the thin-film transistor through a contact hole formed in the first insulating film and the third insulating film. Two closely adjacent outer boundaries of the pixel electrode that are adjacent to each other in a widthwise direction of the plurality of slits may overlap the first common electrode in a plan view, and are located inside one slit of the plurality of slits of the second common electrode.

An entirety of the two closely adjacent outer boundaries may overlap the first common electrode in a plan view, and is located inside the one slit of the second common electrode.

The two closely adjacent outer boundaries may not overlap the second common electrode in a plan view.

A pair of edges of the plurality of slits respectively may cross the boundaries of the two pixel electrodes adjacent to each other in the widthwise direction in a plan view. The pair of edges may extend in a longitudinal direction of the plurality of slits, and the boundaries extending in the widthwise direction.

The plurality of slits may extend along the data line. An opening for connecting the thin-film transistor and the pixel electrode may be formed on the first common electrode. The opening may overlap a region between two pixel electrodes adjacent to each other in the direction in which the data line extends, in a plan view.

The plurality of slits may extend along the plurality of gate lines. An opening for connecting the thin-film transistor and the pixel electrode may be formed on the first common electrode. The opening may overlap a region between two pixel electrodes adjacent to each other in a direction in which the plurality of gate lines extend, in a plan view.

The two closely adjacent outer boundaries may overlap the plurality of data lines or the plurality of gate lines in a plan view.

The third insulating film may include an organic insulating film made of an organic material having a dielectric constant lower than a dielectric constant of the first insulating film or the second insulating film.

In another general aspect, a liquid crystal display device of the present application may include a first substrate, a second substrate, and a liquid crystal layer sandwiched between the first substrate and the second substrate. A plurality of data lines, a plurality of gate lines, and a plurality of pixel regions, each of which is enclosed by adjacent two data lines and adjacent two gate lines are disposed on the first substrate. Each of the pixel regions may include a thin-film transistor connected to a data line, a transparent conductive pixel electrode connected to the thin-film transistor, a first common electrode that is transparent and conductive, and disposed between the pixel electrode and the first substrate, a first insulating film disposed between the pixel electrode and the first common electrode to cover the first common electrode, a second insulating film that covers the pixel electrode, a second common electrode that is transparent and conductive, is disposed on the second insulating film, and includes a plurality of slits formed therein, and a third insulating film disposed between the data line and the thin-film transistor, and the first common electrode to cover the data line and the thin-film transistor. The pixel electrode may be connected to the thin-film transistor through a contact hole formed in the first insulating film and the third insulating film. The plurality of slits may extend along the data line. Two closely adjacent outer boundaries of two pixel electrodes adjacent to each other in a direction in which the plurality of gate lines extend may overlap the first common electrode in a plan view, and may be located inside one of the plurality of slits of the second common electrode. The two closely adjacent outer boundaries may extend along the data line.

In the other general aspect, a liquid crystal display device of the present application may include a first substrate, a second substrate, and a liquid crystal layer sandwiched between the first substrate and the second substrate. A plurality of data lines, a plurality of gate lines, and a plurality of pixel regions, each of which is enclosed by adjacent two data lines and adjacent two gate lines may be disposed on the first substrate. Each of the pixel regions may include a thin-film transistor connected to a data line, a transparent conductive pixel electrode connected to the thin-film transistor, a first common electrode that is transparent and conductive, and disposed between the pixel electrode and the first substrate, a first insulating film disposed between the pixel electrode and the first common electrode to cover the first common electrode, a second insulating film that covers the pixel electrode, a second common electrode that is transparent and conductive, is disposed on the second insulating film, and includes a plurality of slits formed therein, a third insulating film disposed between the data line and the thin-film transistor, and the first common electrode to cover the data line and the thin-film transistor. The pixel electrode may be connected to the thin-film transistor through a contact hole formed in the first insulating film and the third insulating film. The plurality of slits may extend along the plurality of gate lines. Two closely adjacent outer boundaries of two pixel electrodes adjacent to each other in the direction in which the data line extends may overlap the first common electrode in a plan view, and may be located inside one of the plurality of slits of the second common electrode. The two closely adjacent outer boundaries may extend along the plurality of gate lines.

According to the present disclosure, the storage capacitance between the pixel electrode and the common electrode can increase, and a quantity of light passing through the pixel region can also increase.

BRIEF DESCRIPTION OF THE DRAWINGS

FIG. 4 is a sectional view taken along a line 4-4' shown in FIG. 2A.

FIG. 6A is a plan view of one pixel region in the liquid crystal panel according to the first embodiment when a first photo-process is completed.

FIG. 6B is a sectional view taken along a line b-b' shown in FIG. 6A.

FIGS. 13A and 13B are plan views illustrating one pixel region in the liquid crystal panel according to a second embodiment.

FIG. 83B is a sectional view taken along a line b-b' shown in FIG. 83A.

FIG. 84A is a plan view of one pixel in the liquid crystal display panel according to the twelfth embodiment when a fourth photo-process is completed.

FIG. 84B is a sectional view taken along a line b-b' shown in FIG. 84A.

FIG. 85A is a plan view of one pixel in the liquid crystal display panel according to the twelfth embodiment when a fifth photo-process is completed.

FIG. 85B is a sectional view taken along a line b-b' shown in FIG. 85A.

FIG. 86A is a plan view of one pixel in the liquid crystal display panel according to the twelfth embodiment when a sixth photo-process is completed.

FIG. 86B is a sectional view taken along a line b-b' shown in FIG. 86A.

FIG. 87A is a plan view of one pixel in the liquid crystal panel according to the twelfth embodiment when a seventh photo-process is completed.

FIG. 87B is a sectional view taken along a line b-b' shown in FIG. 82A.

FIG. 88 is a detailed plan view illustrating one pixel region in the liquid crystal display according to the twelfth embodiment.

FIG. 89 is a sectional view taken along a line 89-89' shown in FIG. 88.

FIGS. 90A and 90B are detailed plan views illustrating one pixel region in a liquid crystal panel according to a thirteenth embodiment.

Figure 90A:
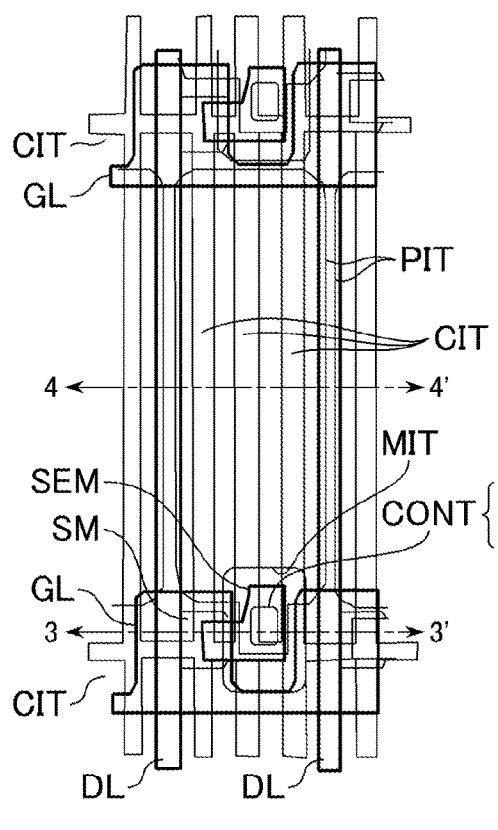
Figure 90B:
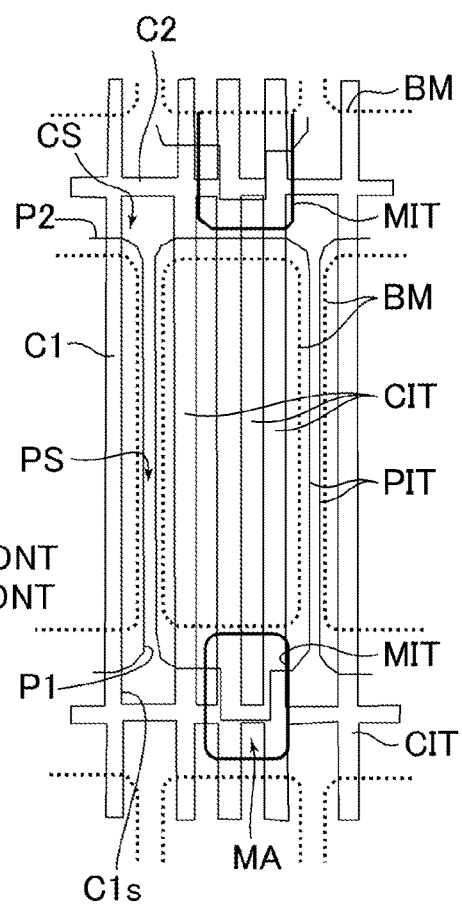
Figure 91:
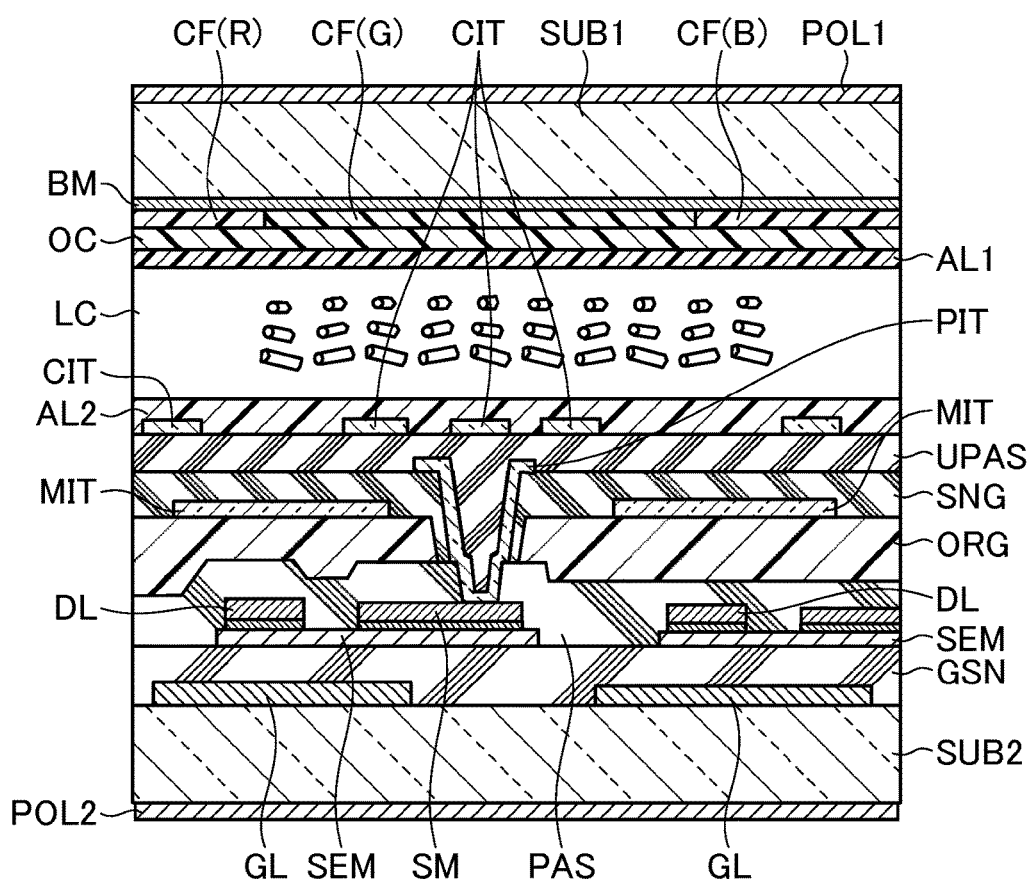

FIG. 91 is a sectional view taken along a line 91-91' shown in FIG. 90.

Figure 92:
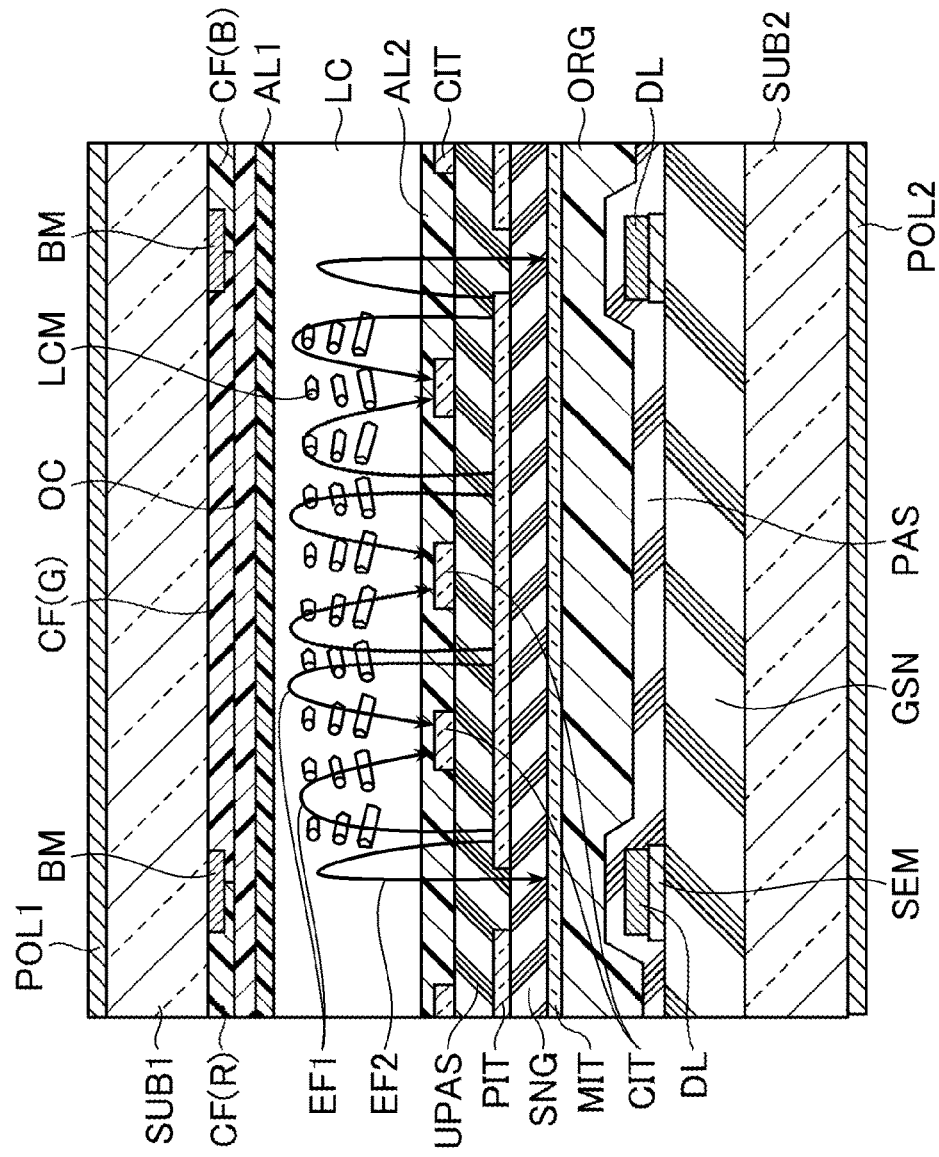

FIG. 92 is a sectional view taken along a line 92-92' shown in FIG. 90.

FIG. 93A is a plan view of one pixel in the liquid crystal display panel according to the thirteenth embodiment when a first photo-process is completed.

FIG. 93B is a sectional view taken along a line b-b' shown in FIG. 93A.

Figure 94A:
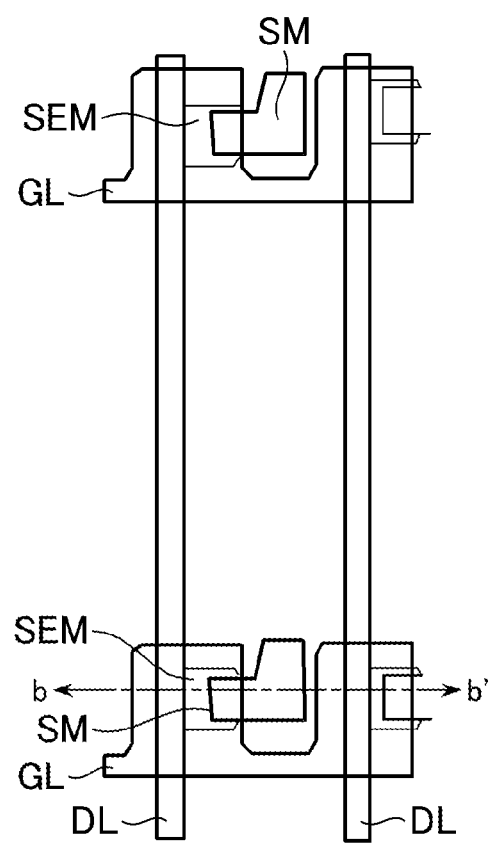

FIG. 94A is a plan view of one pixel in the liquid crystal display panel according to the thirteenth embodiment when a second photo-process is completed.

Figure 94B:
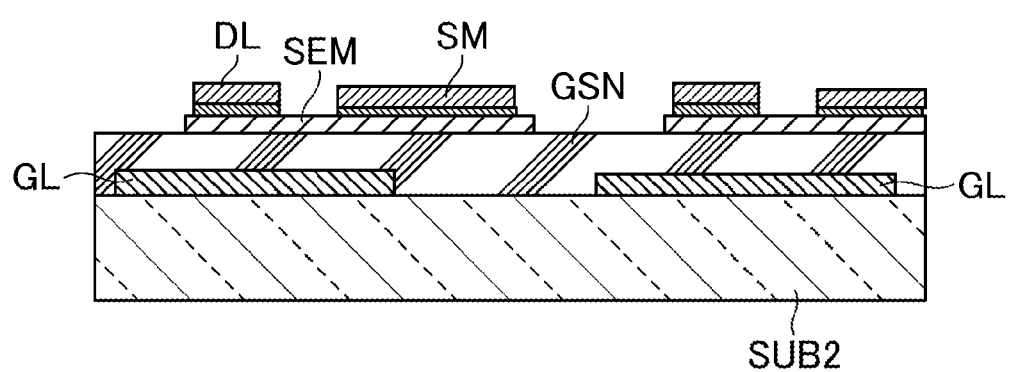

FIG. 94B is a sectional view taken along a line b-b' shown in FIG. 94A.

Figure 95A:
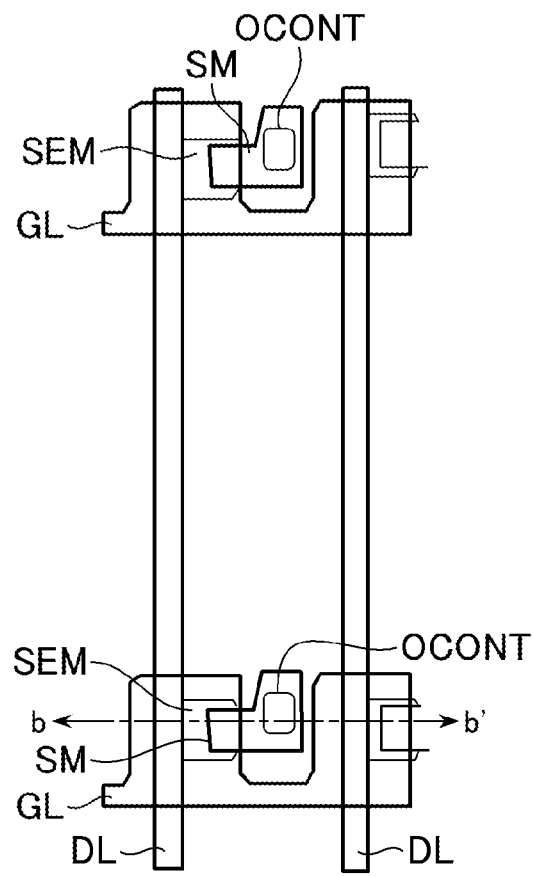

FIG. 95A is a plan view of one pixel in the liquid crystal display panel according to the thirteenth embodiment when a third photo-process is completed.

Figure 95B:
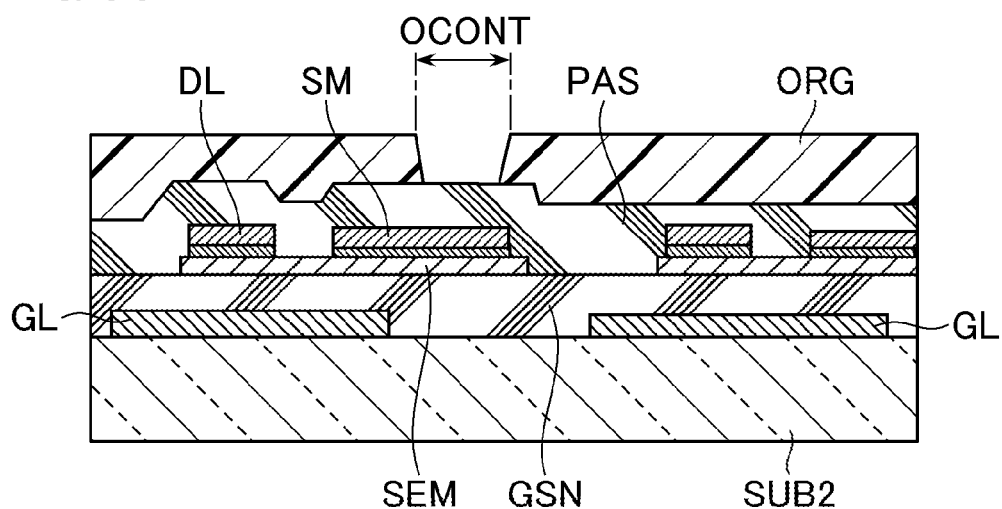

FIG. 95B is a sectional view taken along a line b-b' shown in FIG. 95A.

Figure 96A:
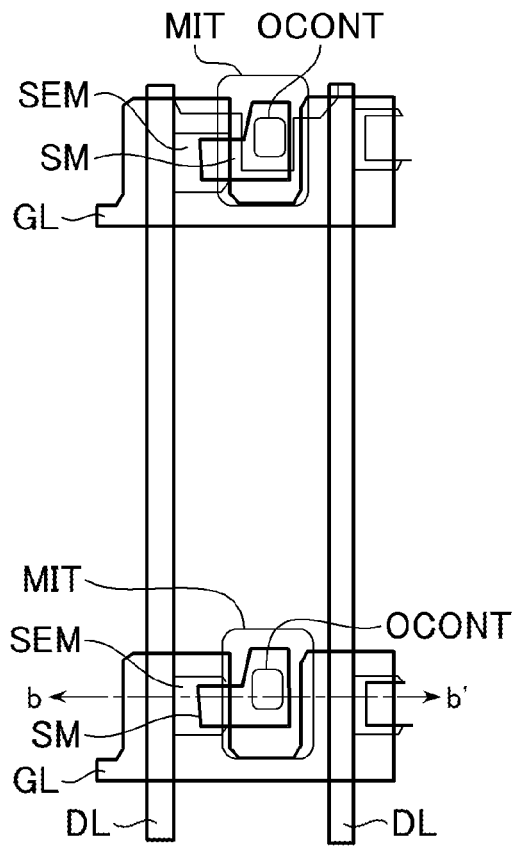

FIG. 96A is a plan view of one pixel in the liquid crystal display panel according to the thirteenth embodiment when a fourth photo-process is completed.

Figure 96B:
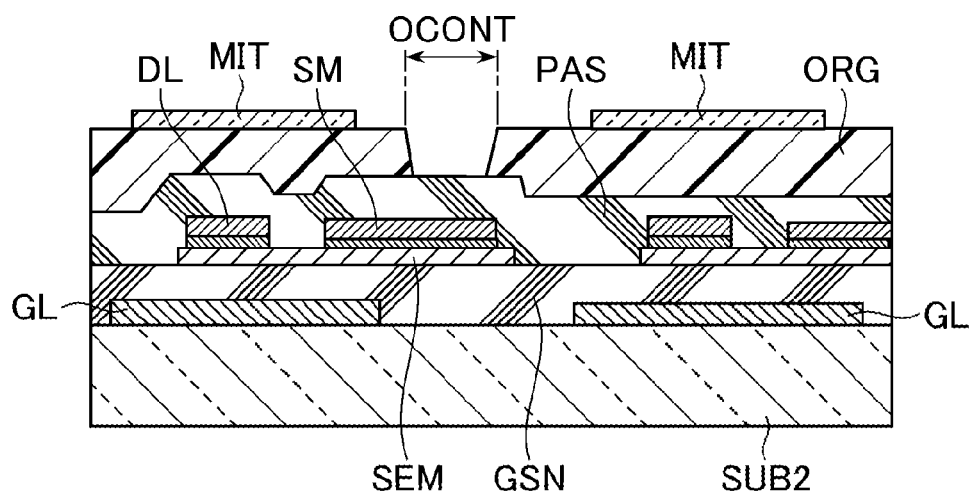

FIG. 96B is a sectional view taken along a line b-b' shown in FIG. 96A.

Figure 97A:
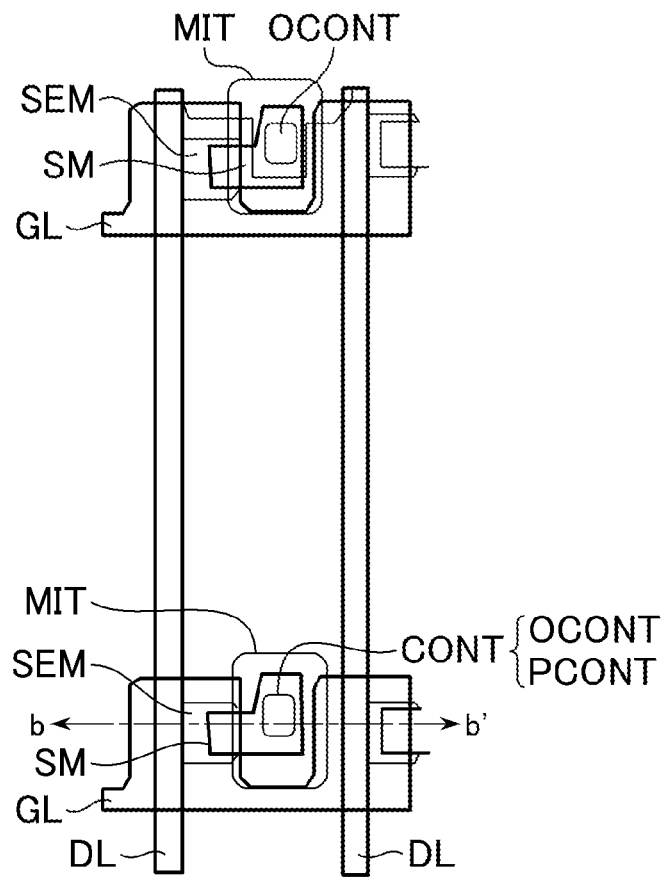

FIG. 97A is a plan view of one pixel in the liquid crystal display panel according to the thirteenth embodiment when a fifth photo-process is completed.

Figure 97B:
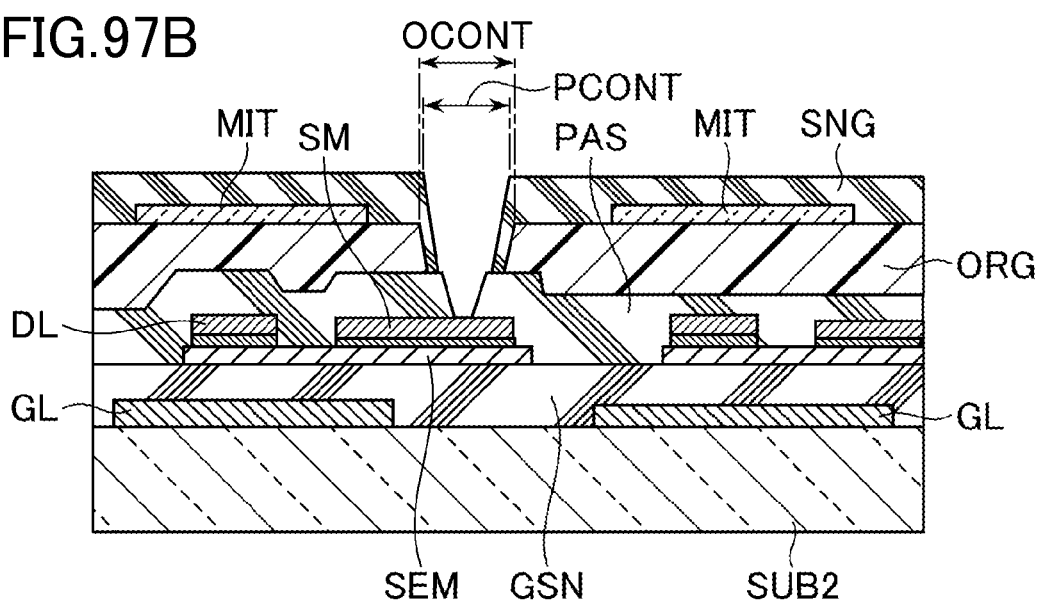

FIG. 97B is a sectional view taken along a line b-b' shown in FIG. 97A.

Figure 98A:
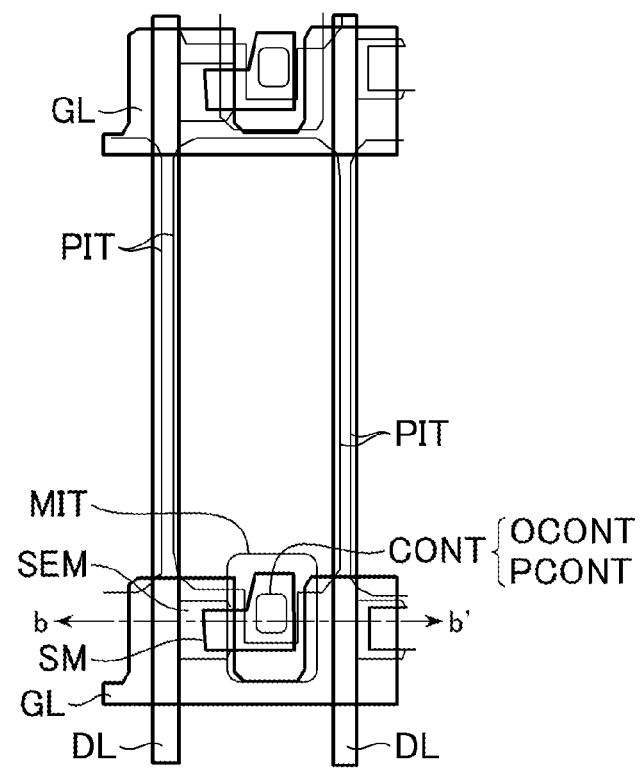

FIG. 98A is a plan view of one pixel in the liquid crystal display panel according to the thirteenth embodiment when a sixth photo-process is completed.

Figure 98B:
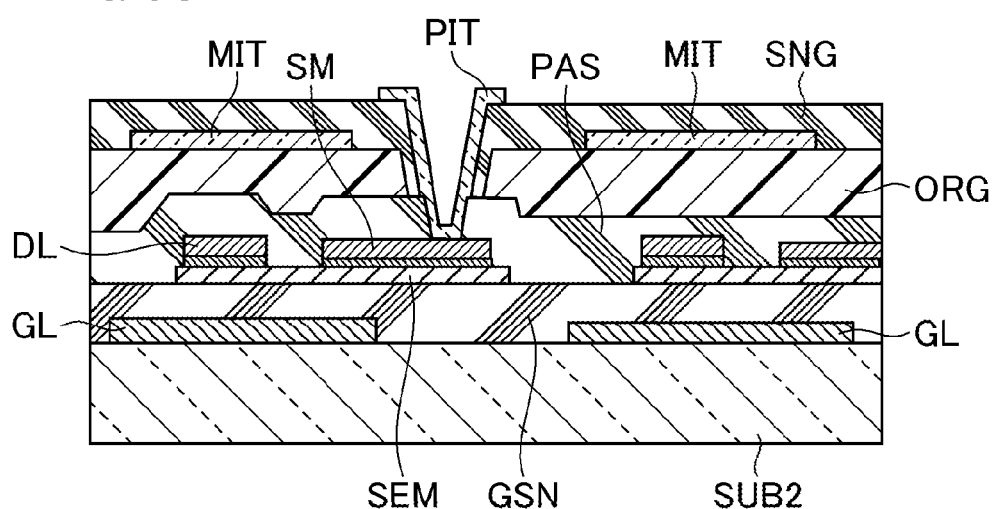

FIG. 98B is a sectional view taken along a line b-b' shown in FIG. 98A.

Figure 99A:
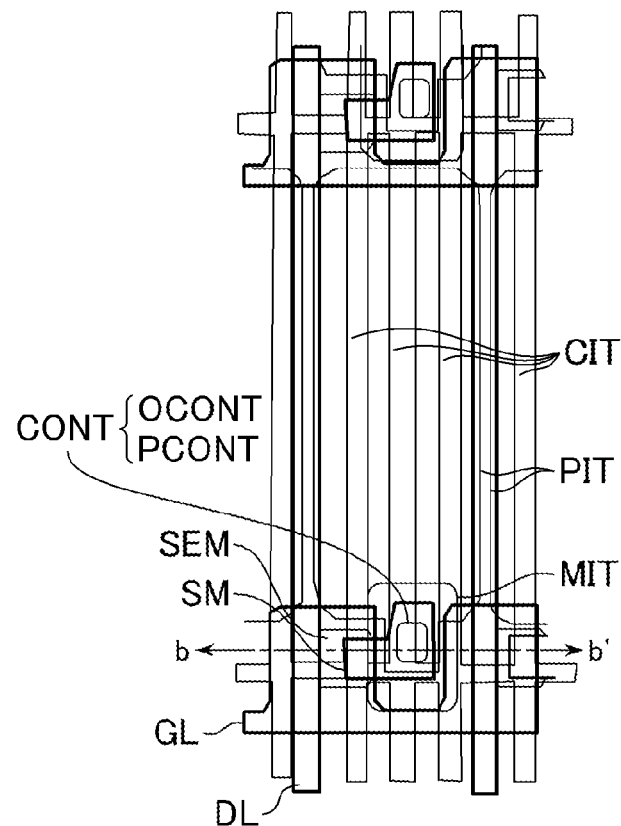

FIG. 99A is a plan view of one pixel in the liquid crystal display panel according to the thirteenth embodiment when a seventh photo-process is completed.

Figure 99B:
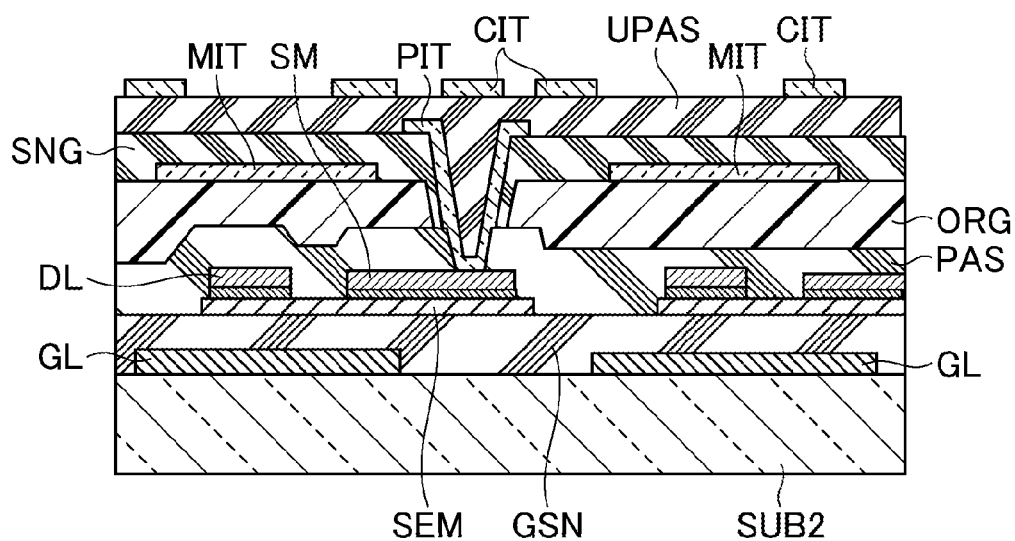

FIG. 99B is a sectional view taken along a line b-b' shown in FIG. 99A.

Figure 100A:
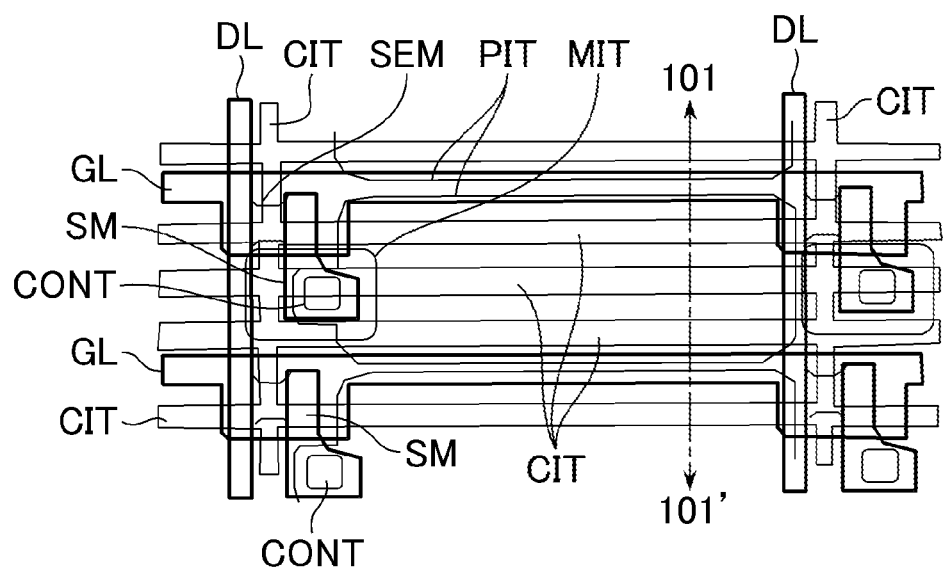
Figure 100B:
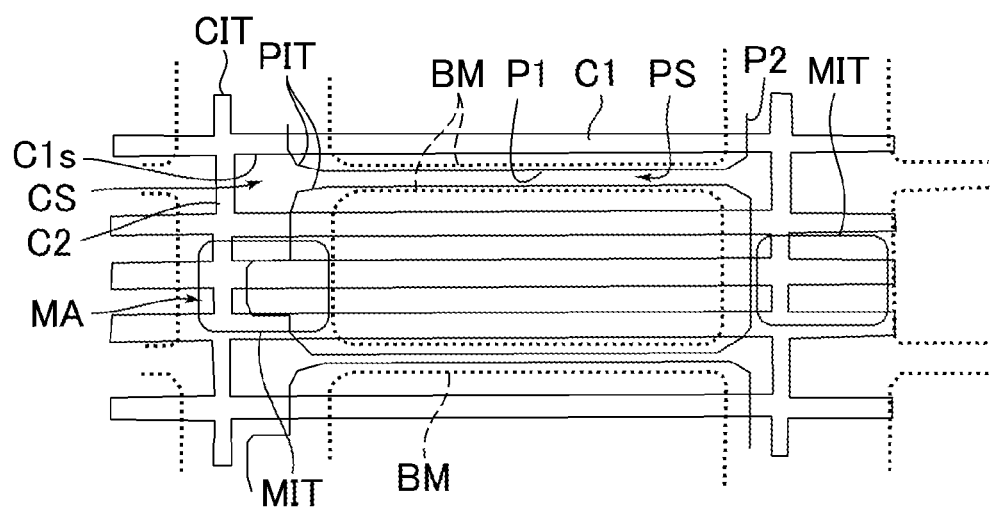

FIGS. 100A and 100B are detailed plan views illustrating one pixel region in the liquid crystal panel according to the fourteenth embodiment.

Figure 101:
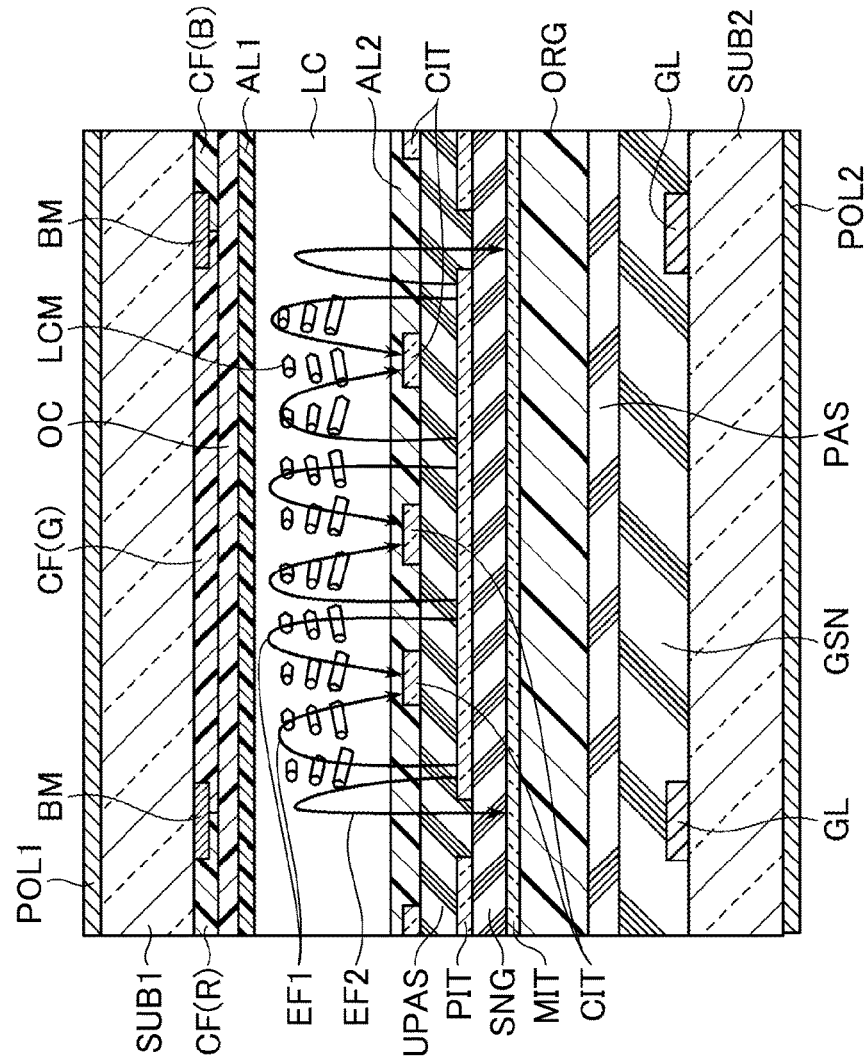

FIG. 101 is a sectional view taken along a line 101-101' shown in FIG. 100.

DETAILED DESCRIPTION

Exemplary display devices are described below with reference to the drawings. In the following embodiments, similar constituent elements are assigned with similar reference numerals. Redundant explanation is omitted as appropriate to clarify the description. Configurations, arrangements and shapes shown in the drawings and description relating to the drawings aim to make principles of the embodiments easily understood. Therefore, the principles of the present embodiments are not limited thereto.

It is to be understood that the following disclosure provides many different embodiments, or examples, for implementing different features of the present subject matter. Specific embodiments or examples of components and arrangements are described below to simplify the present disclosure. These are, of course, merely examples and are not intended to be limiting. For example, dimensions of elements are not limited to the disclosed range or values, but may depend upon process conditions and/or desired properties of the device. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for simplicity and clarity.

Further, spatially relative terms, such as "beneath," "below," "bottom," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. In addition, the term "made of" may mean either "comprising" or "consisting of."

[Basic Structure]

Figure 1:
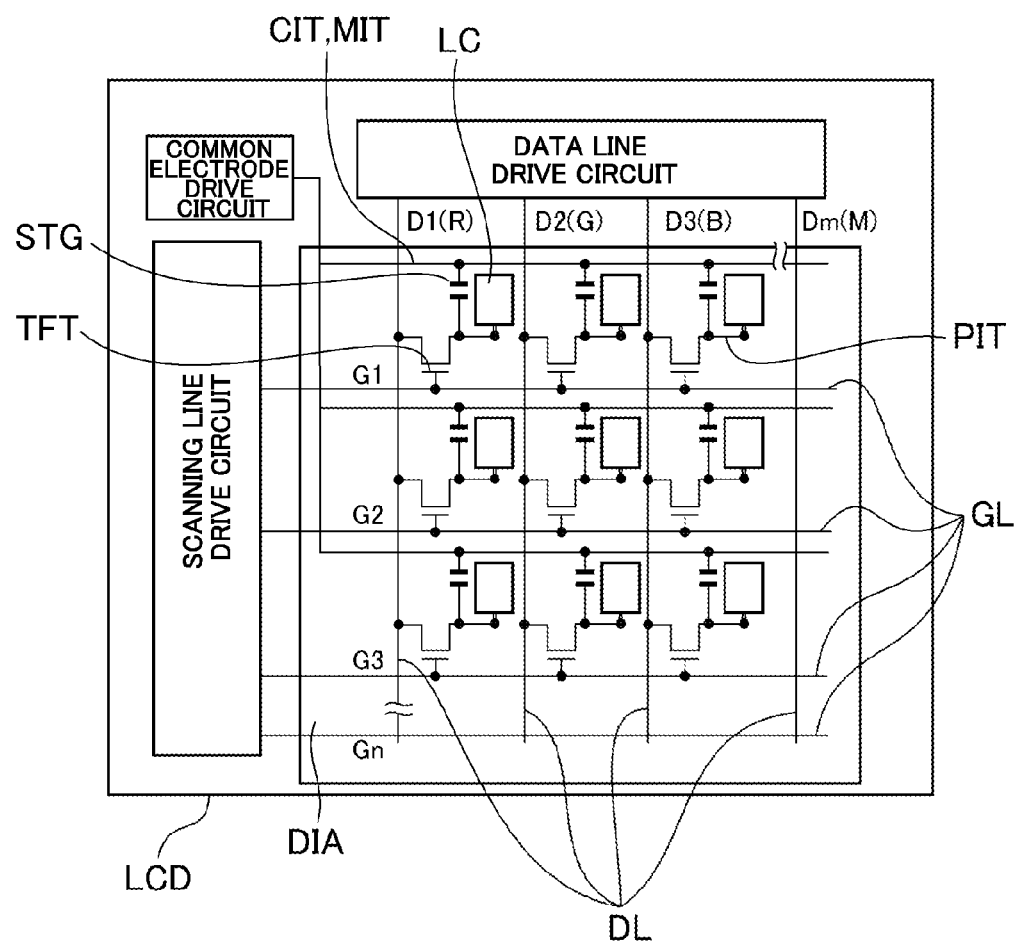
FIG. 1 is a diagram illustrating a system and a circuit connection of a liquid crystal display device.

FIG. 1 illustrates a system and a circuit connection of a liquid crystal display device according to all embodiments of this present application. A liquid crystal display device LCD includes a screen region DIA and a drive circuit region around the screen region DIA. An active matrix display is arranged in the screen region DIA. A scanning-voltage is applied to scanning (gate) lines G1, G2, . . . Gn from a scanning line drive circuit, and a video-data voltage is applied to data lines D1, D2, . . . Dm from a data line drive circuit. The video-data voltage is applied to a transparent pixel electrode PIT by turning on or off a thin-film transistor TFT, and a common voltage is applied to a transparent common electrode CIT from a common electrode drive circuit. An electric field generated between the transparent pixel electrode PIT and the transparent common electrode CIT drives a liquid crystal layer LC. A storage capacitance STG is formed in each pixel region for preventing a voltage drop in the liquid crystal layer LC. The common voltage is propagated from the common electrode drive circuit to the transparent common electrode CIT and a transparent storage capacitance electrode MIT. A desired video-data voltage is applied to the data lines D1 (R), D2 (G), and D3 (B) connected to pixels corresponding to red (R), green (G), and blue (B), whereby a color display is realized.

First Embodiment

Referring to FIGS. 2~12, a liquid crystal panel of a first embodiment will be described.

Figure 2A:
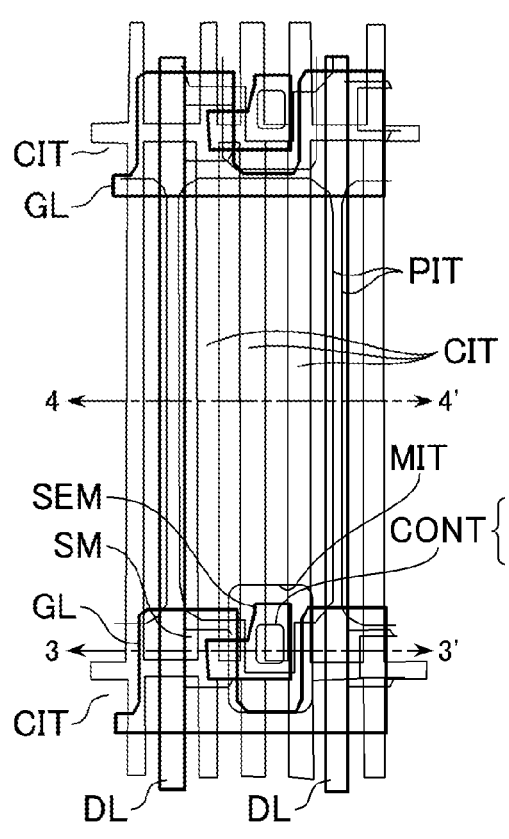
FIGS. 2A and 2B are detailed plan views illustrating one pixel region in a liquid display panel according to a first embodiment.
Figure 2B:
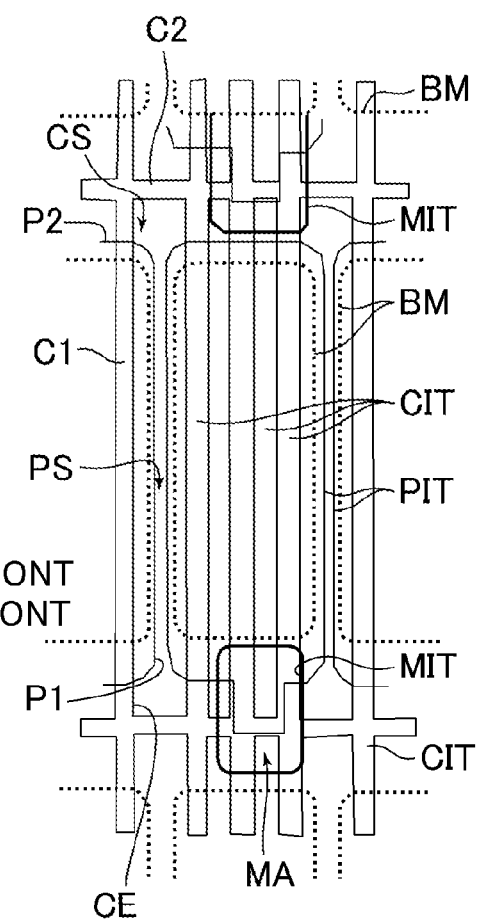
Figure 3:
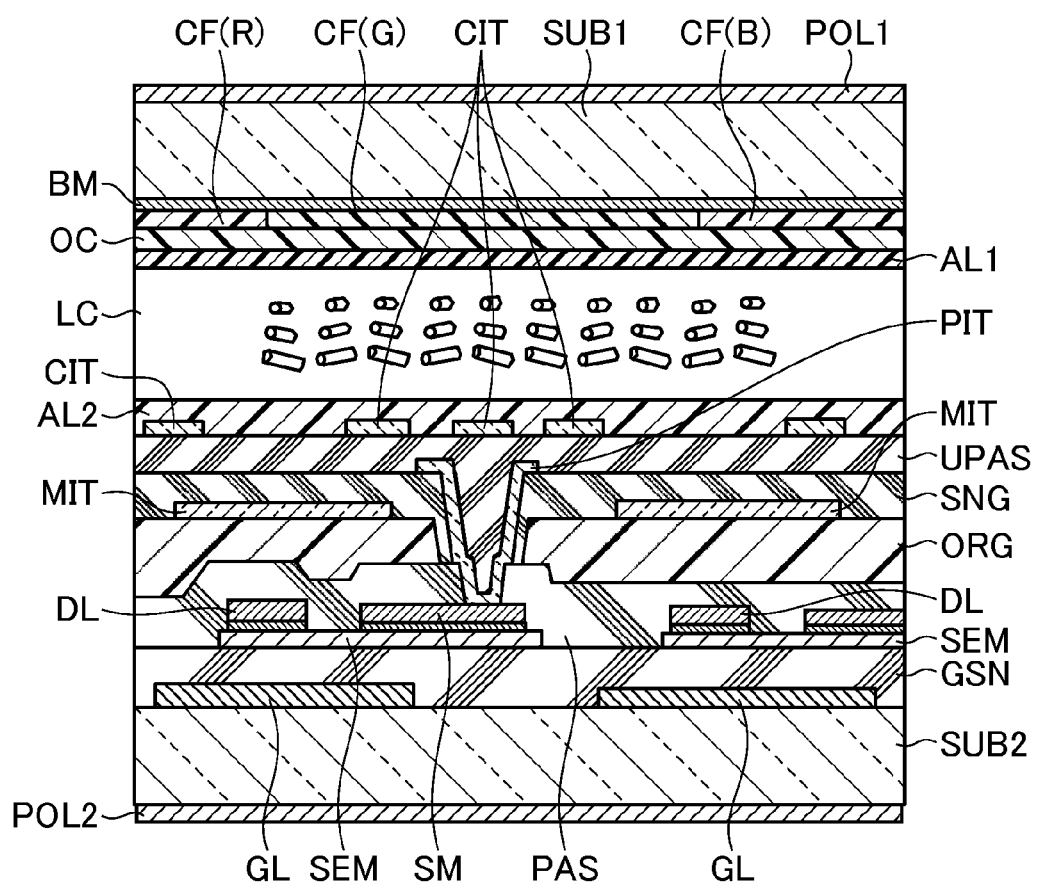
FIG. 3 is a sectional view taken along a line 3-3' shown in FIG. 2A.

FIGS. 2A and 2B are detailed plan views each illustrating one pixel region, FIG. 3 is a sectional view taken along line 3-3' in FIG. 2A, and FIG. 4 is a sectional view taken along line 4-4' in FIG. 2A.

FIGS. 2A and 2B are plan views each illustrating a thin-film transistor TFT, one pixel region enclosed by the gate lines GL and the data lines DL, and a part of the neighboring pixel region adjacent to this pixel region, all of which are illustrated in FIG. 1. To facilitate understanding of the structure, FIG. 2A illustrates patterns of almost all layers, while FIG. 2B illustrates only a pattern of each transparent electrode and a projected position (broken line) of an opening of a black matrix BM. An inner side of the opening of the black matrix BM is a light transmittance region, and an outer side of the opening is a light shielding region.

The arrangement and function of each configuration in FIG. 2A will be described. Each of the gate lines GL is made of a low resistance metal layer. The gate lines GL are connected to the scanning line drive circuit in FIG. 1, and a scanning-voltage is applied to the gate lines GL from the scanning line drive circuit. On the other hand, each of the data lines DL is also made of a low resistance metal layer, and a video-data voltage is applied to the data lines DL. In the case where a gate-on voltage is applied to the gate lines GL, the resistance of the semiconductor layer SEM of the thin-film transistor TFT becomes low, whereby the voltage of the data lines DL is transmitted to a source electrode SM made of a low resistance metal layer, and also transmitted to the transparent pixel electrode PIT connected to the source electrode SM via a contact hole.

The common voltage that is another voltage applied to the liquid crystal layer is applied to the transparent common electrode CIT and the transparent storage capacitance electrode MIT from the common electrode drive circuit in FIG. 1. The transparent pixel electrode PIT is stacked on the transparent storage capacitance electrode MIT with an insulating film interposed therebetween. The transparent common electrode CIT is also stacked on the transparent pixel electrode PIT with an insulating film interposed therebetween. The transparent common electrode CIT has a plurality of slits formed therein. The electric field from the transparent pixel electrode PIT reaches the inside of the liquid crystal layer through the slits of the transparent common electrode CIT disposed on the transparent pixel electrode PIT, is folded in the liquid crystal layer, and finally reaches the transparent common electrode CIT. Thus, a transverse electric field is applied to the liquid crystal layer.

In the present embodiment, an elongated closed opening is referred to as a slit. However, the slit is not limited thereto. The slit may be an elongated cutout with one end open. The width of the slit may be larger than the distance between the slits.

The transparent storage capacitance electrode MIT is also connected to the common electrode drive circuit in FIG. 1, and the common voltage is applied to the transparent storage capacitance electrode MIT from the common electrode drive circuit. The transparent storage capacitance electrode MIT is disposed below the transparent pixel electrode PIT with an insulating film interposed therebetween, and the storage capacitance STG is formed between the transparent pixel electrode PIT and the transparent storage capacitance electrode MIT. As described above, in the present embodiment, the transparent common electrode CIT having the slits, the transparent pixel electrode PIT, and the transparent storage capacitance electrode MIT are formed on the pixel region. These three different transparent conductive films are formed by different processes. The transparent pixel electrode PIT is connected to the source electrode SM via a contact hole CONT formed on the insulating film, and disposed independently on each pixel region. On the other hand, the transparent storage capacitance electrode MIT and the transparent common electrode CIT are connected in the form of a network over the entire screen region DIA to cover the plurality of pixel regions.

The present embodiment is mainly characterized by planar patterns of the transparent common electrode CIT, the transparent storage capacitance electrode MIT, and the transparent pixel electrode PIT in one pixel region. Therefore, the relationship of these patterns will be described with reference to FIG. 2B.

The pattern of the uppermost layer in FIG. 2B is the transparent common electrode CIT. The transparent common electrode CIT has a plurality of band-shaped portions C1 extending parallel to the data lines DL, and a plurality of slits CS are formed between the band-shaped portions C1. In the present embodiment, the longitudinal direction of the slit CS means the extending direction of the data lines DL, and the widthwise direction of the slit CS means the extending direction of the gate lines GL.

In a plan view, the transparent pixel electrode PIT can be seen through each slit CS of the transparent common electrode CIT. Among these slits CS, the slit CS located above the data line DL is formed to be wider than the other slits CS, and an outer boundary P1 of the transparent pixel electrode PIT is present in this slit CS, the outer boundary P1 being parallel to the longitudinal direction of the slit CS.

Specifically, two closely adjacent outer boundaries P1 of two transparent pixel electrodes PIT that are adjacent to each other in the widthwise direction of the slit CS, and a space PS between these two closely adjacent outer boundaries P1 are included in the slit CS located above the data line DL. In other words, the two closely adjacent outer boundaries P1 of two transparent pixel electrodes PIT that are adjacent to each other in the widthwise direction of the slit CS, and the space PS between these two closely adjacent outer boundaries P1 are not covered with the transparent common electrode CIT, i.e., not overlapped with the transparent common electrode CIT in a plan view.

A pair of edges CE of the slit CS located above the data line DL respectively crosses outer boundaries P2 of two transparent pixel electrodes PIT that are adjacent to each other in the widthwise direction of the slit CS in a plan view, the pair of edges CE extending in the longitudinal direction of the slit CS, and the outer boundaries P2 being parallel to the widthwise direction of the slit CS.

The two closely adjacent outer boundaries P1 of two transparent pixel electrodes PIT that are adjacent to each other in the widthwise direction of the slit CS and the space PS between the two closely adjacent outer boundaries P1 overlap the transparent storage capacitance electrode MIT disposed below the transparent pixel electrode PIT in a plan view. The two closely adjacent outer boundaries P1 of two transparent pixel electrodes PIT that are adjacent to each other in the widthwise direction of the slit CS and the space PS between the two closely adjacent outer boundaries P1 also overlap the data line DL disposed below the transparent storage capacitance electrode MIT in a plan view.

The transparent common electrode CIT includes a plurality of connection portions C2 that connect the plurality of band-shaped portions C1 in the widthwise direction of the slit CS above the gate lines GL. The connection portions C2 are disposed in a region where light is shielded by the black matrix BM. Therefore, the band-shaped portions C1 of the transparent common electrode CIT become an electrode that mainly drives the liquid crystal in the opening of the black matrix BM.

The transparent pixel electrode PIT has a planar pattern disposed independently in each pixel region. The transparent pixel electrode PIT and the source electrode SM are connected to each other via the contact hole CONT formed on the insulating film. The outer boundaries P1 and P2 of the adjacent transparent pixel electrodes PIT are separated across the data line DL and the gate line GL respectively.

The transparent storage capacitance electrode MIT is disposed below the transparent pixel electrode PIT with the insulating film interposed therebetween. The transparent storage capacitance electrode MIT is formed into a sheet shape spreading in a plane, and an opening MA is formed corresponding to each pixel region. FIGS. 2A and 2B illustrate an edge of the opening MA. The opening MA is formed to overlap the region between the two transparent pixel electrodes PIT that are adjacent to each other in the longitudinal direction of the slit CS. The contact hole CONT is formed in the opening MA. The transparent storage capacitance electrode MIT is disposed above the gate line GL and the data line DL with the insulating film interposed therebetween to cover the gate line GL and the data line DL. This structure prevents an electric field noise generated from the gate lines GL or the data lines DL from entering the liquid crystal layer LC.

It has been known that, in a liquid crystal display device of an IPS system, an aperture ratio can be enhanced by covering the data lines DL or the gate lines GL with a transparent electrode, to which a common voltage is applied, with an insulating film interposed therebetween. In this system, the uppermost transparent common electrode CIT extends in the direction in which the data lines DL extend, and is formed to have a large width to cover the data lines DL from above. In this case, the width of the transparent common electrode CIT covering the data lines DL is formed to be relatively larger than the width of the data line DL in order to form a margin for positioning during a TFT process. When the width of the transparent common electrode CIT is increased, a transverse electric field is not applied to the width increased portion, even if the electrode is transparent. Therefore, the width increased portion does not contribute to transmittance in the display. In other words, the aperture ratio for the display cannot be enhanced.

In FIGS. 2A and 2B of the present embodiment, the space between the transparent pixel electrodes PIT disposed in the horizontal direction is set to be small, and the transparent storage capacitance electrode MIT is disposed in the portion below the space. In this case, the transparent storage capacitance electrode MIT functions as a shield for the data lines DL, whereby the black matrix BM on the data line DL can be made thin, and hence, the aperture ratio can be increased. Specifically, the present embodiment aims to enhance the aperture ratio by arranging the transparent storage capacitance electrode MIT and not arranging the transparent common electrode CIT above the data lines DL.

In FIGS. 2A and 2B, the transparent storage capacitance electrode MIT is disposed above most of the gate line GL extending in the horizontal direction. The transparent common electrode CIT has a plurality of long band-shaped portions, which extend in the perpendicular direction in which the data lines DL extend, over the plurality of pixel regions, and also has the connection portions disposed almost on the center of the black matrix BM, which covers the gate line GL, in the perpendicular direction, the connection portions extending in the horizontal direction for connecting the band-shaped portions. Thus, the transparent common electrode CIT has a mesh-like planar pattern. This structure provides an effect of maintaining the supply of the common voltage even if the band-shaped portions extending in the perpendicular direction are broken, and an effect of reducing a wiring resistance of the transparent common electrode CIT. In the region where light is shielded by the black matrix BM above the gate line GL, a pair of edges of the slit of the transparent common electrode CIT crosses the outer boundary of the transparent pixel electrode PIT almost perpendicularly, the pair of edges extending in the perpendicular direction.

FIG. 3 is a sectional view taken along line 3-3' in FIG. 2A. The components, their functions, and used materials in the cross-sectional structure will be described. The liquid crystal layer LC is sandwiched between a first transparent substrate SBU1 and a second transparent substrate SUB2. The liquid crystal layer LC includes positive liquid crystal in which long axes of liquid crystal molecules are aligned along the direction of the electric field or negative liquid crystal in which long axes of liquid crystal molecules are aligned in the direction perpendicular to the direction of the electric field. The thickness of the liquid crystal layer ranges from 3 µm to 4 µm. The first transparent substrate SUB1 and the second transparent substrate SUB2 are made of glass, and the thickness of each substrate ranges from 0.4 mm to 0.7 mm in the manufacturing process. However, the thickness may finally be thin, such as about 0.2 mm, by a chemical polishing after the liquid crystal layer LC is sandwiched between the first and second transparent substrates SUB1 and SUB2. The material for the substrate is not limited to glass. Plastic may also be used.

A first polarizing plate POL1 and a second polarizing plate POL2 are attached on the outside of the first transparent substrate SUB1 and the second transparent substrate SUB2. The second polarizing plate POL2 polarizes light from the backlight, which is not illustrated and disposed at the outside, and transmits the polarized light to the liquid crystal layer LC. The liquid crystal layer LC changes the light polarized by the second polarizing plate POL2 into elliptically polarized light by birefringence effects. The first polarizing plate POL1 converts the elliptically polarized light transmitted through the liquid crystal layer LC into linearly polarized light and transmits the linearly polarized light. In the present embodiment, the polarization axis of the first polarizing plate POL1 and the polarization axis of the second polarizing plate POL2 are orthogonal to each other (a so-called crossed nicols). Therefore, when an electric field is not applied to the liquid crystal layer LC, light, passing through the liquid crystal layer LC, from the backlight is shielded by the first polarizing plate POL1, whereby a black image is generated. On the other hand, when an electric field generated between the transparent pixel electrode PIT and the transparent common electrode CIT is mainly applied to the liquid crystal layer LC, the liquid crystal layer LC changes this light into elliptically polarized light by the birefringence effects. In this case, transmittance is changed according to the magnitude of the voltage, whereby a halftone image or white image can be generated. Since the common voltage is applied to the transparent storage capacitance electrode MIT, the liquid crystal layer LC can be driven by the electric field between the transparent storage capacitance electrode MIT and the transparent pixel electrode PIT. However, in the present embodiment, this region is shielded by the black matrix BM as illustrated in FIG. 2A, so that light in this region is not included in the transmission light for the display operation.

A first orientation film AL1 and a second orientation film AL2 for aligning the liquid crystal molecules are disposed to be in contact with both surfaces of the liquid crystal layer LC. The first and second orientation films AL1 and AL2 are mainly made of polyimide. A rubbing method or irradiation of polarized ultraviolet ray is employed as the method of aligning the liquid crystal molecules on their surfaces. Light passes through the color filter CF formed on the first transparent substrate SUB1, whereby a color display is realized. Since a pigment contained in a coloring layer of the color filter CF is dissolved into the liquid crystal layer LC to cause contamination, the surface of the color filter CF is coated with an overcoat film OC made of an organic material. This overcoat film OC also has a function of smoothing the surface.

Some kind of a semiconductor layer SEM may not realize a satisfactory image display, since the resistance of the semiconductor layer SEM is lowered when the semiconductor layer SEM is directly irradiated with external light. Therefore, the black matrix BM is disposed above the semiconductor layer SEM on the first transparent substrate SUB1. The black matrix BM is also disposed on the border between the pixel regions of the color filter CF to prevent a mixed color caused by the situation in which light from the adjacent pixel regions is obliquely seen. In other words, the black matrix BM contributes to a display of an image without a blurring. However, if the width of the black matrix BM is too large, the aperture ratio or transmittance is reduced. Therefore, in order to realize high transmittance and low power consumption in a high-definition liquid crystal display device, the biggest challenge is whether or not the width of the black matrix BM can be set to the minimum width by which the mixed color does not occur when the black matrix BM is obliquely seen. The black matrix BM is made of a resin material containing a black pigment or a metal material.

Similar to the planar configuration in FIGS. 2A and 2B, a drive voltage is applied between the transparent pixel electrode PIT and the transparent common electrode CIT, in the case where the liquid crystal layer LC is regarded as a capacitor in one pixel region. The common voltage identical to that applied to the transparent common electrode CIT is applied to the transparent storage capacitance electrode MIT. Firstly, an on-voltage is applied to the gate lines GL made of a metal layer. Each of the gate lines GL is made of a metal material mainly made of aluminum Al, molybdenum Mo, titanium Ti, or copper Cu, an alloy obtained by adding tungsten W, manganese Mn, titanium Ti, or the like to the above metal material, or a stacked body formed by the combination of these materials. The thickness of the gate line GL ranges from 100 nm to 300 nm.

A gate insulating film GSN is disposed on the gate lines GL. Silicon nitride (SiN) formed by plasma chemical vapor deposition (CVD) is used for the gate insulating film GSN. The gate insulating film GSN may be made of silicon dioxide $SiO_2$ or alumina $Al_2O_3$. The semiconductor layer SEM is processed and disposed in an island shape on the gate line GL. As a material of the semiconductor layer, amorphous silicon a-Si is preferable when silicon nitride is used for the gate lines GL, and oxide semiconductor or low-temperature polysilicon LTPS is preferable when silicon dioxide $SiO_2$ is used for the gate lines GL. Indium gallium zinc oxide is preferable for the oxide semiconductor.

The data line DL and the source electrode SM are formed on the semiconductor layer SEM. The data line DL and the source electrode SM are made of a low resistance metal material formed by the same process. This metal material includes a metal material mainly made of aluminum Al, molybdenum Mo, titanium Ti, or copper Cu, an alloy obtained by adding tungsten W, manganese Mn, titanium Ti, or the like to the above metal material, or a stacked body formed by the combination of these materials.

A protection insulating film PAS is formed on the data line DL and the source electrode SM. Silicon nitride SiN or silicon dioxide $SiO_2$ can be used for the protection insulating film PAS. The protection insulating film PAS may not be provided. An interlayer insulating film ORG is formed on the protection insulating film PAS. A photosensitive organic material including acryl as a main composition is used for the interlayer insulating film ORG. The organic material has a relative dielectric constant of 4 or less, which is lower than 6.7 of silicon nitride. The organic material can be formed to be thicker than silicon nitride due to the manufacturing process. In the present embodiment, the thickness of the organic material is set to be 1.5 μm to 3 μm. According to the interlayer insulating film ORG having reduced relative dielectric constant and increased thickness, the wiring capacitance generated between the second transparent storage capacitance electrode MIT, which is disposed on the interlayer insulating film ORG and forms one electrode of the storage capacitance STG, and the data lines DL or the gate lines GL can significantly be reduced. Accordingly, it is obvious that a wiring delay of the transparent storage capacitance electrode MIT that uses a transparent conductive film material having relatively high resistance can also be reduced. Consequently, a relatively large screen region DIA can be obtained, even if a low resistance metal wiring is not connected to the transparent storage capacitance electrode MIT.

The first transparent substrate SUB1 and the second transparent substrate SUB2 correspond to a first substrate and a second substrate in a liquid crystal display device according to the present application, respectively. A set of the protection insulating film PAS and the interlayer insulating film ORG corresponds to a third insulating film in a liquid crystal display device according to the present application, and the interlayer insulating film ORG corresponds to an organic insulating film in the liquid crystal display device according to the present application.

The transparent storage capacitance electrode MIT is a transparent conductive film, and is made of tin indium oxide ITO or indium zinc oxide IGO, for example. The transparent storage capacitance electrode MIT and the transparent pixel electrode PIT form the storage capacitance STG in the pixel region across an insulating film SNG. The storage capacitance STG can prevent the attenuation of the video-data voltage, caused by the charges accumulated with the thin-film transistor TFT being turned on, during the storage operation period. The transparent storage capacitance electrode MIT corresponds to a first common electrode in the liquid crystal display device according to the present application, and the insulating film SNG corresponds to a first insulating film in the liquid crystal display device according to the present application.

The transparent pixel electrode PIT is electrically connected to the source electrode SM via the contact hole CONT formed on the protection insulating film PAS, the interlayer insulating film ORG, and the insulating film SNG. The transparent pixel electrode PIT has an independent planar pattern in each pixel region separated by the gate lines GL and the data lines DL, which are arranged in a matrix. When an on-voltage is applied to the gate lines GL to bring the semiconductor layer SEM into a low resistance state, the video-data voltage is applied to the transparent pixel electrode PIT via the source electrode SM from the data line DL. The video-data voltage is charged in the capacitance between the transparent pixel electrode PIT and the transparent common electrode CIT and in the capacitance between the transparent pixel electrode PIT and the transparent storage capacitance electrode MIT.

The transparent common electrode CIT is disposed on the transparent pixel electrode PIT with an upper insulating film UPAS interposed therebetween. Like the other insulating films, the upper insulating film UPAS is made of silicon nitride SiN or silicon dioxide $SiO_2$. The transparent common electrode CIT corresponds to a second common electrode in the liquid crystal display device according to the present application, and the upper insulating film UPAS corresponds to a second insulating film in the liquid crystal display device according to the present application.

When the on-voltage is applied to the gate lines GL, the video-data voltage is applied to the transparent pixel electrode PIT via the data lines DL, the semiconductor layer SEM, and the source electrode SM. This video-data voltage is charged in the capacitance between the transparent pixel electrode PIT and the transparent common electrode CIT and in the capacitance between the transparent pixel electrode PIT and the transparent storage capacitance electrode MIT, the transparent common electrode CIT and the transparent storage capacitance electrode MIT having the same common potential. When an off-voltage is applied to the gate lines GL, the period after the application of the off-voltage becomes a storage period, and the semiconductor layer SEM becomes a high resistance state. Therefore, the charged charges (voltage) are basically stored. However, the voltage of the transparent pixel electrode PIT might be varied due to the leakage by the resistance of the semiconductor layer SEM or the resistance of the liquid crystal layer LC.

In general, holding characteristics are obtained by the capacitance formed in the stacked layers of the transparent common electrode CIT and the transparent pixel electrode PIT. In the present embodiment, a capacitance is also formed between the transparent pixel electrode PIT and the transparent storage capacitance electrode MIT, whereby the whole capacitance can be increased. Consequently, the holding characteristics can be satisfactorily maintained, so that a liquid crystal display device with excellent image quality can be provided.

FIG. 4 is a sectional view taken along line 4-4' in FIG. 2A. FIG. 4 is a sectional view of three pixels with the data line DL being defined as a border. The pixel at the center corresponds to the green color filter CF(G) in the color filter CF disposed in a vertical stripe shape. The pixels at the left and at the right of the pixel at the center correspond to the red color filter CF(R) and the blue color filter CF(B), respectively. The black matrix BM is disposed on the inner surface of the first transparent substrate SUB1 on the border of the pixel regions, where the data line DL is located, across the liquid crystal layer LC.

The data line DL and the black matrix BM have an effect of preventing the mixed color in which light of a backlight passing through the adjacent pixel region is seen when the pixel regions separated for each color filter CF is obliquely seen. Although the light from the backlight is not illustrated, the light is emitted to the second transparent substrate SUB2 from the outside of the polarizing plate POL2 attached on the outside of the second transparent substrate SUB2. When the width of the data line DL or the black matrix BM is increased, the aperture ratio or transmittance is reduced. This leads to the problem of a dark image or an increase in power consumption. This problem is the biggest in the high-definition liquid crystal display device. Therefore, a liquid crystal display device that does not cause a display failure even if the width of the black matrix BM or the data line is decreased has been demanded. In the present embodiment, the semiconductor layer SEM is formed below the data line DL due to the manufacturing process. When amorphous silicon or LTPS is used for the semiconductor layer SEM, the semiconductor layer SEM substantially becomes non-transparent. Therefore, when the width of the semiconductor layer SEM is too large, the aperture ratio is reduced, in similar to the data lines DL.

In FIG. 4, the cross sectional structure is divided into two regions in an in-plane direction, the two regions being a pixel border region where the black matrix BM or the data line DL that does not transmit light is located, and an opening region that transmits light. The structure and operation of the opening region will firstly be described.

In the opening region, the video-data voltage and the common voltage are respectively applied to the transparent pixel electrode PIT and the transparent common electrode CIT, and an electric field generated between these electrodes is applied to the liquid crystal layer LC. The intensity of the elliptically polarized light in the liquid crystal layer LC is changed due to the intensity of the electric field, whereby transmittance is controlled to realize a tone image. It is set such that the transmittance becomes the maximum when the maximum potential difference is applied. The liquid crystal display device LCD according to the present embodiment is a liquid crystal display device LCD of an IPS system. Therefore, when the potential difference between the transparent pixel electrode PIT and the transparent common electrode CIT is decreased, the transmittance is reduced to provide a black image. When the potential difference becomes large, the transmittance is increased to provide a white image. The maximum transmittance when the maximum potential difference is applied may merely be referred to as transmittance.

The liquid crystal layer LC includes liquid crystal molecules LCM made of an organic material. The long axes of the liquid crystal molecules LCM are aligned on the surface of the orientation film AL1 disposed on the inner surface of the first transparent substrate SUB1 and the surface of the orientation film AL2 disposed on the inner surface of the second transparent substrate SUB2 by an orientation process. The transparent common electrode CIT has a plurality of band-shaped portions, and a slit is formed between the band-shaped portions. The transparent pixel electrode PIT is present below the slit with the upper insulating film UPAS interposed therebetween. Therefore, when the voltage between the transparent pixel electrode PIT and the transparent common electrode CIT increases, the electric field having electric line of force folded in the liquid crystal layer LC is formed. The maximum electric field region is formed in the vicinity of the border of the band-shaped portion and the slit of the transparent common electrode CIT. Therefore, the rotation of the liquid crystal molecules LCM increases around this region, so that transmittance is increased. When the width of the band-shaped portion or the width of the slit of the transparent common electrode CIT increases, the electric field around the center of the band-shaped portion or the slit is decreased, so that the transmittance is reduced. Therefore, the width of the band-shaped portion and the width of the slit of the transparent common electrode CIT have to be finely set in consideration of the thickness of the liquid crystal layer LC. Accordingly, the pixel region has a transmittance distribution in the transverse direction in the sectional view in FIG. 4.

In order to realize a liquid crystal display device having high transmittance and low power consumption, the width of the black matrix BM or the width of the data line DL has to be decreased, the black matrix BM and the data line DL being located on the border of the pixel regions to form a light-shielding region. With this, the aperture ratio can be increased. In addition, the width of the transparent pixel electrode PIT has to be increased to the light shielding region. Specifically, the space between the adjacent transparent pixel electrodes PIT is decreased, and a boundary of each transparent pixel electrode PIT is overlapped with the data line DL in a plan view.

The transparent storage capacitance electrode MIT is disposed to widely cover the data lines DL from above in the portion below the space between the adjacent transparent pixel electrodes PIT, the space being located above the data lines DL. Accordingly, the electric field noise generated from the data lines DL is shielded by the transparent storage capacitance electrode MIT, whereby the electric field noise to the liquid crystal layer LC is shielded. The transparent common electrode CIT is not disposed between the black matrix BM and the data line DL. In general, the common electrode is disposed to widely cover the space between the adjacent transparent pixel electrodes in the liquid crystal display device in which the transparent storage capacitance electrode MIT is not disposed, and the common electrode is disposed only on the uppermost layer. In this case, the width of the common electrode is large, so that the electric field for driving is weakened. Therefore, even if a transparent electrode material is used, transmittance is reduced. Alternatively, as the width of the black matrix BM increases, the aperture ratio is reduced. In the present embodiment, even if the transparent common electrode CIT is not present above the space between the adjacent transparent pixel electrodes PIT, the data lines DL are shielded by the transparent storage capacitance electrode MIT, whereby the aperture ratio can be increased.

In the liquid crystal display device of an IPS system, when a pressure is externally applied to the display surface by fingers with a voltage being applied between the pixel electrode and the common electrode, the area where the liquid crystal molecules rotate in a direction opposite to the normal direction is generated. As a result, the area where the liquid crystal molecules are in a metastable state may spread in a pixel, and this area may be left as display unevenness. This phenomenon is called pushed domain (or reverse twisted domain).

Figure 17A:
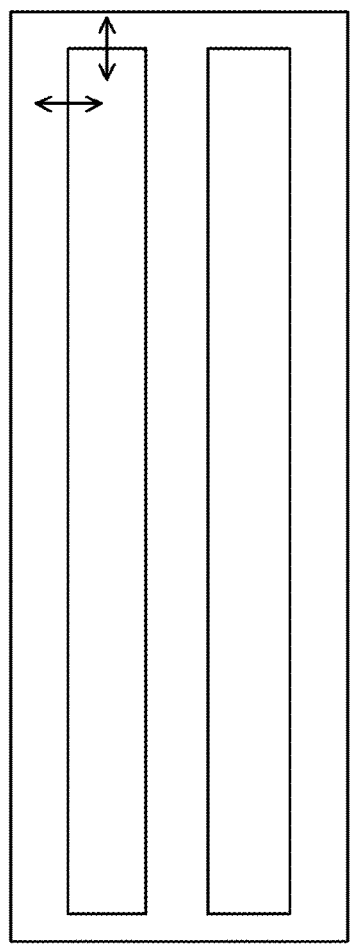
FIGS. 17A and 17B are plan views in order to explain a shape of slits.

In order to prevent the occurrence of the pushed domain and assure quantity of transmitted light, a rectangular slit with a sharp corner illustrated in FIG. 17A is ideally formed. In this case, a transverse electric field orthogonal to the longitudinal edge of the slit is generated on this edge, while a transverse electric field orthogonal to the widthwise edge of the slit is generated on this edge. Therefore, the direction of the transverse electric field is clearly divided into two, whereby the liquid crystal molecules are easy to be uniformly rotated in the vicinity of the end of the slit.

Figure 17B:
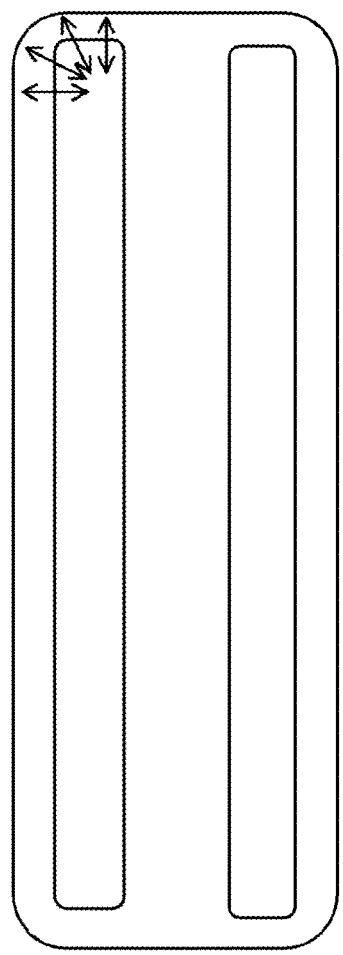

However, the slit is actually formed to have a rounded corner as illustrated in FIG. 17B by a photolithography technique, and the direction of the transverse electric field is diverse in the vicinity of the end of the slit. Therefore, the area where the liquid crystal molecules are rotated in the direction opposite to the normal direction is likely to be generated.

Figure 5A:
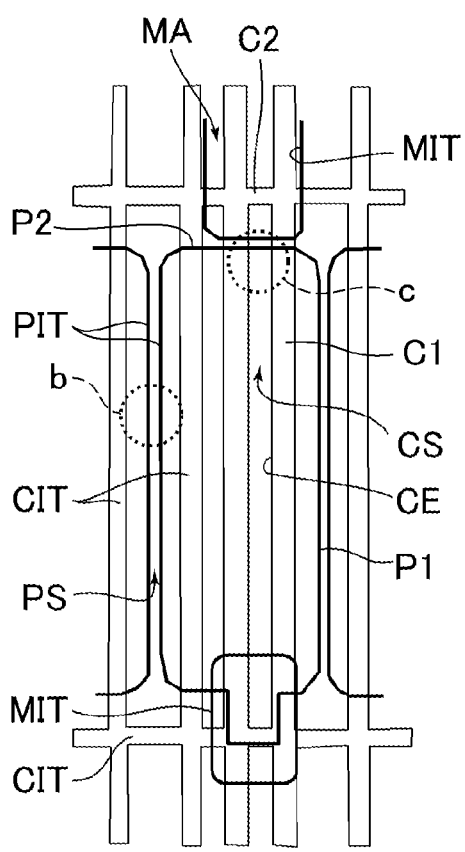
FIG. 5A is a plan view illustrating the patterns of the transparent storage capacitance electrode, the transparent pixel electrode, and the transparent common electrode.
Figure 5B:
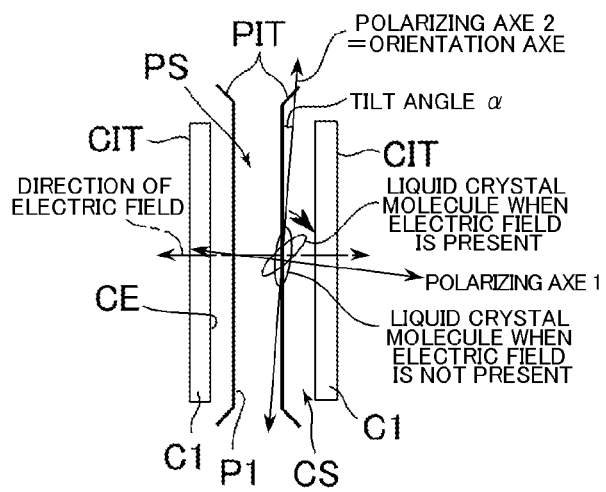
FIG. 5B is an enlarged view illustrating an area b in a dotted circle in FIG. 5A.
Figure 5C:
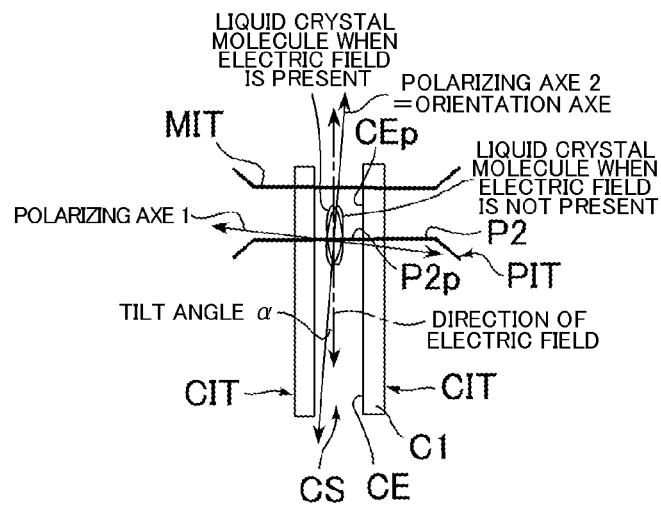
FIG. 5C is an enlarged view illustrating an area c in a dotted circle in FIG. 5A.

FIGS. 5A to 5C are plan views each illustrating one pixel region for showing a mechanism to prevent the occurrence of the pushed domain, and to realize a liquid crystal display device having high transmittance and low power consumption in the present embodiment. FIG. 5A illustrates only the patterns of the transparent storage capacitance electrode MIT, the transparent pixel electrode PIT, and the transparent common electrode CIT, which are made of a transparent conductive film material and extracted from the planar pattern of the pixel region. FIG. 5B is an enlarged view illustrating an area b in a dotted circle in FIG. 5A. This area is near the data line DL, and shielded by the black matrix BM in FIG. 2A. FIG. 5C is an enlarged view illustrating an area c in a dotted circle in FIG. 5A. The area c is near the gate line GL in FIG. 2A, and the plurality of band-shaped portions C1 and the slits CS of the transparent common electrode CIT and the outer boundary P2 of the transparent pixel electrode PIT cross each other in the area c.

FIGS. 5B and 5C also illustrate polarizing axes of the polarizing plates POL1 and POL2 attached respectively on the upper side of the first transparent substrate SUB1 and the lower side of the second transparent substrate SUB2 in the sectional view in FIG. 4, and orientation axes of the liquid crystal molecules LCM. The effect of the present embodiment will be described, together with the rotating operation of the liquid crystal molecule LCM by a driving electric field applied between the transparent pixel electrode PIT and the transparent common electrode CIT or the transparent storage capacitance electrode MIT. In the description below, a positive type in which the long axes of the liquid crystal molecules LCM are aligned in the direction of the electric field will be illustrated. However, the similar effect can be obtained in a negative type in which the liquid crystal molecules LCM are aligned in the direction perpendicular to the direction of the electric field.

In the area in FIG. 5B, the two band-shaped portions C1 of the transparent common electrode CIT extend in the direction identical to the direction of the data lines DL. The two closely adjacent outer boundaries P1 of the adjacent transparent pixel electrodes PIT extend in the direction identical to the direction of the data lines DL at the inside of the slit CS formed between these band-shaped portions C1. A space PS between the two closely adjacent outer boundaries P1 overlaps the transparent storage capacitance electrode MIT in a plan view.

The polarizing axes of the polarizing plates POL1 and POL2 of the first transparent substrate SUB1 and the second transparent substrate SUB2 are mutually orthogonal. The orientation axes of the orientation films AL1 and AL2 in FIG. 4 for aligning the long axes of the liquid crystal molecules LCM are parallel to each other, and this direction is identical to the direction of one of the polarizing axes. The orientation axis tilts by a tilt angle α from a longitudinally extending edge CE of the slit CS and the outer boundary P1 of the transparent pixel electrode PIT. Thus, the liquid crystal molecules LCM can rotate in the direction of the electric field. The electric field is applied between the transparent pixel electrode PIT and the transparent common electrode CIT or the transparent storage capacitance electrode MIT. Therefore, the direction of the electric field is orthogonal to the longitudinally extending edge CE of the slit CS and the outer boundary P1 of the transparent pixel electrode PIT as illustrated in FIG. 5B.

FIG. 5B illustrates the liquid crystal molecule LCM present around the outer boundary P1 of the transparent pixel electrode PIT. In a state in which an electric field is not present, i.e., in an off state, the long axis of the liquid crystal molecule LCM is orientated in the direction of the orientation axis. When an electric field is applied and present, i.e., in an on state, the liquid crystal molecule LCM rotates in the direction of the electric field, whereby light from the backlight transmits. The direction of the electric field is uniform in this region, so that all liquid crystal molecules LCM rotate in the same direction. Specifically, the rotating action of the liquid crystal molecules LCM in this region is identical to that at the inside of the opening of the black matrix BM, resulting in that the pushed domain does not occur. Accordingly, the transmittance is not reduced in the vicinity of this region.

In the area illustrated in FIG. 5C, the band-shaped portion C1 of the transparent common electrode CIT and the slit CS are orthogonal to the outer boundary P2 of the transparent pixel electrode PIT. Specifically, a pair of edges CE of the slit CS is orthogonal to the outer boundary P2 of the transparent pixel electrode PIT in a plan view, the pair of edges extending along the data lines DL, and the outer boundary P2 extending along the gate lines GL. The transparent storage capacitance electrode MIT spreads in the in-plane direction over a plurality of pixel regions, so that the edge of the pattern is not present in the pixel region. The transparent storage capacitance electrode MIT is present in the region that is inside the slit CS sandwiched between the two band-shaped portions C1 of the transparent common electrode CIT and where the transparent pixel electrode PIT is not present (the region outside the outer boundary P2 of the transparent pixel electrode PIT) in a plan view. Therefore, the direction of the electric field becomes the direction orthogonal to the outer boundary P2 of the transparent pixel electrode PIT. Specifically, the transparent storage capacitance electrode MIT is formed to spread in the in-plane direction so as to be overlapped with a portion CEp of the pair of edges CE of the slit CS and a portion P2p of the outer boundary P2 of the transparent pixel electrode PIT in a plan view, the portion CEp being located at the outside of the outer boundary P2 of the transparent pixel electrode PIT, and the portion P2p being located between the pair of edges CE of the slit CS.

The transparent common electrode CIT also has a plurality of connection portions C2 that connect the plurality of band-shaped portions C1 in the widthwise direction of the slit CS. The edge of the connection portion C2 (i.e., the edge, extending in the widthwise direction, of the slit CS) is located at the outside of the outer boundary P2 of the transparent pixel electrode PIT in a plan view (see FIG. 5A).

A pair of edges CE of some slits CS is also orthogonal to the edge of the opening MA formed on the transparent storage capacitance electrode MIT, as well as the outer boundary P2 of the transparent pixel electrode PIT, in a plan view. Thus, a rectangular closed region is formed by the pair of edges CE of the slit CS, the outer boundary P2 of the transparent pixel electrode PIT, and the edge of the opening MA in a plan view. The transparent storage capacitance electrode MIT overlaps the entire closed region in a plan view.

The long axes of the liquid crystal molecules LCM around the outer boundary P2 of the transparent pixel electrode PIT are aligned in the direction along the orientation axis in the off state. When the thin-film transistor becomes the on state, the liquid crystal molecules LCM are fixed in the direction of the electric field, and stop their rotation, since the direction of the electric field only has the small tilt angle α (generally, 10 degrees or less) with respect to the polarizing axis.

Specifically, the electric field orthogonal to the outer boundary P2 of the transparent pixel electrode PIT is generated between the transparent pixel electrode PIT and the transparent storage capacitance electrode MIT in the vicinity of the outer boundary P2 of the transparent pixel electrode PIT, whereby the rotation of the liquid crystal molecules LCM are forcibly fixed due to the electric field. Therefore, the pushed domain does not occur, the pushed domain being a situation in which the rotation of the liquid crystal molecules is complicated and the liquid crystal molecules LCM are difficult to be returned to the initial state even after the electric field is canceled. If the pushed domain is generated at the outside of the outer boundary P2 of the transparent pixel electrode PIT, the spread of the pushed domain toward the inside of the outer boundary P2 of the transparent pixel electrode PIT can be prevented due to the fixed rotation of the liquid crystal molecules LCM around the outer boundary P2. Consequently, a liquid crystal display device having high transmittance and low power consumption can be provided.

FIGS. 6A to 12B each illustrate a manufacturing process of a stacked body including the thin-film transistor TFT formed on the second transparent substrate SUB2 according to the present embodiment. FIGS. 6A, 7A, 8A, 9A, 10A, 11A and 12A are plan views each illustrating one pixel region, and FIGS. 6B, 7B, 8B, 9B, 10B, 11B and 12B are sectional views each taken along line b-b' in the corresponding plan view. FIGS. 6A to 12B each illustrate each photographic processing process (photo-process).

FIG. 6A is a plan view of one pixel region when a first photo-process is completed, and FIG. 6B is a sectional view taken along line b-b' in FIG. 6A. The gate lines GL are patterned by the first photo-process after being formed on the second transparent substrate SUB2 by sputtering.

Figure 7A:
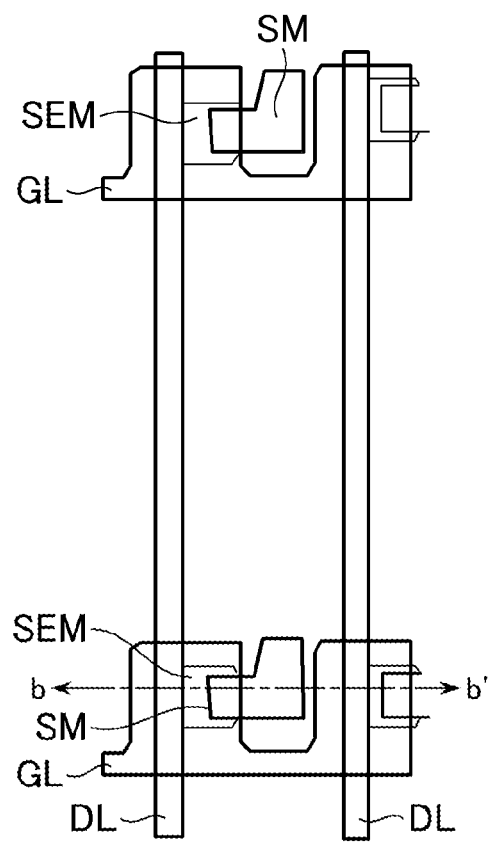
FIG. 7A is a plan view of one pixel region in the liquid crystal panel according to the first embodiment when a second photo-process is completed.
Figure 7B:
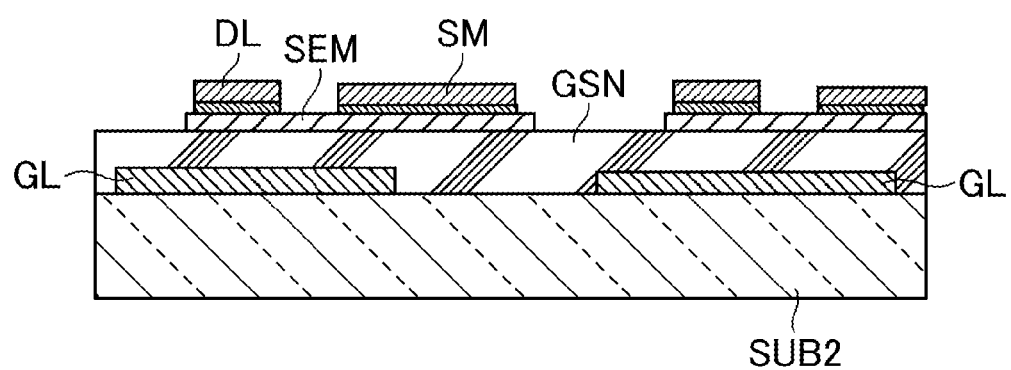
FIG. 7B is a sectional view taken along a line b-b' shown in FIG. 7A.

FIG. 7A is a plan view of one pixel region when a second photo-process is completed, and FIG. 7B is a sectional view taken along line b-b' in FIG. 7A. The gate insulating film GSN made of silicon nitride and the semiconductor layer SEM made of amorphous silicon are stacked on the gate line GL by CVD. A stacked film of molybdenum Mo and copper Cu is also formed on the semiconductor layer SEM by sputtering. The material of the stacked file may be used in identical to the material for the gate lines GL.

The thicknesses of the gate insulating film GSN, the semiconductor layer SEM, and the data line DL/source electrode SM are respectively about 400 nm, 200 nm, and 300 nm. After the stacked film is formed by CVD and sputtering, a photoresist is formed on the stacked film. This photoresist is exposed by use of a halftone photomask, whereby the region of the data line DL and the source electrode SM and the region of the semiconductor layer SEM are formed.

Figure 8A:
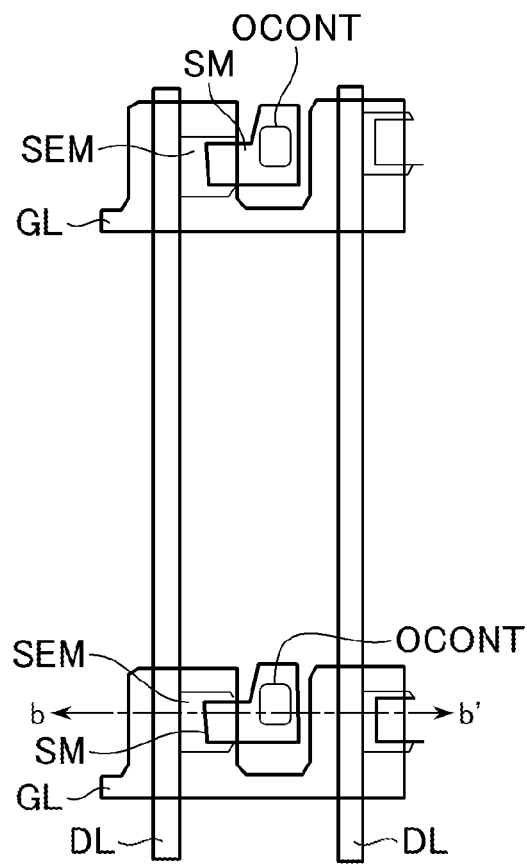
FIG. 8A is a plan view of one pixel region in the liquid crystal panel according to the first embodiment when a third photo-process is completed.
Figure 8B:
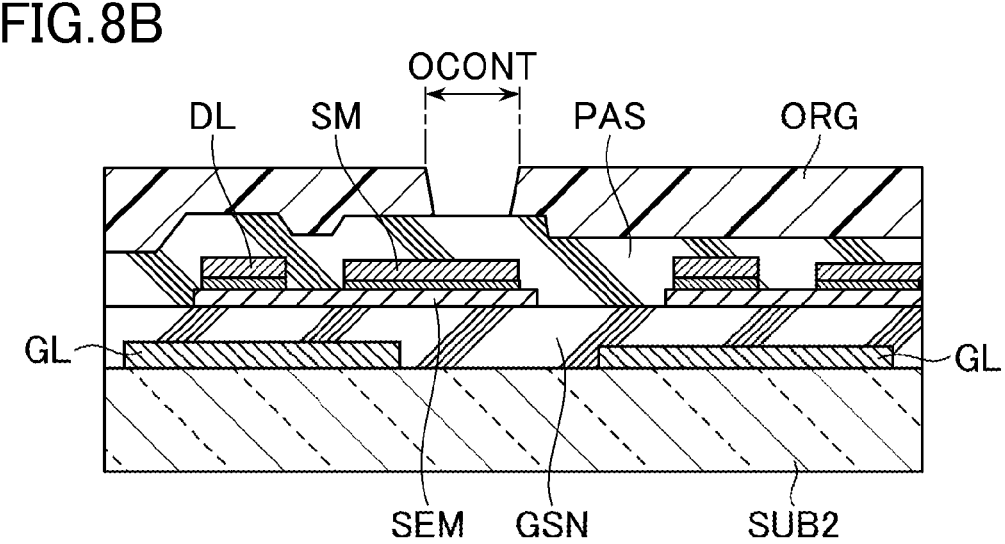
FIG. 8B is a sectional view taken along a line b-b' shown in FIG. 8A.

FIG. 8A is a plan view of one pixel region when a third photo process is completed, and FIG. 8B is a sectional view taken along line b-b' in FIG. 8A. The protection insulating film PAS is formed on the data line DL and the source electrode SM by CVD, and the interlayer insulating film ORG made of photosensitive acryl is applied on the protection insulating film PAS. The protection insulating film PAS is made of silicon nitride, and has a thickness of 100 nm to 400 nm. The material of the photosensitive acryl can be used as a resist in the photo-process. Therefore, an opening OCONT is formed on the source electrode SM by a developing process using the photomask.

Figure 9A:
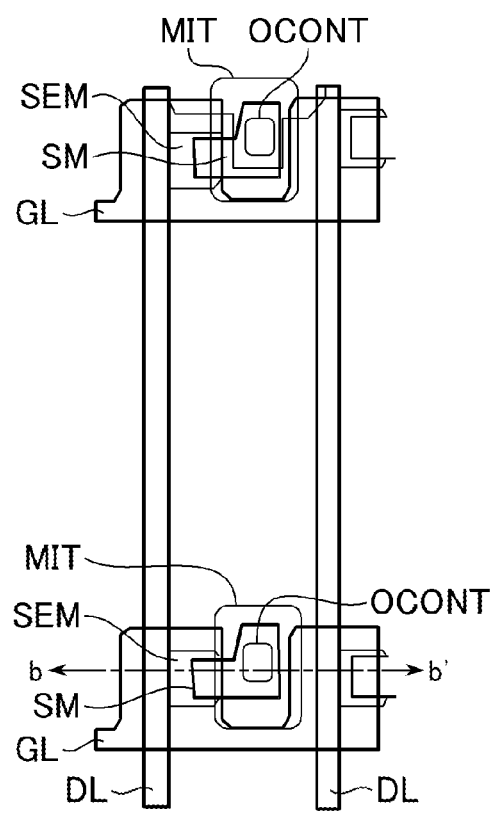
FIG. 9A is a plan view of one pixel region in the liquid crystal panel according to the first embodiment when a fourth photo-process is completed.
Figure 9B:
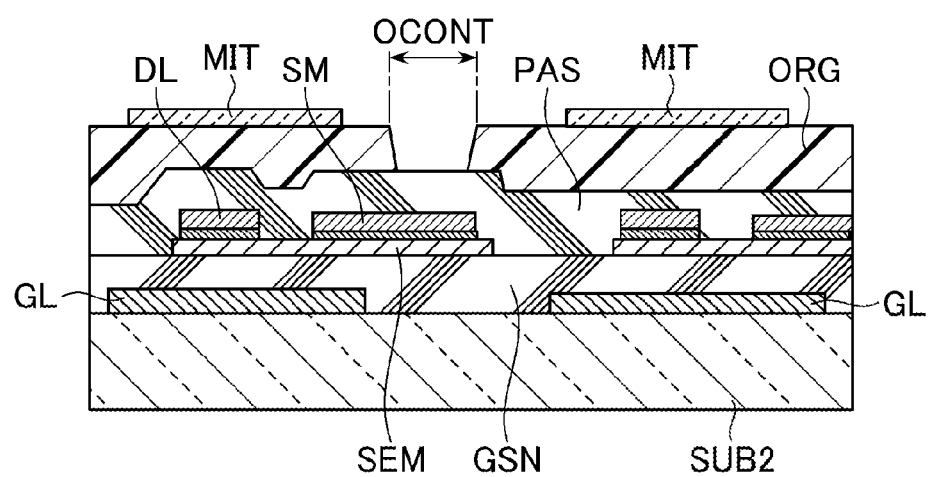
FIG. 9B is a sectional view taken along a line b-b' shown in FIG. 9A.

FIG. 9A is a plan view of one pixel region when a fourth photo-process is completed, and FIG. 9B is a sectional view taken along line b-b' in FIG. 9A. After a film of indium tin oxide that is the material for the transparent conductive film is formed, the photo etching process is performed, whereby the transparent storage capacitance electrode MIT is formed.

Figure 10A:
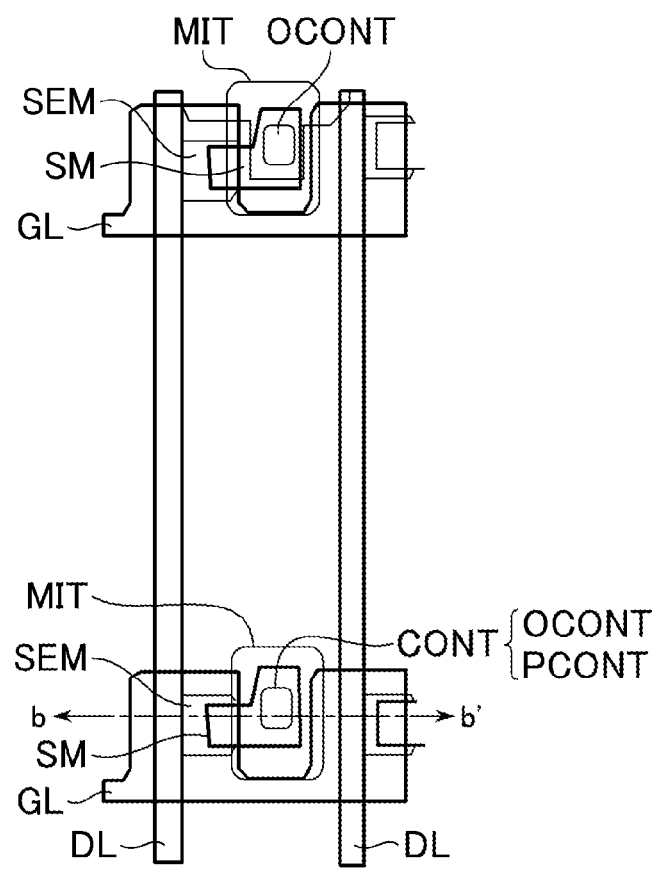
FIG. 10A is a plan view of one pixel region in the liquid crystal panel according to the first embodiment when a fifth photo-process is completed.
Figure 10B:
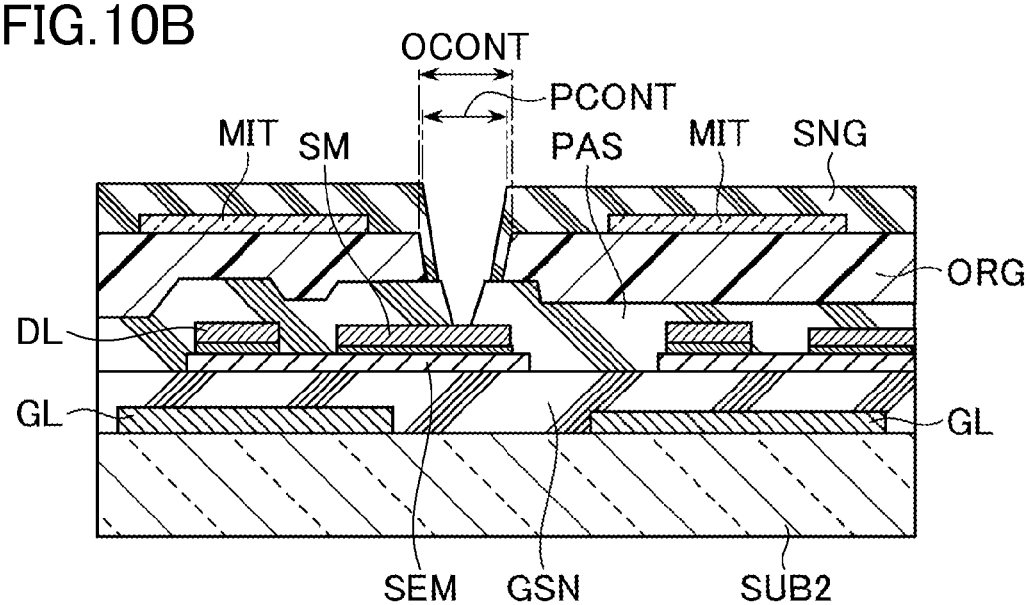
FIG. 10B is a sectional view taken along a line b-b' shown in FIG. 10A.

FIG. 10A is a plan view of one pixel region when a fifth photo-process is completed, and FIG. 10B is a sectional view taken along line b-b' in FIG. 10A. The insulating film SNG is formed on the transparent storage capacitance electrode MIT by CVD. The insulating film SNG is made of silicon nitride, and has a thickness of 200 nm to 600 nm. The photo etching process is performed, whereby a contact hole PCONT that penetrates the interlayer insulating film SNG and the protection insulating film PAS is formed at the inside of the opening OCONT of the interlayer insulating film ORG.

Figure 11A:
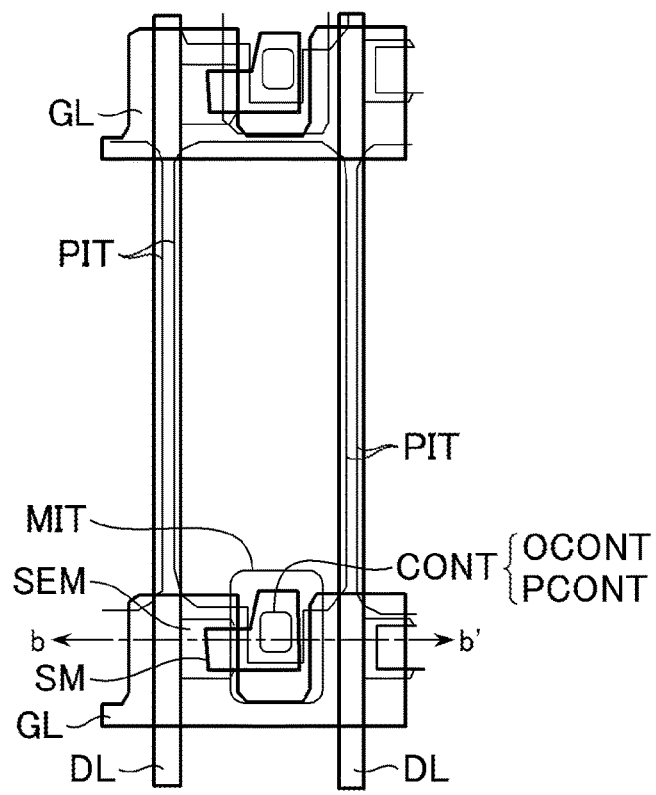
FIG. 11A is a plan view of one pixel region in the liquid crystal panel according to the first embodiment when a sixth photo-process is completed.
Figure 11B:
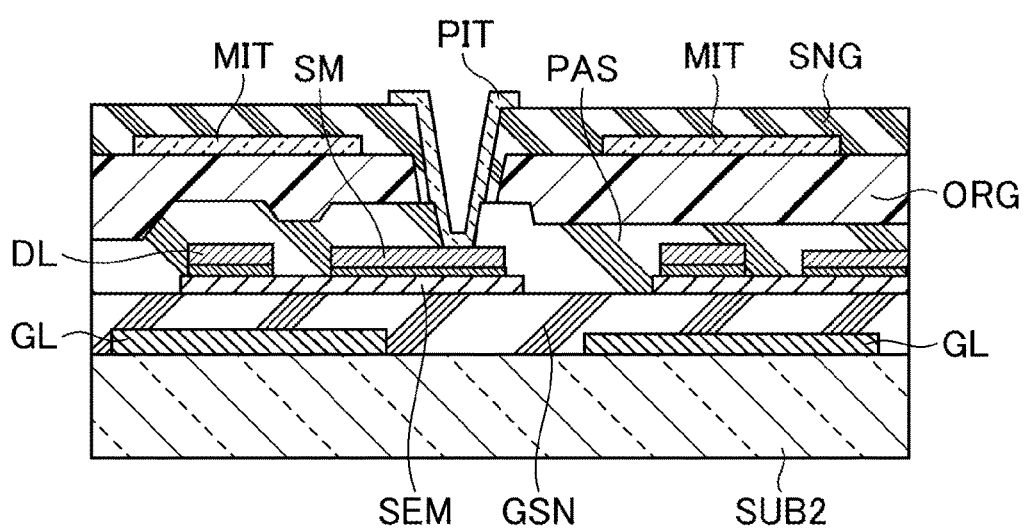
FIG. 11B is a sectional view taken along a line b-b' shown in FIG. 11A.

FIG. 11A is a plan view of one pixel region when a sixth photo-process is completed, and FIG. 11B is a sectional view taken along line b-b' in FIG. 11A. After a film of indium tin oxide that is the material for the transparent conductive film is formed on the insulating film SNG, the transparent pixel electrode PIT is processed by the photo etching process. This transparent pixel electrode PIT is processed in each pixel region to be connected to the source electrode SM.

Figure 12A:
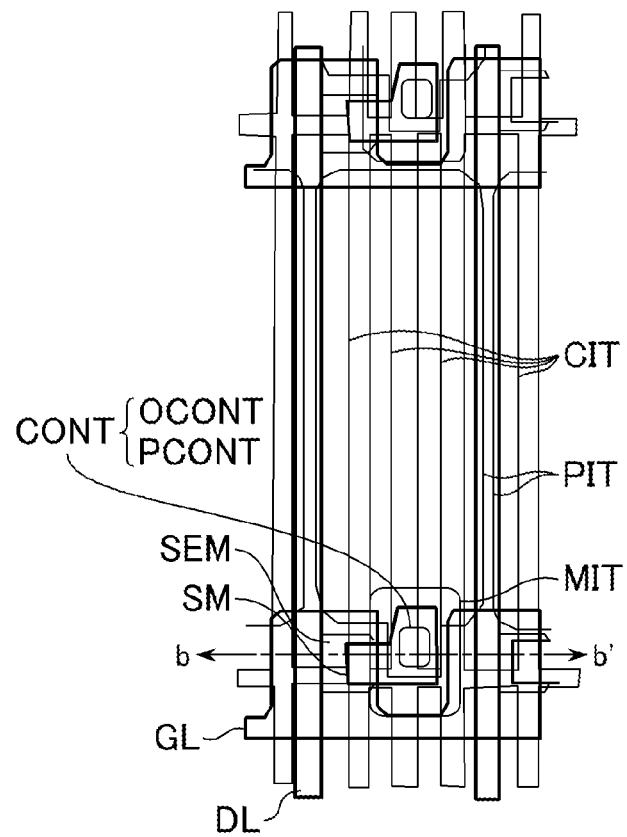
FIG. 12A is a plan view of one pixel region in the liquid crystal panel according to the first embodiment when a seventh and eighth photo-process is completed.
Figure 12B:
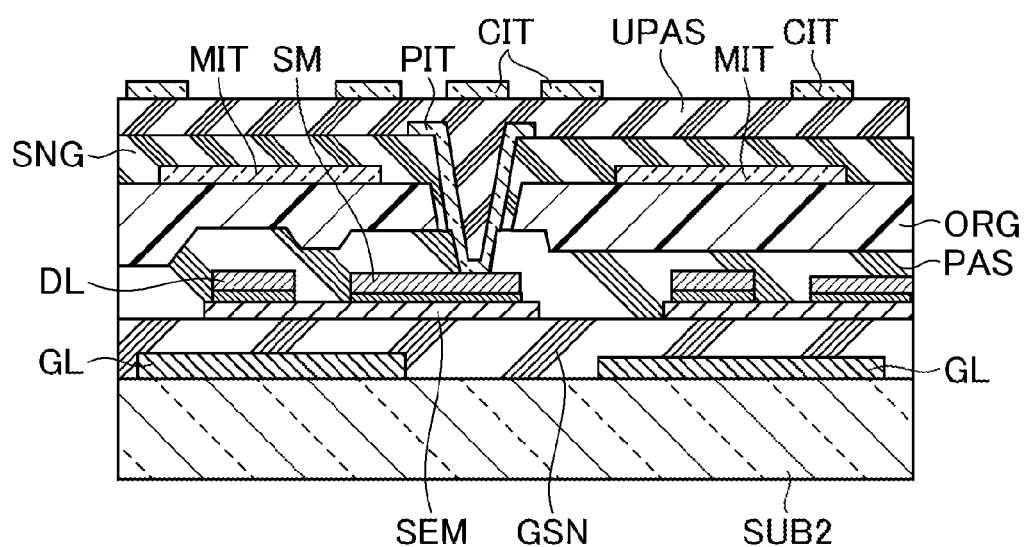
FIG. 12B is a sectional view taken along a line b-b' shown in FIG. 12A.

FIG. 12A is a plan view of one pixel region when seventh and eighth photo-processes are completed, and FIG. 12B is a sectional view taken along line b-b' in FIG. 12A. The upper insulating film UPAS is formed on the transparent pixel electrode PIT. An opening for extracting a terminal is formed on the upper insulating film UPAS at the end portion of the screen region DIA (not illustrated). This is the seventh photo-process. Thereafter, a film of indium tin oxide that is the material for the transparent conductive film is formed, and the transparent common electrode CIT is formed by the photo-etching process.

As described above, the processing of the second transparent substrate SUB2 in the liquid crystal display device according to the present embodiment is completed through eight photo-etching processes in total.

Second Embodiment

Referring to FIGS. 13~16, a liquid crystal panel of a second embodiment will be described.

Figure 14:
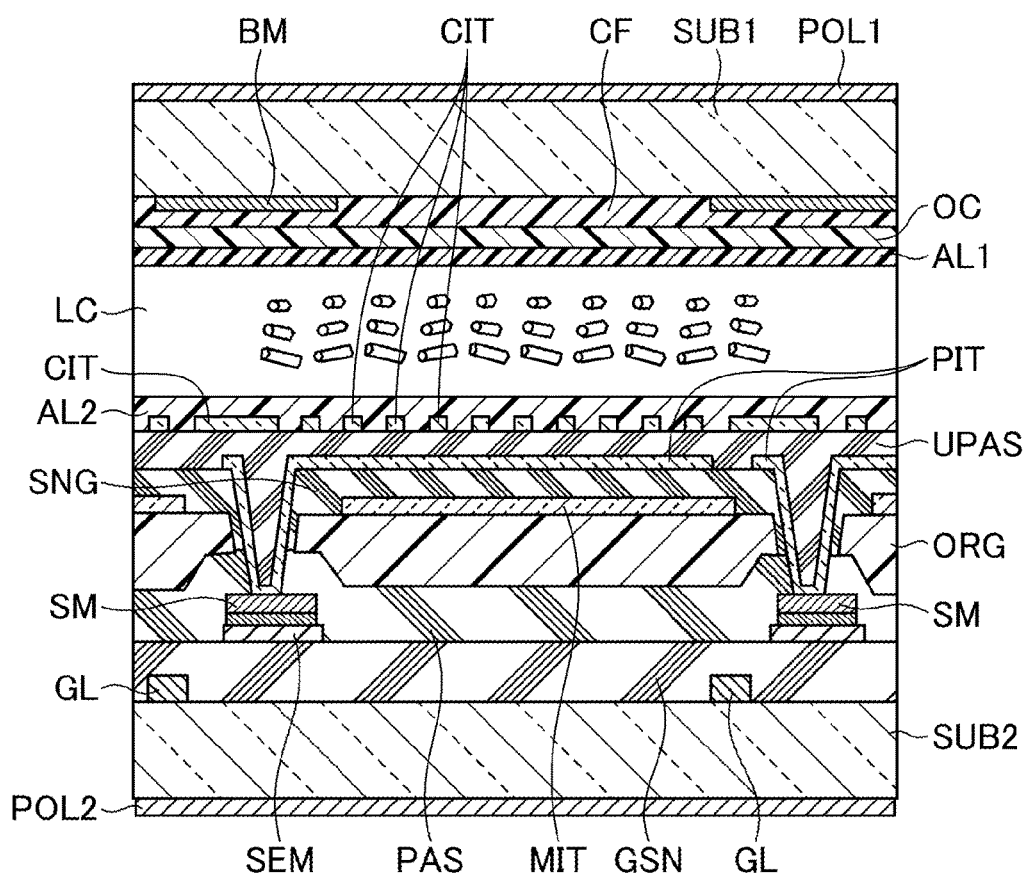
FIG. 14 is a sectional view taken along a line 14-14' shown in FIG. 13A.

FIGS. 13A and 13B are detailed plan views each illustrating one pixel region according to the second embodiment, and FIG. 14 is a sectional view taken along line 14-14' in FIG. 13A.

FIG. 13A is a plan view illustrating a thin-film transistor TFT, one pixel region enclosed by gate lines GL and data lines DL, and a part of the neighboring pixel region adjacent to this pixel region. To facilitate understanding of the structure, FIG. 13A illustrates patterns of almost all layers, while FIG. 13B illustrates only a pattern of each transparent electrode and a projected position (broken line) of an opening of a black matrix BM. An inner side of the opening of the black matrix BM is a light transmittance region, and an outer side of the opening is a light shielding region.

In the present embodiment, the planar pattern different from that in the first embodiment is a transparent common electrode CIT. The planar patterns of the other structures are basically identical to those in the first embodiment. Therefore, the improvement of the planar pattern of the transparent common electrode CIT will mainly be described below.

The present embodiment is mainly characterized by planar patterns of the transparent common electrode CIT, a transparent storage capacitance electrode MIT, and a transparent pixel electrode PIT in one pixel region, as described above in the first embodiment. Therefore, the relationship of these patterns will be described with reference to FIG. 13B.

The transparent common electrode CIT has a plurality of band-shaped portions C1 extending parallel to the gate lines GL, and a plurality of slits CS are formed between the band-shaped portions C1. In the present embodiment, the longitudinal direction of the slit CS means the extending direction of the gate lines GL, and the widthwise direction of the slit CS means the extending direction of the data lines DL. In the present embodiment, the plurality of band-shaped portions C1 are not connected in the widthwise direction of the slit CS above each data line DL.

As illustrated in FIG. 13A, the plurality of band-shaped portions C1 of the transparent common electrode CIT extend parallel to the gate lines GL so as to perpendicularly cross two closely-adjacent outer boundaries P1 of the adjacent transparent pixel electrodes PIT above the region of the data line DL, the region being sandwiched between two gate lines GL. Therefore, the plurality of band-shaped portions C1 separated by the slits CS of the transparent common electrode CIT are arrayed above the space PS between the adjacent transparent pixel electrodes PIT.

As illustrated in FIG. 13A, the transparent storage capacitance electrode MIT is disposed almost all portions above the gate line GL. The plurality of band-shaped portions C1 of the transparent common electrode CIT extend parallel to the gate lines GL over the plurality of pixel regions, wherein the width of the band-shaped portion C1 is wider in the vicinity of the center of the gate line GL.

FIG. 14 is a sectional view taken along line 14-14' in FIG. 13. The components, their functions, and used materials in the cross-sectional structure will be described. FIG. 14 is a sectional view of three pixel regions with the gate line GL being defined as a border. Since a color filter CF is disposed in a vertical stripe shape, the color filter CF of the same color is illustrated in FIG. 14. The black matrix BM is disposed at the inner surface of a first transparent substrate SUB1 across a liquid crystal layer LC at the border between the pixel regions, wherein the gate lines GL are located on this border.

Although light from a backlight is not illustrated, the light is emitted to a second transparent substrate SUB2 from the outside of a polarizing plate POL2 attached on the outside of the second transparent substrate SUB2. When the width of the black matrix BM is increased, an aperture ratio or transmittance is reduced. This leads to the problem of a dark image or an increase in power consumption. This problem is the biggest in a high-definition liquid crystal display device.

Therefore, a liquid crystal display device that does not cause a display failure has been demanded even if the width of the black matrix BM is decreased.

In FIG. 14, the cross-sectional structure is divided into two regions that are a pixel border region where the black matrix BM or the gate line GL that does not transmit light is located, and an opening region that transmits light.

A semiconductor layer SEM of the thin-film transistor TFT, a source electrode SM of the thin-film transistor TFT, and a contact hole CONT formed on an interlayer insulating film ORG, a protection insulating film PAS, and an insulating film SNG are located in the region shielded by the black matrix BM, and the transparent pixel electrode PIT is formed on the source electrode SM via the contact hole CONT.

In the opening region, a video-data voltage and a common voltage are respectively applied between the transparent pixel electrode PIT and the transparent common electrode CIT, and an electric field generated between these electrodes is applied to the liquid crystal layer LC. The intensity of the elliptically polarized light in the liquid crystal layer LC is changed due to the intensity of the electric field, whereby transmittance is controlled to realize a tone display.

In order to realize a liquid crystal display device having high transmittance and low power consumption, the width of the black matrix BM has to be decreased, the black matrix BM being located on the border of the pixel regions to form a light-shielding region. With this, the aperture ratio can be increased. In addition, the width of the transparent pixel electrode PIT has to be increased to the light-shielding region.

Figure 15A:
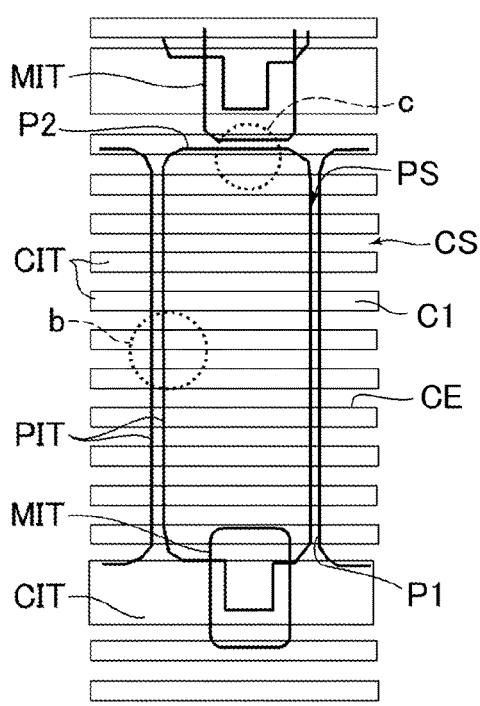
FIG. 15A is a plan view illustrating the patterns of the transparent storage capacitance electrode, the transparent pixel electrode, and the transparent common electrode.
Figure 15B:
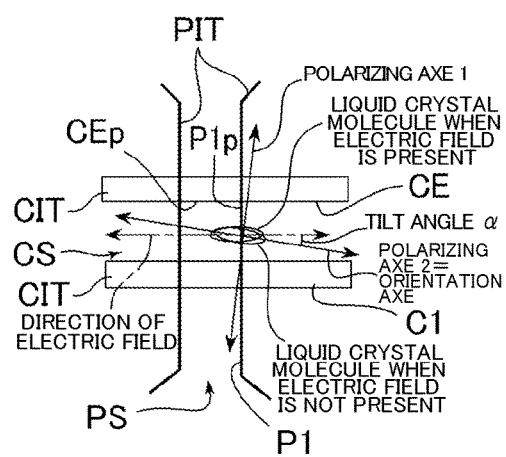
FIG. 15B is an enlarged view illustrating an area b in a dotted circle in FIG. 15A
Figure 15C:
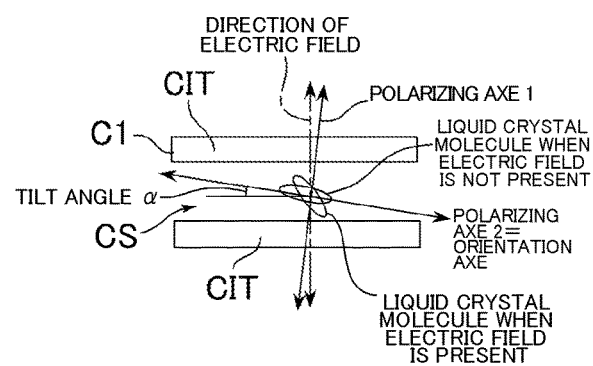
FIG. 15C is an enlarged view illustrating an area c in a dotted circle in FIG. 15A.

FIGS. 15A to 15C are plan views each illustrating one pixel region for showing a mechanism to prevent an occurrence of a pushed domain, and to realize a liquid crystal display device having high transmittance and low power consumption in the present embodiment. FIG. 15A illustrates only the patterns of the transparent storage capacitance electrode MIT, the transparent pixel electrode PIT, and the transparent common electrode CIT, which are made of a transparent conductive film material and extracted from the planar pattern of the pixel region. FIG. 15B is an enlarged view illustrating an area b in a dotted circle in FIG. 15A, and FIG. 15C is an enlarged view illustrating an area c in a dotted circle in FIG. 15A.

In the first embodiment, the band-shaped portions C1 and the slits CS of the transparent common electrode CIT extend parallel to the data lines DL. On the other hand, in the present embodiment, the band-shaped portions C1 and the slits CS of the transparent common electrode CIT are rotated at an angle of 90 degrees and extend parallel to the gate lines GL. This is the difference between the above first embodiment and the present embodiment. Therefore, orientation axes of liquid crystal molecules LCM in the present embodiment are also different from the first embodiment by 90 degrees.

Accordingly, in the area in FIG. 15B, the band-shaped portions C1 and the slits CS of the transparent common electrode CIT are orthogonal to the outer boundary P1 of the transparent pixel electrode PIT. Specifically, in a plan view, the pair of edges CE of the slit CS is orthogonal to the two closely adjacent outer boundaries P1 of two transparent pixel electrodes PIT that are adjacent to each other in the longitudinal direction of the slit CS. The transparent storage capacitance electrode MIT spreads in the in-plane direction over a plurality of pixel regions, so that the edge of the pattern is not present in the pixel region. The transparent storage capacitance electrode MIT is present in the region that is inside the slit CS of the transparent common electrode CIT and where the transparent pixel electrode PIT is not present (the space PS between two outer boundaries P1) in a plan view. Therefore, the direction of the electric field becomes the direction orthogonal to the outer boundary P1 of the transparent pixel electrode PIT. Specifically, the transparent storage capacitance electrode MIT is formed to spread in the in-plane direction so as to be overlapped with a portion CEp of the pair of edges CE of the slit CS and a portion P1p of the outer boundary P1 of the transparent pixel electrode PIT in a plan view, the portion CEp being located at the outside of the outer boundary P1 of the transparent pixel electrode PIT, and the portion P1p being located between the pair of edges CE of the slit CS. In addition, the transparent storage capacitance electrode MIT overlaps an entire rectangular closed region, which is enclosed by the pair of edges CE of the slit CS and two closely adjacent outer boundaries P1, in a plan view.

In an on state, the long axis of the liquid crystal molecule LCM is fixed in the direction perpendicular to the outer boundary P1 of the transparent pixel electrode PIT. The transparent common electrode CIT and the transparent pixel electrode PIT are disposed in different layers with the insulating film interposed therebetween. Therefore, the crossing portion of the edge CE of the band-shaped portion C1 of the transparent common electrode CIT and the outer boundary P1 of the transparent pixel electrode PIT is not rounded, so that the generation and spread of the pushed domain are inhibited. Accordingly, the transmittance is not reduced.

In the area in FIG. 15C, the rotating action of the liquid crystal molecules LCM becomes identical to that at the inside of the opening of the black matrix BM, in similar to the area in FIG. 5B in the first embodiment. Specifically, the rotating directions of the liquid crystal molecules LCM in the on state are aligned, whereby the pushed domain does not occur, the pushed domain being a situation in which the image disturbance is displayed for a long time in the off state due to the coexistence of two or more rotating directions. Thus, a liquid crystal display device having high transmittance and low power consumption can be provided.

Most part of the pixel structure according to the present embodiment includes the planar pattern illustrated in FIG. 13. In the pixel structure in FIG. 13, the plurality of band-shaped portions C1 of the transparent common electrode CIT extend parallel to the direction in which the gate lines GL extend, but the band-shaped portions C1 are not connected to each other in the extending direction of the data lines DL. Therefore, when disconnection occurs on any one of the band-shaped portions C1, the common potential is not supplied to the disconnected portion. Accordingly, a problem of deterioration in an image quality due to a wiring delay might arise. However, when the transparent common electrodes CIT are connected on the data lines DL in all pixel regions in similar to the conventional case, the transparent common electrodes CIT form a closed space on the transparent pixel electrode PIT, and a corner portion on an edge of the closed space is rounded due to an etching process. Therefore, a region where a plurality of rotating directions of the liquid crystal molecules are generated is formed, which results in that the pushed domain occurs, and hence, the transmittance is reduced.

Figure 16A:
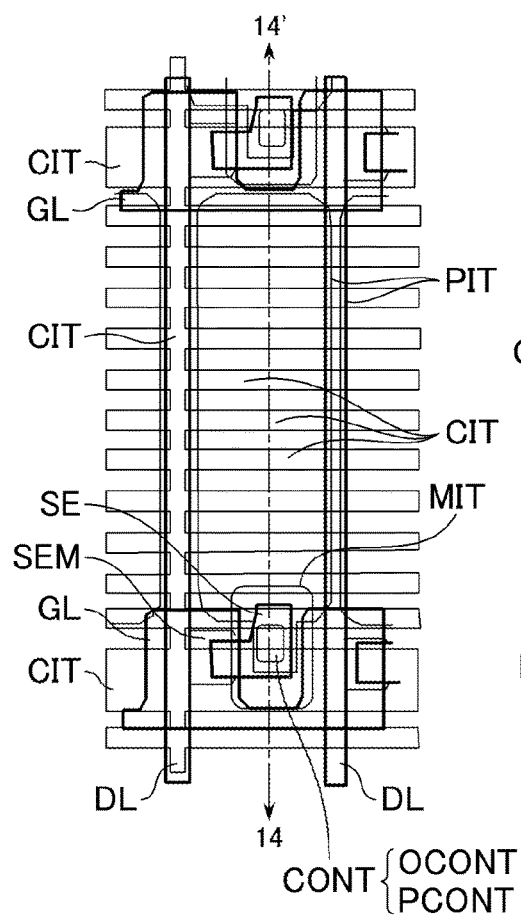
FIGS. 16A and 16B are plan views illustrating one pixel region in the liquid crystal panel according to the second embodiment.
Figure 16B:
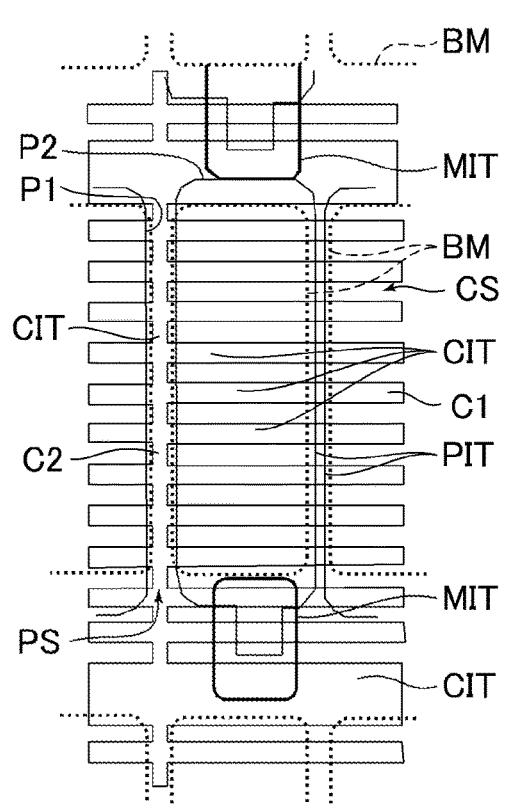

FIGS. 16A and 16B are plan views in which the transparent common electrodes CIT extending in the horizontal direction are connected to each other in only one portion for a plurality of pixel regions, not for all pixel regions, in order to solve the problem described above.

The plurality of band-shaped portions C1, which extend in the extending direction of the gate lines GL, of the transparent common electrode CIT are connected in the extending direction of the data lines DL above the data lines DL. The band-shaped portions C1 are connected on only one portion for a plurality of pixel regions, not for all pixel regions. As in the first embodiment, the band-shaped portions C1 and the slits CS of the transparent common electrode CIT are orthogonal to the outer boundary P1 of the transparent pixel electrode PIT on the portion where the band-shaped portions C1 are connected to each other. This structure provides an effect of fixing the rotation of the liquid crystal molecules LCM to the direction of the electric field. Thus, the occurrence of the pushed domain is prevented, whereby the reduction in the transmittance is small. Accordingly, a liquid crystal display device having less wiring delay and satisfactory image quality can be provided.

Third Embodiment

Referring to FIGS. 18~31, a liquid crystal panel of a third embodiment will be described.

Figure 18:
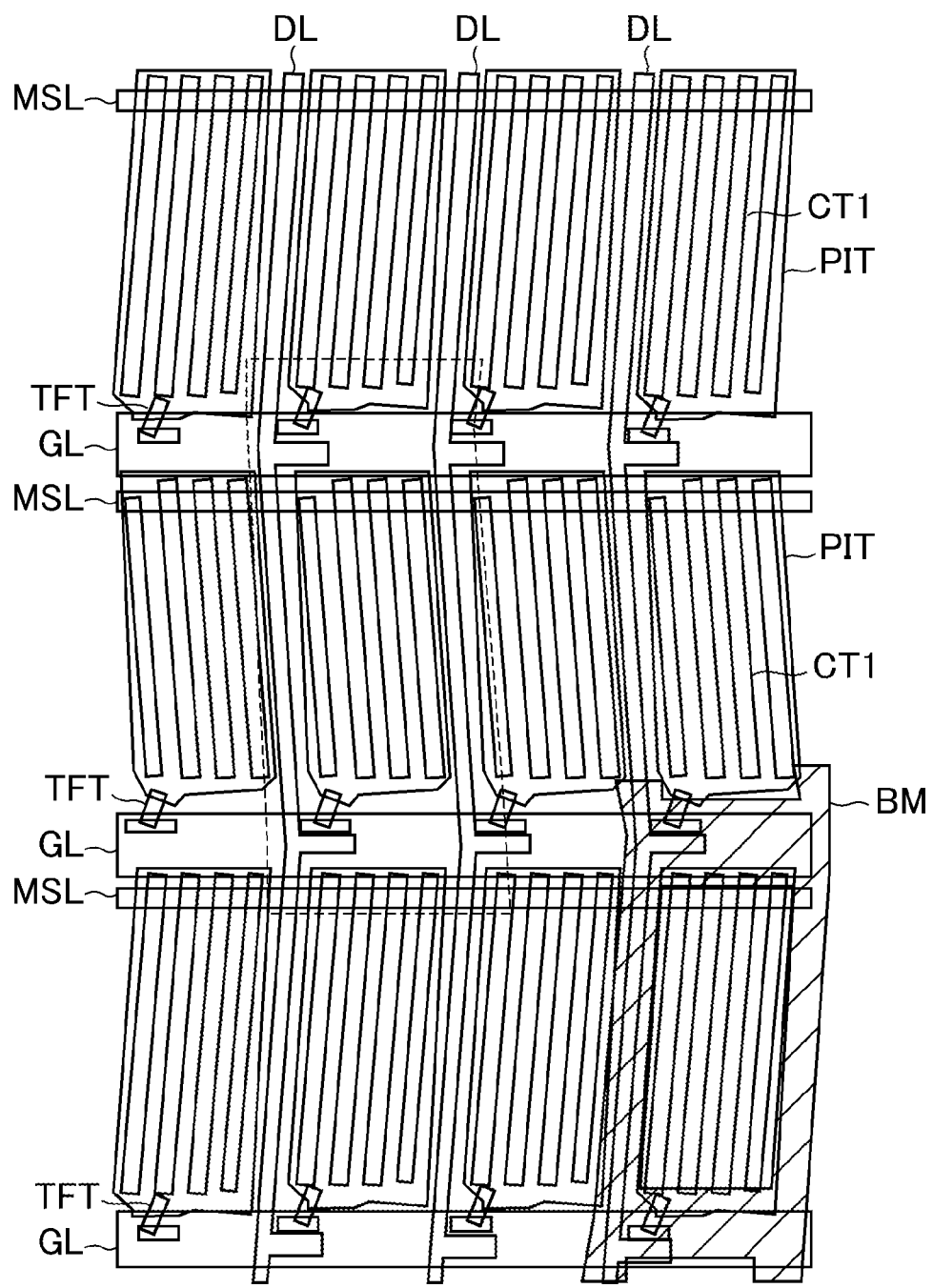
FIG. 18 is a plan view illustrating a plurality of pixels in a liquid crystal panel according to a third embodiment.
Figure 19:
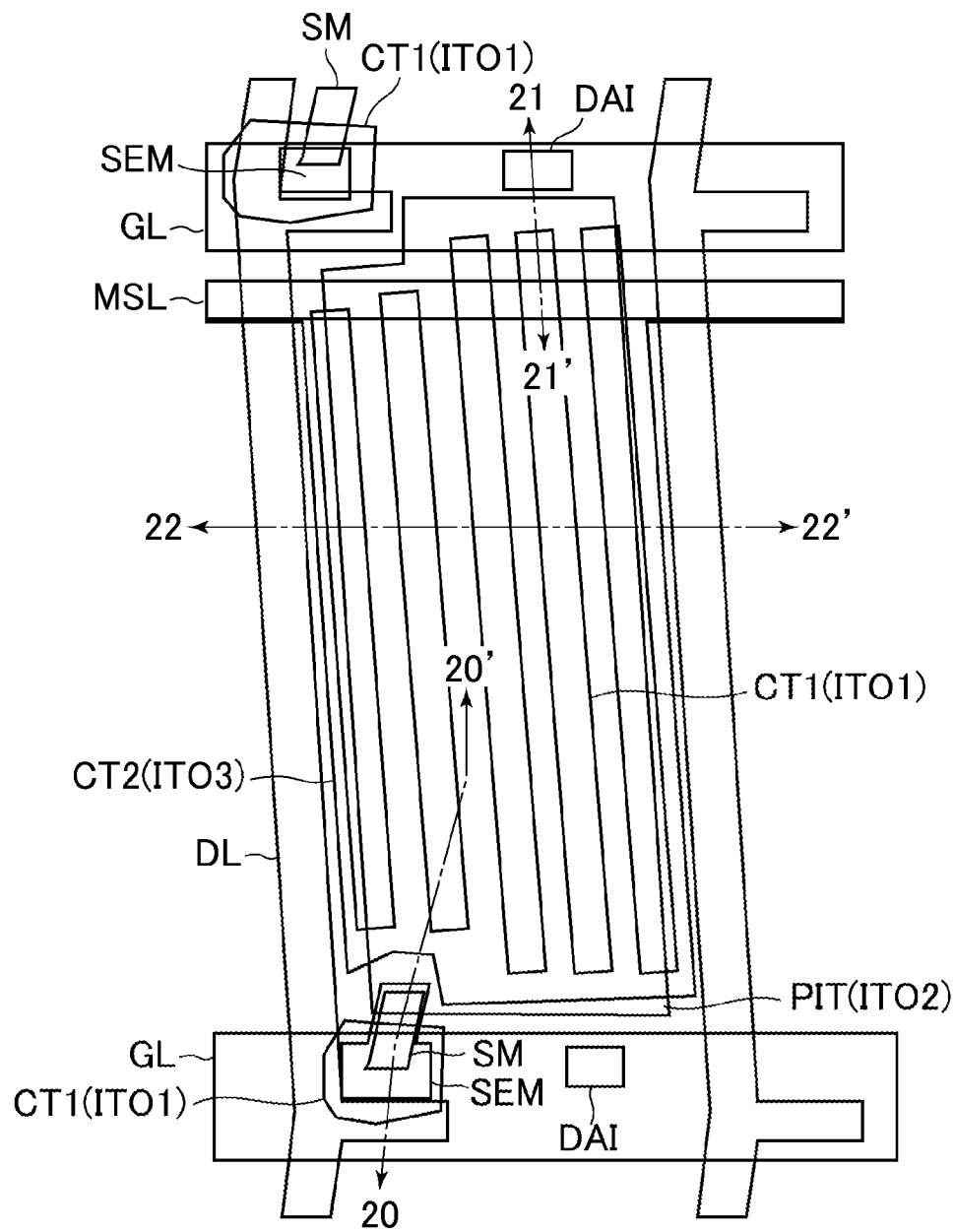
FIG. 19 is a detailed plan view illustrating one pixel in liquid crystal panel shown in FIG. 18.
Figure 20:
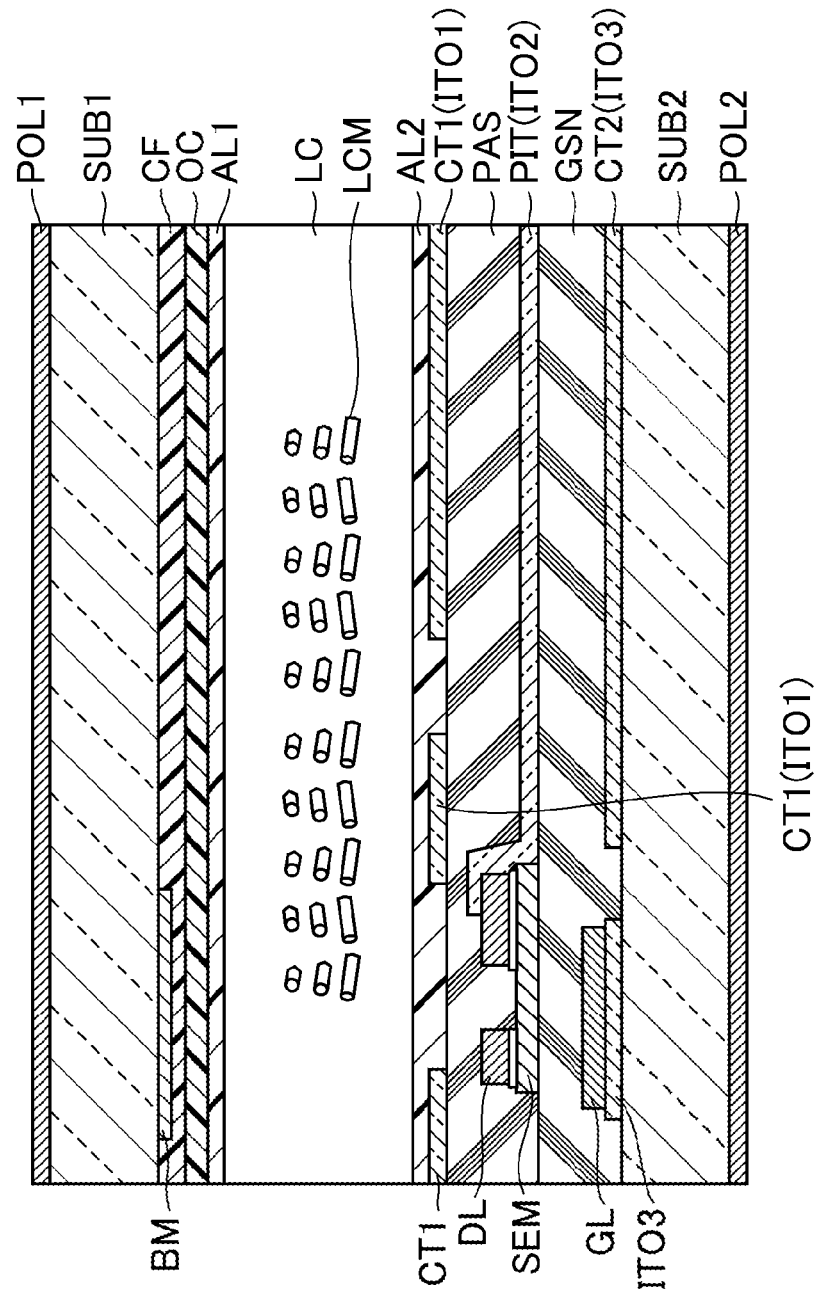
FIG. 20 is a sectional view taken along a line 20-20' shown in FIG. 19.
Figure 21:
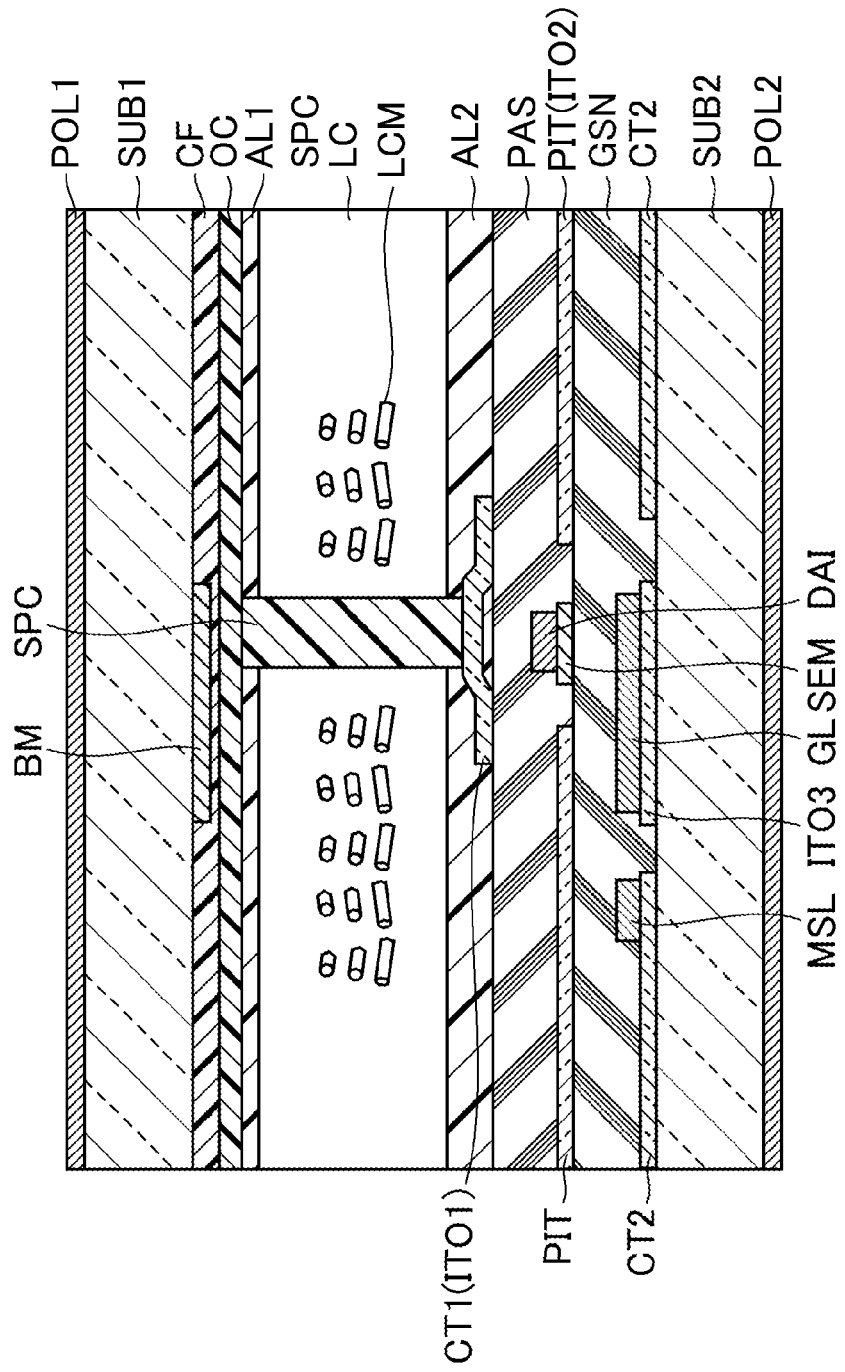
FIG. 21 is a sectional view taken along a line 21-21' shown in FIG. 19.
Figure 22:
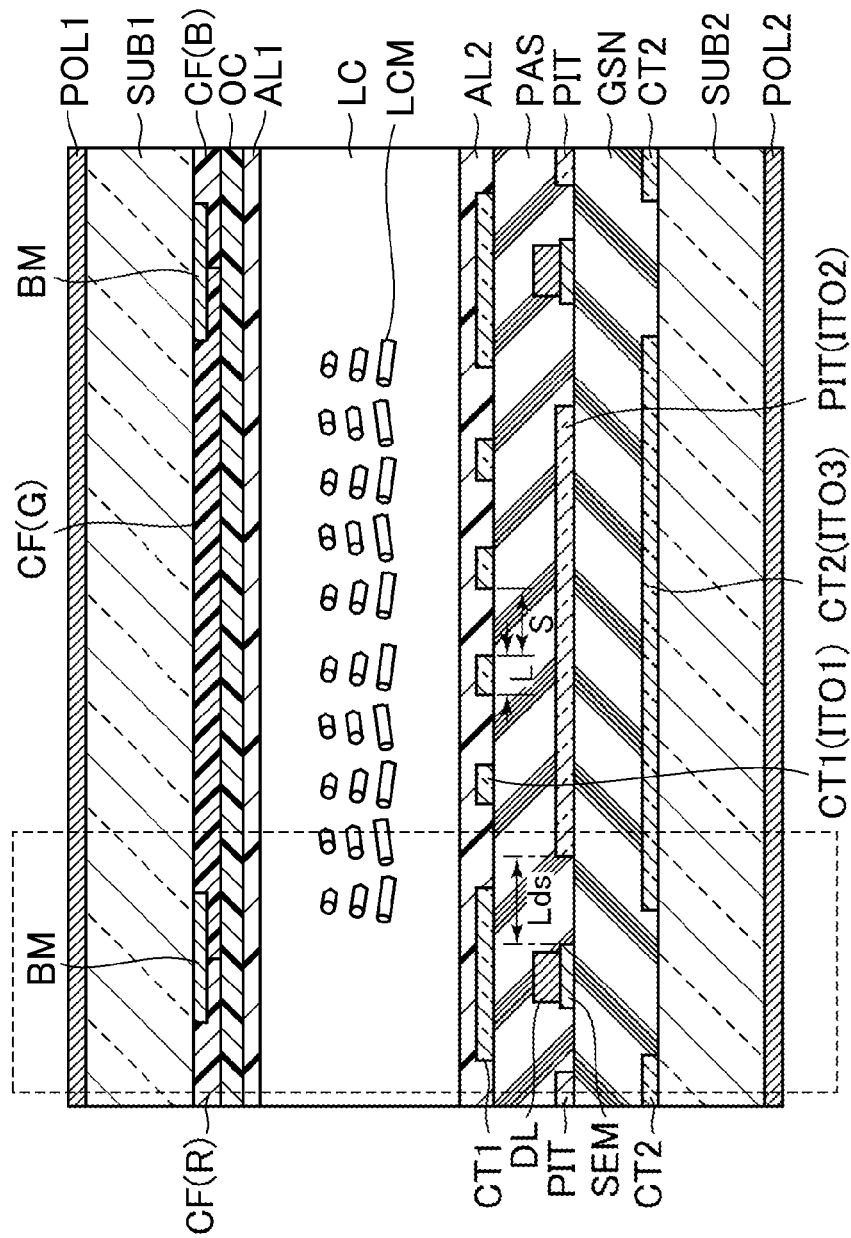
FIG. 22 is a sectional view taken along a line 22-22' shown in FIG. 19.

FIG. 18 is a plan view illustrating a plurality of pixels, FIG. 19 is a detailed plan view illustrating one pixel, FIG. 20 is a sectional view taken along line 20-20' in FIG. 19, FIG. 21 is a sectional view taken along line 21-21' in FIG. 19, and FIG. 22 is a sectional view taken along line 22-22' in FIG. 19.

FIG. 18 is a plan view in which four pixels in the horizontal direction and three pixels in the longitudinal direction, i.e., twelve pixels in total, in a screen region DIA are extracted. Gate lines GL are lines for supplying a scanning-voltage to a thin-film transistor TFT, and data lines DL are lines for supplying a video-data voltage to the thin-film transistor TFT. A common electrode metal line MSL supplies a common voltage to a first transparent common electrode CT1. In the present embodiment, pixels are disposed such that each pixel tilts to the right, to the left, and to the right with respect to the normal line for each row. Since the polarizing axis of the liquid crystal display device is vertical and horizontal, liquid crystal molecules rotate to the left, to the right, and to the left for each row according to the tilt of each pixel. Therefore, the rotation of the liquid crystal is offset for each row, whereby a liquid crystal display device of an IPS system having less color change can be realized.

A black matrix BM is illustrated in one of the plurality of pixels in FIG. 18. The data lines DL and the gate lines GL or the thin-film transistor TFT are covered with the black matrix BM having a light shielding effect, from above, and an opening is formed on its central part. When an aperture ratio that is the size of the opening for one pixel is increased, a bright liquid crystal display device having low power consumption can be realized.

FIG. 19 is a plan view illustrating the thin-film transistor TFT, a region of one pixel enclosed by the gate lines GL and the data lines DL, and a region of the neighboring pixel adjacent to this pixel region, all of which are illustrated in FIG. 18. FIG. 19 illustrates the planar arrangement and functions of the components. Each of the gate lines GL is made of a low-resistance metal layer. The gate lines GL are connected to the gate line drive circuit in FIG. 1, and the scanning-voltage is applied to the gate lines GL from the gate line drive circuit. On the other hand, each of the data lines DL is also made of a low-resistance metal layer, and a video-signal voltage is applied to the data lines DL. When a scanning-voltage that turns on a gate is applied to the gate lines GL, a semiconductor layer SEM of the thin-film transistor becomes a low resistance state, whereby the video-signal voltage of the data lines DL is applied to a source electrode SM made of a low-resistance metal layer, and also applied to a transparent pixel electrode PIT (ITO2) connected to the source electrode SM. Since the transparent electrode material used for the transparent pixel electrode PIT is used not only for the transparent pixel electrode PIT but also for a terminal portion used for the connection to an external device of a liquid crystal display panel, this transparent electrode material is referred to as ITO2.

A common voltage, which is another voltage applied to a liquid crystal layer LC, is applied to a first transparent common electrode CT1 (ITO1) from the common-electrode drive circuit in FIG. 1 via the common electrode metal line MSL. The first transparent common electrode CT1 (ITO1) is made of a first transparent electrode material ITO1. The transparent pixel electrode PIT (ITO2) and the first transparent common electrode CT1 (ITO1) are stacked with an insulating film interposed therebetween. In addition, the first transparent common electrode CT1 (ITO1) is formed with a slit in one pixel region. This slit is formed such that an electric field from the transparent pixel electrode PIT reaches the first transparent common electrode CT1 (ITO1) from the upper surface via the liquid crystal layer LC. This electric field drives the liquid crystal layer LC, whereby a display is realized. The first transparent common electrode CT1 is bored and opened on the top surface of the semiconductor layer SEM. This is for the reason described below. Specifically, when the first transparent common electrode CT1 is superimposed on the semiconductor layer SEM, the scanning-voltage applied to the gate lines affects the common voltage applied to the first transparent common electrode CT1, which results in that a proper potential difference with the pixel electrode cannot be formed. This adversely affects the display.

On the other hand, a second transparent common electrode CT2 (ITO3) is connected to the common electrode drive circuit illustrated in FIG. 1, and the common voltage is applied to the second transparent common electrode CT2 from the common electrode drive circuit. The second transparent common electrode CT2 (ITO3) is stacked on the transparent pixel electrode PIT (ITO2) with the insulating film interposed therebetween to form a storage capacitance STG. As described above, in the present embodiment, the first transparent common electrode CT1 (ITO1) having the slit, the transparent pixel electrode PIT (ITO2), and the second transparent common electrode CT2 (ITO3) are formed in the pixel region. The above three transparent electrode material layers ITO1, ITO2, and ITO3 are formed by different processes during the manufacturing process.

The first transparent common electrode CT1 (ITO1) corresponds to a second electrode in the liquid crystal display device according to the present application, and the second transparent common electrode CT2 (ITO3) corresponds to a first common electrode in the liquid crystal display device according to the present application.

FIG. 20 is a sectional view taken along line 20-20' in FIG. 19. In the present embodiment, a third transparent electrode material ITO3 and the gate line GL are processed after they are successively formed on the second transparent substrate SUB2. Therefore, the third transparent electrode material ITO3 is formed below the gate line GL to have a shape of the gate line GL. The third transparent electrode material ITO3 in the region where the gate line GL is removed forms the second transparent common electrode CT2.

The second transparent common electrode CT2 forms a storage capacitance STG in a pixel together with the transparent pixel electrode PIT (ITO2) that is formed with the gate insulating film GSN interposed between the second transparent common electrode CT2 and the transparent pixel electrode PIT. The storage capacitance STG can prevent attenuation of the video-signal voltage, which is applied with the thin-film transistor TFT being on, during the period of the storage operation.

The gate insulating film GSN is formed on the gate lines GL. The gate insulating film GSN corresponds to a first insulating film in the liquid crystal display device according to the present application. The semiconductor layer SEM is processed and disposed in an island shape on the gate line GL.

The data line DL and the source electrode SM are formed to apply the video-signal voltage to the semiconductor layer SEM. The transparent pixel electrode PIT (ITO2) is connected on the source electrode SM. A protection insulating film PAS is formed on the data line DL and the source electrode SM.

The first transparent common electrode CT1 (ITO1) is formed on the transparent pixel electrode PIT with the protection insulating film PAS interposed therebetween. In general, holding characteristics are maintained by the capacitance formed by the stacked structure of the first transparent common electrode CT1 and the transparent pixel electrode PIT. However, in the present embodiment, the storage capacitance can be increased between the transparent pixel electrode PIT and the second transparent common electrode CT2, whereby more satisfactory holding characteristics can be maintained. Thus, a liquid crystal display device with excellent image quality can be provided.

FIG. 21 is a sectional view taken along line 21-21' in FIG. 19. FIG. 21 illustrates a cross-section of the adjacent two pixel regions over the gate lines GL. FIG. 21 particularly illustrates the cross-section crossing a columnar spacer that is provided to maintain the thickness of the liquid crystal layer LC sealed between the first transparent substrate SUB1 and the second transparent substrate SUB2.

The second transparent common electrode CT2 (ITO3) is formed on the adjacent same planes of the gate lines GL. The second transparent common electrode CT2 is superimposed on the transparent pixel electrode PIT with the gate insulating film GSN interposed therebetween as described above, and the superimposed region forms the storage capacitance STG that has a function of preventing the reduction in the applied voltage during the period of the application of the video-signal voltage. The storage capacitance STG is also formed on the portion where the first transparent common electrode CT1 (ITO1) and the transparent pixel electrode PIT are superimposed with the protection insulating film PAS interposed therebetween. However, this storage capacitance cannot be formed to be large, since the first transparent common electrode CT1 is separated into the slit portion and the electrode portion as illustrated in the plan view in FIG. 19. This tendency becomes the significant problem in a high definition liquid crystal display device having a small area of a pixel region. Specifically, the storage capacitance STG is decreased in proportion to the square of the area of the superimposed portion. On the other hand, in the present embodiment, the second transparent common electrode CT2 that is superimposed on the entire surface of the transparent pixel electrode PIT is provided as illustrated in FIG. 21. Therefore, a large storage capacitance STG can be formed, whereby the reduction in the voltage applied to the transparent pixel electrode PIT can be prevented, and flickering or image persistence can also be prevented.

The common electrode metal line MSL is formed on the second transparent common electrode CT2. Since the common electrode metal line MSL is formed by the same process as the gate lines GL, the common electrode metal line MSL is made of a low-resistance metal line material. This structure reduces the wiring delay in the voltage applied to the second transparent common electrode CT2.

The thickness of the liquid crystal layer LC is accurately maintained with a spacer SPC formed on the first transparent substrate SUB1. The spacer SPC is formed by processing an organic material applied on the first transparent substrate SUB1. A base DAI is formed on the second transparent substrate SUB2 at the position opposite to the spacer SPC. The base DAI is a difference in level formed during the manufacturing process of the data lines DL. A plurality of spacers SPC are disposed in the liquid crystal display device as a whole, but the liquid crystal display device includes a pixel having the base DAI below the spacer SPC and a pixel having no base DAI. The base DAI is deformed when depressed by shock or fingers, thereby absorbing shock.

FIG. 22 is a sectional view taken along line 22-22' in FIG. 19. FIG. 22 is a sectional view of three pixels with the data line DL being defined as a border. The pixel at the center corresponds to a green color filter CF(G) in a color filter CF disposed in a vertical stripe shape. The pixels at the left and at the right of the pixel at the center correspond to a red color filter CF(R) and a blue color filter CF(B), respectively. The black matrix BM is disposed on the inner surface of the first transparent substrate SUB1 on the border of the pixel regions, where the data line DL is located, across the liquid crystal layer LC.

The data line DL and the black matrix BM have an effect of preventing a mixed color in which light of a backlight passing through the adjacent pixel region is seen when the pixel regions separated for each color filter CF is obliquely seen. Although the light from the backlight is not illustrated, the light is emitted to the second transparent substrate SUB2 from the outside of a polarizing plate POL2 attached on the outside of the second transparent substrate SUB2. When the width of the data line DL or the black matrix BM is increased, the aperture ratio or transmittance is reduced. This leads to the problem of a dark image. When an output of the backlight is increased for solving this problem, power consumption might be increased. This problem is the biggest in a high definition liquid crystal display device. Therefore, a liquid crystal display device has been demanded that does not cause a display failure even if the width of the black matrix BM or the data line is decreased. In the present embodiment, the semiconductor layer SEM is formed below the data line DL. When amorphous silicon or LTPS is used for the semiconductor layer SEM, the semiconductor layer SEM substantially becomes non-transparent. Therefore, when the width of the semiconductor layer SEM is too large, the aperture ratio is reduced, in similar to the data line DL.

In FIG. 22, the cross-sectional structure is divided into two regions that are a pixel shielding region where the black matrix BM or the data line DL that does not transmit light is located, and an opening region that transmits light. The structure and operation of the opening region will firstly be described.

In the opening region, the video-data voltage and the common voltage are respectively applied to the transparent pixel electrode PIT (ITO2) and the first transparent common electrode CIT, and an electric field generated between these electrodes is applied to the liquid crystal layer LC. The intensity of the elliptically polarized light in the liquid crystal layer LC is changed due to the intensity of the electric field, whereby transmittance is controlled to realize a tone image. In the first transparent common electrode CT1 having a plurality of slits, the width of the electrode is L, and the space between the electrodes is S. The transparent pixel electrode PIT is present below the slit, which is the slit width S, with the protection insulating film PAS interposed therebetween. Therefore, when the potential difference between two electrodes becomes large, the electric field having electric line of force folded in the liquid crystal layer LC is formed. The maximum electric field region is formed on the border of the electrode width L and the slit width S, which is the slit, of the first transparent common electrode CT1. Therefore, the rotation of the liquid crystal molecules LCM increases around the border of the electrode width L and the slit width S, so that transmittance is increased. On the contrary, the electric field around the center of the electrode width L and the slit width S is decreased. Therefore, the rotation of the liquid crystal molecules LCM is small, so that the transmittance is reduced. Specifically, the pixel region has a transmittance distribution in the transverse direction in the sectional view in FIG. 22. Accordingly, when the width L or the slit width S of the first transparent common electrode CT1 is increased, the electric field in the vicinity of the center of the electrode width L and the slit width S becomes weak, so that the transmittance is reduced. Consequently, the electrode width L and the slit width S, which is the slit, of the first transparent common electrode have to be finely set in consideration of the thickness of the liquid crystal layer LC.

In order to realize a bright liquid crystal display device with low power consumption, the width of the black matrix BM or the width of the data line DL has to be decreased, the black matrix BM and the data line DL being a light shielding region of a data line DL on the border of the pixel regions. With this, the aperture ratio can be increased. In addition, the width of the transparent pixel electrode PIT has to be increased to the light-shielding region in order to increase the driving region of the liquid crystal layer LC. Specifically, a distance Lds between the transparent pixel electrode PIT and the adjacent data line DL has to be decreased. In addition, it is necessary to consider that, in the transmittance distribution in the transverse direction in one pixel, the transmittance at the border of the electrode width L and the slit width S, which is the slit, of the first transparent common electrode CT1 becomes the maximum, and the transmittance in the vicinity of the center of the electrode width L and the slit width S which is the slit is low.

Figure 23:
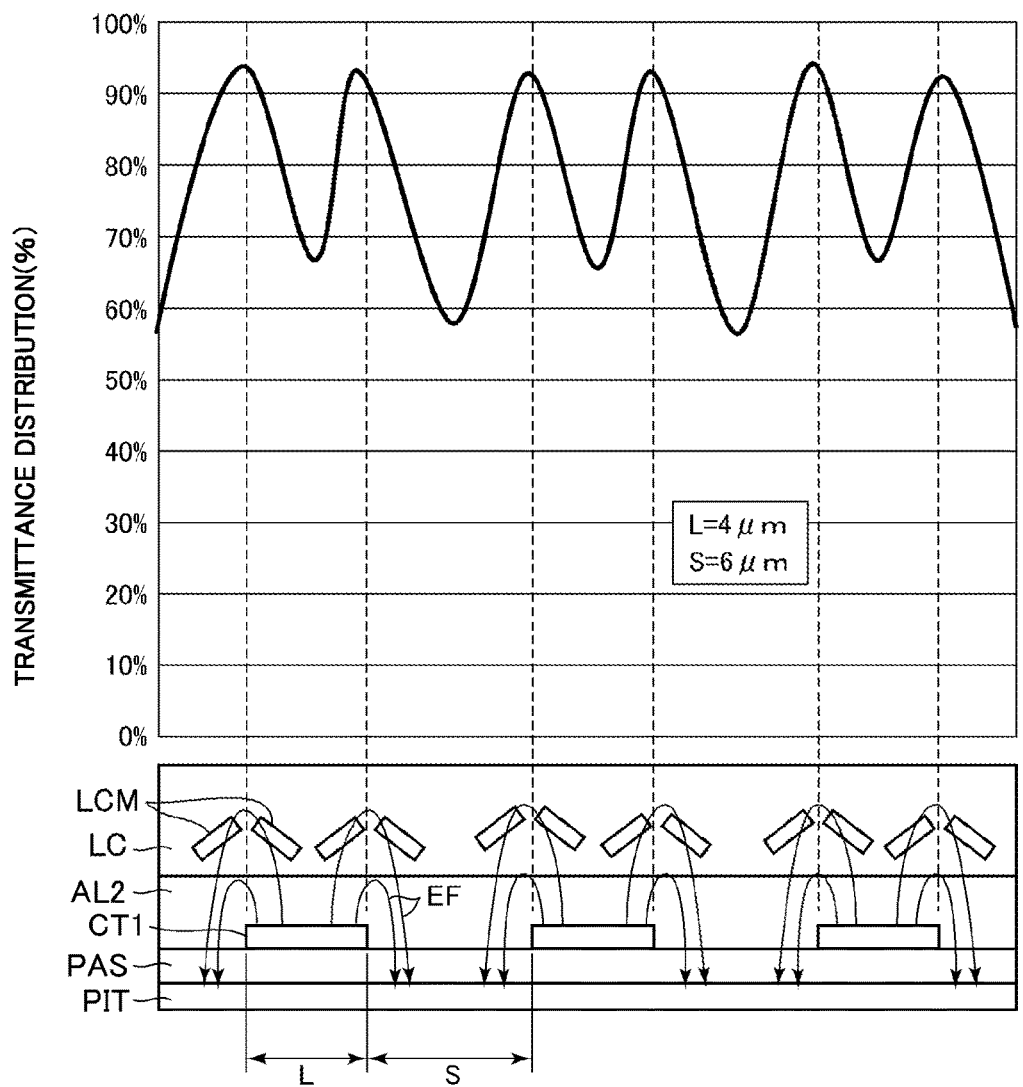
FIG. 23 is a diagram illustrating a calculation result of a transmittance distribution in opening regions in FIG. 22.

FIG. 23 illustrates a calculation result of the transmittance distribution in the opening region in FIG. 22. The electrode width L and the slit width S, which is the slit, of the first transparent common electrode CT1 are respectively 4 μm and 6 μm as illustrated in FIG. 23 in the present embodiment.

The transmittance is periodically increased and decreased in the transverse direction of the sectional structure. The transmittance is a relative value. The maximum transmittance is obtained at the end of the transparent common electrode CT1. The electric field EF from the first transparent common electrode CT1 to the transparent pixel electrode PIT via the liquid crystal layer LC becomes the maximum at the end of the transparent common electrode CT1. On this region, the rotation angle of the liquid crystal molecules in the liquid crystal layer LC becomes the maximum, so that the transmittance becomes the maximum. The region where the transmittance is decreased is in the vicinity of the center of the electrode width L and the vicinity of the center of the slit width S, which is the slit, of the first transparent common electrode CT1. In this region, the electric field EF becomes weak. The reason why the transmittance is the minimum in the vicinity of the center of the slit width S which is the slit is because the intensity of the electric field EF is low. Therefore, in order to enhance the transmittance, the region where the electric field EF is strong is densely formed. Specifically, the electrode width L and the slit width S of the first transparent common electrode CT1 has to be set as smaller as possible. In order to keep the relative transmittance illustrated in FIG. 23 at 50% or higher, the first transparent common electrode CT1 has to be formed such that the electrode width L and the slit width S are equal to each other as much as possible. The point to which the greatest attention has to be paid is the space with each electrode or line in the light-shielding region around the data lines DL, the light-shielding region greatly affecting the aperture ratio of the pixel region.

Figure 24A:
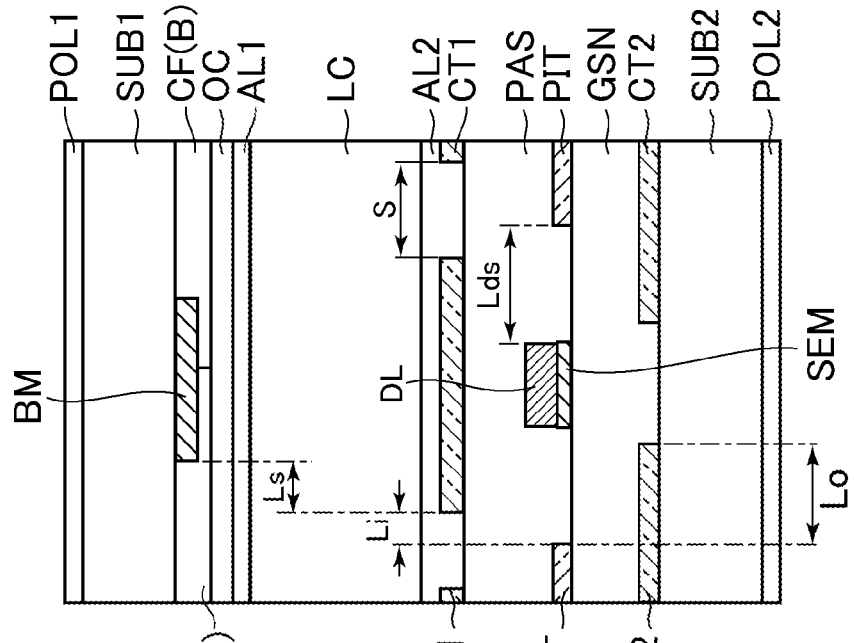
FIGS. 24A and 24B are sectional views taken along the border between adjacent pixels.
Figure 24B:
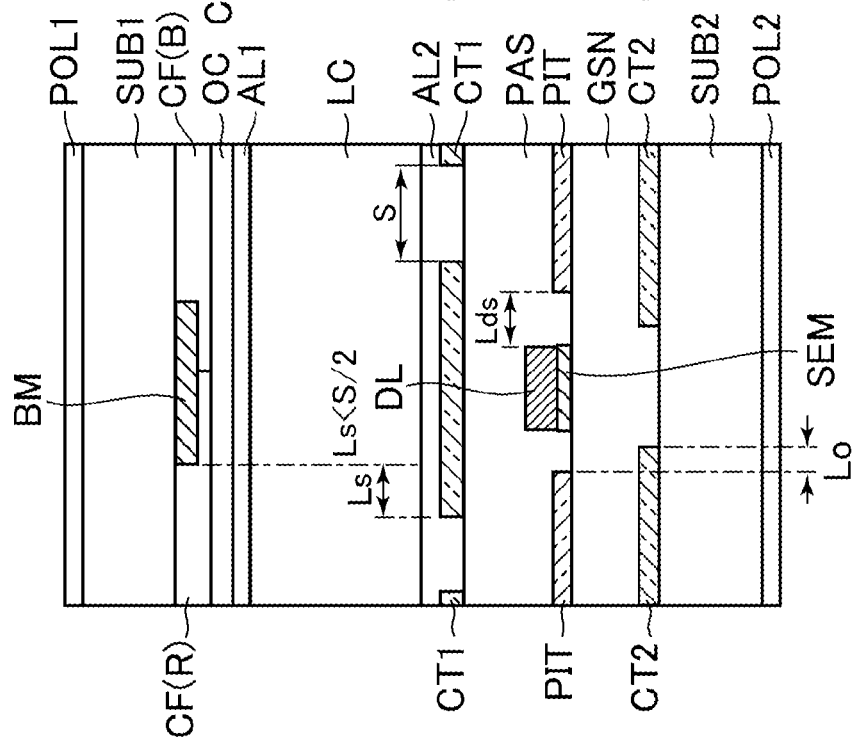

FIGS. 24A and 24B each illustrate a cross-section of the border between the adjacent pixels in a dotted frame in FIG. 22. FIGS. 24A and 24B are views for describing a configuration for efficiently improving the aperture ratio or the (maximum) transmittance.

A leakage electric field generated by the flow of the video image signal to the data line DL might cause deterioration in display performance. This is considered as follows. Specifically, the charges and voltage in the pixel region are charged when the thin-film transistor TFT is turned on. However, the charging period is only when the gate line GL is selected in one frame, and the pixel region is in a floating period while the other gate lines GL are selected. However, a video image signal for other pixel regions is always flown on the data lines DL, and the pixel region in the floating state is affected by the leakage electric field from the data lines DL. Therefore, the storage capacitance in the pixel region is likely to vary. In the cross-sectional structure in FIG. 24, the capacitance coupling from the data lines DL to the transparent pixel electrode PIT depends upon the distance Lds. When the distance Lds is short, the voltage variation from the data lines DL is affected by a parasitic capacitance from the first transparent pixel electrode PIT, so that the pixel voltage is likely to vary. In the case where a white or black window is displayed on a gray background at the center, a display with brightness close to the brightness of the window appears on the gray background at the portion above or below the window, when this variation is large. This is a display failure called vertical crosstalk. However, when the distance Lds is set too large, the area of the transparent pixel electrode PIT becomes small, so that the superimposed portion with the first transparent common electrode CT1 also becomes small. Therefore, the range where the electric field EF is formed also becomes small, whereby the aperture ratio is decreased to cause a dark image. In the present embodiment, the parasitic capacitance between the data line DL and the transparent pixel electrode PIT can be decreased, even if the distance Lds between the data line DL and the transparent pixel electrode PIT is decreased. In addition, the present embodiment realizes the structure in which the transmittance is difficult to be reduced, even if the distance Lds is increased. FIG. 24A illustrates one example of a cross-section on the border between the adjacent pixels. The distance Lds between the transparent pixel electrode PIT and the data line DL is very small. Therefore, the coupling capacitance between the transparent pixel electrode PIT and the data line DL is likely to increase, and hence, the transparent pixel electrode PIT is easy to be affected by the signal on the data line DL. In view of this, the transparent pixel electrode PIT extends to be superimposed with the first transparent common electrode CT1 on the data line DL in the present embodiment. In other words, the distance Lds between the transparent pixel electrode PIT and the data line DL is covered with the first transparent common electrode CT1 in the direction of the liquid crystal LC. The second transparent common electrode CT2 is formed below the transparent pixel electrode PIT with the gate insulating film GSN interposed therebetween. The edge of the second transparent common electrode CT2 is set to the position close to the data line DL from the transparent pixel electrode PIT by Lo. In other words, the edge of the second transparent common electrode CT2 is overlapped with the distance Lds between the data line DL and the transparent pixel electrode PIT in a plan view. The thickness of the protection insulating film PAS is about 0.6 µm, and the thickness of the gate insulating film GSN is about 0.4 µm. These thicknesses are much smaller than the set values of the slit width S between the electrodes and the distance Lds. The first transparent common electrode CT1 and the second transparent common electrode CT2 are fixed to be a common potential for the common electrode. Therefore, the parasitic capacitance depending upon the distance Lds between the data line DL and the transparent pixel electrode PIT can be suppressed to be low due to the effect of electric shield from the top surface of the first transparent common electrode CT1 and from the lower surface of the second transparent common electrode CT2. Specifically, the influence of the data line DL can be reduced even in the structure in which the distance Lds between the transparent pixel electrode PIT and the data line DL is very small.

On the other hand, the first transparent common electrode CT1 and the transparent pixel electrode PIT are superimposed, and the liquid crystal layer LC is driven by an electric field applied between these two electrodes. As understood from the calculation in FIG. 23, a protruding size Ls of the first transparent common electrode CT1, the protrusion protruding to the outside from the black matrix BM formed on the first transparent substrate SUB1, (i.e., the distance between the edge of the slit of the first transparent common electrode CT1 and the edge of the black matrix BM in a plan view) has a function equivalent to the electrode width L. Therefore, if the protruding distance Ls is a half or less of the slit width S of the first transparent common electrode CT1, the electric field EF can be made dense, whereby a liquid crystal display device with less reduction in transmittance can be provided.

FIG. 24B illustrates a structure in which the distance Lds between the data line DL and the transparent pixel electrode PIT is large in the similar cross-sectional structure. In this case, since the distance Lds between the data line DL and the transparent pixel electrode PIT is large, the coupling capacitance is greatly reduced. This structure also reduces the possibility that the data line DL and the transparent pixel electrode PIT are short-circuited due to an error during the manufacturing process. However, in this case, the area of the transparent pixel electrode PIT is reduced. Therefore, the problem is to prevent the reduction in the transmittance. The first transparent common electrode CT1 includes a plurality of slits in the region outside the data line DL. The width of each slit is defined as S. As apparent from the plan view in FIG. 19 and the sectional view in FIG. 22, the slits extend in the direction along the data lines DL. The end of the transparent pixel electrode PIT in FIG. 24B is formed to be located in the most adjacent slit of the first transparent common electrode CT1 that covers the data line DL, and extend along the data lines DL in a plane.

On the other hand, in the present embodiment, the transparent pixel electrode PIT and the first transparent common electrode CT1 covering the data line DL are not overlapped with each other, but are apart from each other by a predetermined distance Li in the slit width S which is the slit. Specifically, the distance Li is formed between the edge of the slit of the first transparent common electrode CT1 and the edge of the transparent pixel electrode PIT in a plan view. If the second transparent common electrode CT2 is not formed below the transparent pixel electrode PIT in the present embodiment, only the transparent pixel electrode PIT and the first transparent common electrode CT1 drive the liquid crystal layer LC. As for the planar size, the slit width S which is the slit is 6 µm, for example, as illustrated in FIG. 23. Therefore, when the distance Li is set to be not less than 3 µm, the intensity of the electric field is sharply reduced, which results in that the transmittance is reduced. In the present embodiment, the second transparent common electrode CT2 is formed blow the predetermined distance Li. Specifically, the distance Li and the second transparent common electrode CT2 are overlapped with each other in a plan view. The electric field at the end of the transparent pixel electrode PIT reaches the second transparent common electrode CT2 from the slit width S which is the slit via the liquid crystal layer LC to drive the liquid crystal layer LC. With this operation, the reduction in the transmittance can be prevented. Specifically, the end of the transparent pixel electrode PIT is present in the slit width S, which is the slit, adjacent to the first transparent common electrode CT1 covering the data line DL, and the second transparent common electrode is present below the space between the end of the transparent pixel electrode PIT and the end of the transparent common electrode CT1. This structure can provide a liquid crystal display device having small parasitic capacitance, high transmittance, and low power consumption.

Figure 25:
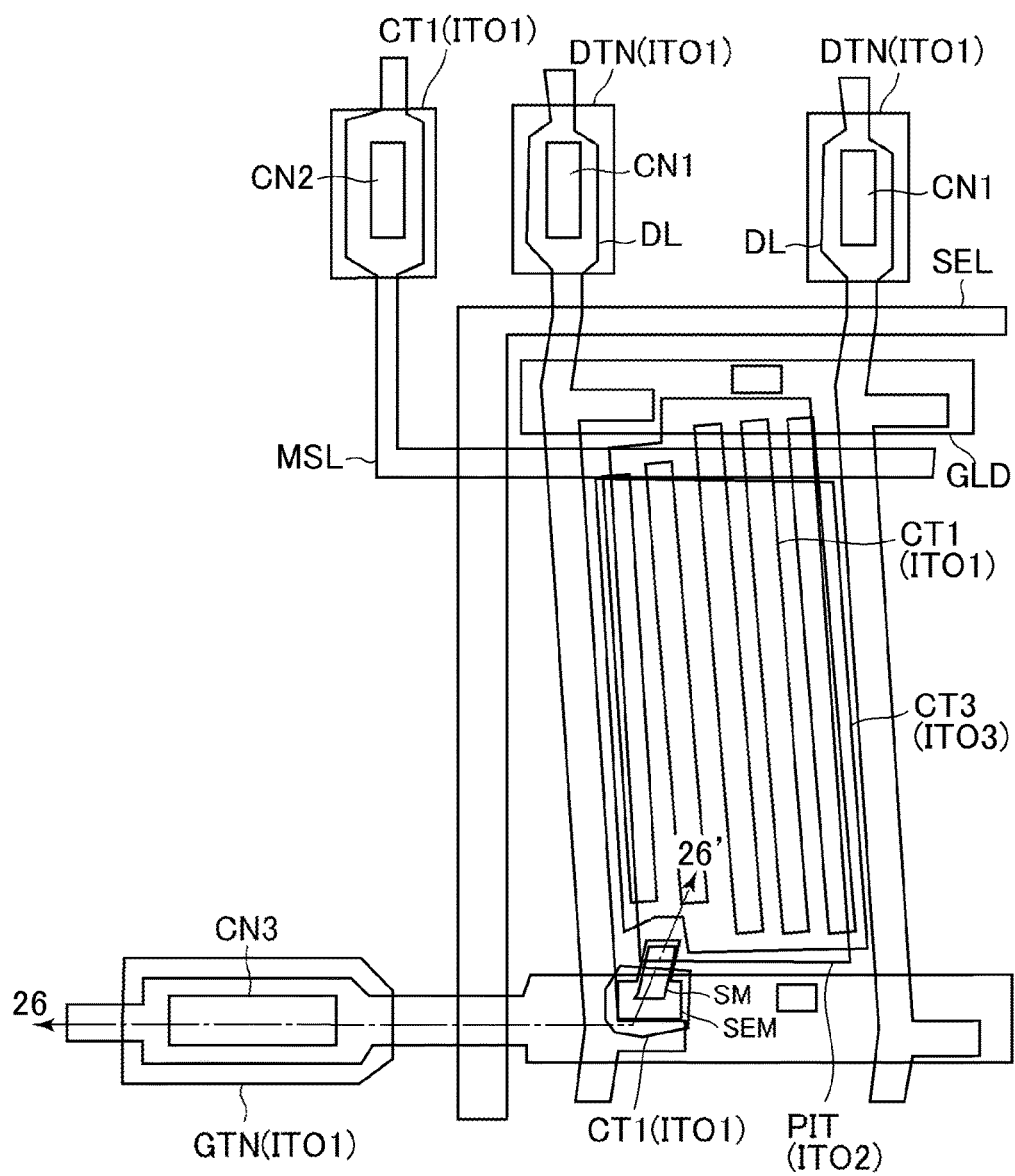
FIG. 25 is a plan view of one pixel corresponding to an end of a screen portion of a liquid crystal display panel according to a third embodiment.

FIG. 25 is a plan view of one pixel corresponding to an end of a screen of the liquid crystal display device. FIG. 25 illustrates a terminal portion for the extraction from the end of the screen to the outside. The data line DL and the first transparent electrode material ITO1 are connected to each other from a drain opening CN1 formed on a metal line of the data line DL, and this forms a drain terminal electrode DTN. The common electrode metal line MSL is similarly connected to the first transparent electrode material ITO1 on a common electrode metal line opening CN2, and this is extracted as a common electrode terminal CTN. On the other hand, the gate line GL is extracted on the first transparent electrode material ITO1 from a gate line opening CN3, and this forms a gate line terminal electrode GTN. The gate line GLD at the terminal end is a gate line for a dummy pixel, since a corresponding pixel is actually not present. An adhesive layer seal SEL is a rectangular frame made of an organic material for preventing leakage of liquid crystal.

Figure 26:
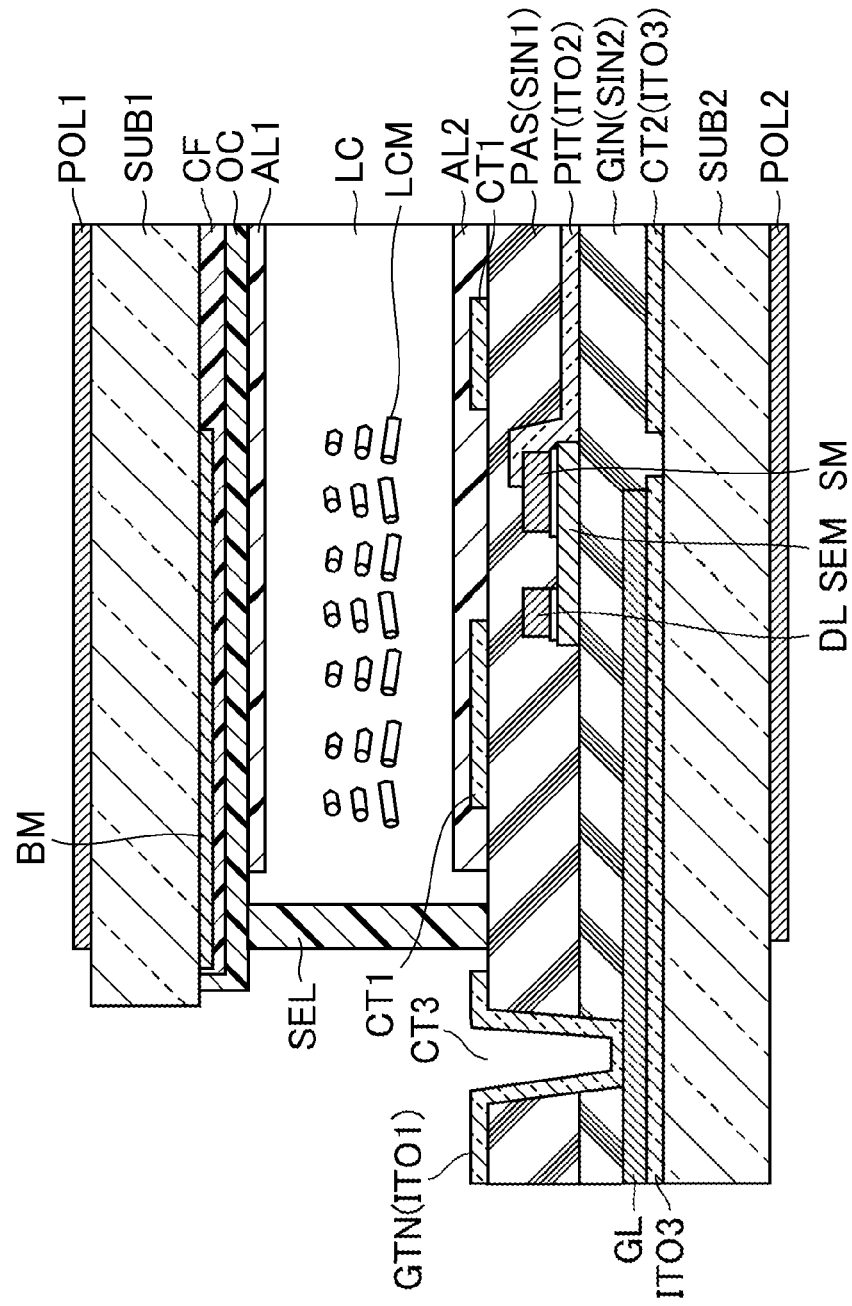
FIG. 26 is a cross-section view taken along a line 26-26' shown in FIG. 25.

FIG. 26 illustrates a cross-section taken along line 26-26' in FIG. 25. FIG. 26 illustrates a cross-sectional structure from the gate line terminal electrode GTN to the semiconductor layer SEM in the liquid crystal display device.

The region sandwiched between the first transparent substrate SUB1 and the second transparent substrate SUB2 is the liquid crystal layer LC. The adhesive layer seal SEL is formed on the periphery of the screen region DIA for preventing the liquid crystal in the liquid crystal layer LC from leaking. The gate line GL is extracted to the periphery of the second transparent substrate SUB2 where the liquid crystal layer LC is not present, wherein the gate line GL is extracted with the first transparent electrode material ITO1 from the opening on the gate insulating film GIN and the protection insulating film PAS. The gate drive circuit is connected to the gate line terminal electrode GTN.

FIGS. 27A to 31B each illustrate a manufacturing process of the thin-film transistor TFT, the wiring region, and the opening formed on the second transparent substrate SUB2 in the present embodiment. FIGS. 27A, 28A, 29A, 30A, and 31A are plan views each illustrating one pixel region, and FIGS. 27B, 28B, 29B, 30B, and 31B are sectional views each taken along line b-b' in the corresponding plan view. FIGS. 27A to 31B each illustrate each photographic processing process in the TFT process. Each plan view is a plan view of one pixel including the terminal portion in FIG. 25, and each sectional view is a sectional view including the gate line terminal electrode GTN in FIG. 26.

Figure 27A:
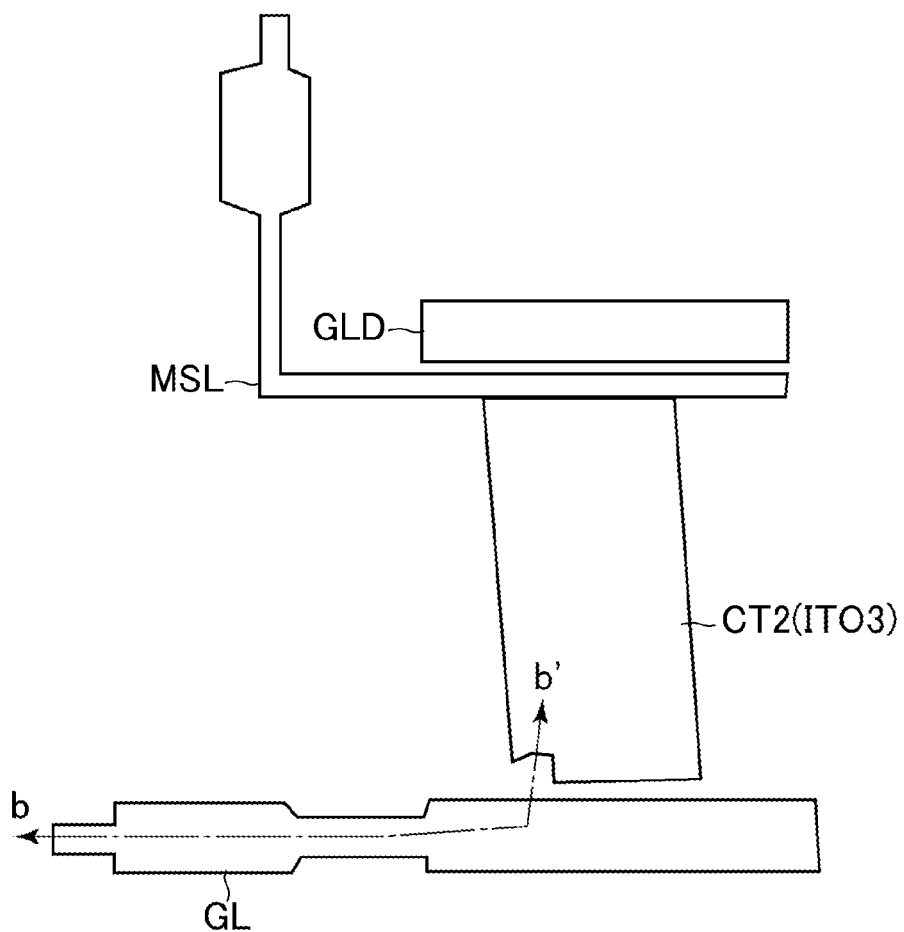
FIG. 27A is a plan view of one pixel in the liquid crystal panel according to the third embodiment when a first photo-process is completed.
Figure 27B:
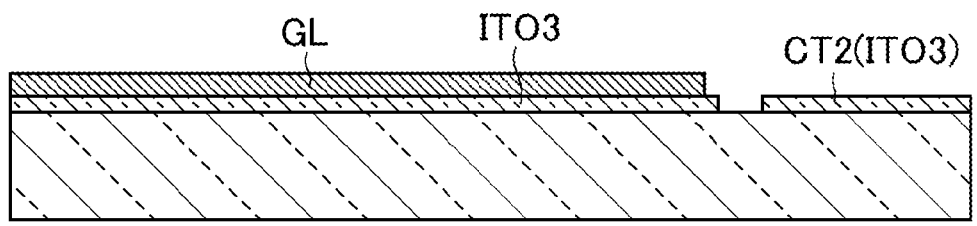
FIG. 27B is a sectional view taken along a line b-b' shown in FIG. 27A.

FIG. 27A is a plan view of one pixel, when a first photo-process is completed on the second transparent substrate SUB2, and FIG. 27B is a sectional view taken along line b-b' in FIG. 27A. The gate line GL, the common electrode metal line MSL, and the second transparent common electrode CT2 (ITO3) are formed by the first photo-process. The third transparent electrode material ITO3 and the metal material for the gate line GL are formed on the second transparent substrate SUB2 by sputtering. In an exposure process for the resist in the first photo-process, a photomask is made of perfectly light shielding metal and semitransparent metal. By using this photomask, a thick photoresist can be formed on the gate line GL, a thin photoresist can be formed on the second transparent common electrode CT2, and a photoresist cannot be formed on the other region. With this state, the material of the gate line GL and the third transparent electrode material ITO3 are removed by etching, and then, the thin resist is removed by an ashing process. Then, the gate line GL is again removed, whereby the second transparent common electrode CT2, the gate line GL having the metal line, and the common electrode metal line MSL can be formed by one exposure process. The process in which two types of resists, each having a different thickness, are formed in one exposure as described above is called halftone exposure. According to the halftone exposure, the number of exposure processes that are conventionally performed twice can be reduced to half, whereby the number of the whole photo-process can be reduced. Accordingly, cost can be reduced.

Figure 28A:
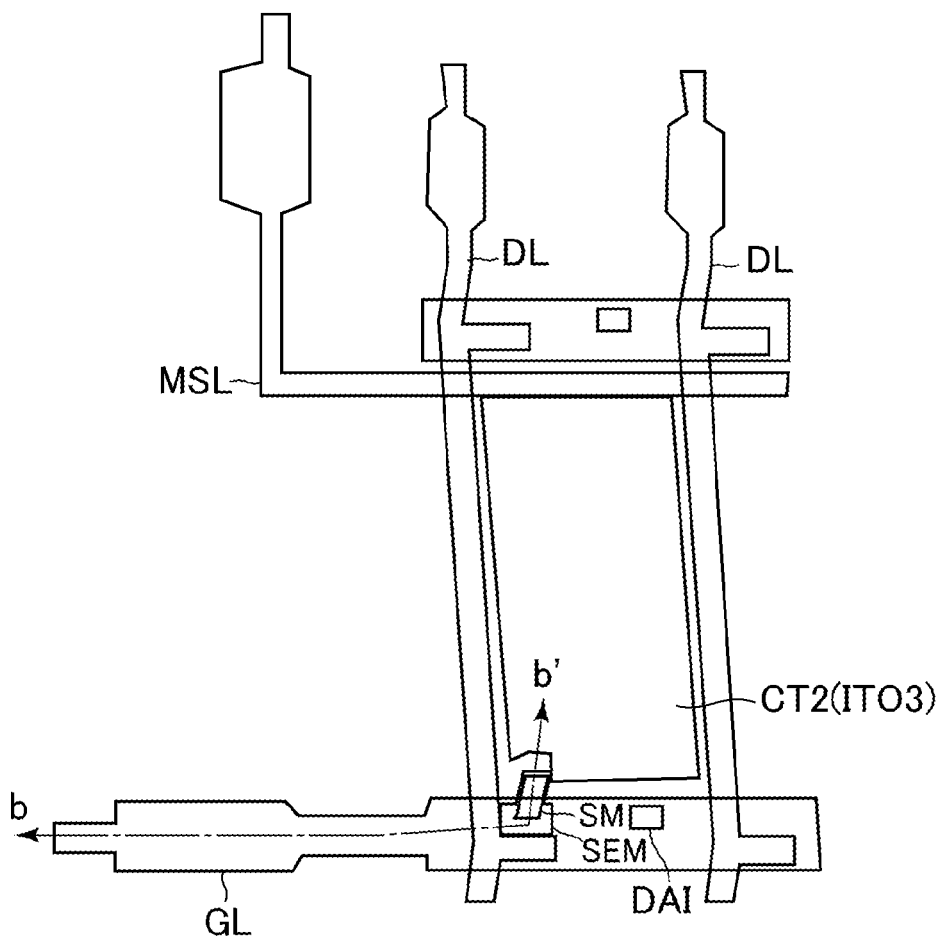
FIG. 28A is a plan view of one pixel in the liquid crystal panel according to the third embodiment when a second photo-process is completed.
Figure 28B:
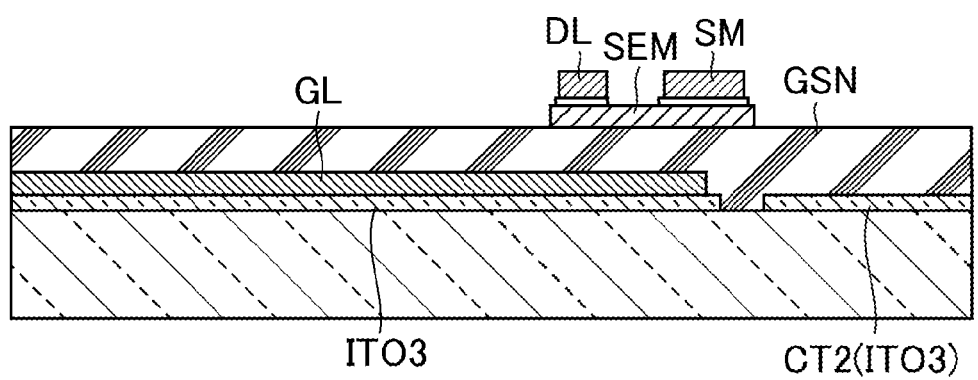
FIG. 28B is a sectional view taken along a line b-b' shown in FIG. 28A.

FIG. 28A is a plan view of one pixel, when a second photo-process is completed, and FIG. 28B is a sectional view taken along line b-b' in FIG. 28A. The gate insulating film GSN made of silicon nitride and the semiconductor layer SEM made of amorphous silicon are stacked on the gate line GL by CVD. A stacked film of molybdenum Mo and copper Cu is formed on the semiconductor layer SEM by sputtering, whereby the data line DL and the source electrode SM are formed.

A photoresist is formed on the CVD film and the sputtering film, and the photoresist is exposed by use of a halftone photomask, whereby the region of the data line DL and the source electrode SM and the region of the semiconductor layer SEM can be formed.

Figure 29A:
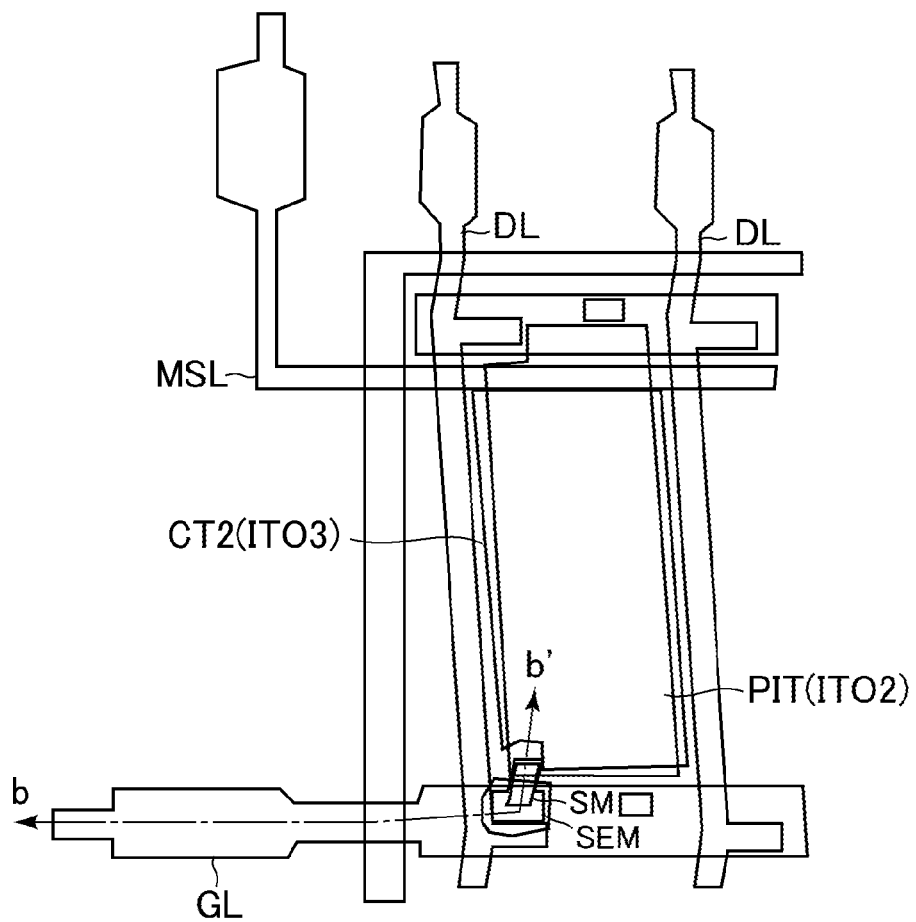
FIG. 29A is a plan view of one pixel in the liquid crystal panel according to the third embodiment when a third photo-process is completed.
Figure 29B:
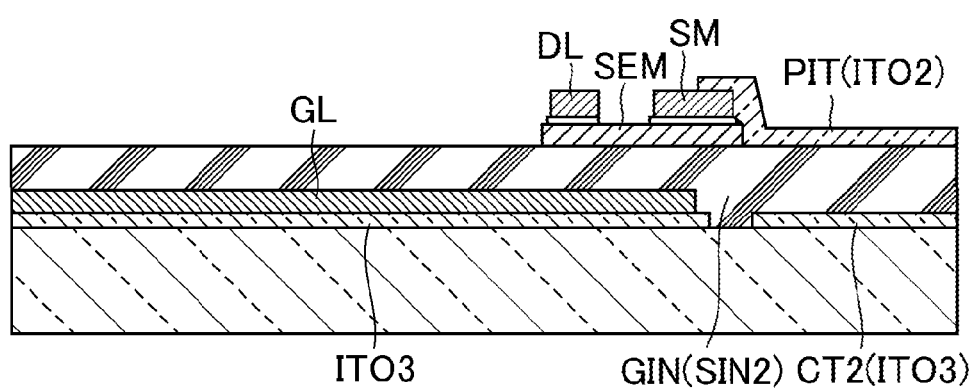
FIG. 29B is a sectional view taken along a line b-b' shown in FIG. 29A.

FIG. 29A is a plan view of one pixel, when a third photo-process is completed, and FIG. 29B is a sectional view taken along line b-b' in FIG. 29A. The second transparent electrode material ITO2 is formed on the data line DL and the source electrode SM. The photo-process is performed to the second transparent electrode material ITO2 to thereby form the transparent pixel electrode PIT. The transparent pixel electrode PIT is formed in a square pattern in one pixel. The transparent pixel electrode PIT is connected to the source electrode SM.

Figure 30A:
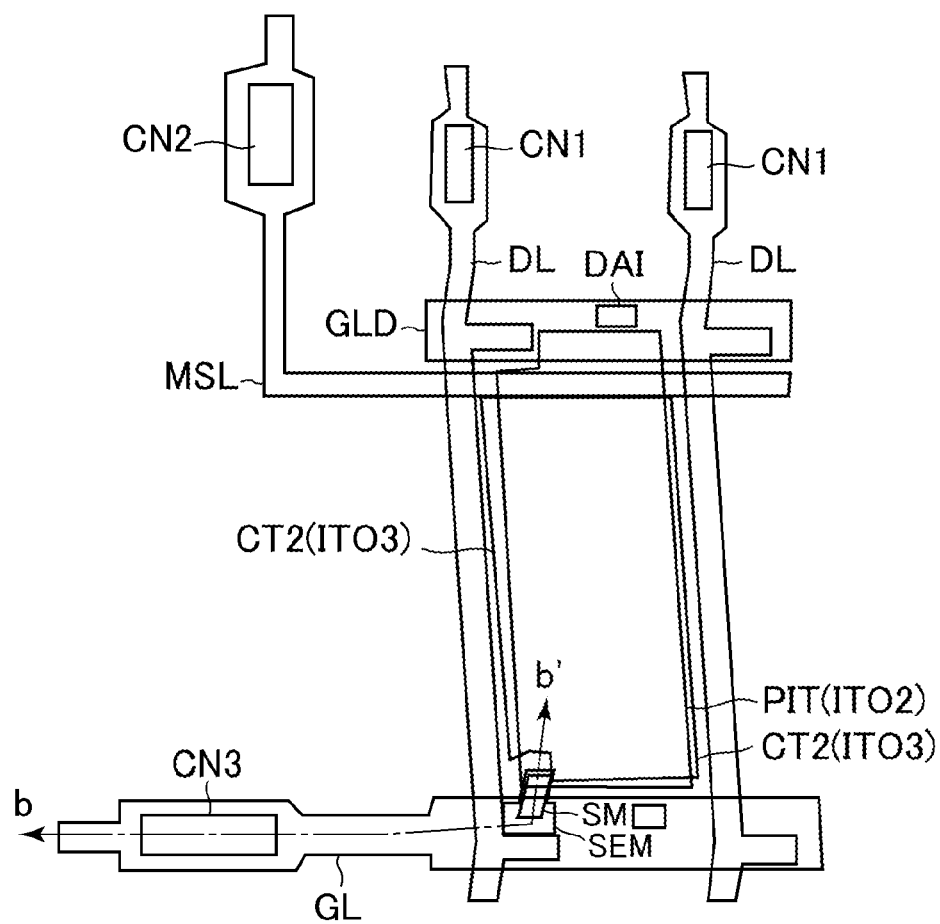
FIG. 30A is a plan view of one pixel in the liquid crystal panel according to the third embodiment when a fourth photo-process is completed.
Figure 30B:
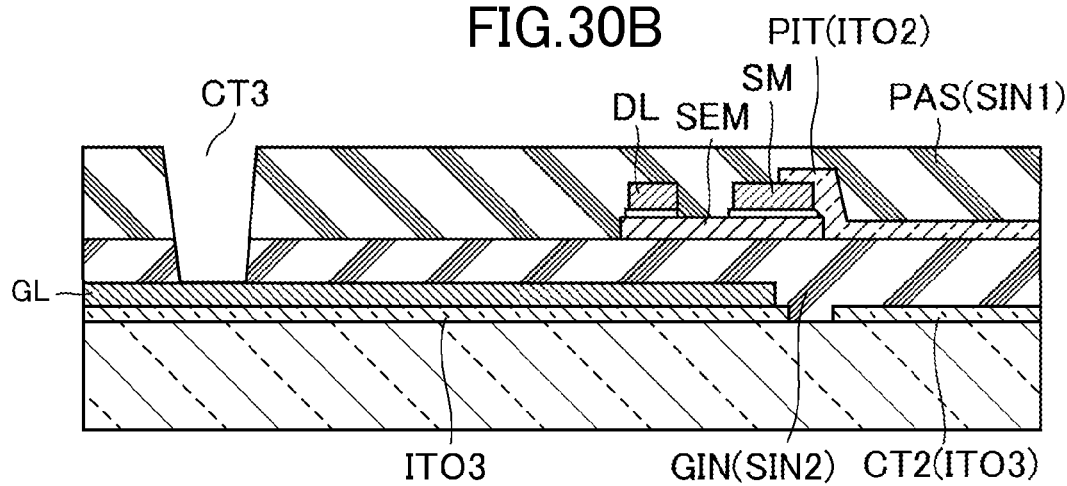
FIG. 30B is a sectional view taken along a line b-b' shown in FIG. 30A.

FIG. 30A is a plan view of one pixel, when a fourth photo-process is completed, and FIG. 30B is a sectional view taken along line b-b' in FIG. 30A. In this photo-process for forming the protection insulating film PAS on the data line DL and the source electrode SM by CVD, the protection insulating film PAS is processed by dry etching on the terminal region to form a gate line opening CN3, which is a contact hole penetrating to the surface of the gate line GL.

Figure 31A:
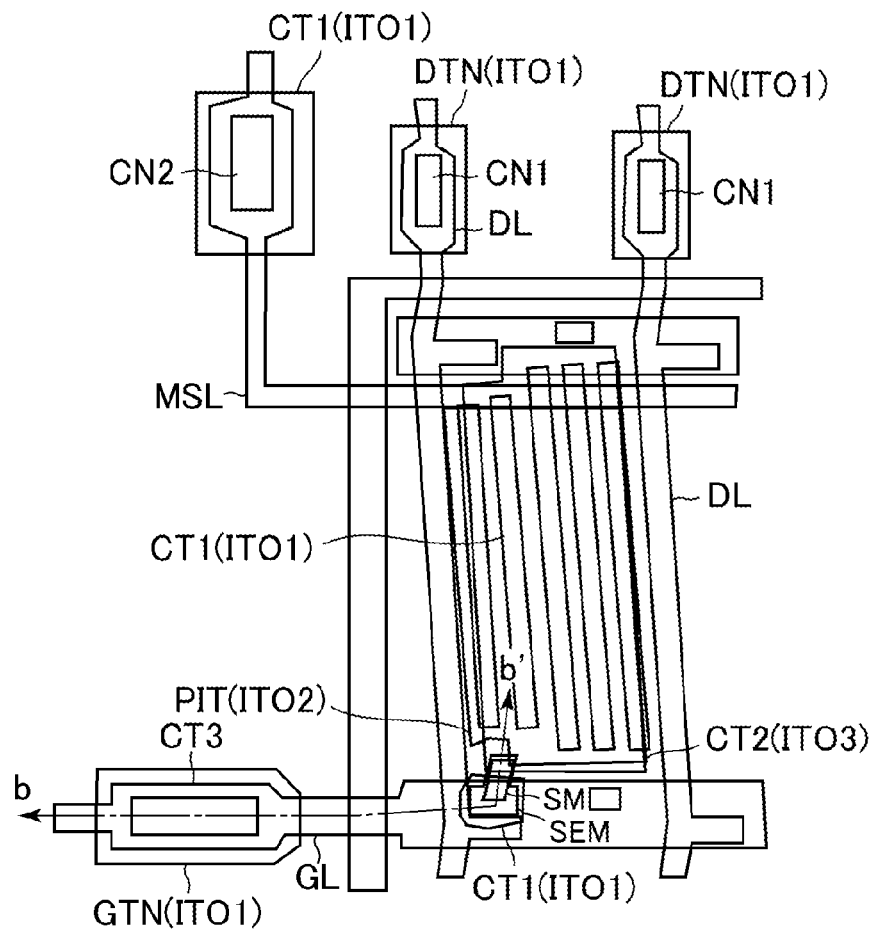
FIG. 31A is a plan view of one pixel in the liquid crystal panel according to the third embodiment when a fifth photo-process is completed.
Figure 31B:
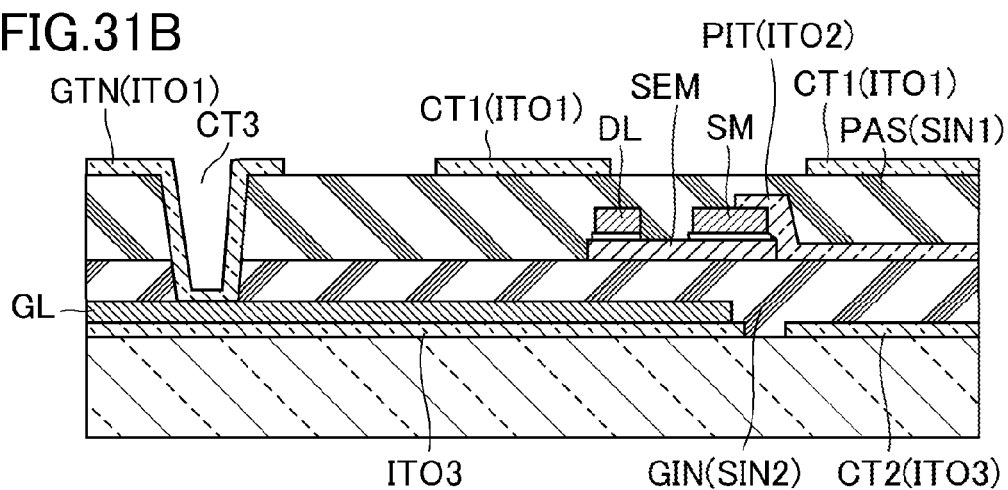
FIG. 31B is a sectional view taken along a line b-b' shown in FIG. 31A.

FIG. 31A is a plan view of one pixel, when a fifth photo-process is completed, and FIG. 31B is a sectional view taken along line b-b' in FIG. 31A. The first transparent electrode material ITO1 is formed, and then, the photo-etching process is performed to the first transparent electrode material ITO1 to thereby form the first transparent common electrode CT1. The gate line terminal electrode GTN connected to the gate line opening CN3 is formed by using the first transparent electrode material ITO1 on the terminal region of the gate line GL. In the present embodiment, the transparent pixel electrode PIT is formed on the same layer as the semiconductor layer SEM. Therefore, a through-hole that is to be formed on the interlayer insulating film for connecting the semiconductor layer SEM and the transparent pixel electrode PIT is unnecessary. Accordingly, the aperture ratio can be enhanced.

Fourth Embodiment

Referring to FIGS. 32~35, a liquid crystal panel of a fourth embodiment will be described.

Figure 32:
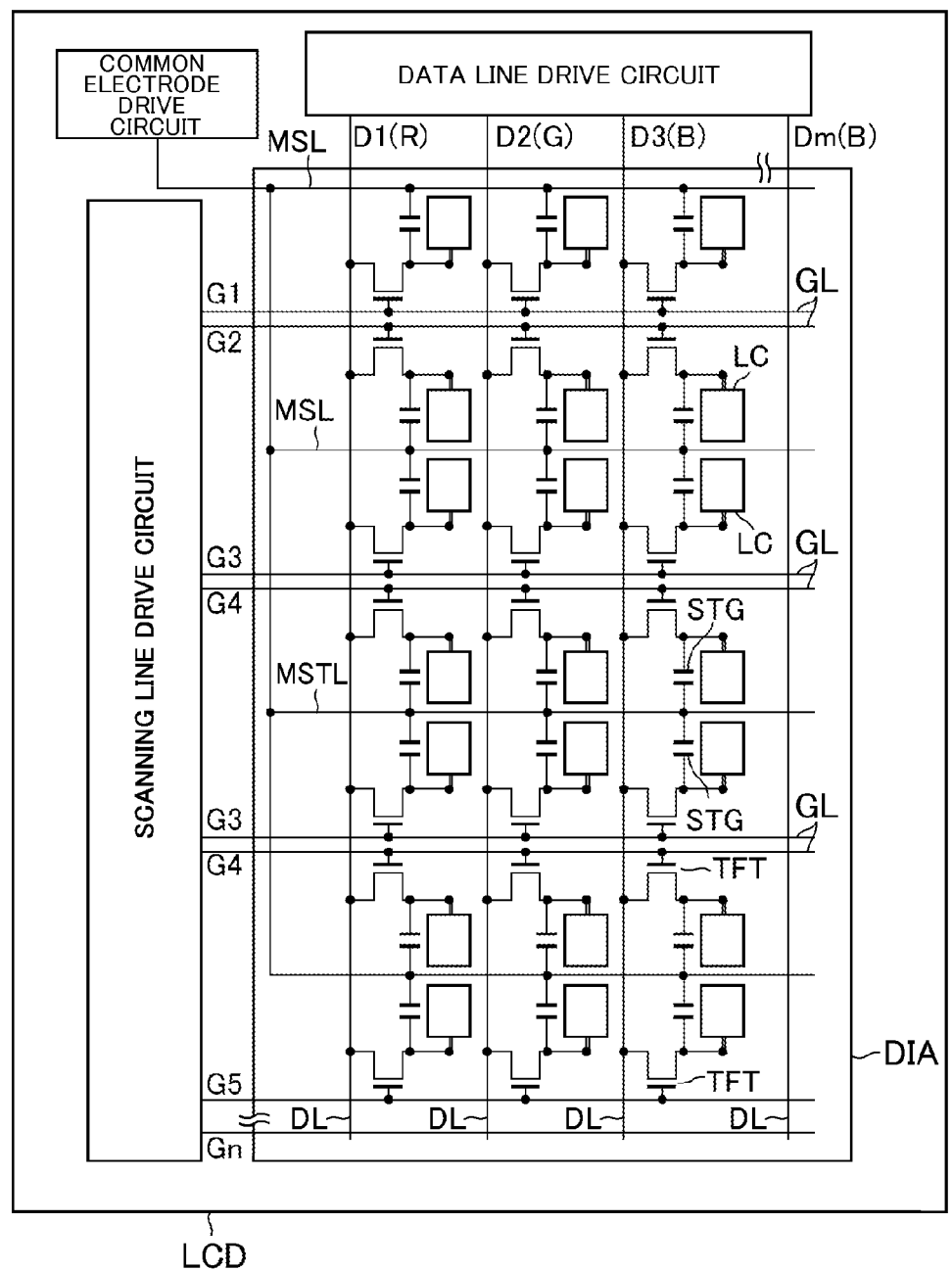
FIG. 32 is a diagram illustrating a system and a circuit connection of a liquid crystal display device according to a fourth embodiment.

FIG. 32 is a diagram illustrating a system and a circuit connection of a liquid crystal display device according to the present embodiment.

A common voltage is propagated to a screen region DIA by a common electrode metal line MSL and a transparent common electrode CT1 connected thereto.

In the third embodiment described above, the first transparent common electrode CT1, a transparent pixel electrode PIT, and the second transparent common electrode CT2 are formed in a pixel by using three types of transparent electrode materials ITO1, ITO2, and ITO3 in different manufacturing processes, and an aperture ratio and transmittance in the vicinity of the cross-section of a black matrix BM on a data line DL are enhanced due to the arrangement of these electrodes. On the other hand, in the third embodiment, the common electrode metal line MSL that supplies a common voltage to the second transparent common electrode CT2 is formed as illustrated in the plan view in FIG. 19 and the sectional view in FIG. 21. This common electrode metal line MSL is non-transparent, thereby reducing the aperture ratio. However, it is difficult to eliminate the common electrode metal line MSL, since resistance has to be reduced by the connection to the metal line, considering the wiring delay of the second transparent common electrode CT2. In the present embodiment, the loss of the aperture ratio is reduced by designing the shape of the common electrode metal line MSL.

In the present embodiment, the common electrode metal line MSL is disposed to be shared by two upper and lower pixels in FIG. 32. Since the metal material used for the common electrode metal line MSL has low resistivity, the common electrode metal line MSL may have the planar width identical to that of the common electrode metal line MSL in the third embodiment if it is shared by two pixels. With this configuration, the aperture ratio can be enhanced.

Figure 33:
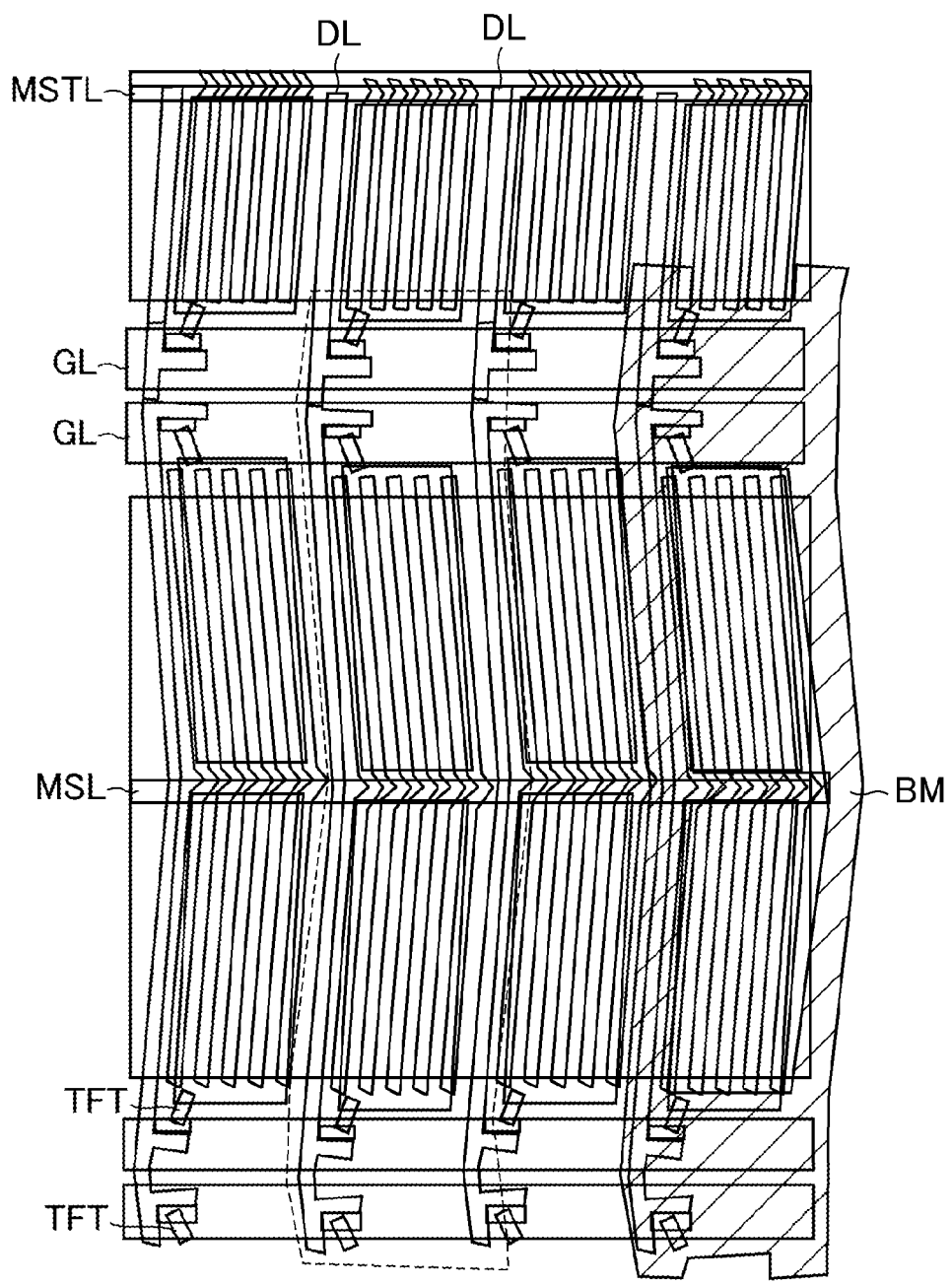
FIG. 33 is a plan view illustrating a plurality of pixels in the liquid crystal panel shown in FIG. 32.

FIG. 33 is a plan view illustrating a plurality of pixels in a screen region DIA. FIG. 33 illustrates that the black matrix BM on a first transparent substrate SUB1, on which a color filter CF is formed, is disposed on a set of upper and lower pixels across the common electrode metal line MSL. In the pixel structure in the screen region DIA, the gate lines GL that supply a scanning-voltage and data lines DL that supply a video-signal voltage are arranged in a matrix, and a thin-film transistor TFT is formed in each pixel region.

Figure 34:
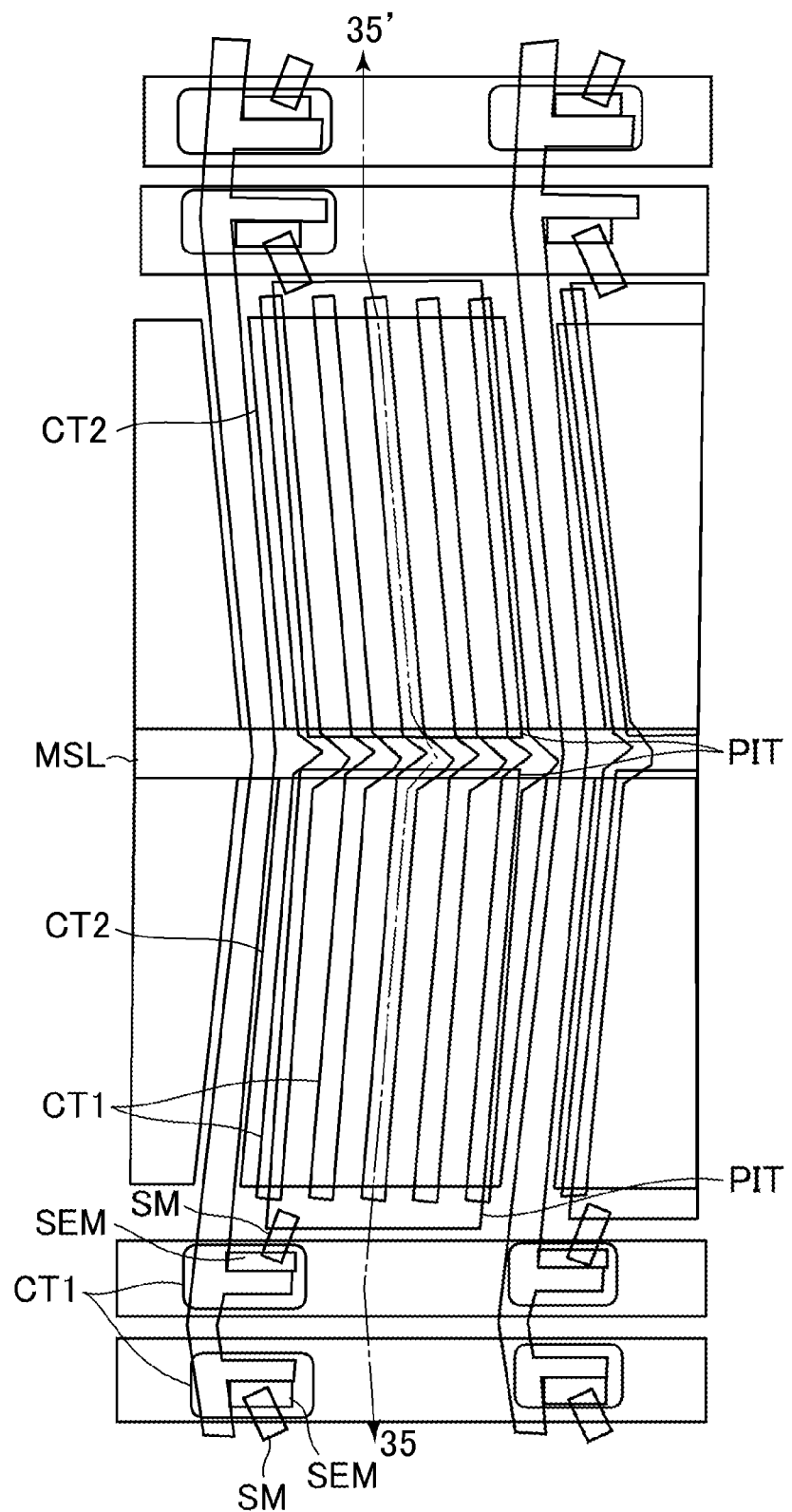
FIG. 34 is a plan view illustrating a pixel of the plurality of pixels in the liquid crystal panel shown in FIG. 33.
Figure 35:
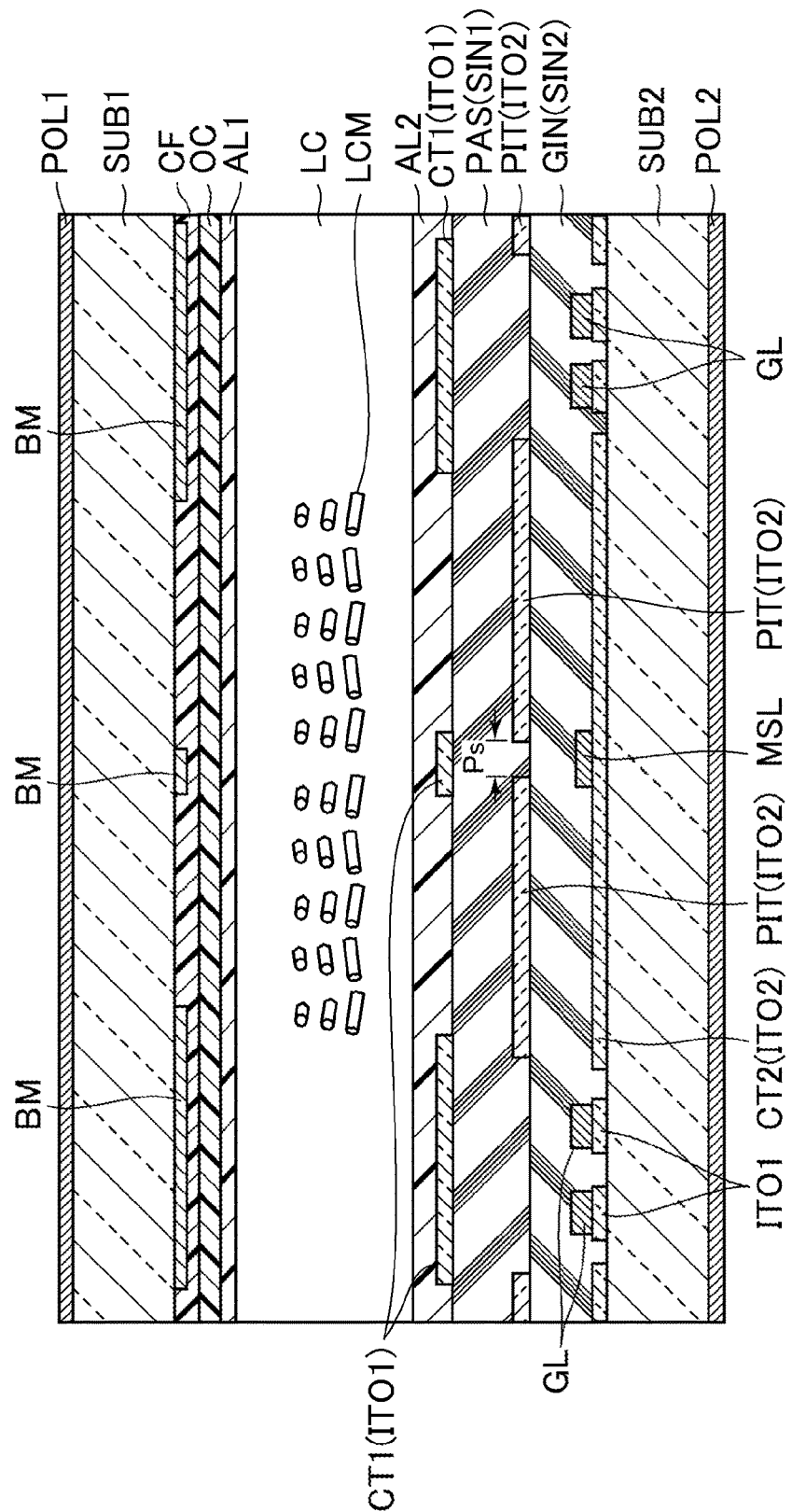
FIG. 35 is a sectional view taken along a line 35-35' shown in FIG. 34.

FIG. 34 is a plan view illustrating two upper and lower pixels across the common electrode metal line MSL according to the present embodiment, and FIG. 35 is a sectional view taken along line 35-35' in FIG. 34.

As illustrated in the plan view in FIG. 34, two pixels are disposed above and below the common electrode metal line MSL. The gate lines GL for each of two pixels are adjacent to each other and disposed in parallel to each other. As in the third embodiment, the data lines DL supply the video-signal voltage to each pixel. Specifically, a pair of pixel regions adjacent to each other in the longitudinal direction of the data line DL is disposed between a pair of gate lines GL. The common electrode metal line MSL, which is connected to the second transparent common electrode CT2 included in each pixel region and which is parallel to the gate line GL, is disposed between the pair of pixel regions. This common electrode metal line MSL corresponds to a common line in the liquid crystal display device according to the present application.

The two upper and lower pixels across the common electrode metal line MSL are disposed to bend at a predetermined angle. With this configuration, the rotation directions of the liquid crystal in the upper and lower pixels are made opposite to each other in an in-plane switching (IPS) display, whereby an effect of significantly reducing a color change in viewing angle performance can be provided. In the third embodiment, the upper and lower pixels are disposed to bend across the gate line GL. On the other hand, in the present embodiment, the upper and lower pixels are disposed to bend across the common electrode metal line MSL. Since the width of the common electrode metal line MSL is smaller than the width of the gate line GL, the aperture ratio at the folded portion can be increased. Since the voltage applied to the gate line GL is different from the video-signal voltage and the common voltage, this voltage is likely to cause malfunction on the display. Therefore, the liquid crystal layer LC can be driven more accurately in the configuration of the present embodiment in which the gate line GL is not formed on the superimposed portion with the transparent pixel electrode PIT.

The common electrode metal line MSL is made of a low-resistance material, and is non-transparent. Therefore, if it is shared by two pixels as in the present embodiment, the aperture ratio can be improved without an increase in the line width, whereby a bright liquid crystal display device with low power consumption can be provided.

FIG. 35 is a sectional view taken along line 35-35' in the plan view in FIG. 34. FIG. 35 illustrates a cross-section of two pixels across the gate line GL, the two pixels having the common electrode metal line MSL disposed at the center of the inside of two gate lines GL that are disposed parallel to each other. The inner gate line GL of two gate lines GL that are disposed side by side supplies a voltage to the transparent pixel electrode PIT of each of two pixels via the semiconductor layer SEM of the thin-film transistor TFT.

The width of the common electrode metal line MSL is set to be identical to the width used in the third embodiment. With this width, the common electrode metal line MSL can supply the common voltage to the second transparent common electrode CT2 without the wiring delay. According to this configuration, the number of the common electrode metal lines MSL can be reduced to half, whereby the aperture ratio can be improved.

The black matrix BM is formed on the first transparent substrate opposite to the common electrode metal line MSL. With this configuration, the border of the display between pixels can be made clear. However, when an increase in the aperture ratio is demanded, the black matrix BM can be eliminated, since the common electrode metal line MSL has a function as a light shielding film.

In the present embodiment, the distance Ps between the adjacent transparent pixel electrodes PIT is set to be small in order to increase the aperture ratio. With this configuration, the aperture ratio is enhanced. However, when the distance Ps between the transparent pixel electrodes PIT is set to be small, another problem of deterioration in image quality occurs, although the aperture ratio can be enhanced. In the present embodiment, the transparent pixel electrodes PIT sandwiched between two gate lines GL are adjacent to each other as illustrated in the plan view in FIG. 34. In the actual driving, the scanning-voltage is successively applied to the gate lines GL from the upper one. The scanning-voltage is applied to the gate line GL in the upper one of the pixel regions that are adjacent to each other, and the video-signal voltage is applied to the transparent pixel electrode PIT from the data line DL. When the scanning-voltage is similarly applied to the lower gate line GL, the video-signal voltage that is another data is applied to the transparent pixel electrode PIT in the lower pixel from the data line DL via the semiconductor layer SEM. The scanning-voltage to the gate line GL is applied in a form of a pulse. When the scanning-voltage is applied to the upper gate line GL, and then, the scanning-voltage is applied to the lower gate line GL, the scanning-voltage applied to the upper gate line GL is decreased and turned off. When the scanning-voltage is turned off, the voltage variation increases. Therefore, the voltage of the transparent pixel electrode PIT is decreased due to the movement of charges on the semiconductor layer SEM of the gate line GL or the capacitance coupling of the parasitic capacitance between the gate line GL and the transparent pixel electrode PIT. The thin-film transistor TFT is disposed in each pixel, and each parasitic capacitance is almost equal. Therefore, the influence of this voltage variation to the deterioration in image quality is small, so long as the voltage variation is not so large. On the other hand, when the thin-film transistors TFTs of the adjacent pixels are close to each other as in the present embodiment, a display failure might occur. The present embodiment proposes a countermeasure for the occurrence of the display failure.

When the application of the scanning-voltage to the gate line GL in the upper pixel illustrated in FIG. 34 is stopped, the potential of the upper transparent pixel electrode PIT, which is in the storage period, is reduced due to the coupling of the parasitic capacitance between the gate line GL and the transparent pixel electrode PIT. On the other hand, when the application of the scanning-voltage to the lower gate line GL is started, so that the potential of the lower transparent pixel electrode PIT is increased, the potential of the upper pixel varies due to the capacitance coupling of the distance Ps between the transparent pixel electrodes PIT. When the application of the scanning-voltage to the gate line GL in the lower pixel is stopped, the voltage of the upper transparent pixel electrode PIT also varies according to the distance Ps between the adjacent transparent pixel electrodes PIT. Thus, a stripe-like display is generated for each row, which results in that the image quality is deteriorated.

The common electrode metal line MSL and the second transparent common electrode CT2 are formed below the region of the distance Ps between the adjacent transparent pixel electrodes PIT with the gate insulating film GIN interposed therebetween as illustrated in FIG. 35. On the other hand, the first transparent common electrode CT1 is formed above the region of the distance Ps with the protection insulating film PAS interposed therebetween. A common voltage is applied to the first transparent common electrode CT1 and the second transparent common electrode CT2 as a power source. Specifically, the distance Ps between two transparent pixel electrodes PIT is shielded in the vertical direction. When the distance Ps between the transparent pixel electrodes PIT is small, a parasitic capacitance is generated between the transparent pixel electrodes PIT. Therefore, when one of the transparent pixel electrodes PIT is turned on, the potential of the adjacent transparent pixel electrode PIT also varies. However, in the present embodiment, the distance Ps between the transparent pixel electrodes PIT is shielded by the first transparent common electrode CT1. Therefore, the parasitic capacitance between the adjacent transparent pixel electrodes PIT can be suppressed by the parasitic capacitance between the transparent pixel electrode PIT and the first transparent common electrode CT1. Accordingly, the voltage variation can be prevented by the coupling capacitance, even if the distance Ps between the transparent pixel electrodes PIT is small, which results in that a bright liquid crystal display device with low power consumption can be provided. In the present embodiment, the width of the first transparent common electrode CT1 is set larger than the distance Ps between the adjacent transparent pixel electrodes PIT. However, even if the width of the first transparent common electrode CT1 is smaller than the distance Ps, the parasitic capacitance between the adjacent transparent pixel electrodes PIT can be suppressed only by forming the first transparent common electrode CT1 above the distance Ps.

Fifth Embodiment

Referring to FIGS. 36~45, a liquid crystal panel of a fifth embodiment will be described.

Figure 36:
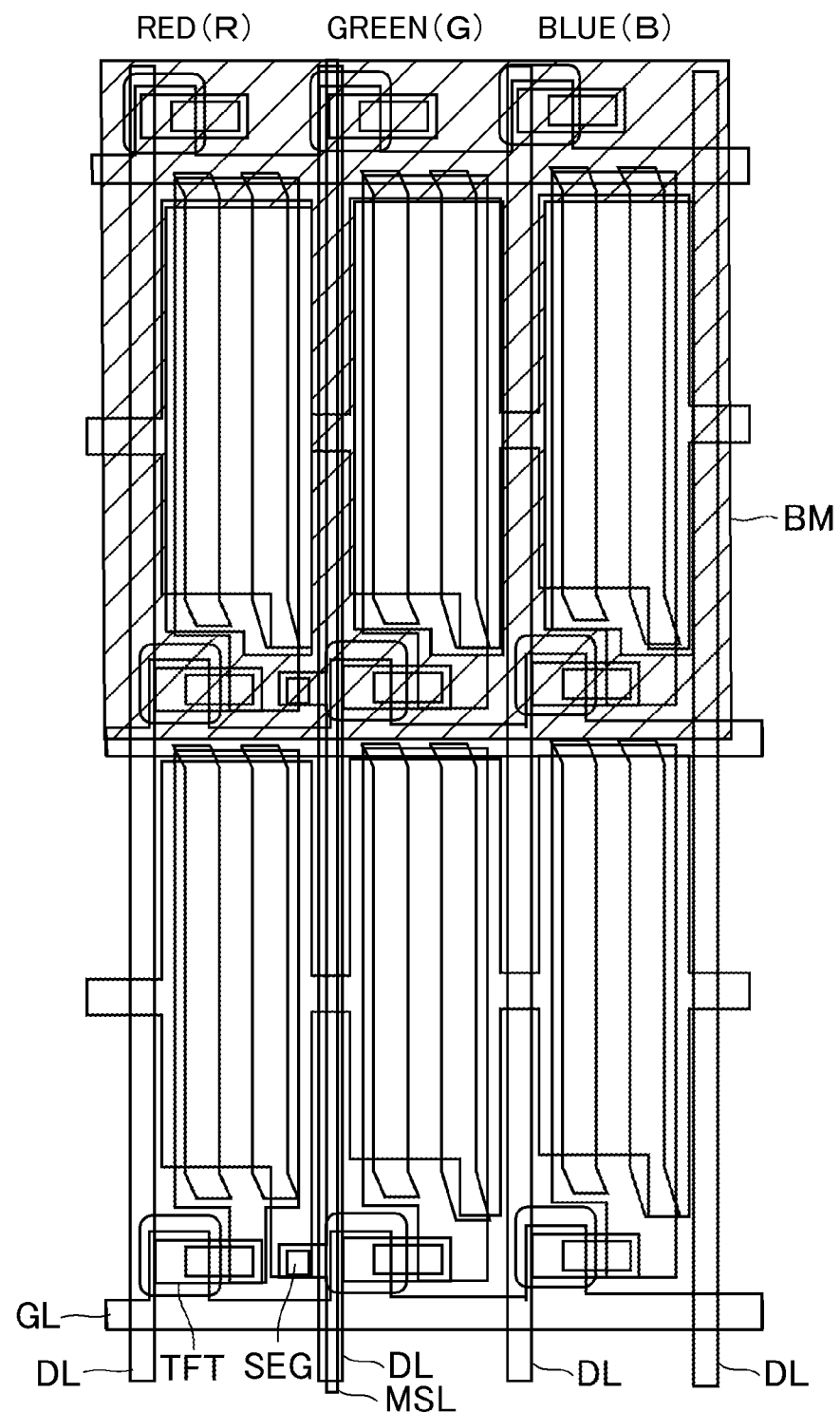
FIG. 36 is a plan view of six pixels of the liquid crystal panel according to the fifth embodiment.

FIG. 36 is a plan view of six pixels in a screen region DIA. FIG. 36 illustrates that a black matrix BM on which a color filter CF is formed is disposed on the upper-half three pixels. In the pixel structure in the screen region DIA, gate lines GL that supply a scanning-voltage and data lines DL that supply a video-signal voltage are arranged in a matrix, and a thin-film transistor TFT is formed in each pixel region. In each pixel, a red R color filter CF, a green G color filter CF, and a blue B color filter CF are formed in the horizontal direction. The red R pixel forms a row in the vertical direction. A common electrode metal line MSL is disposed on the data line DL with the insulating film interposed therebetween in order to supply a common voltage to the red R pixel. Specifically, the common electrode metal line MSL is connected to a first transparent common electrode CT1, and overlapped with the data line DL in a plan view. The common electrode metal line MSL is connected to a second transparent common electrode CT2 via a connection point SEG. The connection point SEG reduces the aperture ratio of the pixel. In order to reduce this influence, the connection point SEG is formed on the red R pixel that less affects white brightness.

In the present embodiment, since the connection point SEG of the common electrode metal line MSL reduces the aperture ratio of the pixel, the common electrode metal lines MSL are thinned out to reduce a number of lines. Specifically, one connection point SEG is disposed for a plurality of pixels to prevent the reduction in the aperture ratio. In the present embodiment, the connection point SEG is formed only on the red R pixel that gives less influence of the deterioration in brightness in a white display, out of the red R, the green G, and the blue B pixels. With this configuration, the common voltage is efficiently supplied to the first transparent common electrode CT1 and the second transparent common electrode CT2 from the common electrode metal line MSL, and a high aperture ratio is realized for high brightness. The green G greatly affects white brightness among three colors. In the present embodiment, the connection point SEG is formed on the red R pixel, but it may be formed on the blue B pixel.

Figure 37:
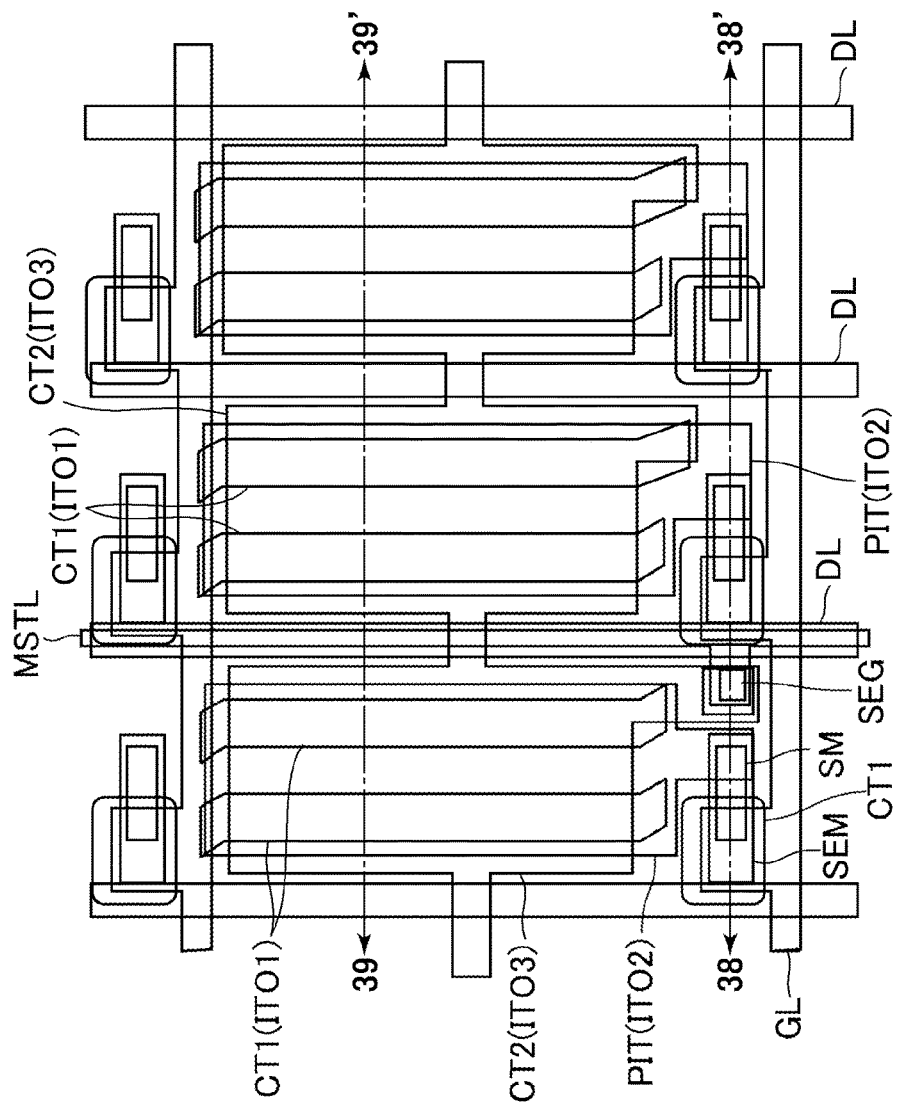
FIG. 37 is a detailed plan view of three pixels of red R, green G, and blue B pixels shown in FIG. 36.
Figure 38:
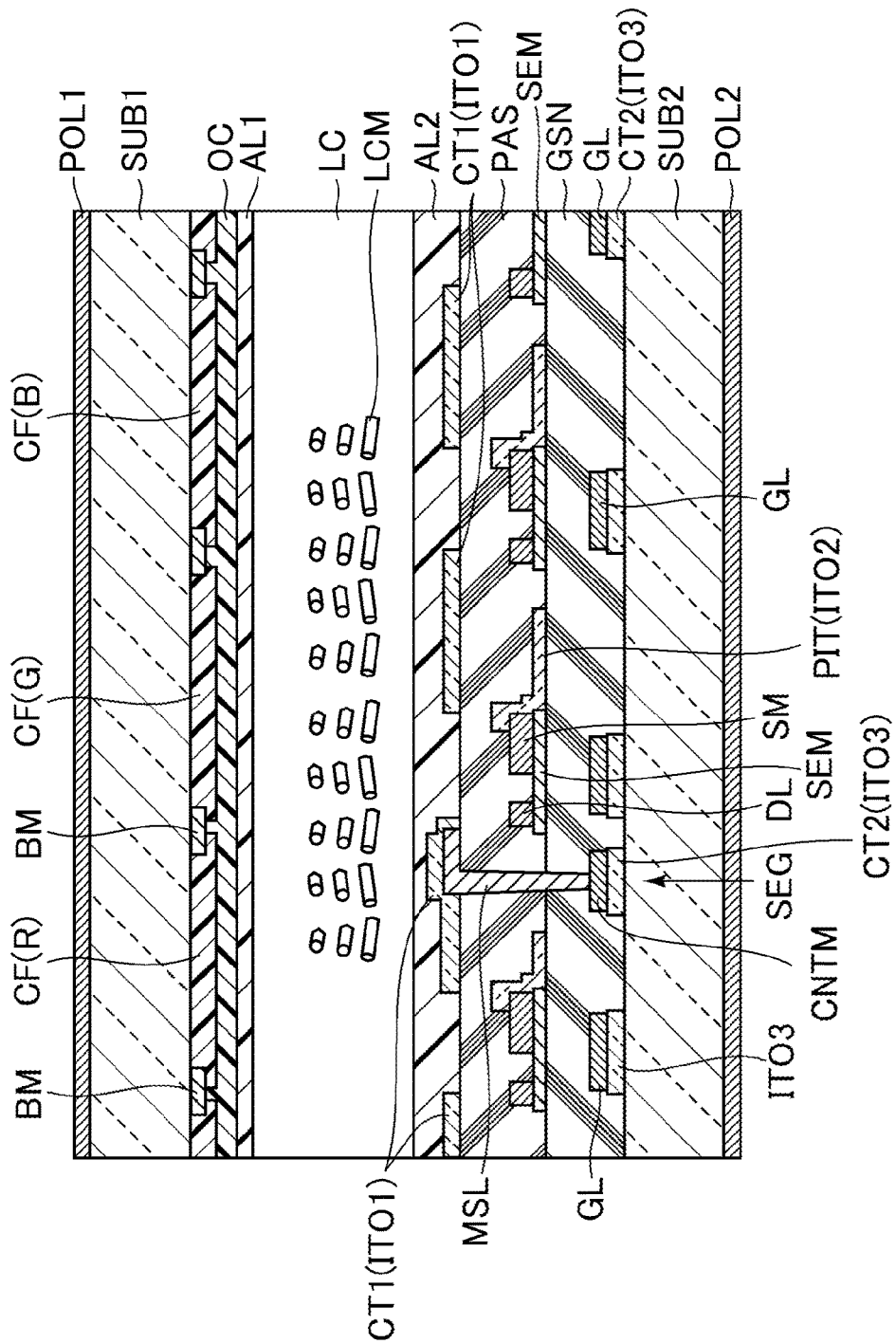
FIG. 38 is a sectional view taken along a line 38-38' shown in FIG. 37.
Figure 39:
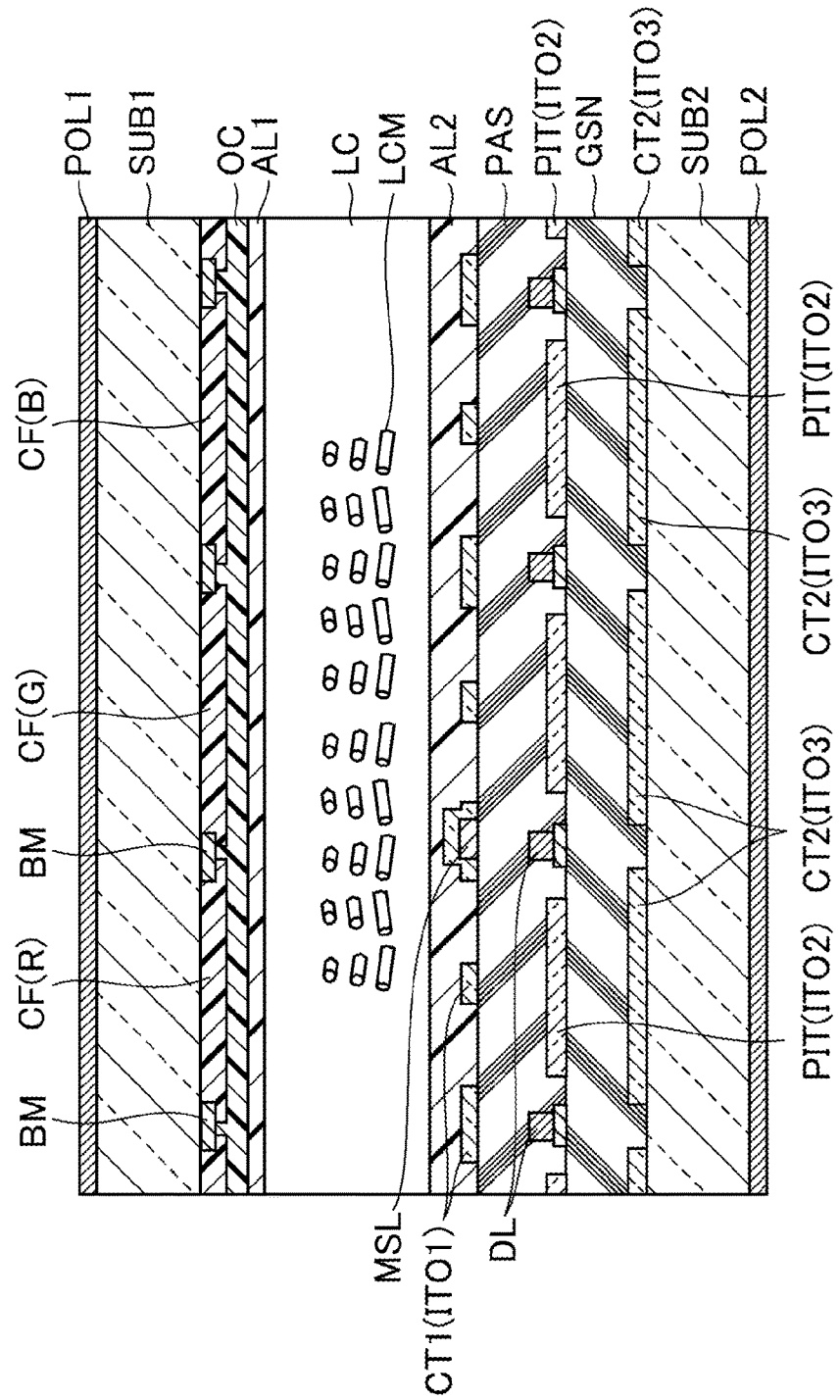
FIG. 39 is a sectional view taken along a line 39-39' shown in FIG. 37.

FIG. 37 is a detailed plan view of the red R, green G, and blue B pixels, FIG. 38 is a sectional view taken along line 38-38' in FIG. 37, and FIG. 39 is a sectional view taken along line 39-39' in FIG. 37. A scanning-voltage is applied to the gate lines GL. Thus, the video-signal voltage is transmitted to the transparent pixel electrode PIT (ITO2) from the data lines DL through the low-resistance semiconductor SEM and the source electrode SM. On the other hand, another common potential for driving the liquid crystal layer LC is supplied to the first transparent common electrode CT1 (ITO1) that is on the uppermost surface (at the liquid crystal layer side). The first transparent common electrode CT1 also covers the gate line GL and the data line DL with the insulating film interposed therebetween, and extends over the plurality of pixels.

Each arrangement and configuration will be described with reference to the sectional views in FIGS. 37 and 38.

FIG. 38 is a sectional view taken along line 38-38' in FIG. 37. FIG. 38 is a sectional view of three pixels of red R, green G, and blue B on the TFT portion. FIG. 38 illustrates a cross-section crossing the red R, green G, and blue B pixels in the transverse direction. The common electrode metal line MSL connected to the first transparent common electrode CT1 is covered with the first transparent common electrode CT1, and is connected to the second transparent common electrode CT2 via an opening in a protection insulating film PAS and a gate insulating film GSN and a contact metal electrode CNTM. The aperture ratio is reduced due to the formation of the connection point SEG. However, the connection point SEG is formed only on the red R pixel, and is not formed on the green G pixel that affects white brightness. Therefore, the influence is small. The contact metal electrode CNTM is a conductor that connects the ITOs.

FIG. 39 is similarly a sectional view crossing three pixels that are red R, green G, and blue B pixels. This sectional view illustrates a portion crossing the data line DL where the thin-film transistor TFT is not formed. The common electrode metal line MSL is disposed on the data line DL of the green G pixel with the protection insulating film PAS interposed therebetween. As described in the third and fourth embodiments, the common electrode metal line MSL reduces the aperture ratio, when it is disposed to cross the opening. In the present embodiment, the common electrode metal line MSL is located in the position hidden by the black matrix BM formed on the first transparent substrate SUB1 above the data line DL, so that the common electrode metal line MSL does not reduce the aperture ratio.

FIGS. 40A to 45B each illustrate a manufacturing process of the thin-film transistor TFT formed on the second transparent substrate SUB2 at the point of an end of a photo-process. The thin-film transistor TFT is formed through six photo-etching processes in total.

Figure 40A:
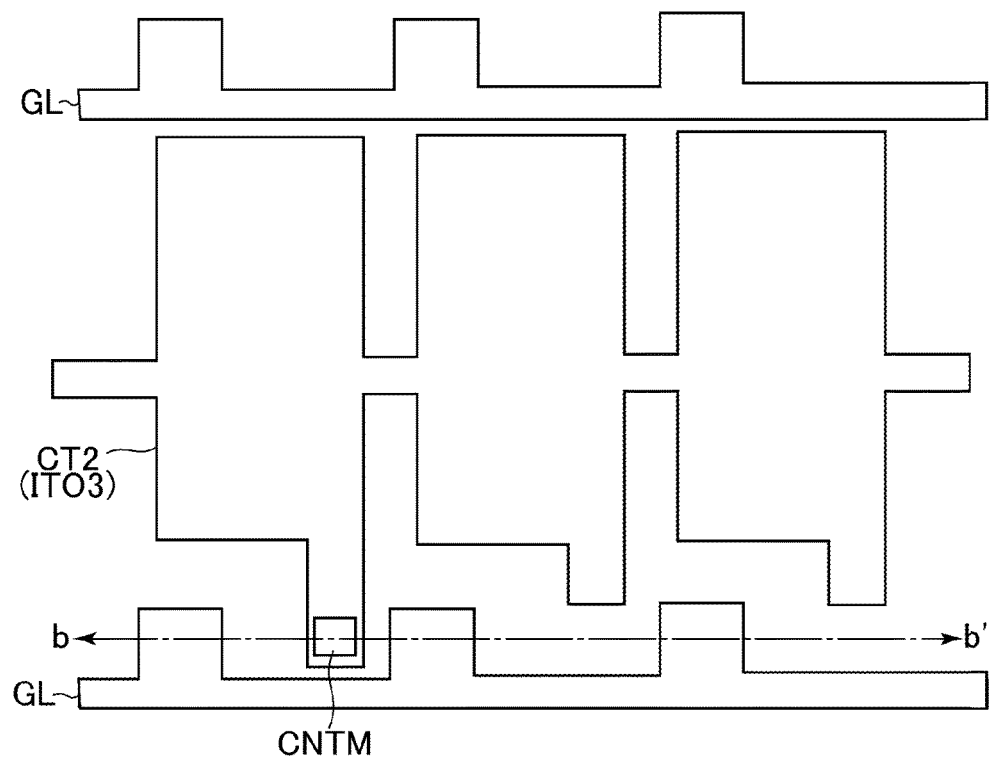
FIG. 40A is a plan view of three pixels in a liquid crystal display panel according to a fifth embodiment when a first photo-process is completed.
Figure 40B:
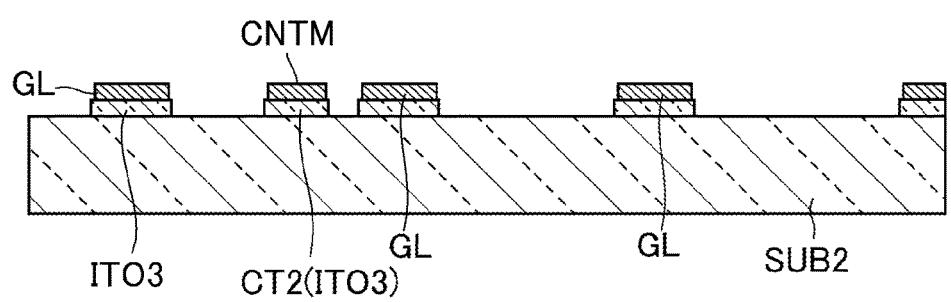
FIG. 40B is a sectional view taken along a line b-b' shown in FIG. 40A.

FIG. 40A is a plan view of one pixel region when a first photo-process is completed on the second transparent substrate SUB2, and FIG. 40B is a sectional view taken along line b-b' in FIG. 40A. The gate line GL, the contact metal electrode CNTM, and the second transparent common electrode CT2 are formed through the first photo-process. The third transparent electrode material ITO3 and the metal material for the gate line GL and the contact metal electrode CNTM are formed on the second transparent substrate SUB2 by sputtering. In an exposure process for the resist in the first photo-process, a photomask is made of perfectly light shielding metal and semitransparent metal. By using this photomask, a thick photoresist can be formed on the gate line GL and the contact metal electrode CNTM, a thin photoresist can be formed on the second transparent common electrode CT2, and a photoresist cannot be formed on the other region. With this state, the material of the gate line GL and the contact metal electrode CNTM, and the third transparent electrode material ITO3 are removed by etching, and then, the thin resist is removed by an ashing process. Then, the gate line GL and the contact metal electrode CNTM are again removed, whereby the second transparent common electrode CT2, the gate line GL, the gate line GL having the contact metal electrode CNTM, and the contact metal electrode CNTM can be formed by one exposure process. The process in which two types of resists, each having a different thickness, are formed in one exposure as described above is called halftone exposure. According to the halftone exposure, the number of exposure processes that are conventionally performed twice can be reduced to half, whereby the number of the whole photo-process can be reduced. Accordingly, cost can be reduced.

Figure 41A:
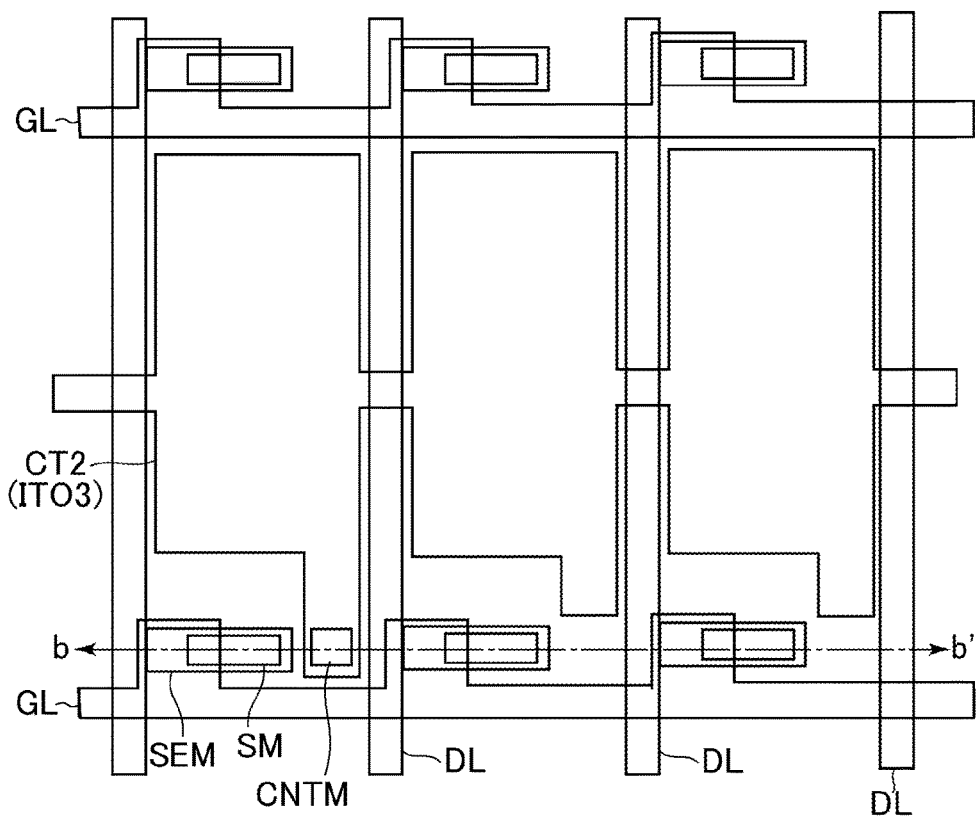
FIG. 41A is a plan view of three pixels in the liquid crystal display panel according to the fifth embodiment when a second photo-process is completed.
Figure 41B:
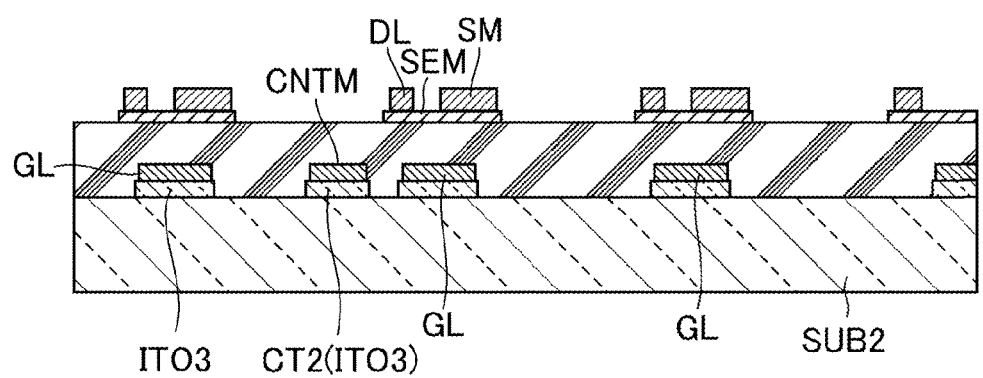
FIG. 41B is a sectional view taken along a line b-b' shown in FIG. 41A.

FIG. 41A is a plan view of one pixel when a second photo-process is completed, and FIG. 41B is a sectional view taken along line b-b' in FIG. 41A. The gate insulating film GSN made of silicon nitride and the semiconductor layer SEM made of amorphous silicon are stacked on the gate line GL and the contact metal electrode CNTM by CVD. The data line DL and the source electrode SM are formed on the semiconductor layer SEM as a metal line by the halftone exposure.

Figure 42A:
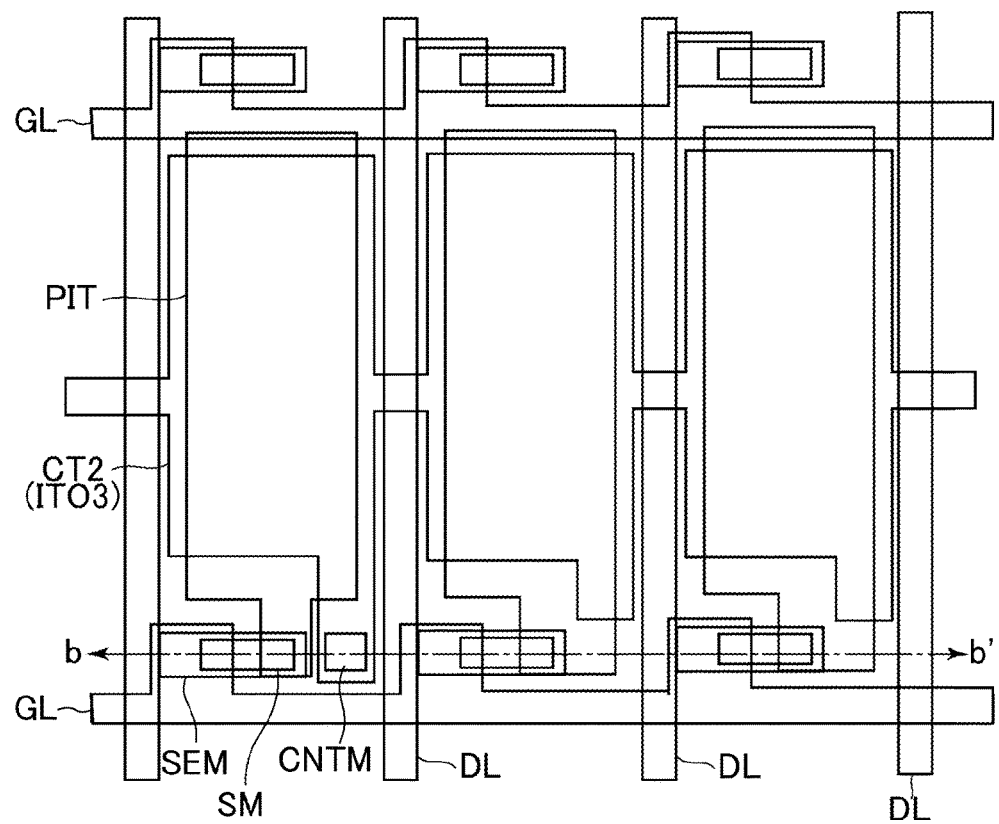
FIG. 42A is a plan view of three pixels in the liquid crystal display panel according to the fifth embodiment when a third photo-process is completed.
Figure 42B:
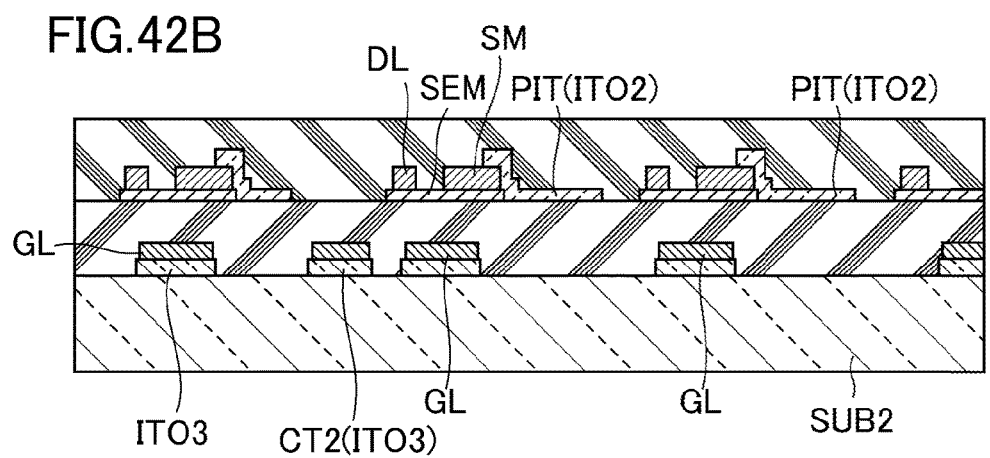
FIG. 42B is a sectional view taken along a line b-b' shown in FIG. 42A.

FIG. 42A is a plan view of one pixel when a third photo-process is completed, and FIG. 42B is a sectional view taken along line b-b' in FIG. 42A. The second transparent electrode material ITO2 is formed on the data line DL and the source electrode SM. The photo-process is performed to the second transparent electrode material ITO2 to thereby form the transparent pixel electrode PIT. The transparent pixel electrode PIT is formed in a square pattern in one pixel. The transparent pixel electrode PIT is connected to the source electrode SM.

Figure 43A:
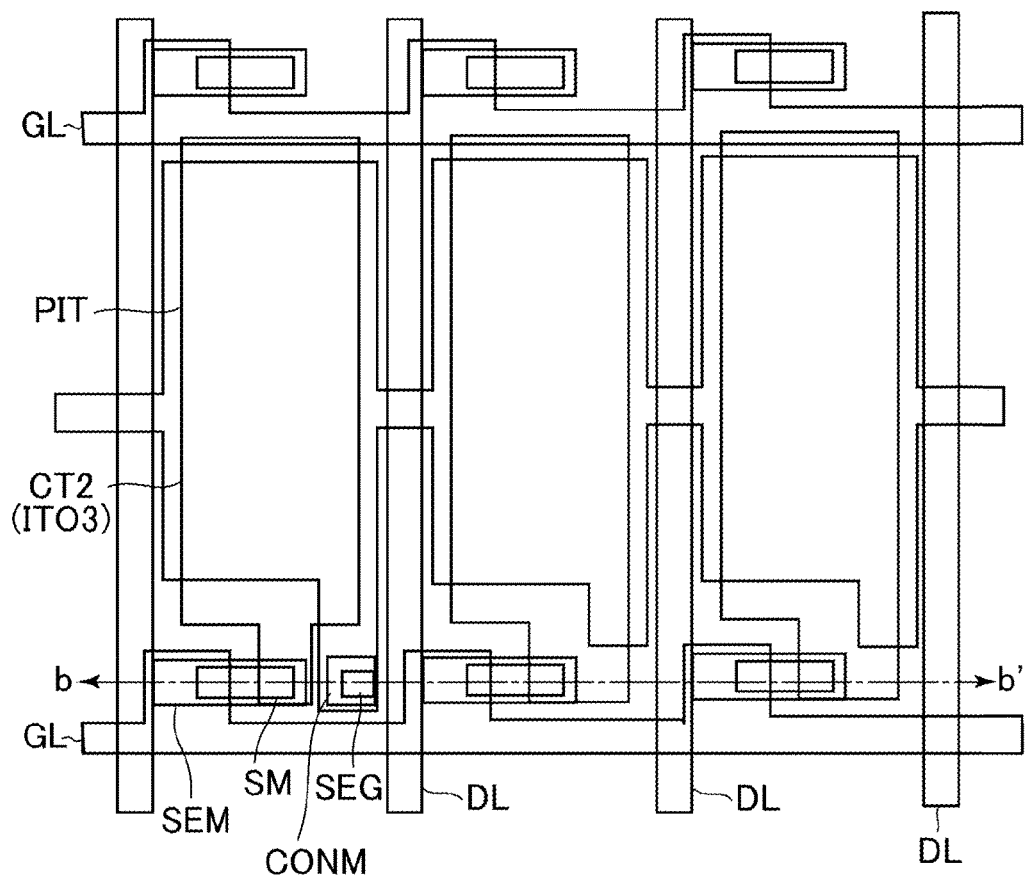
FIG. 43A is a plan view of three pixels in the liquid crystal display panel according to the fifth embodiment when a fourth photo-process is completed.
Figure 43B:
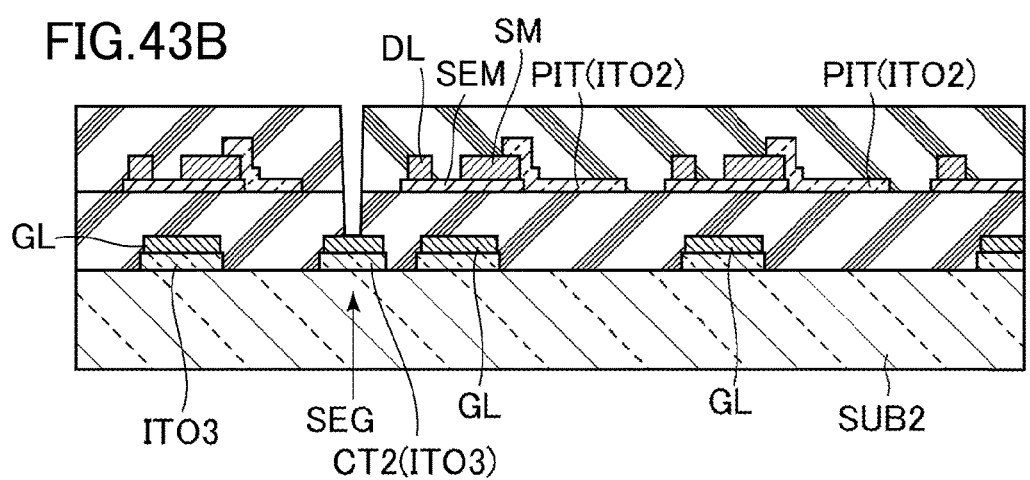
FIG. 43B is a sectional view taken along a line b-b' shown in FIG. 43A.

FIG. 43A is a plan view of one pixel when a fourth photo-process is completed, and FIG. 43B is a sectional view taken along line b-b' in FIG. 43A. The protection insulating film PAS is formed on the data line DL and the source electrode SM by CVD. The protection insulating film PAS is made of silicon nitride, and has a thickness of 200 nm to 400 nm. In this photo-process, the protection insulating film PAS and the gate insulating film GSN are processed by dry etching to form an opening that is a contact hole reaching the surface of the contact metal electrode CNTM.

Figure 44A:
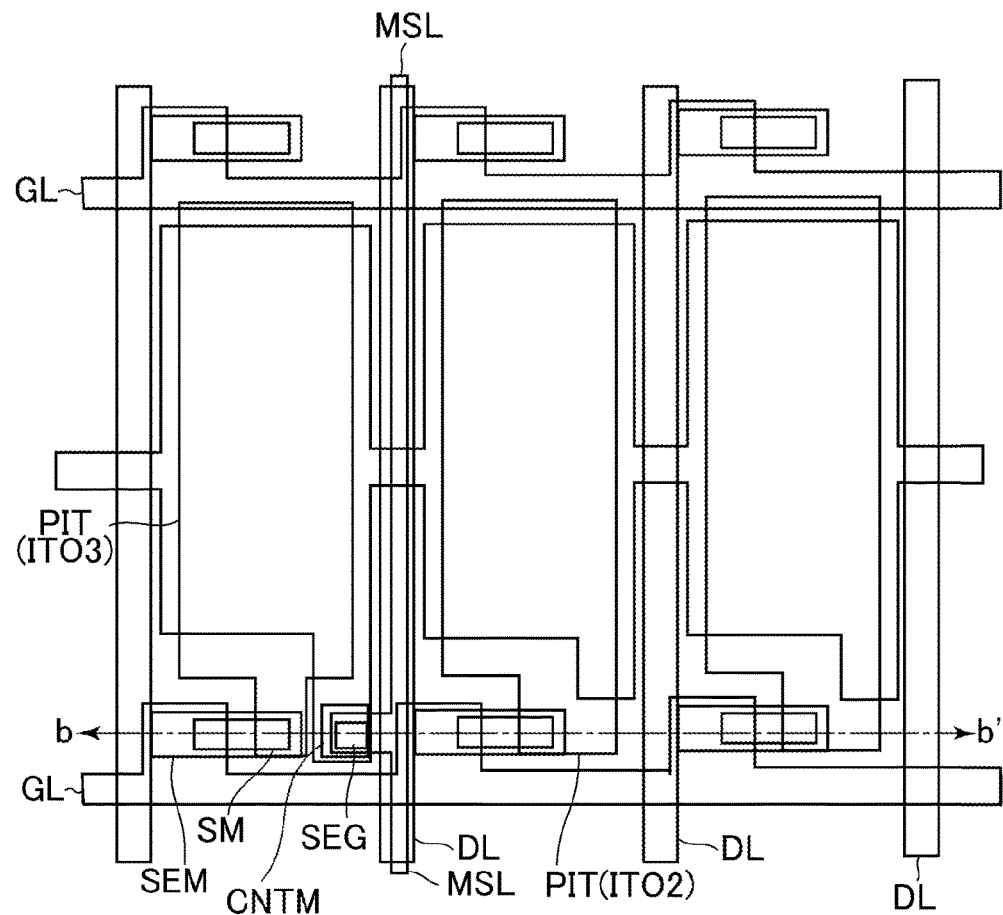
FIG. 44A is a plan view of three pixels in the liquid crystal display panel according to the fifth embodiment when a fifth photo-process is completed.
Figure 44B:
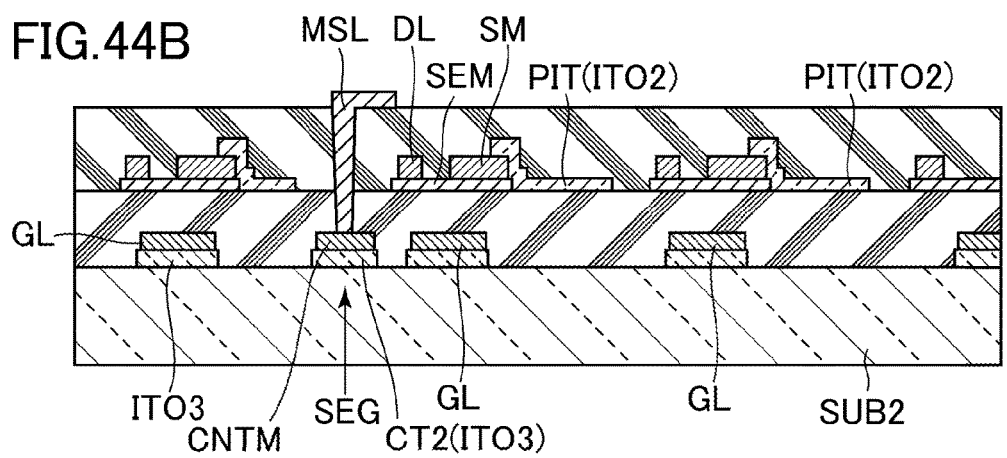
FIG. 44B is a sectional view taken along a line b-b' shown in FIG. 44A.

FIG. 44A is a plan view of one pixel when a fifth photo-process is completed, and FIG. 44B is a sectional view taken along line b-b' in FIG. 44A. Metal materials for the common electrode metal line MSL and the contact metal electrode CNTM are formed on the protection insulating film PAS by sputtering, and the photo-process is performed to the metal materials to thereby form the common electrode metal line MSL and the contact metal electrode CNTM. The common electrode metal line MSL is formed to be overlapped with the data line DL in a plan view. The common electrode metal line MSL buries the hole formed on the protection insulating film PAS and the gate insulating film GSN, and is connected to the contact metal electrode CNTM.

Figure 45A:
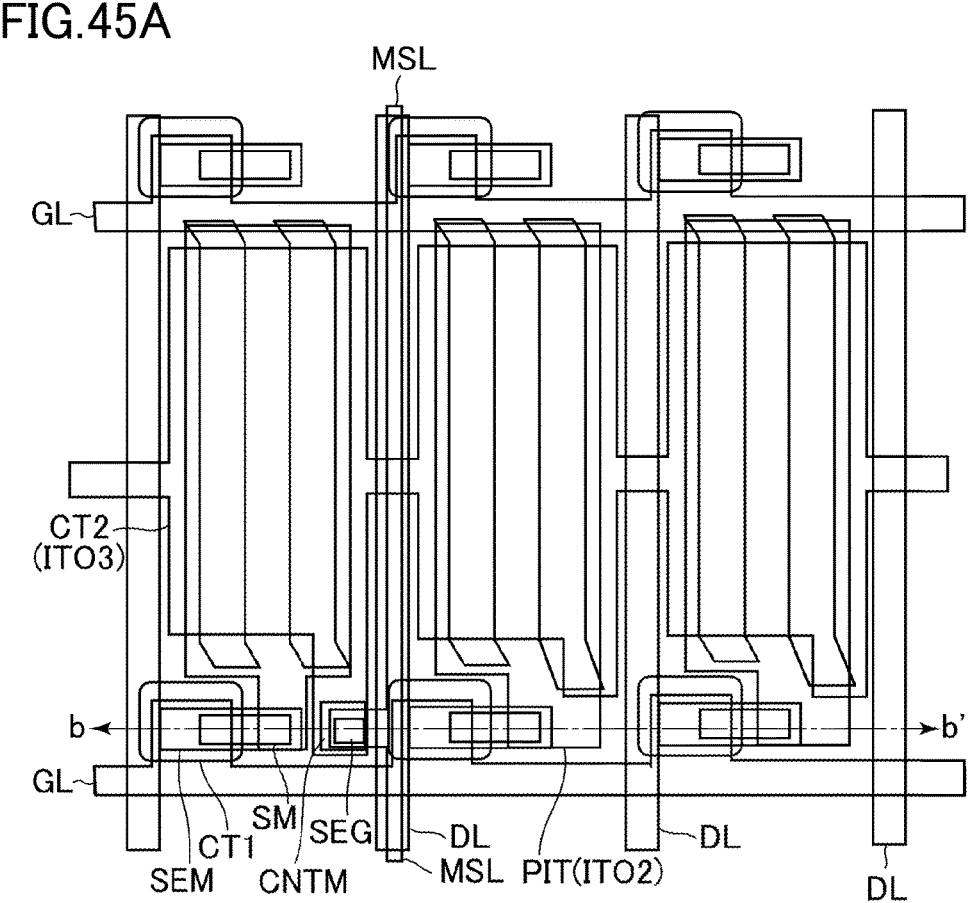
FIG. 45A is a plan view of three pixels in the liquid crystal display panel according to the fifth embodiment when a sixth photo-process is completed.
Figure 45B:
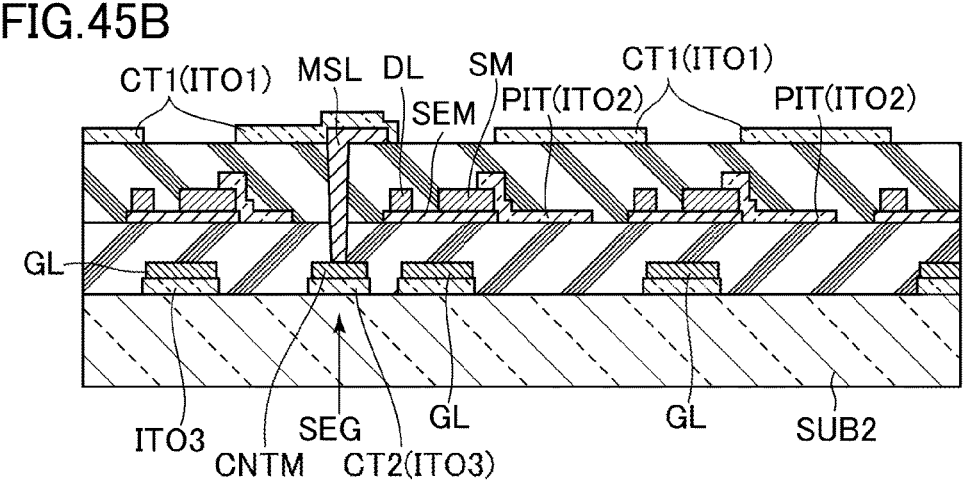
FIG. 45B is a sectional view taken along a line b-b' shown in FIG. 45A.

FIG. 45A is a plan view of one pixel when a sixth photo-process is completed, and FIG. 45B is a sectional view taken along line b-b' in FIG. 45A. The transparent electrode material ITO1 is formed, and the photo-etching process is performed to the transparent electrode material ITO1 to thereby form the first transparent common electrode CT1.

Sixth Embodiment

Figure 46:
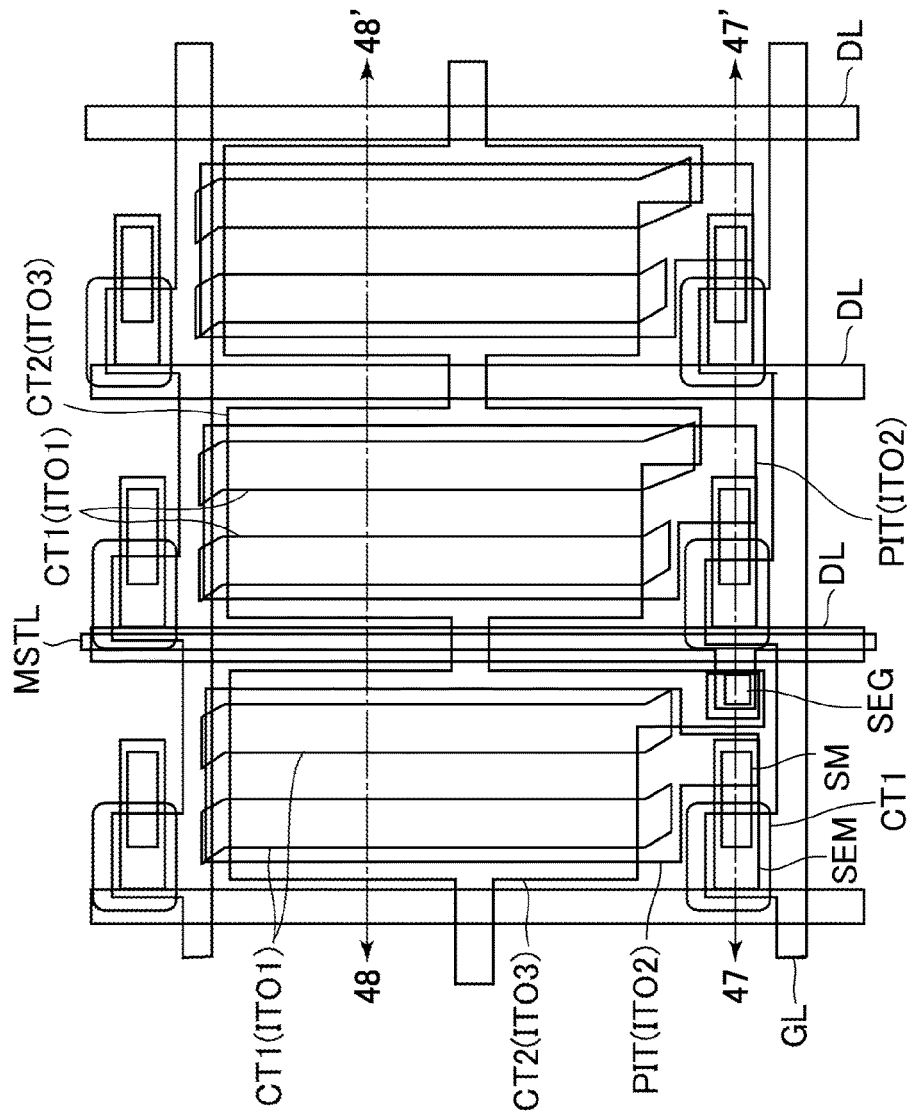
FIG. 46 is a plan view of three pixels in a liquid crystal display panel according to a sixth embodiment.
Figure 47:
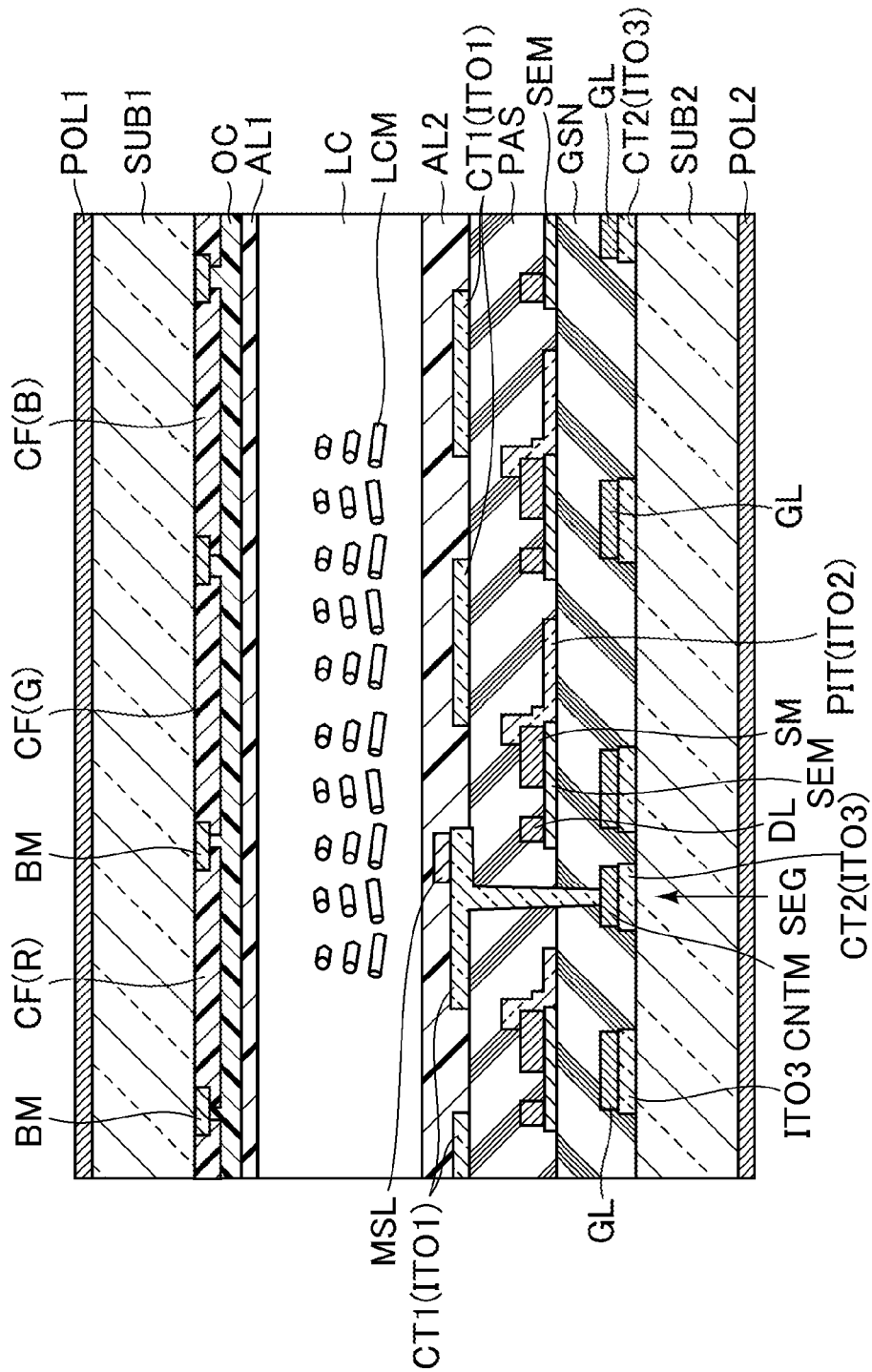
FIG. 47 is a sectional view taken along a line 47-47' shown in FIG. 46.
Figure 48:
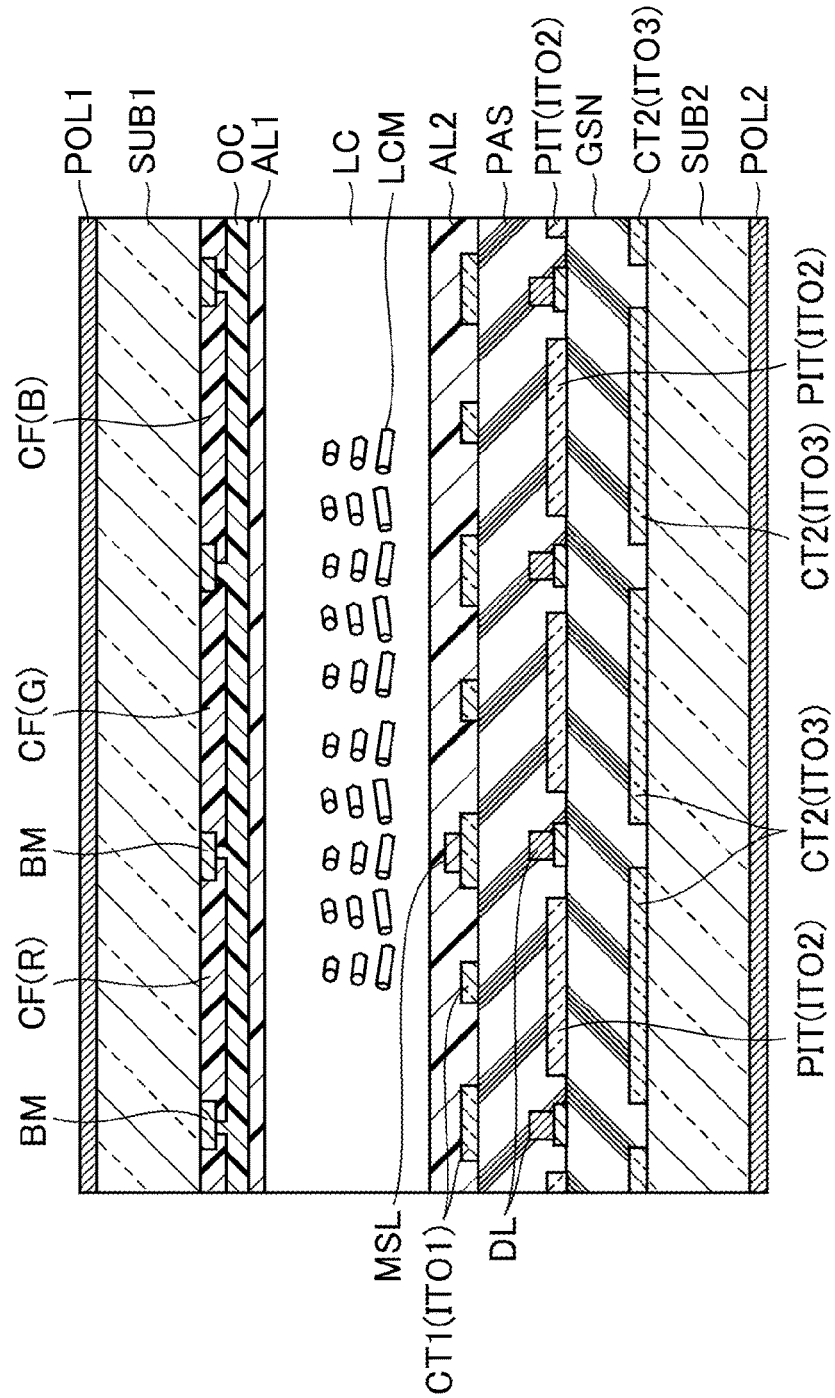
FIG. 48 is a sectional view taken along a line 48-48' shown in FIG. 46.

Referring to FIGS. 46~48, a liquid crystal panel of a sixth embodiment will be described.

FIG. 46 is a plan view of three pixels according to the present embodiment. As in the fifth embodiment, three pixels correspond to color filters CF in a vertical stripe shape in a liquid crystal display device. Three pixels respectively correspond to red R, green G, and blue B pixels from the left. A connection point SEG is formed on the red R pixel, and a common electrode metal line MSL is disposed on a data line DL of the green G pixel.

FIGS. 47 and 48 are sectional views taken along lines 47-47' and 48-48', respectively, in FIG. 46. In the sectional view in FIG. 47, the connection point SEG is formed on the red R pixel, and the common electrode metal line MSL is formed on the data line DL of the green G pixel, which are similar to the fifth embodiment. However, the present embodiment is characterized in that the common electrode metal line MSL is formed on a first transparent common electrode CT1. With this structure, the number of the manufacturing processes can be reduced to five, although six manufacturing processes are performed in the fifth embodiment. Specifically, instead of the processes illustrated in FIGS. 44A to 45B, the transparent electrode material ITO1 for the first transparent common electrode CT1 and the metal line material for the common electrode metal line MSL are continuously formed by sputtering, and the halftone exposure described in detail in the fifth embodiment is performed to these materials. Thus, the exposure process is reduced by one. Accordingly, a liquid crystal display device having high aperture ratio and low power consumption can be provided. In the present embodiment, the transparent electrode material ITO1 is directly connected to the contact metal electrode CNTM on the first transparent common electrode CT1. Specifically, the transparent electrode material ITO1 buries the hole formed on the protection insulating film PAS and the gate insulating film GSN, and is connected to the contact metal electrode CNTM.

Seventh Embodiment

Referring to FIGS. 49~59, a liquid crystal panel of a seventh embodiment will be described.

Figure 49A:
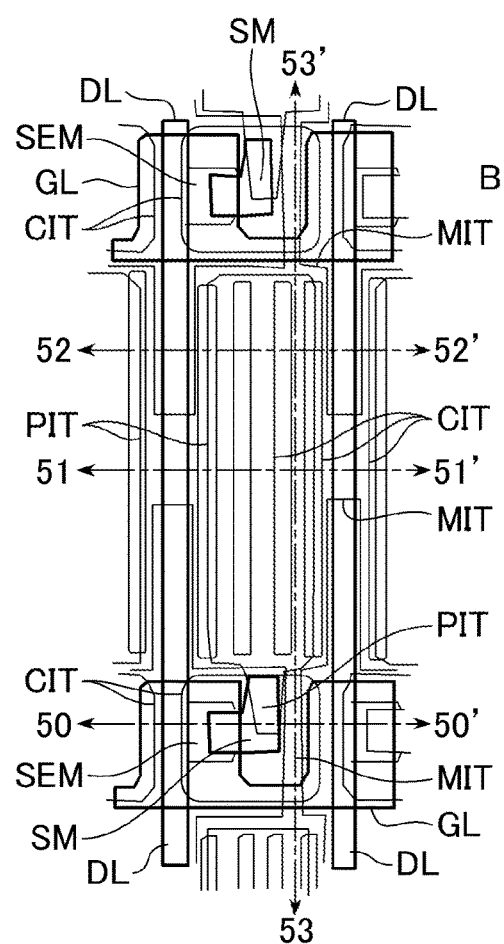
FIGS. 49A and 49B are detailed plan views each illustrating one pixel region in a liquid crystal panel according to a seventh embodiment.
Figure 49B:
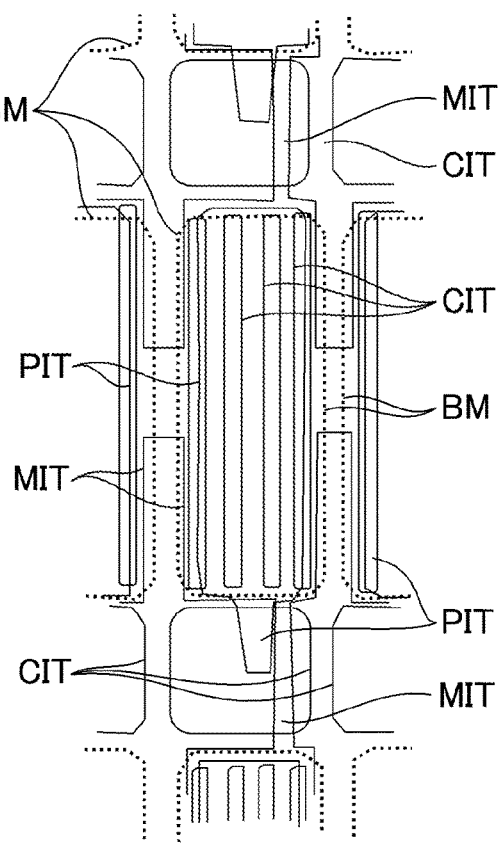
Figure 50:
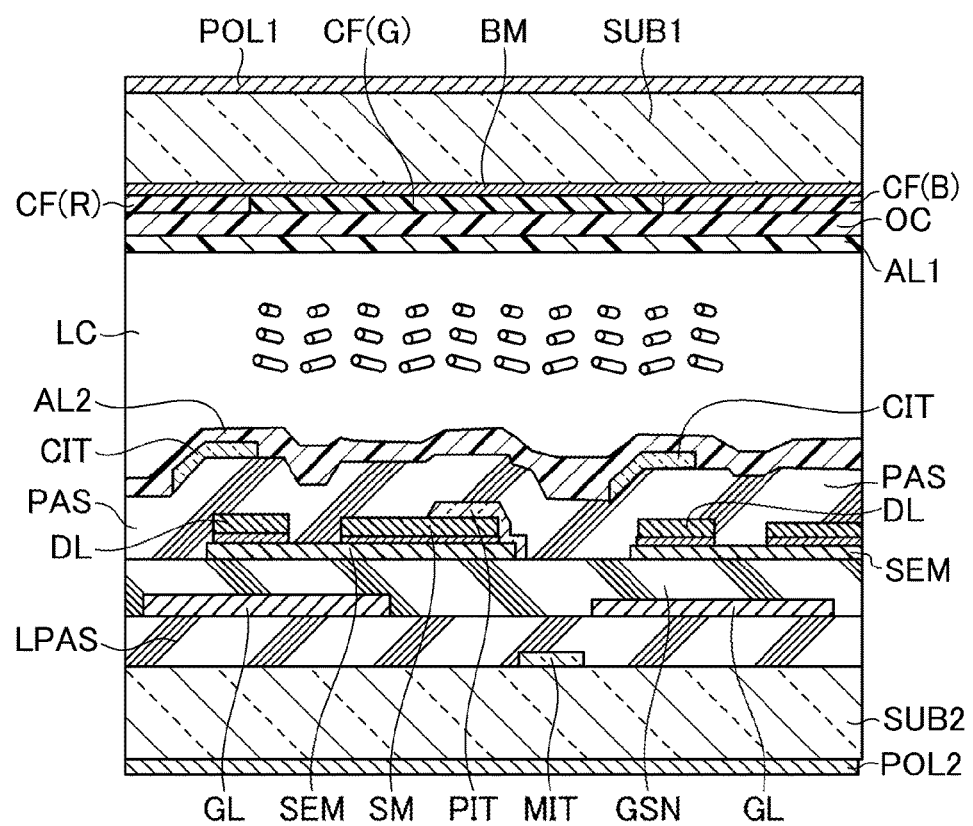
FIG. 50 is a sectional view taken along a line 50-50' shown in FIG. 49.
Figure 51:
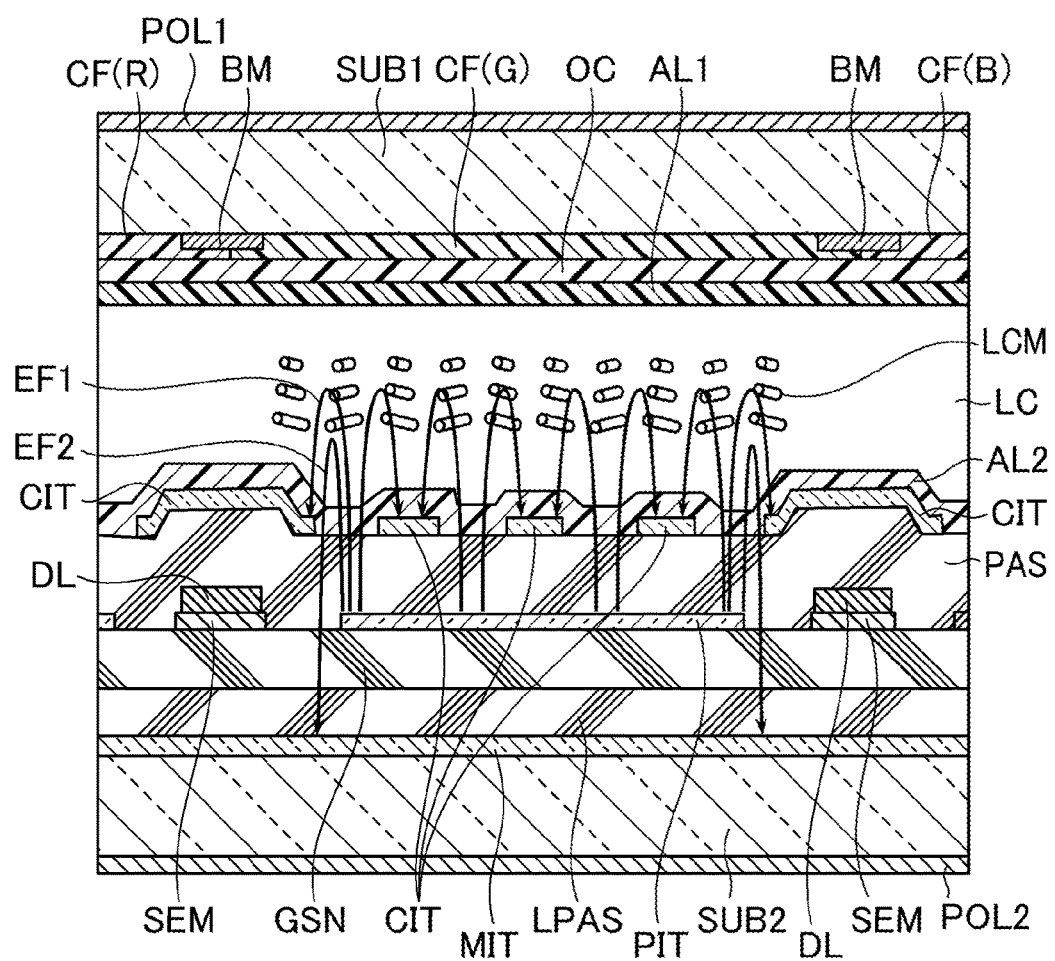
FIG. 51 is a sectional view taken along a line 51-51' shown in FIG. 49.
Figure 52:
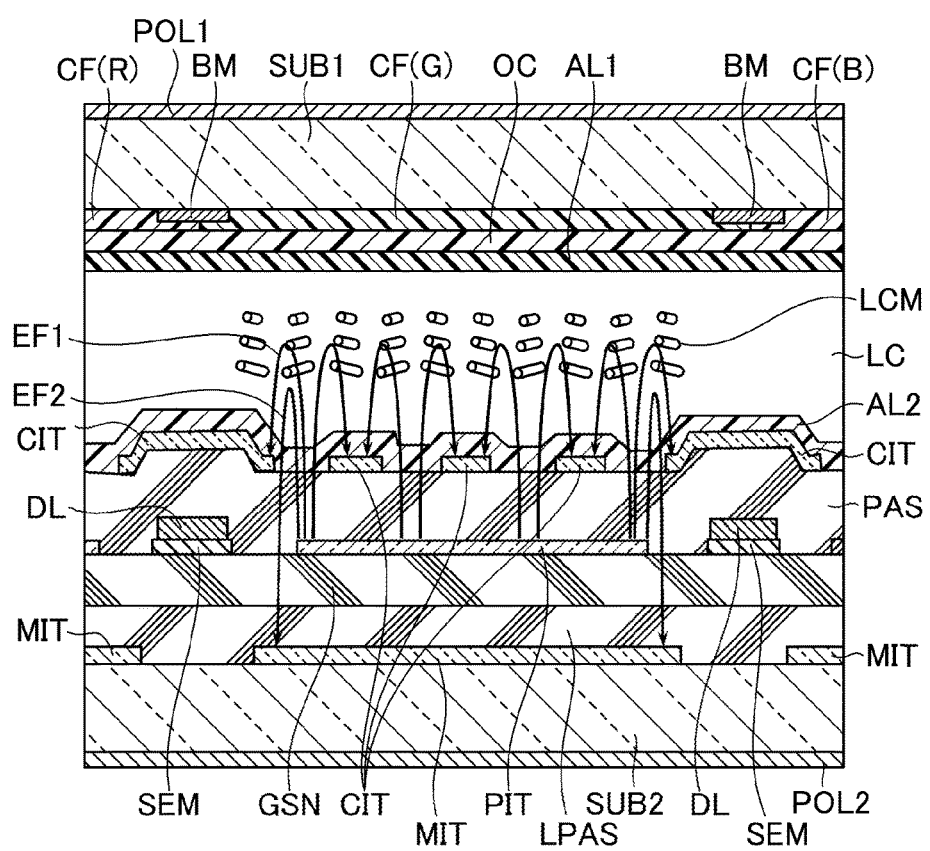
FIG. 52 is a sectional view taken along a line 52-52' shown in FIG. 49.
Figure 53:
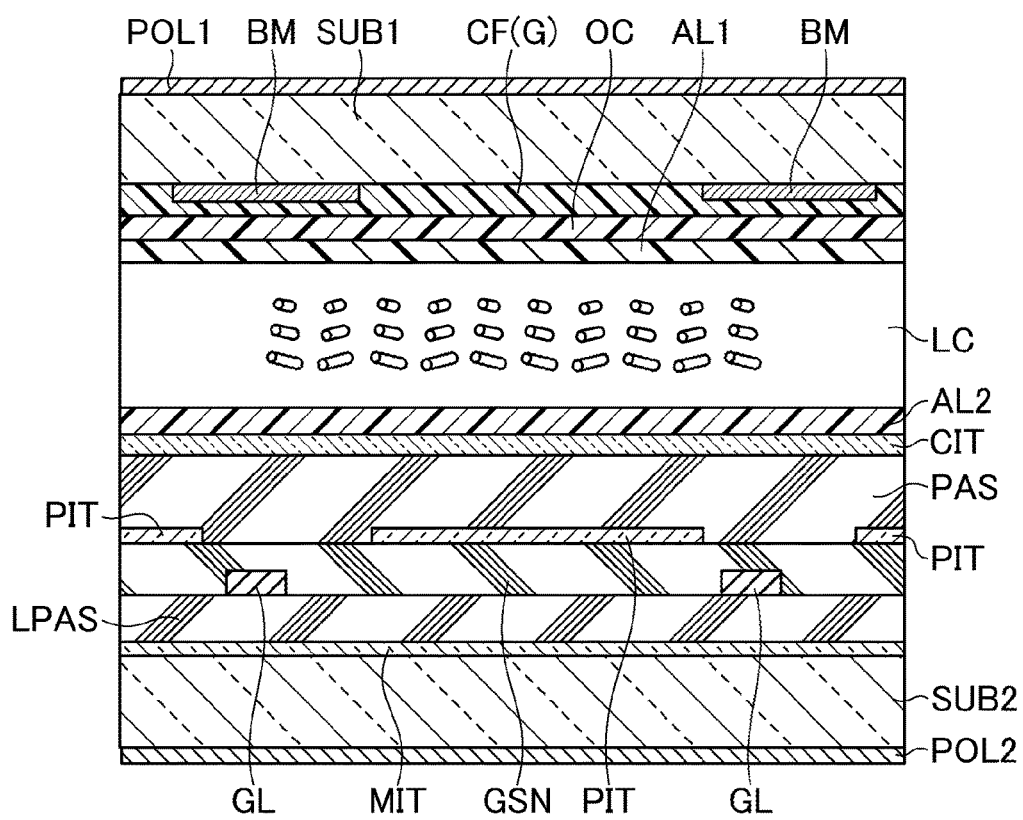
FIG. 53 is a sectional view taken along a line 53-53' shown in FIG. 49.

FIGS. 49A and 49B are detailed plan views each illustrating one pixel region, FIG. 50 is a sectional view taken along line 50-50' in FIG. 49, FIG. 51 is a sectional view taken along line 51-51' in FIG. 49, FIG. 52 is a sectional view taken along line 52-52' in FIG. 49, and FIG. 53 is a sectional view taken along line 53-53' in FIG. 49.

FIG. 49A is a plan view illustrating a thin-film transistor TFT, one pixel region enclosed by gate lines GL and data lines DL, and a part of the neighboring pixel region adjacent to this pixel region, which are illustrated in FIG. 1. To facilitate understanding of the structure, FIG. 49A illustrates patterns of almost all layers, while FIG. 49B illustrates only a pattern of each transparent electrode and a projected position (broken line) of an opening of a black matrix BM. An inner side of the opening of the black matrix BM is a light transmittance region, and an outer side of the opening is a light shielding region.

The arrangement and function of each configuration in FIG. 49A will be described. Each of the gate lines GL is made of a low-resistance metal layer. The gate lines GL are connected to the scanning line drive circuit in FIG. 1, and a scanning-voltage is applied to the gate lines GL from the scanning line drive circuit. On the other hand, each of the data lines DL is also made of a low-resistance metal layer, and a video-data voltage is applied to the data lines DL. In the case where a gate-on voltage is applied to the gate lines GL, the resistance of a semiconductor layer SEM of the thin-film transistor becomes low, whereby the voltage of the data lines DL is transmitted to a source electrode SM made of a low-resistance metal layer, and also transmitted to a transparent pixel electrode PIT connected to the source electrode SM.

A common voltage that is another voltage applied to a liquid crystal layer is applied to a transparent common electrode CIT and a transparent storage capacitance electrode MIT from the common electrode drive circuit in FIG. 1. The transparent pixel electrode PIT is stacked on the transparent storage capacitance electrode MIT with an insulating film interposed therebetween. The transparent common electrode CIT is also stacked on the transparent pixel electrode PIT with an insulating film interposed therebetween, wherein the transparent common electrode CIT has a plurality of slits formed therein. An electric field from the transparent pixel electrode PIT reaches the inside of the liquid crystal layer through the slits of the transparent common electrode CIT disposed on the transparent pixel electrode PIT, is folded in the liquid crystal layer, and finally reaches the transparent common electrode CIT. Thus, a transverse electric field is applied to the liquid crystal layer.

The transparent storage capacitance electrode MIT is also connected to the common electrode drive circuit in FIG. 1, and the common voltage is applied to the transparent storage capacitance electrode MIT from the common electrode drive circuit. The transparent storage capacitance electrode MIT is disposed below the transparent pixel electrode PIT with an insulating film interposed therebetween, and a storage capacitance STG is formed between the transparent pixel electrode PIT and the transparent storage capacitance electrode MIT. As described above, in the seventh embodiment, the transparent common electrode CIT having the slits, the transparent pixel electrode PIT, and the transparent storage capacitance electrode MIT are formed on the pixel region. These three different transparent conductive films are formed by different processes. The transparent pixel electrode PIT is connected to the source electrode SM, and disposed independently on each pixel region. On the other hand, the transparent storage capacitance electrode MIT and the transparent common electrode CIT are connected in the form of a network over the entire screen region DIA to cover the plurality of pixel regions.

The present seventh embodiment is mainly characterized by planar patterns of the transparent common electrode CIT, the transparent storage capacitance electrode MIT, and the transparent pixel electrode PIT in one pixel region. Therefore, the relationship of these patterns will be described by comparing FIGS. 49A and 49B.

The inside of the outline of the black matrix BM in FIG. 49B is an opening. On the contrary, the regions of the gate lines GL and the data lines DL are shielded. The uppermost pattern seen from the opening is the transparent common electrode CIT extending parallel to the data lines DL in FIG. 49A. The transparent pixel electrode PIT can be seen through the slits of the transparent common electrode CIT from above.

The transparent common electrode CIT has a plurality of band-shaped portions extending parallel to the data line DL, and a plurality of slits are formed between these band-shaped portions. The plurality of band-shaped portions extending parallel to the data line DL cover the data line DL with a width larger than the width of the data line DL above the data line DL.

The transparent common electrode CIT does not completely cover the data line DL above the gate line GL, but is opened so as not to cover the semiconductor layer SEM sandwiched between the data line DL and the source electrode SM. This is for preventing the occurrence of malfunction caused by the transparent common electrode CIT reducing the resistance of the semiconductor layer SEM with a protection insulating film PAS interposed therebetween. The transparent common electrodes CIT adjacent to each other in the longitudinal direction of the data line DL across the gate line GL are connected to each other. This is to reduce a wiring delay time by connecting the transparent common electrodes CTI in a matrix.

The transparent pixel electrode PIT has a planar pattern disposed independently in each pixel region. The transparent pixel electrode PIT is connected to the source electrode SM. The outer boundaries of the adjacent transparent pixel electrodes PIT are separated across the data line DL and the gate line GL respectively.

The transparent storage capacitance electrode MIT is disposed below the transparent pixel electrode PIT with an insulating film interposed therebetween. The transparent storage capacitance electrode MIT is formed into a substantially rectangular planar pattern in the pixel region. The transparent storage capacitance electrodes MIT that are adjacent to each other in the longitudinal direction of the gate line GL across the data line DL are connected to each other by a connection portion below the data line DL. The transparent storage capacitance electrodes MIT that are adjacent to each other in the longitudinal direction of the data line DL across the gate line GL are also connected to each other by the connection portion below the gate line GL. As described above, the transparent storage capacitance electrodes MIT are connected in a matrix to reduce the wiring delay time. According to the configuration of shortening the wiring delay time, a liquid crystal display device having high display uniformity can be realized.

In the present seventh embodiment, the transparent common electrodes CIT above the transparent pixel electrode PIT extend to be connected to each other on the protection insulating film PAS above the data line DL, and the transparent storage capacitance electrodes MIT below the transparent pixel electrode PIT also extend to be connected to each other below a lower insulating film LPAS below the gate line GL, as described above. Therefore, a liquid crystal display device having a large storage capacitance, high aperture ratio, low power consumption, and high uniformity in image quality can be provided.

In FIGS. 49A and 49B of the present seventh embodiment, the space between the transparent pixel electrode PIT and the data line DL is set to be small, and further, the transparent common electrode CIT is disposed above the space, while the transparent storage capacitance electrode MIT is disposed below this space. In this case, the transparent common electrode CIT and the transparent storage capacitance electrode MIT have a function of shielding the data lines DL. Accordingly, the black matrix BM on the data line DL can be set to be small, whereby the aperture ratio can be increased.

FIG. 50 is a sectional view taken along line 50-50' in FIG. 49A. The lower insulating film LPAS is disposed above the transparent storage capacitance electrode MIT. The transparent storage capacitance electrode MIT is formed into a layer different from the gate line GL by the lower insulating film LPAS, so that the transparent storage capacitance electrodes MIT can be connected to each other via the region below the gate line GL. The transparent storage capacitance electrode MIT and the transparent pixel electrode PIT form the storage capacitance STG in the pixel region across the lower insulating film LPAS and the gate insulating film GSN.

The transparent storage capacitance electrode MIT corresponds to a first common electrode in a liquid crystal display device according to the present application, the lower insulating film LPAS corresponds to a third insulating film in the liquid crystal display device according to the present application, and the gate insulating film GSN corresponds to a first insulating film in the liquid crystal display device according to the present application.

As in the planar configuration in FIGS. 49A and 49B, a drive voltage is applied between the transparent pixel electrode PIT and the transparent common electrode CIT in the case where the liquid crystal layer LC is regarded as a capacitor in one pixel region. The common voltage identical to that for the transparent common electrode CIT is also applied to the transparent storage capacitance electrode MIT. Firstly, an on-voltage is applied to the gate lines GL made of a metal layer.

The gate insulating film GSN is formed on the gate lines GL. The semiconductor layer SEM is processed and disposed in an island shape on the gate line GL.

The data line DL and the source electrode SM are formed on the semiconductor layer SEM. The data line DL and the source electrode SM are made of a low-resistance metal material formed by the same process. The protection insulating film PAS is formed on the data line DL and the source electrode SM.

The transparent pixel electrode PIT covers the source electrode SM from above, and is electrically connected thereto. The transparent pixel electrode PIT has an independent planar pattern in each pixel region separated by the gate lines GL and the data lines DL, which are arranged in a matrix. When an on-voltage is applied to the gate lines GL to bring the semiconductor layer SEM into a low resistance state, the video-data voltage is applied to the transparent pixel electrode PIT via the source electrode SM from the data lines DL. The video-data voltage is charged in the capacitance between the transparent pixel electrode PIT and the transparent common electrode CIT and in the capacitance between the transparent pixel electrode PIT and the transparent storage capacitance electrode MIT.

The transparent common electrode CIT is disposed on the transparent pixel electrode PIT with the protection insulating film PAS interposed therebetween. The protection insulating film PAS corresponds to a second insulating film in the liquid crystal display device according to the present application, and the transparent common electrode CIT corresponds to a second common electrode in the liquid crystal display device according to the present application.

When the on-voltage is applied to the gate lines GL, the video-data voltage is applied to the transparent pixel electrode PIT via the data lines DL, the semiconductor layer SEM, and the source electrode SM. This video-data voltage is charged in the capacitance between the transparent pixel electrode PIT and the transparent common electrode CIT, and in the capacitance between the transparent pixel electrode PIT and the transparent storage capacitance electrode MIT, the transparent common electrode CIT and the transparent storage capacitance electrode MIT having the same common potential. When an off-voltage is applied to the gate lines GL, the period after the application of the off-voltage becomes a storage period, and the semiconductor layer SEM becomes a high resistance state. Therefore, the charged charges (voltage) are basically stored. However, the voltage of the transparent pixel electrode PIT might be varied due to the leakage by the resistance of the semiconductor layer SEM or the resistance of the liquid crystal layer LC.

In general, holding characteristics are obtained by the capacitance formed by the stacked layers of the transparent common electrode CIT and the transparent pixel electrode PIT. In the present seventh embodiment, a capacitance is also formed between the transparent pixel electrode PIT and the transparent storage capacitance electrode MIT, whereby the whole capacitance can be increased. Consequently, the holding characteristics can be satisfactorily maintained, so that a liquid crystal display device with excellent image quality can be provided.

FIG. 51 is a sectional view taken along line 51-51' in FIG. 49A. FIG. 51 is a sectional view of three pixels with the data line DL being defined as a border. The pixel at the center corresponds to a green color filter CF(G) in a color filter CF disposed in a vertical stripe shape. The pixels at the left and at the right of the pixel at the center correspond to a red color filter CF(R) and a blue color filter CF(B), respectively. The black matrix BM is disposed on the inner surface of a first transparent substrate SUB1 on the border of the pixel regions, where the data lines DL are located, across the liquid crystal layer LC.

In FIG. 51, the cross-sectional structure is divided into two regions in an in-plane direction, the two regions being a pixel border region where the black matrix BM or the data line DL that does not transmit light is located, and an opening region that transmits light. The structure and operation of the opening region will firstly be described.

In the opening region, the video-data voltage and the common voltage are respectively applied to the transparent pixel electrode PIT and the transparent common electrode CIT, and an electric field generated between these electrodes is applied to the liquid crystal layer LC. The intensity of the elliptically polarized light in the liquid crystal layer LC is changed due to the intensity of the electric field, whereby transmittance is controlled to realize a tone image.

The transparent common electrode CIT has a plurality of band-shaped portions, and a slit is formed between the band-shaped portions. The transparent pixel electrode PIT is present below the slit with an upper insulating film UPAS interposed therebetween. Therefore, when the voltage between the transparent pixel electrode PIT and the transparent common electrode CIT increases, an electric field having electric line of force folded in the liquid crystal layer LC is formed. The maximum electric field region is formed in the vicinity of the border of the band-shaped portion and the slit of the transparent common electrode CIT. Therefore, the rotation of the liquid crystal molecules LCM increases around this region, so that transmittance is increased. When the width of the band-shaped portion or the space, which is the slit, of the transparent common electrode CIT increases, the electric field around the center of the band-shaped portion or the slit is decreased, so that the transmittance is reduced. Therefore, the width of the band-shaped portion and the width of the slit of the transparent common electrode CIT have to be finely set in consideration of the thickness of the liquid crystal layer LC. Accordingly, the pixel region has a transmittance distribution in the transverse direction in the sectional view in FIG. 51.

FIG. 51 illustrates lines of electric force EF1 and EF2 for driving the liquid crystal layer LC with arrows. Specifically, the line of electric force EF1 is emitted from the transparent pixel electrode PIT, is folded in the liquid crystal layer LC, and then, reaches the transparent common electrode CIT. The line of electric force EF2 is emitted from the transparent pixel electrode PIT, is folded in the liquid crystal layer LC, and then, reaches the transparent storage capacitance electrode MIT. The transparent common electrode CIT and the transparent storage capacitance electrode MIT both have the common voltage, and two lines of electric force contribute to the drive of the liquid crystal layer LC, i.e., contribute to the display. In a most part of the opening of the black matrix BM, the line of electric force EF1 from the transparent pixel electrode PIT to the transparent common electrode CIT drives the liquid crystal layer LC. On the other hand, the line of electric force EF2 drives the liquid crystal layer LC at the periphery of the opening of the black matrix BM. Since the electric field becomes the maximum near the border (the edge of the slit) between the transparent pixel electrode PIT and the transparent common electrode CIT in a plan view, the transmittance becomes the maximum around this region. However, the transmittance can be increased around the border (the outer boundary of the transparent pixel electrode PIT) between the transparent pixel electrode PIT and the transparent storage capacitance electrode MIT at the periphery of the opening of the black matrix BM in a plan view. Accordingly, in the pixel structure in the present seventh embodiment, the whole portion above the transparent pixel electrode PIT can effectively be utilized, whereby a liquid crystal display device with high transmittance and low power consumption can be provided.

On the other hand, in order to realize a liquid crystal display device having high transmittance and low power consumption, the width of the black matrix BM or the width of the data line DL has to be decreased, the black matrix BM and the data line DL being located on the border of the pixel regions to form a light shielding region. With this, the aperture ratio can be increased. In addition, the width of the transparent pixel electrode PIT has to be increased to the light shielding region. Specifically, the space between the adjacent transparent pixel electrodes PIT is decreased, and a boundary of each transparent pixel electrode PIT is overlapped with the data line DL in a plan view.

The connection portion that connects the transparent storage capacitance electrodes MIT across the gate line GL via the gate insulating film GSN and a lower insulating film LPAS is disposed below the space between the transparent pixel electrodes PIT that are adjacent to each other in the longitudinal direction of the data line DL across the gate line GL. The width of the connection portion overlaps the gate line GL in a plan view, and the connection portion is narrower than the rectangular portion of the transparent storage capacitance electrode MIT in the pixel region in the longitudinal direction of the gate line GL.

The connection portion that connects the transparent storage capacitance electrodes MIT, which are adjacent to each other in the longitudinal direction of the gate line GL, across the data line DL via the gate insulating film GSN and the lower insulating film LPAS is disposed below the space between the transparent pixel electrodes PIT that are adjacent to each other in the longitudinal direction of the gate line GL across the data line DL. The width of the connection portion overlaps the data line DL in a plan view, and the connection portion is narrower than the rectangular portion of the transparent storage capacitance electrode MIT in the pixel region in the longitudinal direction of the data line DL.

The arrangement of the transparent storage capacitance electrode MIT prevents the electric field noise, generated from the data lines DL, from going around the second transparent substrate SUB2 and reaching the transparent pixel electrode PIT. The transparent storage capacitance electrode MIT shields the region below the data line DL, whereby the parasitic capacitance between the transparent pixel electrode PIT and the data line DL can be reduced.

The transparent common electrode CIT is formed to be wider than the data line DL in the area enclosed by the black matrix BM and the data line DL. With this structure, the electric field directing upward from the data line DL via the protection insulating film PAS is shielded. As a result, unnecessary electric field noise directing upward from the data line DL is shielded by the transparent common electrode CIT that is wider than the data line DL, and the unnecessary electric field noise directing downward is shielded by the transparent storage capacitance electrode MIT. This shielding effect can be enhanced by arranging the transparent pixel electrode PIT at the inner of the pixel region from the edge of the transparent common electrode CIT covering the data line DL. Accordingly, a liquid crystal display device having high aperture ratio can be provided.

In the present seventh embodiment, the transparent storage capacitance electrode MIT overlaps the data line DL and the gate line GL in a plan view via the gate insulating film GSN and the lower insulating film LPAS. With this configuration, the transparent storage capacitance electrodes MIT in the plurality of pixel regions are connected, whereby the wiring delay time can be shortened. Thus, a liquid crystal display device having high uniformity can be provided.

FIG. 52 is a sectional view taken along line 52-52' in FIG. 49A. The main portions are identical to those in the sectional view in FIG. 51. The different point is that the transparent storage capacitance electrode MIT buried below the gate insulating film GSN below the data line DL and the lower insulating film LPAS is opened below the data line DL, and not superimposed with the data line DL in a plan view. As understood from the plan view in FIG. 49, the transparent storage capacitance electrodes MIT are connected to each other via the connection portion that is smaller in width than the transparent storage capacitance electrode MIT, and this connection portion crosses the data line DL in a plan view. Therefore, the transparent storage capacitance electrode MIT is not superimposed with the data line DL in the portion other than the connection portion. This configuration has an effect of reducing wiring capacitance of the data line DL when the present embodiment is applied to a large-sized liquid crystal display device.

On the other hand, the transparent pixel electrode PIT has to be shielded by the transparent common electrode CIT and the transparent storage capacitance electrode MIT for reducing an influence of electric field noise from the data line DL. In order to enhance this shielding effect, the boundary of the transparent pixel electrode PIT is preferably located at the inner side of the pixel region from the boundary of the transparent storage capacitance electrode MIT. Specifically, the boundary of the transparent storage capacitance electrode MIT is preferably located between the transparent pixel electrode PIT and the data line DL, and between the transparent pixel electrode PIT and the gate line GL in a plan view.

FIG. 53 is a sectional view taken along line 53-53' in FIG. 49A. This sectional view illustrates a portion where the transparent storage capacitance electrode MIT buried in the lower insulating film LPAS below the gate line GL crosses the gate line GL. The transparent storage capacitance electrodes MIT that are adjacent to each other in the longitudinal direction of the data line DL across the gate line GL are also connected to each other by the connection portion that is narrower than the transparent storage capacitance electrode MIT. As described above, the transparent storage capacitance electrodes MIT in each pixel region are connected to each other in both the longitudinal direction of the gate line GL and in the longitudinal direction of the data line DL. This configuration can shorten the wiring delay time, whereby a liquid crystal display device that can display a uniform image can be provided.

FIGS. 54A to 59B each illustrate a manufacturing process of a stacked body including the thin-film transistor TFT formed on the second transparent substrate SUB2 according to the present seventh embodiment. FIGS. 54A, 55A, 56A, 57A, 58A, and 59A are plan views each illustrating one pixel region, and FIGS. 54B, 55B, 56B, 57B, 58B, and 59B are sectional views each taken along line b-b' in the corresponding plan view. FIGS. 54A to 59B each illustrate each photographic processing process (photo-process).

Figure 54A:
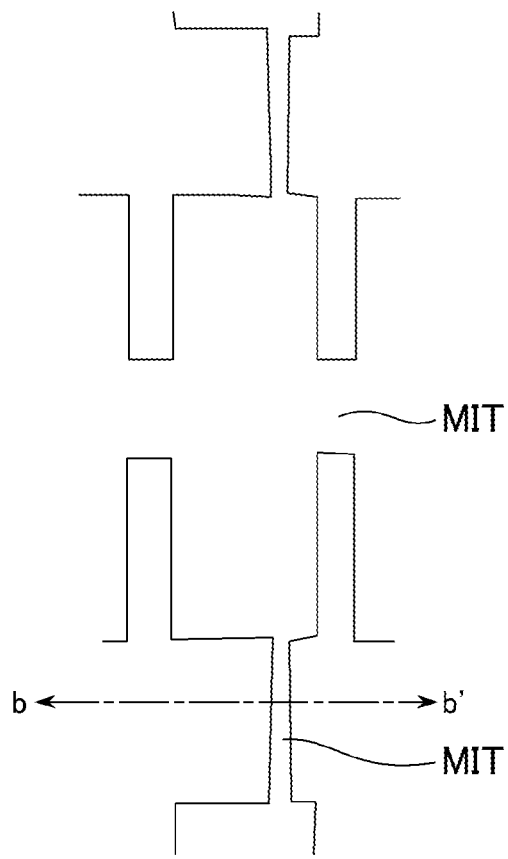
FIG. 54A is a plan view of one pixel in the liquid crystal display panel according to the seventh embodiment when a first photo-process is completed.
Figure 54B:
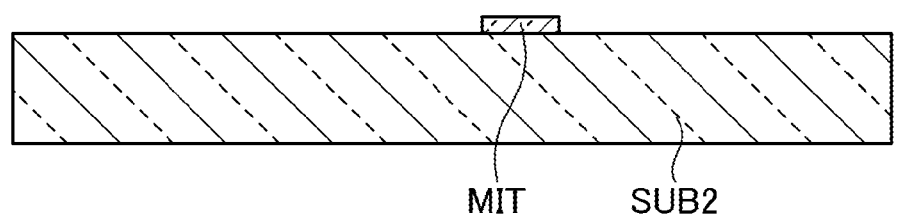
FIG. 54B is a sectional view taken along a line b-b' shown in FIG. 54A.

FIG. 54A is a plan view of one pixel region when a first photo-process is completed, and FIG. 54B is a sectional view taken along line b-b' in FIG. 54A. The transparent storage capacitance electrode MIT is patterned by the first photo-process after being formed on the second transparent substrate SUB2 by sputtering. After a transparent electrode material is formed, a photo-etching process is performed to the transparent electrode material to thereby form the transparent storage capacitance electrode MIT. The transparent storage capacitance electrode MIT has generally a rectangular shape in each pixel region, and has a connection portion that is connected in the longitudinal direction of the gate lines GL and in the longitudinal direction of the data lines DL.

Figure 55A:
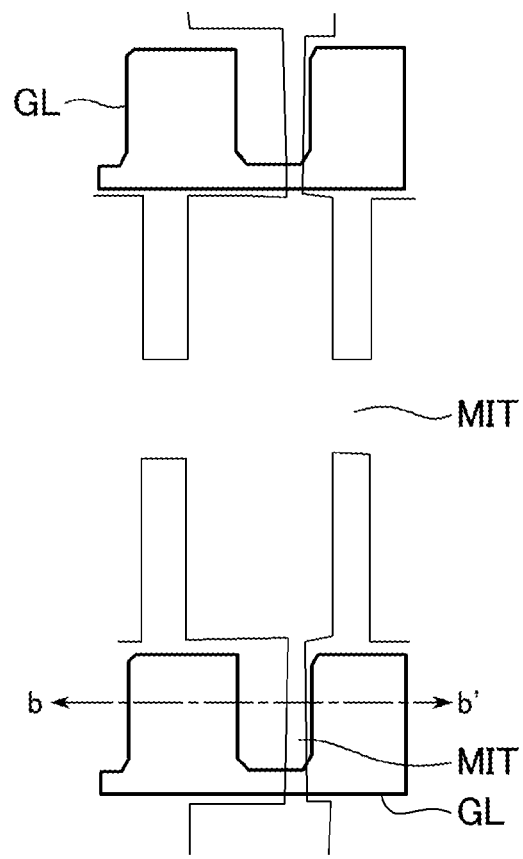
FIG. 55A is a plan view of one pixel in the liquid crystal display panel according to the seventh embodiment when a second photo-process is completed.
Figure 55B:
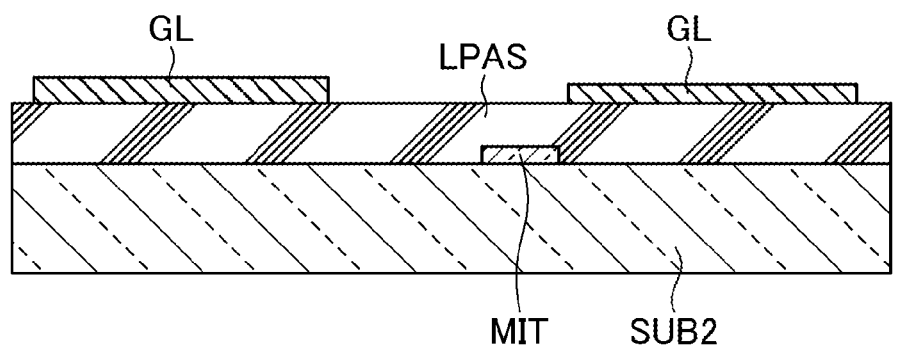
FIG. 55B is a sectional view taken along a line b-b' shown in FIG. 55A.

FIG. 55A is a plan view of one pixel region when a second photo-process is completed, and FIG. 55B is a sectional view taken along line b-b' in FIG. 55A. The lower insulating film LPAS is formed on the transparent storage capacitance electrode MIT by CVD. The gate lines GL are formed the lower insulating film LPAS by sputtering, and then, are patterned by the second photo-process.

Figure 56A:
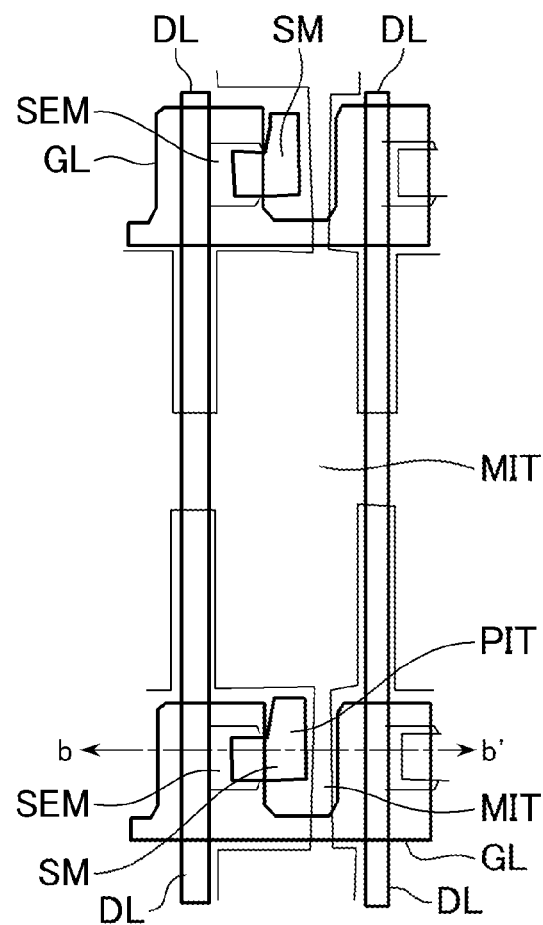
FIG. 56A is a plan view of one pixel in the liquid crystal display panel according to the seventh embodiment when a third photo-process is completed.
Figure 56B:
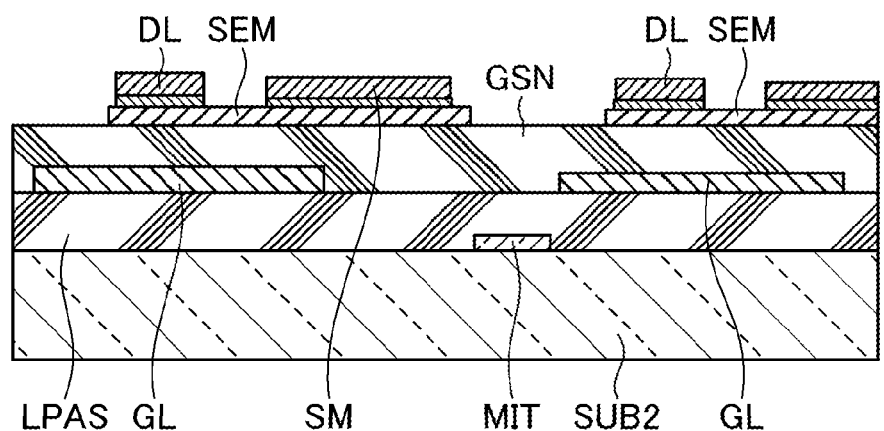
FIG. 56B is a sectional view taken along a line b-b' shown in FIG. 56A.

FIG. 56A is a plan view of one pixel region when a third photo-process is completed, and FIG. 56B is a sectional view taken along line b-b' in FIG. 56A. The gate insulating film GSN made of silicon nitride and the semiconductor layer SEM made of amorphous silicon are stacked on the gate lines GL by CVD. A conductive film serving as a line material is formed the semiconductor layer SEM by sputtering.

After the stacked film is formed by CVD and sputtering, a photoresist is formed on the stacked film, and this photoresist is exposed by use of a halftone photomask, whereby a region of the data line DL and the source electrode SM and a region of the semiconductor layer SEM are formed.

Figure 57A:
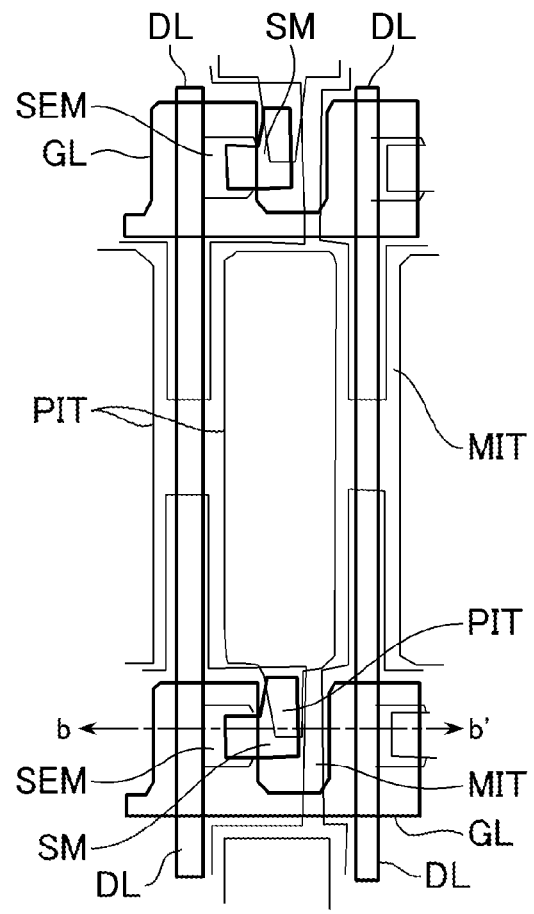
FIG. 57A is a plan view of one pixel in the liquid crystal display panel according to the seventh embodiment when a fourth photo-process is completed.
Figure 57B:
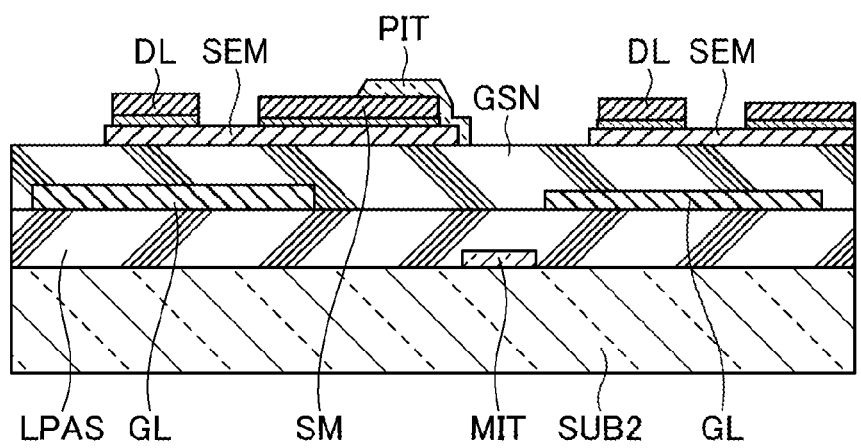
FIG. 57B is a sectional view taken along a line b-b' shown in FIG. 57A.

FIG. 57A is a plan view of one pixel region when a fourth photo-process is completed, and FIG. 57B is a sectional view taken along line b-b' in FIG. 57A. A transparent electrode material is formed on the data line DL and the source electrode SM by sputtering, and the transparent pixel electrode PIT is formed by the photo-etching process. The transparent pixel electrode PIT directly covers the source electrode SM, whereby the transparent pixel electrode PIT is electrically connected to the source electrode SM.

Figure 58A:
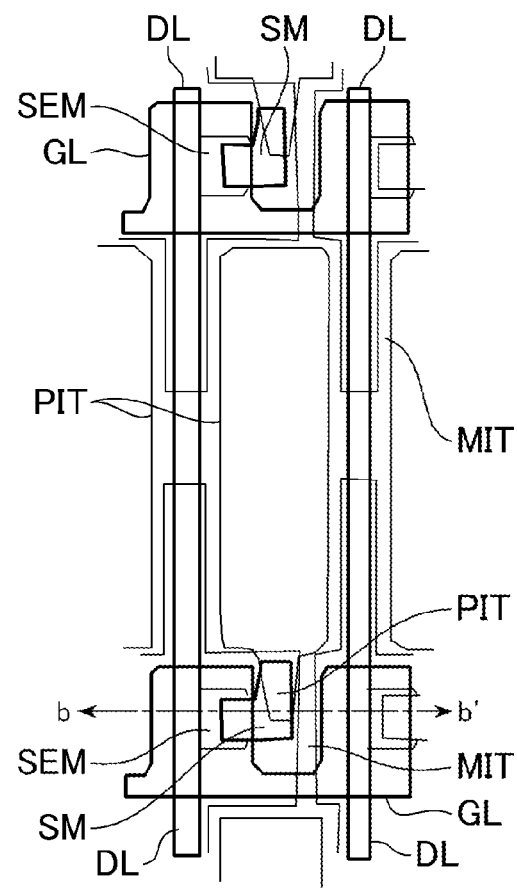
FIG. 58A is a plan view of one pixel in the liquid crystal display panel according to the seventh embodiment when a fifth photo-process is completed.
Figure 58B:
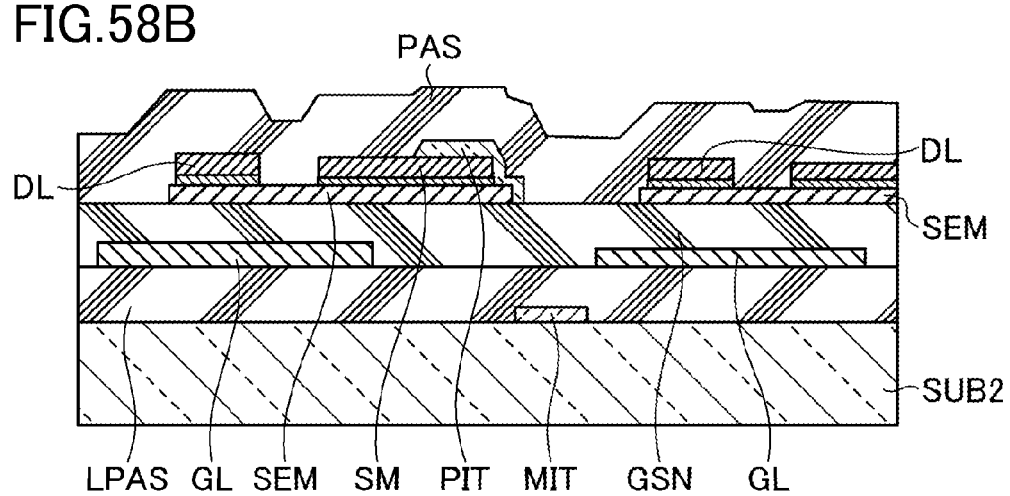
FIG. 58B is a sectional view taken along a line b-b' shown in FIG. 58A.

FIG. 58A is a plan view of one pixel region when a fifth photo-process is completed, and FIG. 58B is a sectional view taken along line b-b' in FIG. 58A. The protection insulating film PAS is formed on the transparent pixel electrode PIT. The fifth photo-process is a photo-etching process for forming an opening on the protection insulating film PAS. The opening is not formed in the screen region DIA in FIG. 58. The opening is a contact hole for connecting the gate line GL or the data line DL to the transparent common electrode CIT in the peripheral region outside the screen region DIA.

Figure 59A:
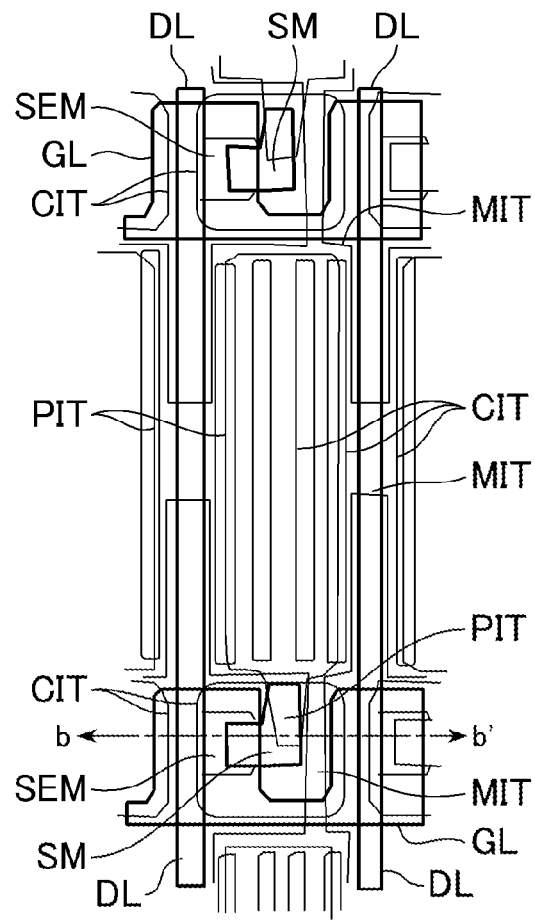
FIG. 59A is a plan view of one pixel in the liquid crystal display according to the seventh embodiment when a sixth photo-process is completed.
Figure 59B:
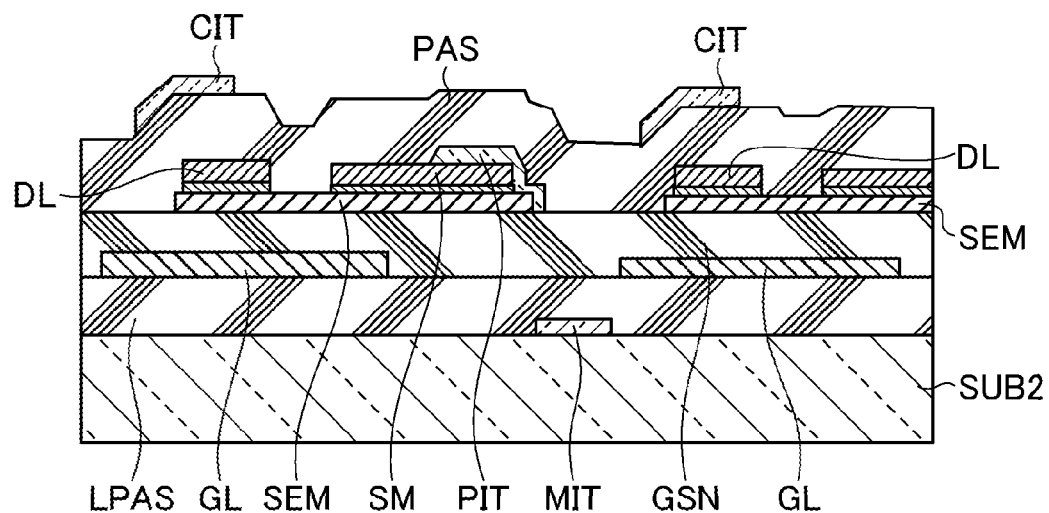
FIG. 59B is a sectional view taken along a line b-b' shown in FIG. 59A.

FIG. 59A is a plan view of one pixel region when a sixth photo-process is completed, and FIG. 59B is a sectional view taken along line b-b' in FIG. 59A. After the transparent conductive film is formed on the protection insulating film PAS, the transparent common electrode CIT is formed by the photo-etching process.

As described above, the processing of the second transparent substrate SUB2 in the liquid crystal display device according to the present seventh embodiment is completed through six photo-etching processes in total.

Eighth Embodiment

Figure 60:
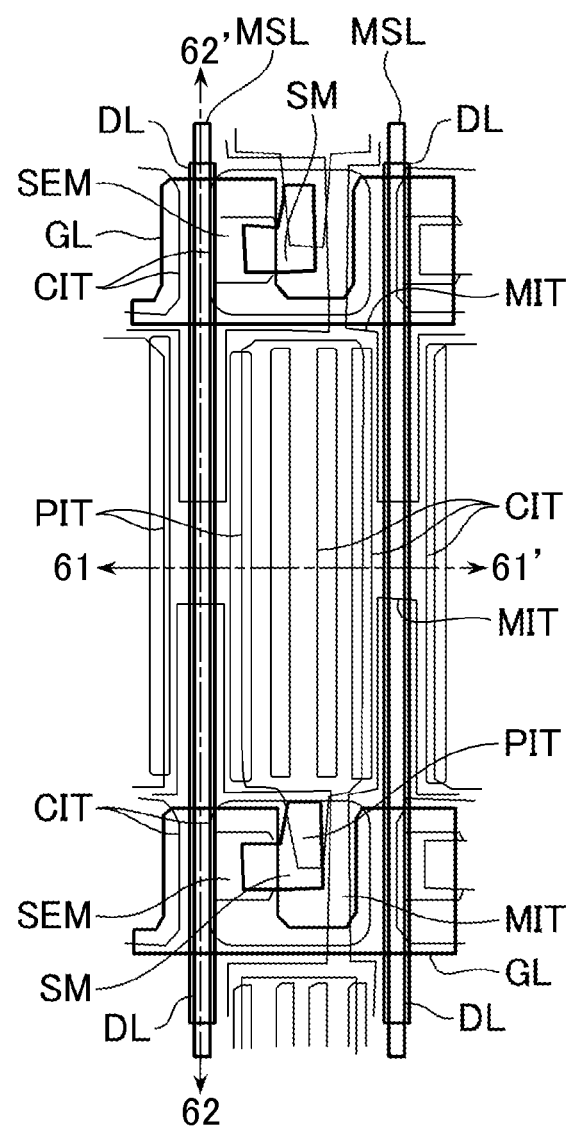
FIG. 60 is a detailed plan view illustrating one pixel region in a liquid crystal display device according to an eighth embodiment.
Figure 61:
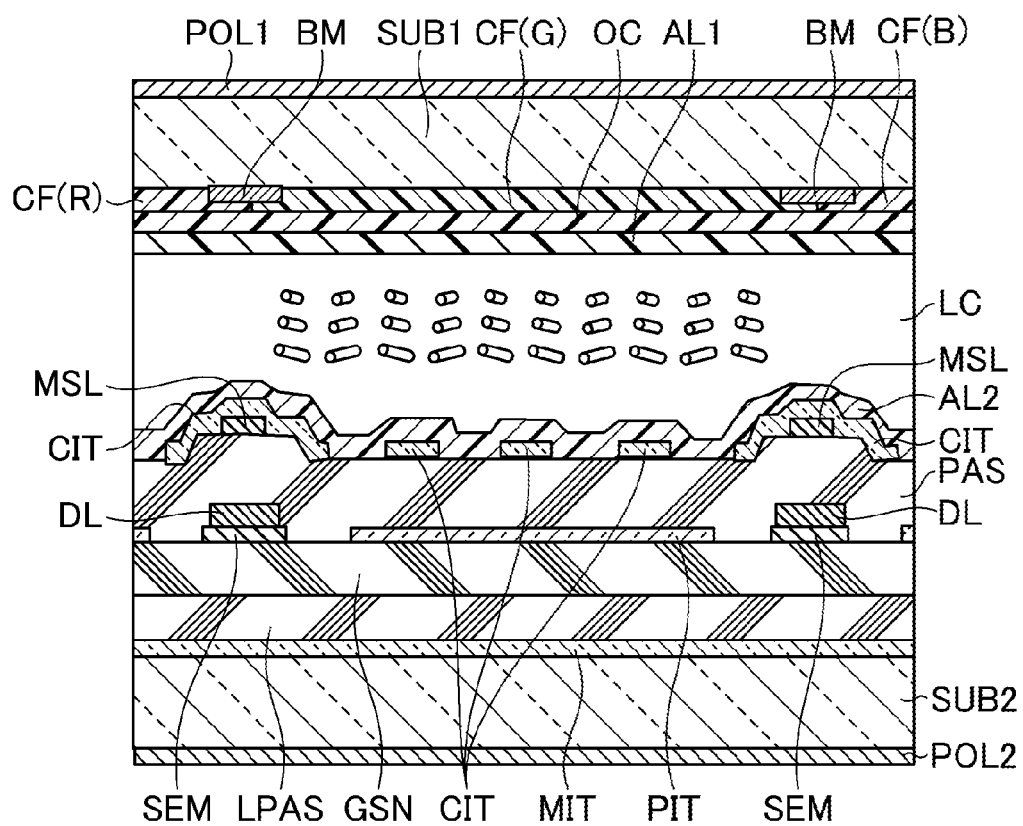
FIG. 61 is a sectional view taken along a line 61-61' shown in FIG. 60.
Figure 62:
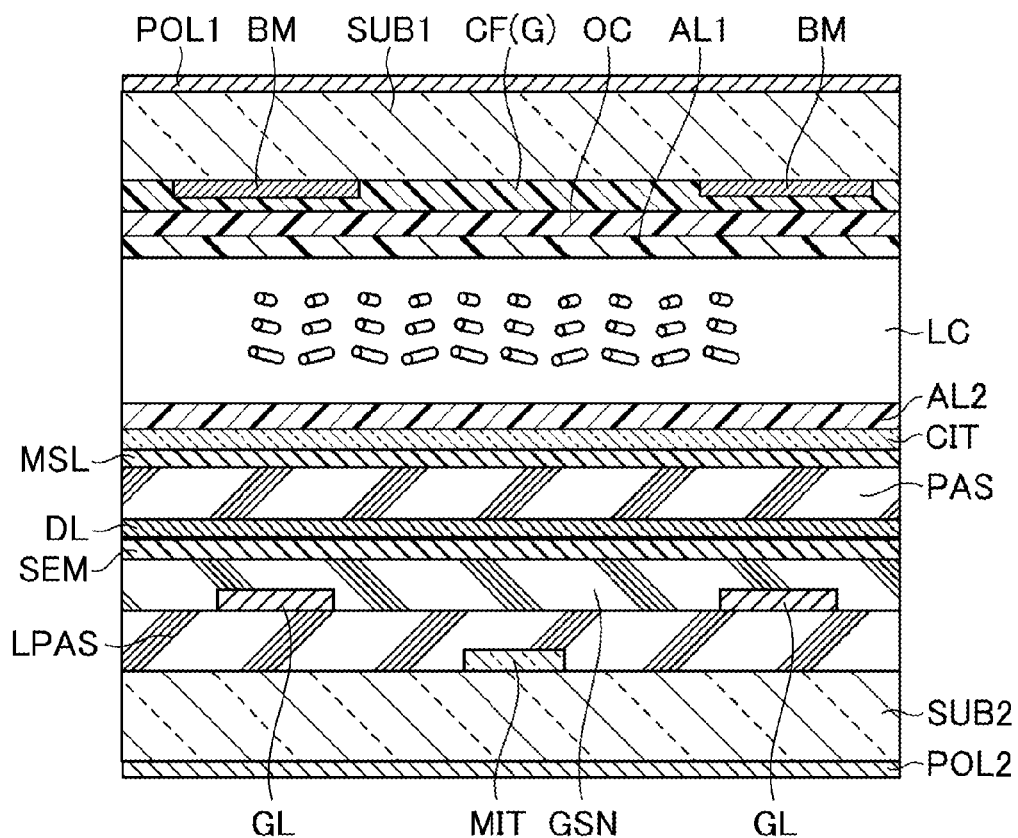
FIG. 62 is a sectional view taken along a line 62-62' shown in FIG. 60.

Referring to FIGS. 60~62, a liquid crystal panel of a eighth embodiment will be described.

FIG. 60 is a detailed plan view illustrating one pixel region in the liquid crystal display device according to the eighth embodiment of the present application, FIG. 61 is a sectional view taken along line 61-61' in FIG. 60, and FIG. 62 is a sectional view taken along line 62-62' in FIG. 60.

The present eighth embodiment is characterized in that a common electrode metal line MSL made of a metal material is directly connected below a transparent common electrode CIT above data line DL so as to be overlapped with the data line DL in a plan view for reducing a wiring delay of the transparent common electrode CIT. With this configuration, the wiring delay of the transparent common electrode CIT is small, and satisfactory image quality can be realized with high aperture ratio and low power consumption, even if the liquid crystal display device has a large screen.

FIG. 60 is a plan view illustrating a thin-film transistor TFT, one pixel region enclosed by gate lines GL and data lines DL, and a part of the neighboring pixel region adjacent to this pixel region. In this plan view, the common electrode metal line MSL that is made of a metal line smaller than the data line DL is disposed to be overlapped with the data line DL as viewed in a plane, in addition to the components in the plan views in FIGS. 49A and 49B in the seventh embodiment. The common electrode metal line MSL crosses the gate line GL and extends over the plurality of pixel regions.

FIG. 61 is a sectional view taken along line 61-61' in FIG. 60. FIG. 61 illustrates the pixel region enclosed by the adjacent data lines DL. A transparent storage capacitance electrode MIT is disposed at the lowermost layer, a lower insulating film LPAS and a gate insulating film GSN are disposed on the transparent storage capacitance electrode MIT, and the data line DL are disposed thereon, the data line DL including a semiconductor layer SEM formed below the data line DL. A transparent pixel electrode PIT is disposed between the adjacent data lines DL. A protection insulating film PAS is disposed on the transparent pixel electrode PIT, and a transparent common electrode CIT having a slit is formed on the protection insulating film PAS. An electric field applied between the transparent common electrode CIT and the transparent pixel electrode PIT drives a liquid crystal layer LC.

The transparent common electrode CIT widely covers the data line DL from above with the protection insulating film PAS interposed therebetween. This configuration brings an effect of shielding unnecessary electric field of the data line DL to enhance an aperture ratio. However, this transparent common electrode CIT mostly covers the data line DL, so that it forms a large capacitance with the data line DL. Since each of the data lines DL is made of a low-resistance metal line, the wiring delay is not generated. However, when a screen size is increased, uniformity in an image might be deteriorated due to the wiring delay, since the transparent common electrode CIT is made of a high-resistance material such as indium tin oxide ITO.

In the present eighth embodiment, the common electrode metal line MSL made of copper Cu is disposed on the protection insulating film PAS and below the transparent common electrode CIT. This common electrode metal line MSL has low resistance, and the common electrode metal line MSL is in contact with the transparent common electrode CIT. Consequently, the wiring delay of the transparent common electrode CIT can significantly be reduced, whereby satisfactory image uniformity can be realized even in a large screen.

The common electrode metal line MSL is disposed above the data line DL, and its width is set to be smaller than the width of the transparent common electrode CIT in order to prevent the reduction in the aperture ratio. In addition, the width of the common electrode metal line MSL is set to be equal to or smaller than the width of the data line DL. With this configuration, a liquid crystal display device having high aperture ratio and excellent uniformity in image quality can be realized even in a large screen.

FIG. 62 is a sectional view taken along line 62-62' in FIG. 60. FIG. 62 is a sectional view taken along the data line DL crossing the adjacent gate line GL in a plan view. The transparent storage capacitance electrode MIT is disposed below the adjacent gate line GL with a lower insulating film LPAS interposed therebetween. The data line DL integral with the semiconductor layer SEM is disposed above the adjacent gate line GL with the gate insulating film GSN interposed therebetween. The protection insulating film PAS is formed on the data line DL, and the common electrode metal line MSL and the transparent common electrode CIT are disposed on the protection insulating film PAS so as to cover the data line DL and cross two gate lines GL. The common electrode metal line MSL is connected to the transparent common electrode CIT, whereby the wiring delay is reduced.

Ninth Embodiment

Figure 63:
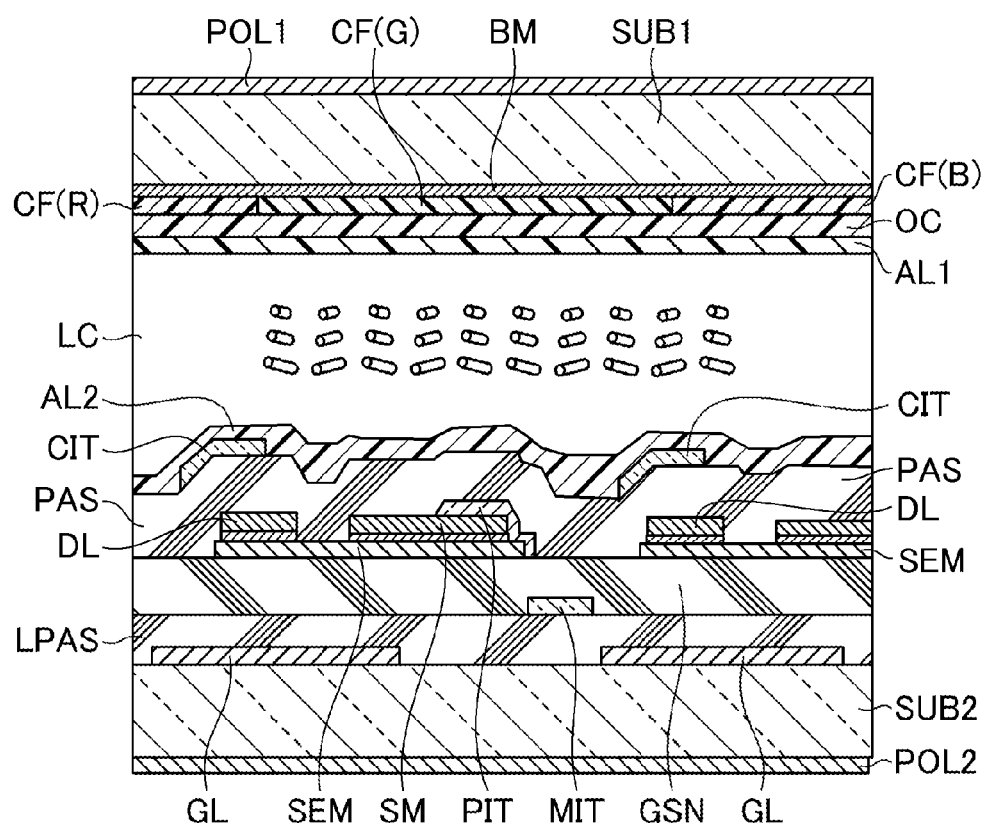
FIG. 63 is a sectional view of a liquid crystal display device according to a ninth embodiment.
Figure 64:
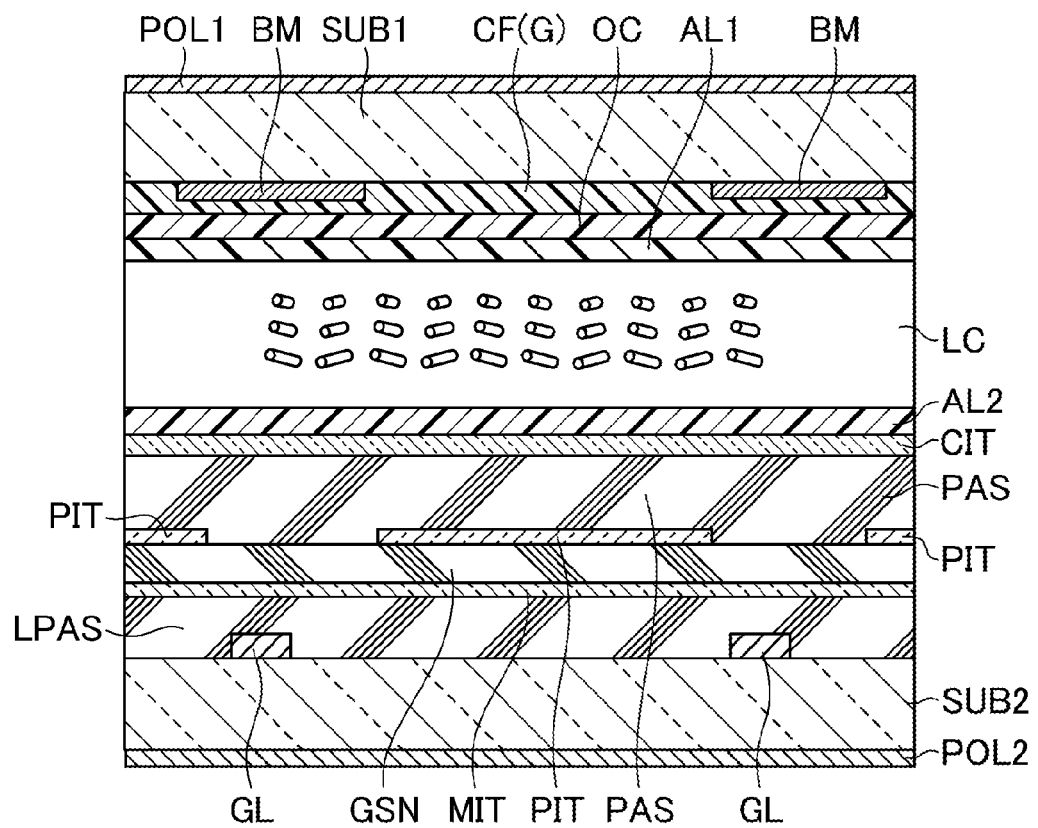
FIG. 64 is a sectional view of the liquid crystal display device according to the ninth embodiment.

Referring to FIGS. 63 and 64, a liquid crystal panel of a ninth embodiment will be described.

FIGS. 63 and 64 are sectional views of the liquid crystal display device according to the ninth embodiment of the present application. The planar configuration of the pixel region in the present ninth embodiment is similar to that in the seventh embodiment, so that the description thereof will not be given. FIG. 63 corresponds to the sectional view taken along line 63-63' in FIG. 49A. FIG. 64 corresponds to the sectional view taken along line 64-64' in FIG. 49A.

According to the present ninth embodiment, the positioning accuracy in the exposure process can be improved, and an aperture ratio can be enhanced in a higher-definition liquid crystal display device. In general, an exposure using a photomask during a TFT process is executed by using a pattern formed by exposing and etching a metal film on a first layer as a reference. Methods of reading and recognizing the pattern include a method of detecting a border based on reflectivity of a film, and a method of detecting a difference in level. However, in the above seventh embodiment, the first layer is the pattern of the transparent storage capacitance electrode MIT. Therefore, the accuracy in detecting the border by the measurement of reflectivity is deteriorated, compared to a metal material. Since the thickness of the transparent storage capacitance electrode MIT is smaller than the gate line GL, a difference in level is difficult to be detected. Although the detail is not described in the manufacturing process according to the above first embodiment, in the positioning during the exposure process, the transparent storage capacitance electrode MIT is firstly formed on the second transparent substrate SUB2, and this pattern is used as a positioning reference upon processing the gate line GL. In the process after the gate line GL is processed, the pattern of the gate line GL is used as a positioning reference. Accordingly, the positioning accuracy becomes high in the succeeding processes.

On the other hand, different from the above seventh embodiment, the procedure is changed such that the first layer becomes the gate line GL in order to enhance the positioning accuracy in the present ninth embodiment. The planar structure of the pixel region is similar to that in the seventh embodiment, but the sectional structure is different.

In the seventh embodiment, the transparent storage capacitance electrode MIT is formed on the second transparent substrate SUB2, the lower insulating film LPAS is formed, and then, the gate lines GL are formed. On the other hand, in the ninth embodiment, the gate lines GL are formed, the lower insulating film LPAS is formed, and then, the transparent storage capacitance electrode MIT is formed. This is the different point from the above seventh embodiment in the thin-film stacked structure formed on the second transparent substrate SUB2.

From the viewpoint of the operation of the semiconductor layer SEM, the actual gate insulating film is a stacked layer of the lower insulating film LPAS and the gate insulating film GSN. The transparent storage capacitance electrode MIT is disposed between the lower insulating film LPAS and the gate insulating film GSN. According to this configuration, the transparent storage capacitance electrode MIT extends over the plurality of pixel regions without being short-circuited due to the presence of the gate insulating film GSN, even if it crosses the data line DL in a plan view, and further, the transparent storage capacitance electrode MIT can extend over a plurality of pixel regions without being short-circuited due to the presence of the lower insulating film LPAS, even if it crosses the gate line GL in a plan view, as in the above seventh embodiment. Consequently, the aperture ratio can be improved. In addition, the gate line GL can be used as a reference mark during the exposure process, whereby the positioning accuracy is enhanced, and the aperture ratio can be increased.

FIG. 64 illustrates a region where the transparent storage capacitance electrode MIT disposed above the lower insulating film LPAS crosses the gate line GL in a plan view above the gate line GL. The transparent storage capacitance electrodes MIT, which are adjacent to each other in the longitudinal direction of the data line DL across the gate line GL, in the plurality of pixel regions are connected to each other, and the transparent storage capacitance electrodes MIT, which are adjacent to each other in the longitudinal direction of the gate line GL across the data line DL, in the plurality of pixel regions are connected to each other. Specifically, the transparent storage capacitance electrodes MIT are connected in a matrix. According to this configuration, the wiring delay time can be shortened, whereby a liquid crystal display device that can display a uniform image can be provided.

Tenth Embodiment

Referring to FIGS. 65~74, a liquid crystal panel of a tenth embodiment will be described.

Figure 65:
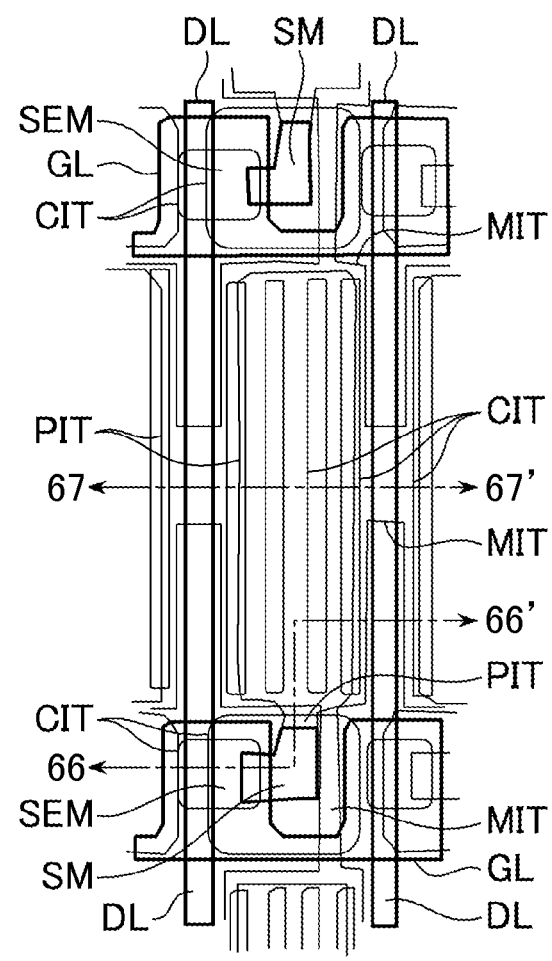
FIG. 65 is a detailed plan view illustrating one pixel region in a liquid crystal display according to a tenth embodiment.
Figure 66:
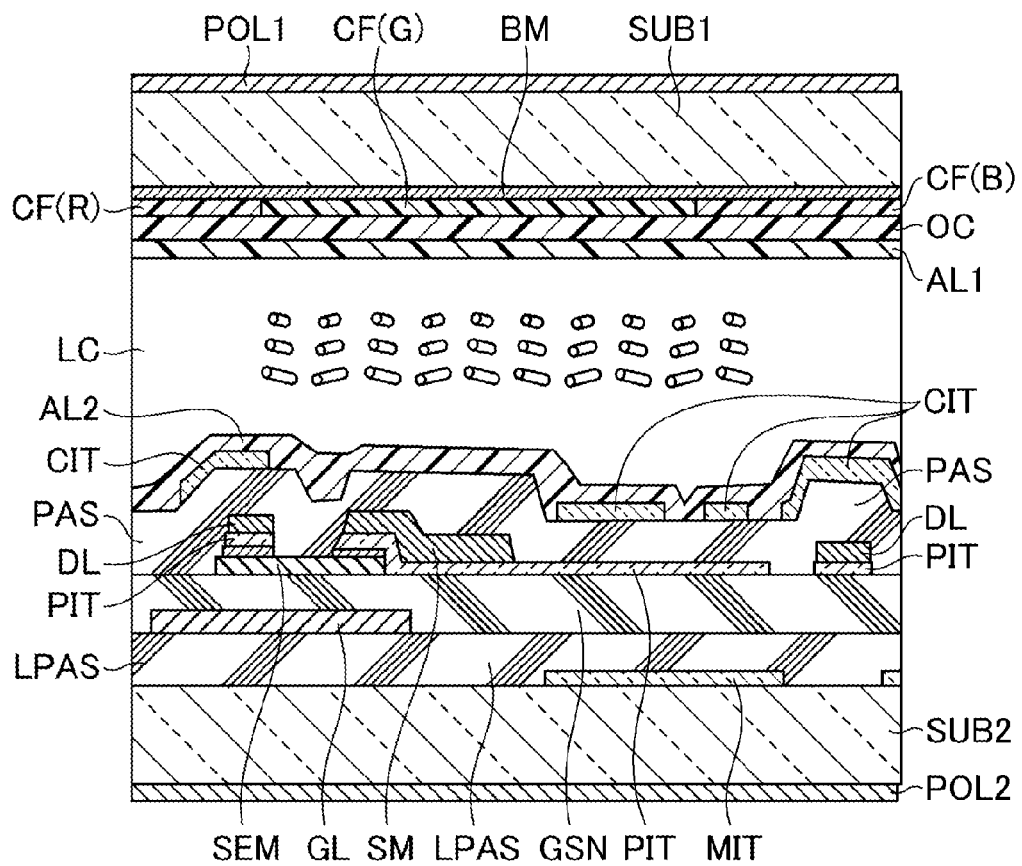
FIG. 66 is a sectional view taken along a line 66-66' shown in FIG. 65.
Figure 67:
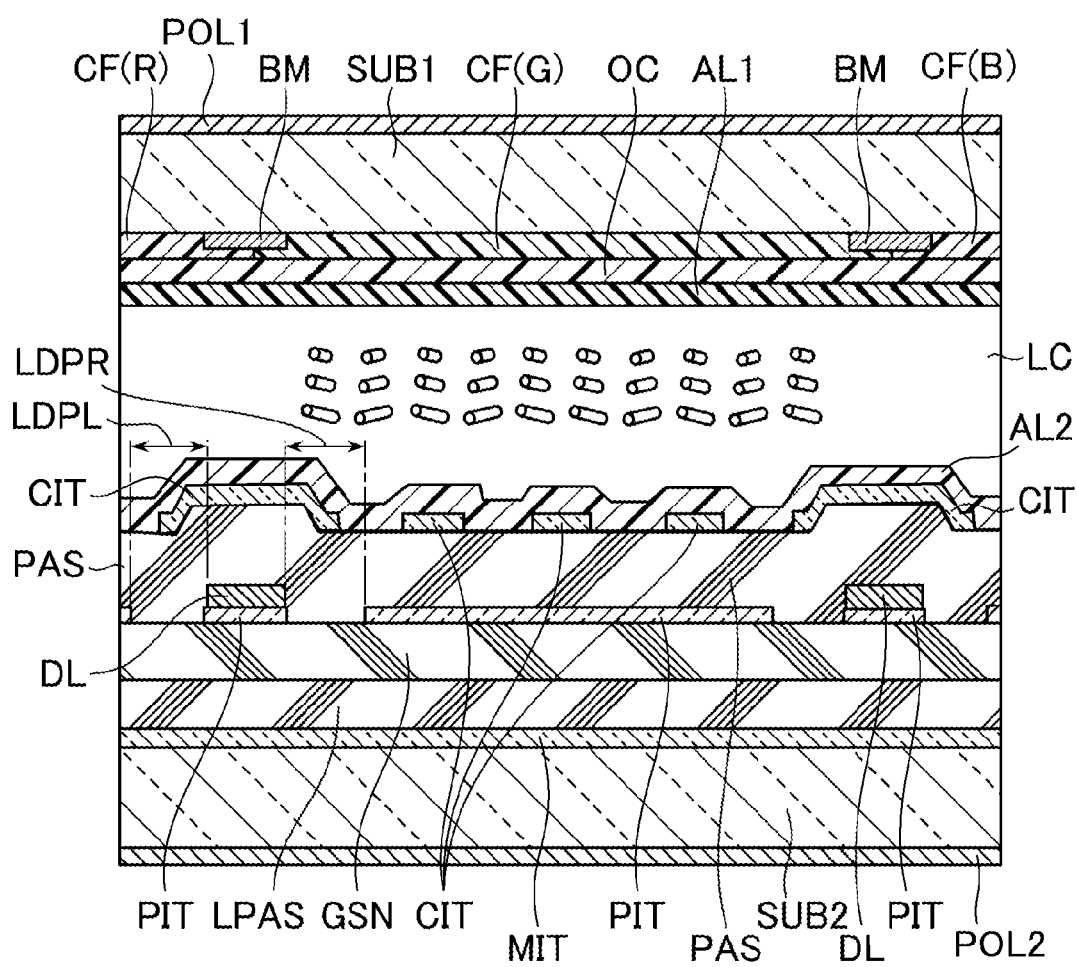
FIG. 67 is a sectional view taken along a line 67-67' shown in FIG. 65.

FIG. 65 is a detailed plan view illustrating one pixel region, FIG. 66 is a sectional view taken along line 66-66' in FIG. 65, and FIG. 67 is a sectional view taken along line 67-67' in FIG. 65. In the present tenth embodiment, the positioning accuracy in data line DL and a transparent pixel electrode PIT during an exposure process is improved by changing a sectional structure of a pixel region and a TFT manufacturing process. An aperture ratio can be enhanced compared to those in the above seventh to ninth embodiments.

FIG. 65 is a plan view illustrating a thin-film transistor TFT, one pixel region enclosed by gate lines GL and data lines DL, and a part of the neighboring pixel region adjacent to this pixel region. The different point between the planar structure of the pixel region according to the present tenth embodiment and those in the seventh to ninth embodiments is that the outline of the patterns of the data line DL, a source electrode SM, and the transparent pixel electrode PIT are integrated. In the manufacturing process, the transparent electrode material for the transparent pixel electrode PIT and the metal material for the data line DL are continuously formed, and they are processed in the same exposure process, whereby the transparent pixel electrode PIT and the data line DL have the same outline. It results in preventing the positional deviation between the data line DL and the transparent pixel electrode PIT disposed on a gate insulating film GSN, whereby the aperture ratio can be increased. The configuration for realizing the above structure will be described below.

Each of the gate lines GL is made of a low-resistance metal layer. The gate lines GL are connected to the scanning line drive circuit in FIG. 1, and a scanning-voltage is applied to the gate lines GL from the scanning line drive circuit. On the other hand, each of the data lines DL is also made of a low-resistance metal layer, and a video-data voltage is applied to the data lines DL. In the case where a gate-on voltage is applied to the gate lines GL, the resistance of a semiconductor layer SEM of the thin-film transistor becomes low, whereby the voltage of the data lines DL is transmitted to the source electrode SM made of a low-resistance metal layer, and also transmitted to the transparent pixel electrode PIT connected to the source electrode SM.

A common voltage that is another voltage applied to a liquid crystal layer is applied to a transparent common electrode CIT and a transparent storage capacitance electrode MIT from the common electrode drive circuit in FIG. 1. The transparent pixel electrode PIT is stacked on the transparent storage capacitance electrode MIT with an insulating film interposed therebetween. The transparent common electrode CIT is also stacked on the transparent pixel electrode PIT with an insulating film interposed therebetween, wherein the transparent common electrode CIT has a plurality of slits formed therein.

The transparent storage capacitance electrode MIT is also connected to the common electrode drive circuit in FIG. 1, and the common voltage is applied to the transparent storage capacitance electrode MIT from the common electrode drive circuit. As described above, in the present tenth embodiment, the transparent common electrode CIT having the slits, the transparent pixel electrode PIT, and the transparent storage capacitance electrode MIT are formed on the pixel region. These three transparent conductive films are formed by different processes. The transparent pixel electrode PIT is connected to the source electrode SM, and disposed independently on each pixel region. On the other hand, the transparent storage capacitance electrode MIT and the transparent common electrode CIT are connected in the form of a network over the entire screen region DIA to cover the plurality of pixel regions.

The transparent pixel electrode PIT has a planar pattern disposed independently in each pixel region. The transparent pixel electrode PIT and the source electrode SM are integrally formed, and connected to each other. The outer boundaries of the adjacent transparent pixel electrodes PIT are separated across the data line DL and the gate line GL respectively.

The transparent storage capacitance electrode MIT is disposed below the transparent pixel electrode PIT with the insulating film interposed therebetween. The transparent storage capacitance electrode MIT is formed into a substantially rectangular planar pattern in the pixel region. The transparent storage capacitance electrodes MIT that are adjacent to each other in the longitudinal direction of the gate line GL across the data line DL are connected to each other by a connection portion below the data lines DL. The transparent storage capacitance electrodes MIT that are adjacent to each other in the longitudinal direction of the data line DL across the gate line GL are also connected to each other by the connection portion below the gate line GL. As described above, the transparent storage capacitance electrodes MIT are connected in a matrix to reduce the wiring delay time. According to the configuration of shortening the wiring delay time, a liquid crystal display device having high display uniformity can be realized.

In FIG. 65 of the present tenth embodiment, the space between the transparent pixel electrode PIT and the data line DL is set to be small, and further, the transparent common electrode CIT is disposed above the space. In this case, the transparent common electrode CIT has a function of shielding the data lines DL.

FIG. 66 is a sectional view taken along line 66-66' in FIG. 65. The components, their functions, and used materials in the cross-sectional structure will be described. The transparent storage capacitance electrode MIT is disposed on a second transparent substrate SUB2, a lower insulating film LPAS is disposed on the transparent storage capacitance electrode MIT, and the gate lines GL are disposed on the lower insulating film LPAS. The gate insulating film GSN is disposed on the gate lines GL, and the semiconductor layer SEM is formed on the gate insulating film GSN.

The semiconductor layer SEM and the data line DL as well as the source electrode SM are connected with the transparent pixel electrode PIT interposed therebetween.

This is achieved such that, after the semiconductor layer SEM is processed to have an island pattern, the transparent electrode material of the transparent pixel electrode PIT is formed, the metal line material of the data line DL is continuously formed, and then, these materials are processed in the same exposure process. With this process, the transparent electrode material formed by the same process as the transparent pixel electrode PIT is formed below the data line DL and the source electrode SM in the present tenth embodiment.

The protection insulating film PAS is formed on the data line DL, the source electrode SM, and the transparent pixel electrode PIT. The transparent common electrode CIT is formed on the protection insulating film PAS.

FIG. 67 is a sectional view taken along line 67-67' in FIG. 65. FIG. 67 is a sectional view illustrating three pixels with the data line DL defined as a border.

In FIG. 67, the cross-sectional structure is divided into two regions in an in-plane direction, the two regions being a pixel border region where the black matrix BM or the data line DL that does not transmit light is located, and an opening region that transmits light. Space regions LDPR and LDPL between the data line DL and the transparent pixel electrode PIT are formed on both sides of the data line DL. The transparent common electrode CIT covering the data line DL is formed to be wider than the data line DL. This is for shielding the unnecessary noise electric field from the data line DL from entering the liquid crystal layer LC. When the width of the transparent common electrode CIT protruding in the in-plane direction from the data line DL is small, malfunction might occur. However, when the protruding width becomes too large, the transmittance of the opening region is reduced. This is because the liquid crystal display device according to the present embodiment drives the liquid crystal by the electric field applied between the transparent pixel electrode PIT and the transparent common electrode CIT. The drive electric field enters the liquid crystal layer LC from the transparent pixel electrode PIT via the protection insulating film PAS, is folded, and reaches the transparent common electrode CIT covering the data line DL. Specifically, the drive electric field is reduced, and the transmittance is reduced above the portion of the transparent common electrode CIT, the portion being apart from the transparent pixel electrode PIT.

The space regions LDPR and LDPL have to be set as small as possible within a range where the electric field noise from the data line DL to the liquid crystal layer LC is suppressed. In the cross-sectional structure in FIG. 51 in the above seventh embodiment, the data line DL and the transparent pixel electrode PIT are processed with the different exposure processes. Therefore, the space between the transparent pixel electrode PIT and the data line DL is different between one side and the other side of the data line DL in the widthwise direction, when positional deviation occurs during the exposure process in which the transparent pixel electrode PIT is used as a reference. In this case, the protruding width of the transparent common electrode CIT, which covers the data line DL, from the data line DL becomes small at the side where the space is small. Specifically, the shielding effect is insufficient, so that the electric field noise might enter the liquid crystal layer LC to cause malfunction. One of the countermeasures against this situation is to set the original space between the data line DL and the transparent pixel electrode PIT to be wider. However, according to this structure, the drive electric field is reduced, and the transmittance is significantly reduced.

In the present tenth embodiment, the transparent pixel electrode PIT and the data line DL are continuously formed, and then, patterned in the same exposure process. Therefore, the space regions LDPR and LDPL between the data line DL and the transparent pixel electrode PIT always have the same size, which results in that the positional deviation does not occur. Accordingly, the transmittance of the opening region can be increased, whereby a liquid crystal display device with low power consumption can be provided. Even if the space regions LDPR and LDPL are set to be small, the data line DL and the transparent pixel electrode PIT do not generate short-circuit failure due to the positional deviation in the exposure process, whereby a yield can be increased.

FIGS. 68A to 74B each illustrate a manufacturing process of a stacked body including the thin-film transistor TFT formed on the second transparent substrate SUB2 according to the present tenth embodiment. FIGS. 68A, 69A, 70A, 71A, 72A, 73A, 74A are plan views each illustrating one pixel region, and FIGS. 68B, 69B, 70B, 71B, 72B, 73B, 74B are sectional views each taken along line b-b' in the corresponding plan view. FIGS. 68A to 74B each illustrate each photographic processing process (photo-process).

Figure 68A:
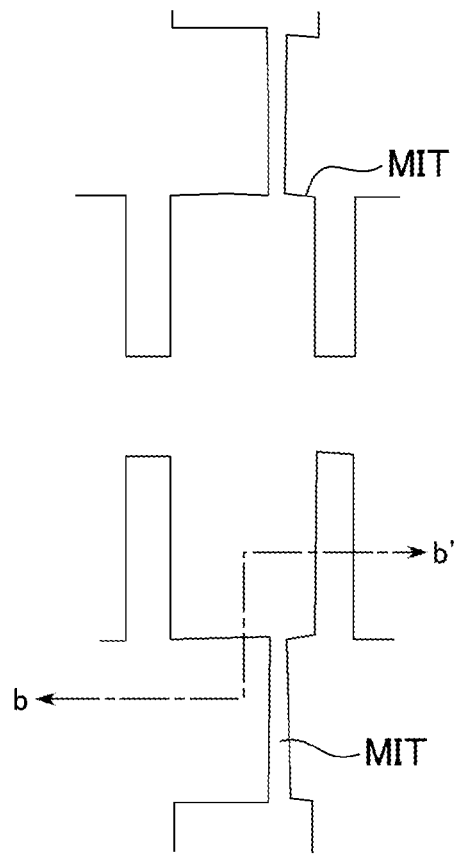
FIG. 68A is a plan view of one pixel in the liquid crystal panel according to the tenth embodiment when a first photo-process is completed.
Figure 68B:
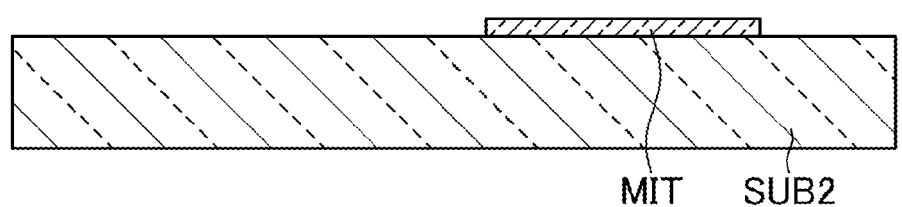
FIG. 68B is a sectional view taken along a line b-b' shown in FIG. 68A.

FIG. 68A is a plan view of one pixel region, when a first photo-process is completed, and FIG. 68B is a sectional view taken along line b-b' in FIG. 68A. The transparent storage capacitance electrode MIT is patterned by the first photo-process after being formed on the second transparent substrate SUB2 by sputtering. After a transparent electrode material is formed, a photo-etching process is performed to the transparent electrode material to thereby form the transparent storage capacitance electrode MIT. The transparent storage capacitance electrode MIT has generally a rectangular shape in each pixel region, and has a connection portion that is connected in the longitudinal direction of the gate lines GL and in the longitudinal direction of the data lines DL.

Figure 69A:
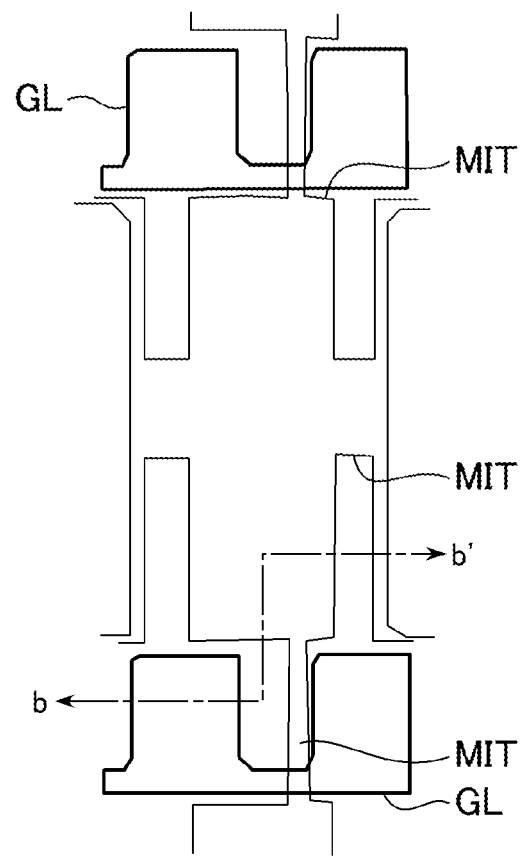
FIG. 69A is a plan view of one pixel in the liquid crystal panel according to the tenth embodiment when a second photo-process is completed.
Figure 69B:
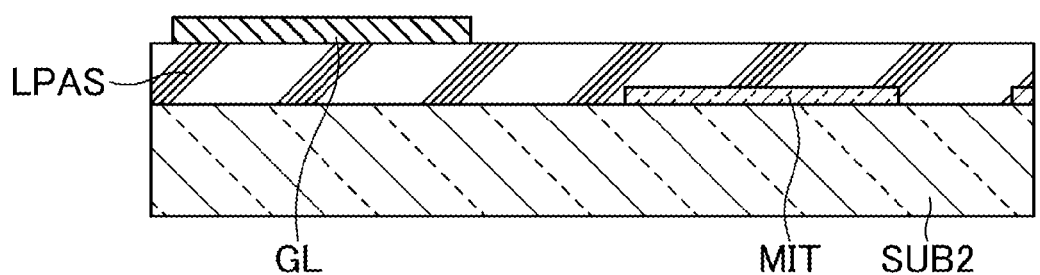
FIG. 69B is a sectional view taken along a line b-b' shown in FIG. 69A.

FIG. 69A is a plan view of one pixel region, when a second photo-process is completed, and FIG. 69B is a sectional view taken along line b-b' in FIG. 69A. The lower insulating film LPAS is formed on the transparent storage capacitance electrode MIT by CVD. The gate lines GL are formed on the lower insulating film LPAS by sputtering, and then, patterned by the second photo-process. The connection portion of the transparent storage capacitance electrode MIT overlaps the gate line GL in a plan view. The first and second photo-processes described above are similar to those in the tenth embodiment.

Figure 70A:
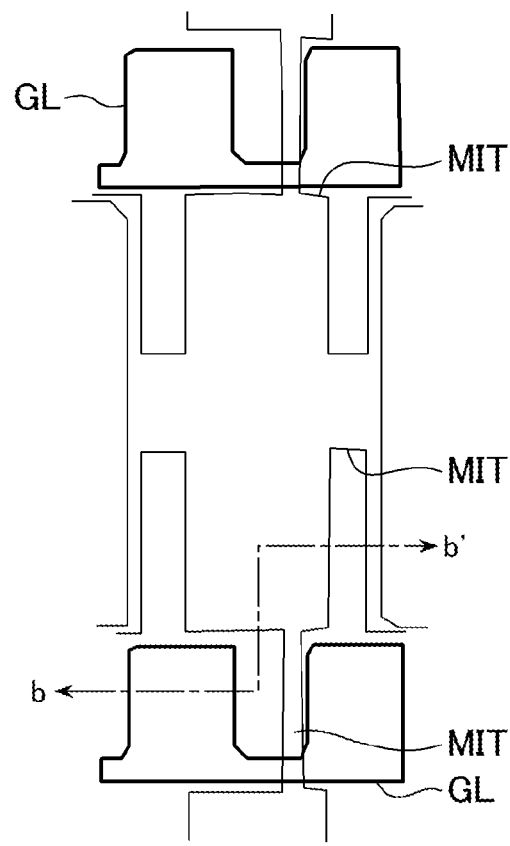
FIG. 70A is a plan view of one pixel in the liquid crystal panel according to the tenth embodiment when three layers are stacked after the step shown in FIG. 69
Figure 70B:
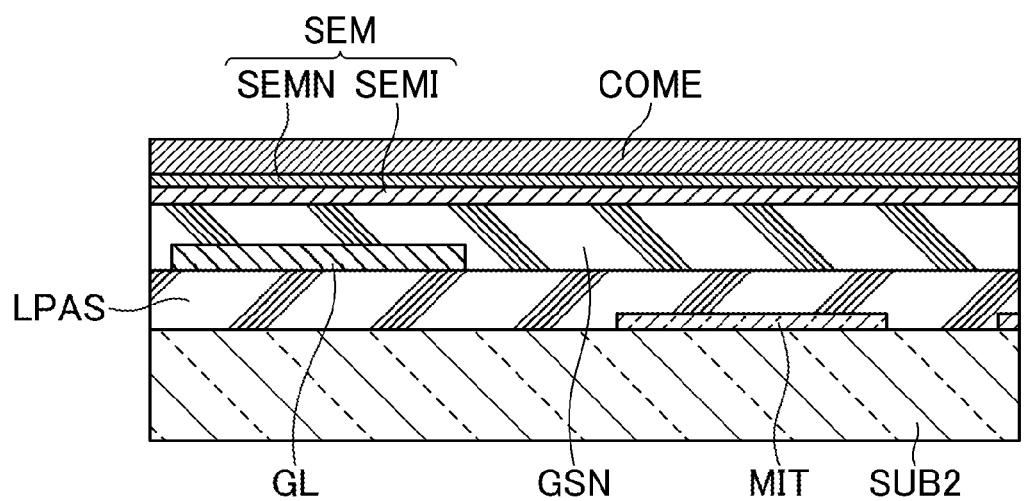
FIG. 70B is a sectional view taken along a line b-b' shown in FIG. 70A.

FIGS. 70A and 70B illustrate the state in which, after the completion of the second photo-process, the gate insulating film GSN and the semiconductor layer SEM are stacked on the gate lines GL by chemical vapor deposition CVD, and a COME is further formed on the semiconductor layer SEM by sputtering. The semiconductor layer SEM is a stacked body including a low concentration amorphous silicon layer SEMI including few N-type semiconductor, and an N-type semiconductor amorphous silicon layer SEMN to which phosphor is doped in high concentration. Molybdenum Mo is formed on the N-type semiconductor layer SEMN with the second transparent substrate SUB2 being heated. A silicide layer COSI (illustrated in FIG. 71) is formed with the film formation involving the heating process. Although not illustrated in FIG. 70, the molybdenum Mo is removed by wet etching, and the silicide layer COSI serving as a reaction layer remains as a surface layer.

Figure 71A:
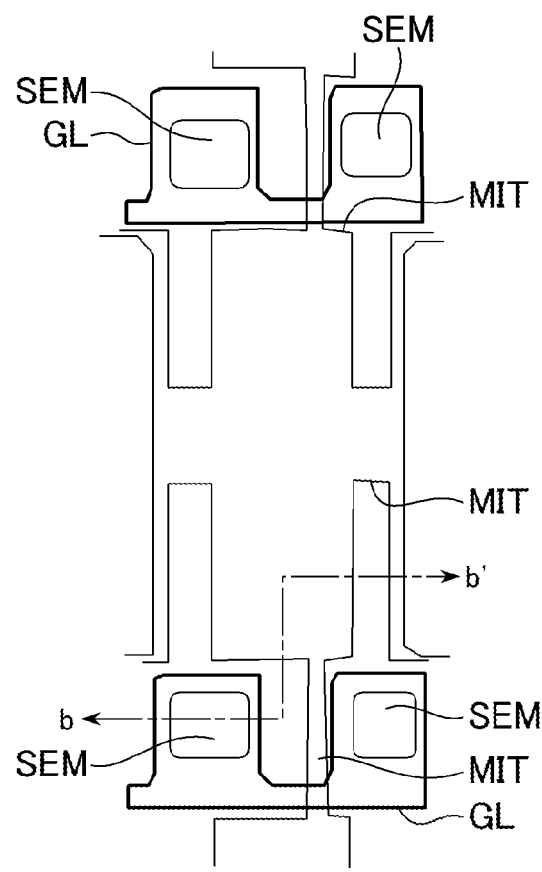
FIG. 71A is a plan view of one pixel in the liquid crystal panel according to the tenth embodiment when a third photo-process is completed.
Figure 71B:
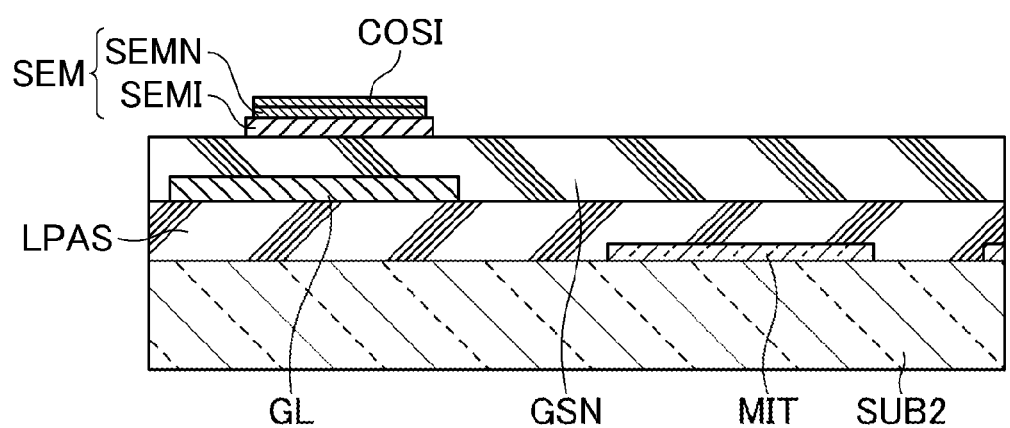
FIG. 71B is a sectional view taken along a line b-b' shown in FIG. 71A.

FIG. 71A is a plan view of one pixel region when a third photo-process is completed, and FIG. 71B is a sectional view taken along line b-b' in FIG. 71A. After molybdenum Mo is removed, a photoresist is applied on the silicide layer COSI. Then, an exposure and development are performed by using a photomask, and the silicide layer COSI and the semiconductor layer SEM are removed by etching to form an island pattern. The silicide layer COSI reduces connection resistance between the transparent pixel electrode PIT and the semiconductor layer SEM during the later-described formation of the transparent pixel electrode PIT, thereby being capable of extracting satisfactory on/off performance as the TFT. If this silicide layer COSI is not formed, an oxide film is formed on the surface of the semiconductor layer SEM due to a supply of oxygen from the transparent pixel electrode PIT, which causes insufficient connection performance.

Figure 72A:
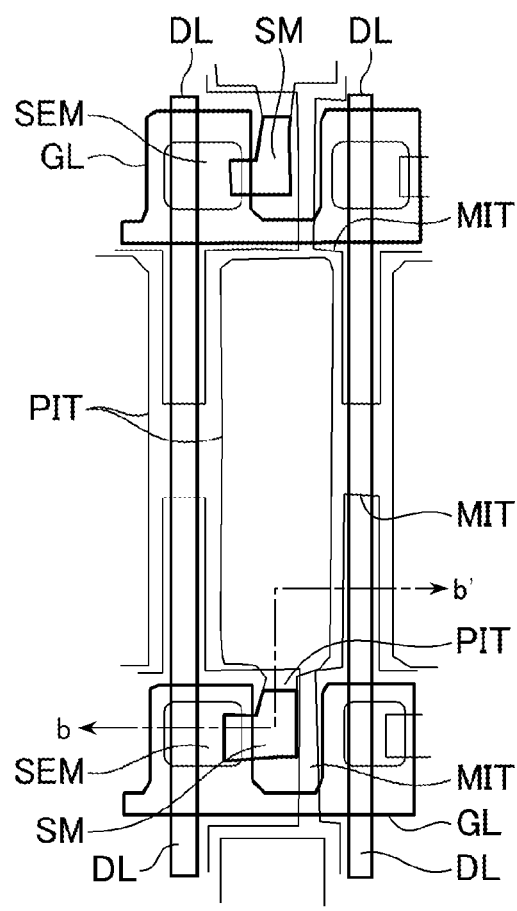
FIG. 72A is a plan view of one pixel in the liquid crystal panel according to the tenth embodiment when a fourth photo-process is completed.
Figure 72B:
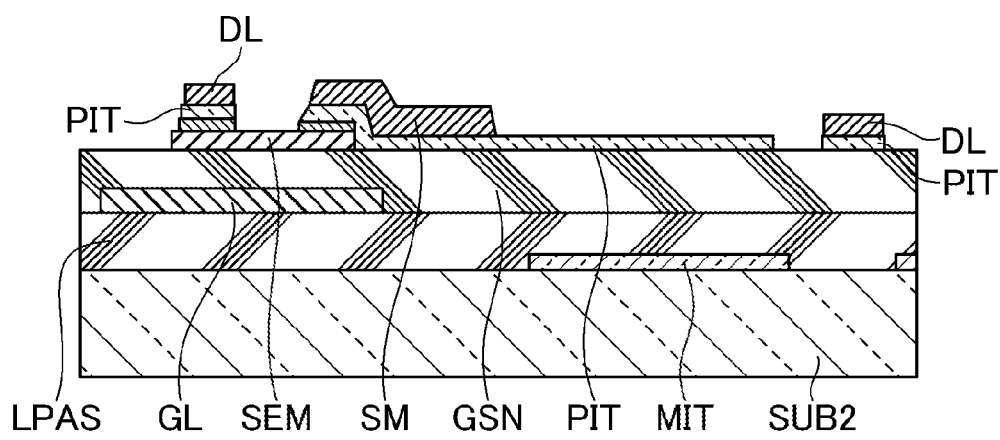
FIG. 72B is a sectional view taken along a line b-b' shown in FIG. 72A.

FIG. 72A is a plan view of one pixel region when a fourth photo-process is completed, and FIG. 72B is a sectional view taken along line b-b' in FIG. 72A. A transparent electrode material is formed on the semiconductor layer SEM, on which the silicide layer COSI is formed, by sputtering. Then, a line material for a stacked film of molybdenum Mo and copper Cu are formed thereon by sputtering.

A photoresist is applied on the material of the metal line, and the material of the metal line and the transparent electrode material are processed by using a photomask. A halftone mask is used as the photomask during the exposure process, whereby the transparent electrode material and the material of the metal line can be separated into a region where both materials are left as a pattern and a region where only the transparent electrode material is left. The transparent electrode material is always present below the region of the data line DL and the source electrode SM. The region where only the transparent electrode material is left is an opening that has a function as the transparent pixel electrode PIT to drive the liquid crystal layer LC and form a transmittance region. The channel separation between the data line DL and the source electrode SM is realized by removing the silicide layer COSI and the N-type semiconductor layer SEMN by etching with this resist pattern. The silicide layer COSI illustrated in FIG. 71B serves to satisfactorily keep the connection between the transparent pixel electrode PIT, which is made of the transparent electrode material, and the semiconductor layer SEM.

Figure 73A:
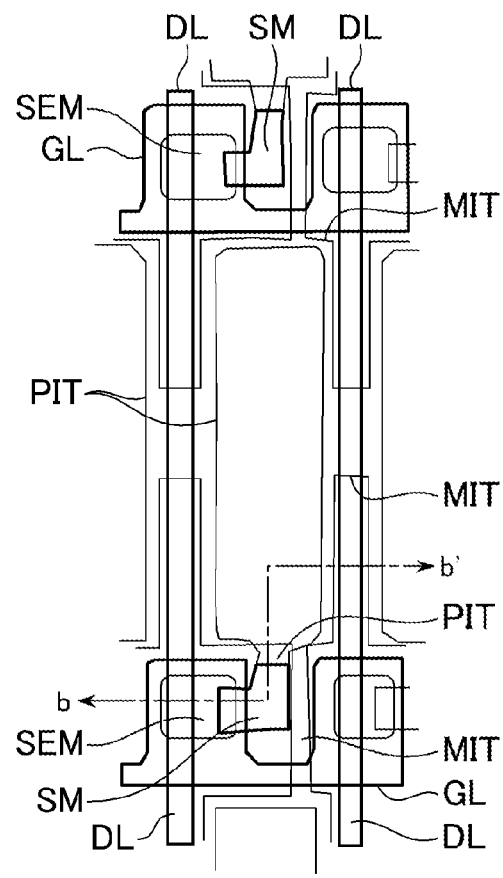
FIG. 73A is a plan view of one pixel in the liquid crystal panel according to the tenth embodiment when a fifth photo-process is completed.
Figure 73B:
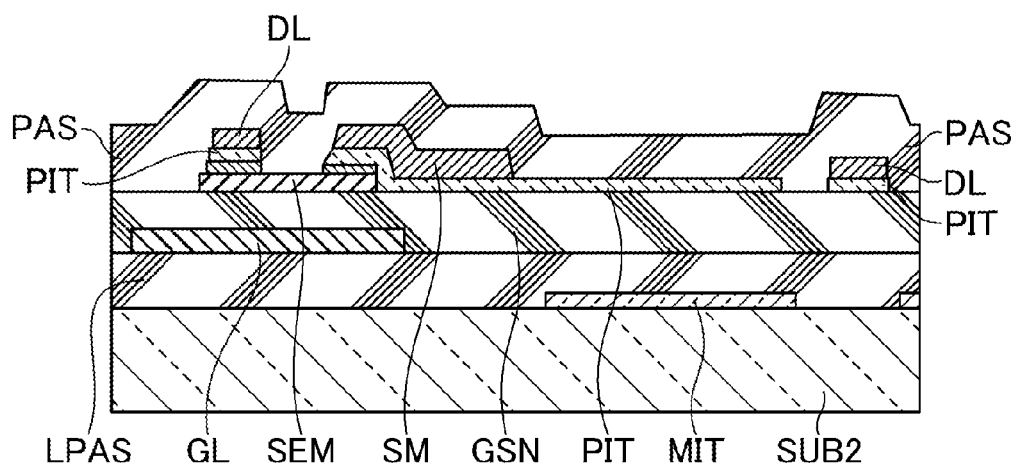
FIG. 73B is a sectional view taken along a line b-b' shown in FIG. 73A.

FIG. 73A is a plan view of one pixel region, when a fifth photo-process is completed, and FIG. 73B is a sectional view taken along line b-b' in FIG. 73A. The protection insulating film PAS is formed on the transparent pixel electrode PIT. The fifth photo-process is a photo-etching process for forming an opening on the protection insulating film PAS. The opening is not formed in the screen region DIA in FIG. 73, but it is a contact hole for connecting the gate lines GL or the data lines DL to the transparent common electrode CIT at the outer peripheral region of the screen region DIA.

Figure 74A:
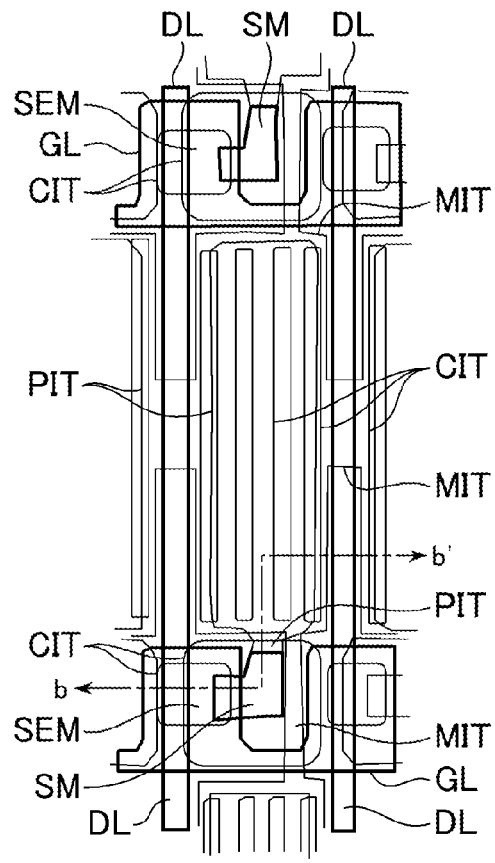
FIG. 74A is a plan view of one pixel in the liquid crystal panel according to the tenth embodiment when a sixth photo-process is completed.
Figure 74B:
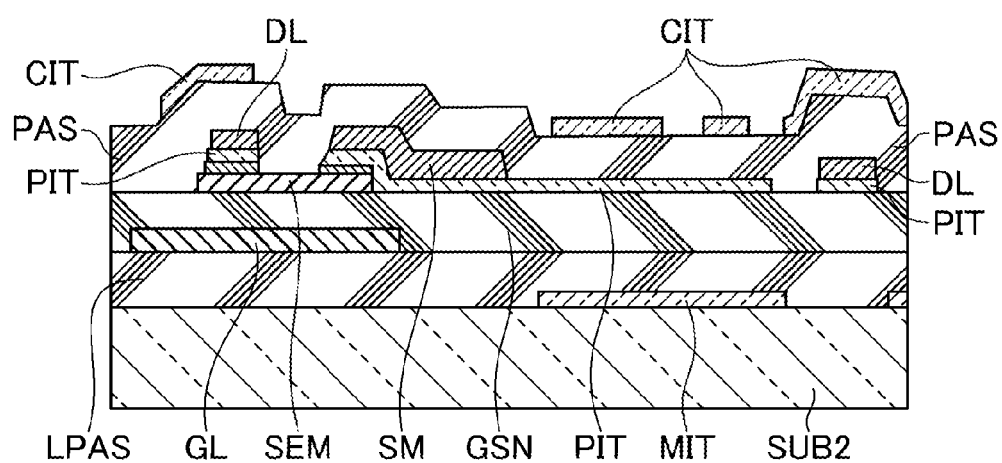
FIG. 74B is a sectional view taken along a line b-b' shown in FIG. 74A.

FIG. 74A is a plan view of one pixel region when a sixth photo-process is completed, and FIG. 74B is a sectional view taken along line b-b' in FIG. 74A. After indium tin oxide ITO that is a material for the transparent conductive film is formed on the protection insulating film PAS, the transparent common electrode CIT is formed by the photo-etching process.

As described above, the processing of the second transparent substrate SUB2 in the liquid crystal display device according to the present tenth embodiment is completed through six photo-etching processes in total.

Eleventh Embodiment

Referring to FIGS. 75~87, a liquid crystal panel of a eleventh embodiment will be described.

Figure 75:
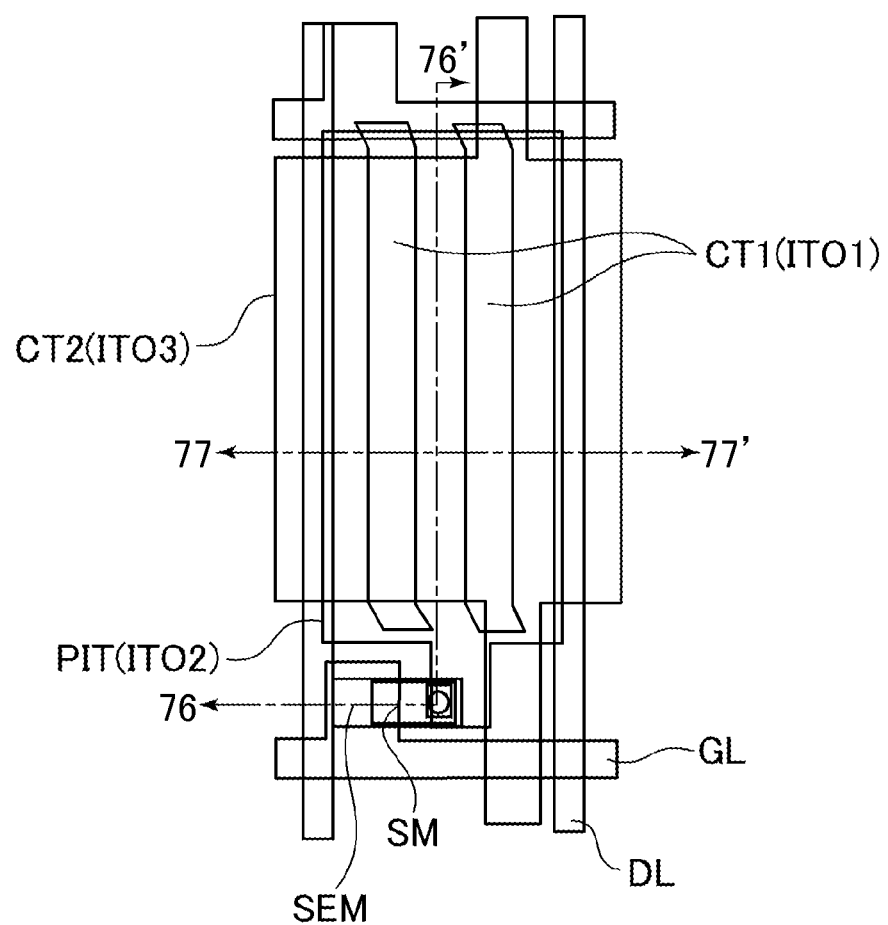
FIG. 75 is a detailed plan view illustrating one pixel region in a liquid crystal display according to an eleventh embodiment.
Figure 76:
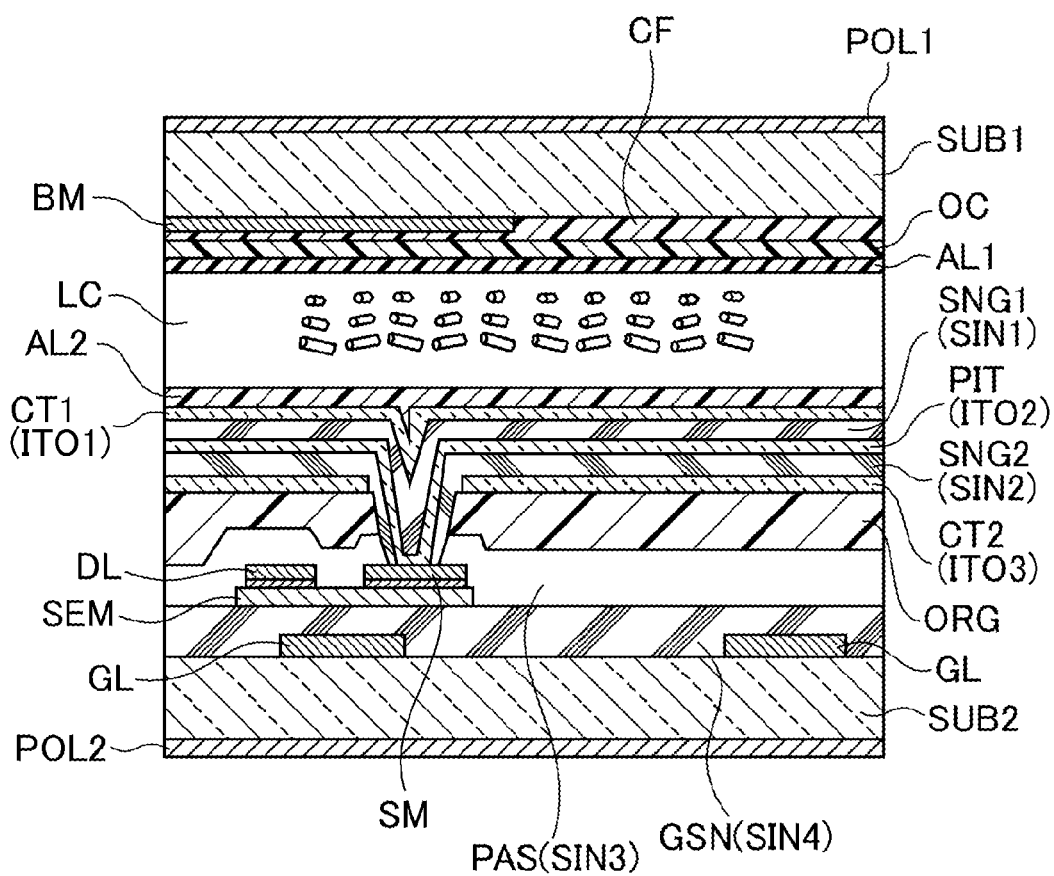
FIG. 76 is a sectional view taken along a line 76-76' shown in FIG. 75.
Figure 77:
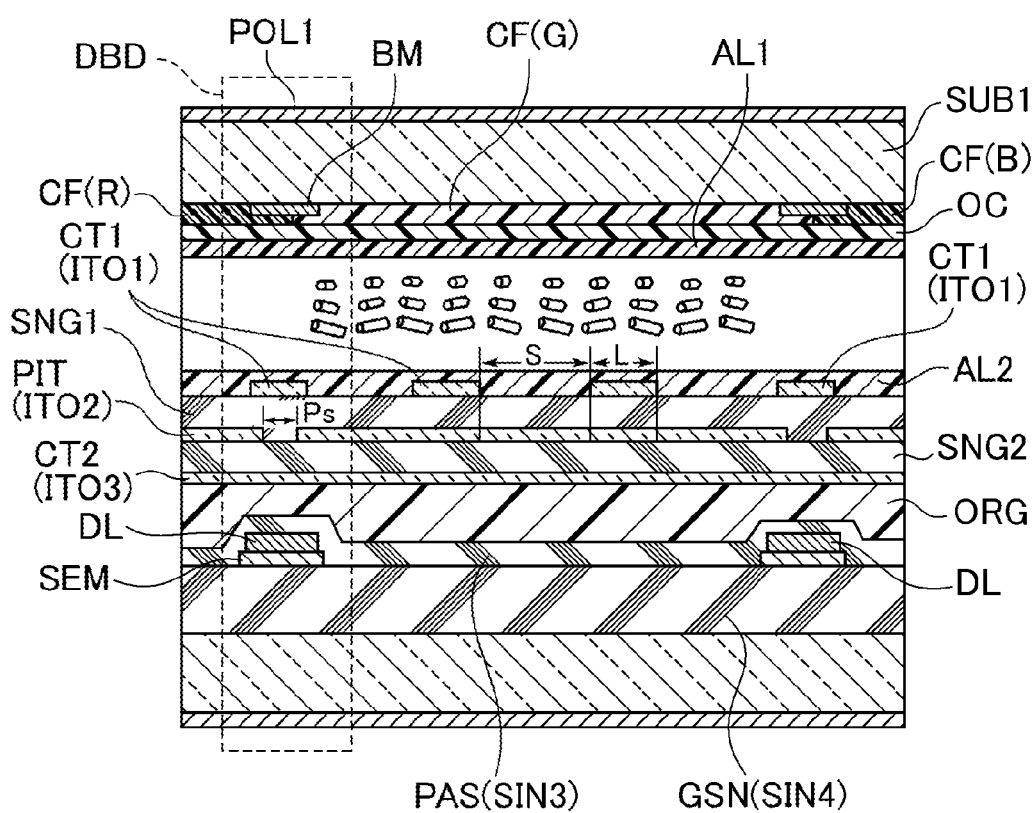
FIG. 77 is a sectional view taken along a line 77-77' shown in FIG. 75.

FIG. 75 is a detailed plan view illustrating one pixel region, FIG. 76 is a sectional view taken along line 76-76' in FIG. 75, and FIG. 77 is a sectional view taken along line 77-77' in FIG. 75.

FIG. 75 is a plan view illustrating a thin-film transistor TFT, a region of one pixel enclosed by gate lines GL and data lines DL, and the region including the neighboring pixels adjacent to this pixel region, all of which are illustrated in FIG. 1. FIG. 75 illustrates the planar arrangement and functions of the components. Each of the gate lines GL is made of a low-resistance metal layer. The gate lines GL are connected to the scanning line drive circuit in FIG. 1, and a scanning-voltage is applied to the gate lines GL from the scanning line drive circuit. On the other hand, each of the data lines DL is also made of a low-resistance metal layer, and video-signal voltage is applied to the data lines DL. When a scanning-voltage that turns on a gate is applied to the gate lines GL, a semiconductor layer SEM of the thin-film transistor becomes a low-resistance state, whereby the video-signal voltage of the data lines DL is applied to a source electrode SM made of a low-resistance metal layer, and also applied to a transparent pixel electrode PIT (ITO2) connected to the source electrode SM via a contact hole. Since the transparent electrode material used for the transparent pixel electrode PIT is used not only for the transparent pixel electrode PIT but also a terminal portion used for the connection to an external device of a liquid crystal display panel, this transparent electrode material is referred to as ITO2.

A common voltage, which is another voltage applied to a liquid crystal layer LC, is applied to a first transparent common electrode CT1 (ITO1) from the common electrode drive circuit in FIG. 1 via a common electrode metal line MSL. The first transparent common electrode CT1 (ITO1) is made of a first transparent electrode material ITO1. The transparent pixel electrode PIT (ITO2) and the first transparent common electrode CT1 (ITO1) are stacked with an insulating film interposed therebetween. In addition, the first transparent common electrode CT1 (ITO1) is formed with a slit in one pixel region. This slit is formed such that an electric field from the transparent pixel electrode PIT reaches the first transparent common electrode CT1 (ITO1) from the upper surface via the liquid crystal layer LC. This electric field drives the liquid crystal layer LC, whereby a display is realized.

On the other hand, a second transparent common electrode CT2 (ITO3) is connected to the common electrode drive circuit illustrated in FIG. 1, and the common voltage is applied to the second transparent common electrode CT2 from the common electrode drive circuit. The second transparent common electrode CT2 (ITO3) is stacked on the transparent pixel electrode PIT (ITO2) with an insulating film interposed therebetween to form a storage capacitance STG. As described above, in the present embodiment, the first transparent common electrode CT1 (ITO1) having the slit, the transparent pixel electrode PIT (ITO2), and the second transparent common electrode CT2 (ITO3) are formed in the pixel region. The above three transparent electrode material layers ITO1, ITO2, and ITO3 are formed by different processes during the manufacturing process.

The first transparent common electrode CT1 (ITO1) corresponds to a second common electrode in the liquid crystal display device according to the present application, and the second transparent common electrode CT2 (ITO3) corresponds to a first common electrode in the liquid crystal display device according to the present application.

FIG. 76 is a sectional view taken along line 76-76' in FIG. 75. The components, their functions, and used materials in the cross-sectional structure will be described.

A gate insulating film GSN is formed on the gate lines GL. A semiconductor layer SEM is disposed to be processed into an island shape on the gate line GL.

The data line DL and the source electrode SM are formed to apply the video-signal voltage to the semiconductor layer SEM.

A protection insulating film PAS is formed on the data line DL and the source electrode SM. An interlayer insulating film ORG is formed on the protection insulating film PAS. A photosensitive organic material including acryl as a main composition is used for the interlayer insulating film ORG. The organic material has a relative dielectric constant of 4 or less, which is lower than 6.7 of silicon nitride. The organic material can be formed to be thicker than silicon nitride due to the manufacturing process. In the present embodiment, the thickness of the organic material is set to be 1.5 μm to 3 μm.

According to the interlayer insulating film ORG having reduced relative dielectric constant and increased thickness, the wiring capacitance formed by the capacitance between the second transparent common electrode CT2 (ITO3) and the data line DL or the gate line GL can significantly be reduced. Accordingly, it is obvious that a wiring delay of the second transparent common electrode CT2 that uses the transparent conductive film material ITO3 having relatively high resistance can also be reduced. Consequently, a liquid crystal display device having relatively a large screen can be obtained, even if a low-resistance metal line is not formed and connected to the second transparent common electrode CT2 (ITO3).

A set of the protection insulating film PAS and the interlayer insulating film ORG corresponds to a third insulating film in a liquid crystal display device according to the present application, and the interlayer insulating film ORG corresponds to an organic insulating film in the liquid crystal display device according to the present application.

The second transparent common electrode CT2 forms the storage capacitance STG in the pixel region with the transparent pixel electrode PIT (ITO2) formed with the second insulating film SNG2 (SIN2) interposed therebetween. The storage capacitance STG can prevent the attenuation of the video-signal voltage, applied with the thin-film transistor TFT being turned on, during the storage operation period.

The second insulating film SNG2 (SIN2) corresponds to a first insulating film in the liquid crystal display device according to the present application.

The transparent pixel electrode PIT (ITO2) is electrically connected to the source electrode SM via the contact hole formed on the protection insulating film PAS, the interlayer insulating film ORG, and the second insulating film SNG2. The transparent pixel electrode PIT has a closed planar pattern in each pixel region separated by the gate lines GL and the data lines DL, which are arranged in a matrix. When a scanning-voltage that turns on a gate is applied to the gate lines GL, the semiconductor layer SEM becomes a low resistance state, whereby the video-signal voltage is applied to the transparent pixel electrode PIT via the source electrode SM from the data lines DL. Each pixel region is charged by the potential difference between the video-signal voltage applied to the transparent pixel electrode PIT and the common voltage applied to the first transparent common electrode CT1 and the second transparent common electrode CT2.

The first insulating film SNG1 (SIN1) corresponds to a second insulating film in the liquid crystal display device according to the present application.

The first transparent common electrode CT1 (ITO1) is disposed on the transparent pixel electrode PIT with the protection insulating film PAS interposed therebetween. In general, holding characteristics are maintained by the capacitance formed by the stacked structure of the first transparent common electrode CT1 and the transparent pixel electrode PIT. However, in the present embodiment, the storage capacitance can be increased between the transparent pixel electrode PIT and the second transparent common electrode CT2, whereby more satisfactory holding characteristics can be maintained. Thus, a liquid crystal display device with excellent image quality can be provided.

FIG. 77 is a sectional view taken along line 77-77' in FIG. 75. FIG. 77 is a sectional view of three pixels with the data line DL being defined as a border. The pixel at the center corresponds to a green color filter CF(G) in a color filter CF disposed in a vertical stripe shape. The pixels at the left and at the right of the pixel at the center correspond to a red color filter CF(R) and a blue color filter CF(B), respectively. A black matrix BM is disposed on the inner surface of a first transparent substrate SUB1 on the border of the pixel regions, where the data line DL is located, across the liquid crystal layer LC.

In FIG. 77, the cross-sectional structure is divided into two regions that are a pixel shielding region where the black matrix BM or the data line DL is located, and an opening region that transmits light. The structure and operation of the opening region will firstly be described.

In the opening region, the video-signal voltage and the common voltage are respectively applied to the transparent pixel electrode PIT (ITO2) and the transparent common electrode CT1, and an electric field generated between these electrodes is applied to the liquid crystal layer LC. The intensity of the elliptically polarized light in the liquid crystal layer LC is changed due to the intensity of the electric field, whereby transmittance is controlled to realize a tone image. Since the liquid crystal display device according to the present embodiment is a liquid crystal display device of an in-plane switching (IPS) system, it is set such that the transmittance becomes the maximum to provide a white image, when the maximum potential difference is applied. When the potential difference between the transparent pixel electrode PIT and the first transparent common electrode CT1 is decreased, the transmittance is reduced to provide a black image. The maximum transmittance when the maximum potential difference is applied may merely be referred to as transmittance.

Liquid crystal molecules LCM made of an organic material are filled in the liquid crystal layer LC. The long axes of the liquid crystal molecules LCM are aligned on the surface of an orientation film AL1 disposed on the inner surface of the first transparent substrate SUB1 and the surface of an orientation film AL2 disposed on the inner surface of the second transparent substrate SUB2 by an orientation process. In the first transparent common electrode CT1 having a plurality of slits, the electrode width is L, and the space between the electrodes is S. The transparent pixel electrode PIT is present below the slit, which is the slit width S, with the protection insulating film PAS interposed therebetween. Therefore, when the potential difference between the transparent pixel electrode PIT and the first transparent common electrode CT1 increases, the electric field having electric line of force folded in the liquid crystal layer LC is formed. The maximum electric field region is formed on the border of the electrode width L and the slit width S, which is the slit, of the first transparent common electrode CT1. Therefore, the rotation of the liquid crystal molecules LCM increases around the border of the electrode width L and the slit width S, so that transmittance is increased. On the contrary, the electric field is weak around the center of the electrode width L or the slit width S, so that the rotation of the liquid crystal molecules LCM decreases around this region, and the transmittance is decreased. Specifically, the pixel region has a transmittance distribution in the transverse direction in the sectional view in FIG. 77. Therefore, when the width L or the slit width S of the first transparent common electrode CT1 is increased, the electric field around the center of the electrode width L or the slit width S is decreased, so that the transmittance is reduced. Therefore, the electrode width L and the slit width S, which is the slit, of the first transparent common electrode CT1 has to be finely set in consideration of the thickness of the liquid crystal layer LC.

In order to realize a bright liquid crystal display device with low power consumption, the width of the black matrix BM or the width of the data line DL has to be decreased, the black matrix BM and the data line DL being a light shielding region of a data line DL on the border of the pixel regions. With this, the aperture ratio can be increased. In addition, the width of the transparent pixel electrode PIT has to be increased to the light shielding region in order to increase the driving region of the liquid crystal layer LC. Specifically, the distance Lds between the transparent pixel electrode PIT and the adjacent data line DL has to be decreased. In addition, it is necessary to consider that, in the transmittance distribution in the transverse direction in one pixel, the transmittance at the border of the electrode width L and the slit width S, which is the slit, of the first transparent common electrode CT1 becomes the maximum, and the transmittance in the vicinity of the center of the electrode width L and the slit width S which is the slit is low.

Figure 78:
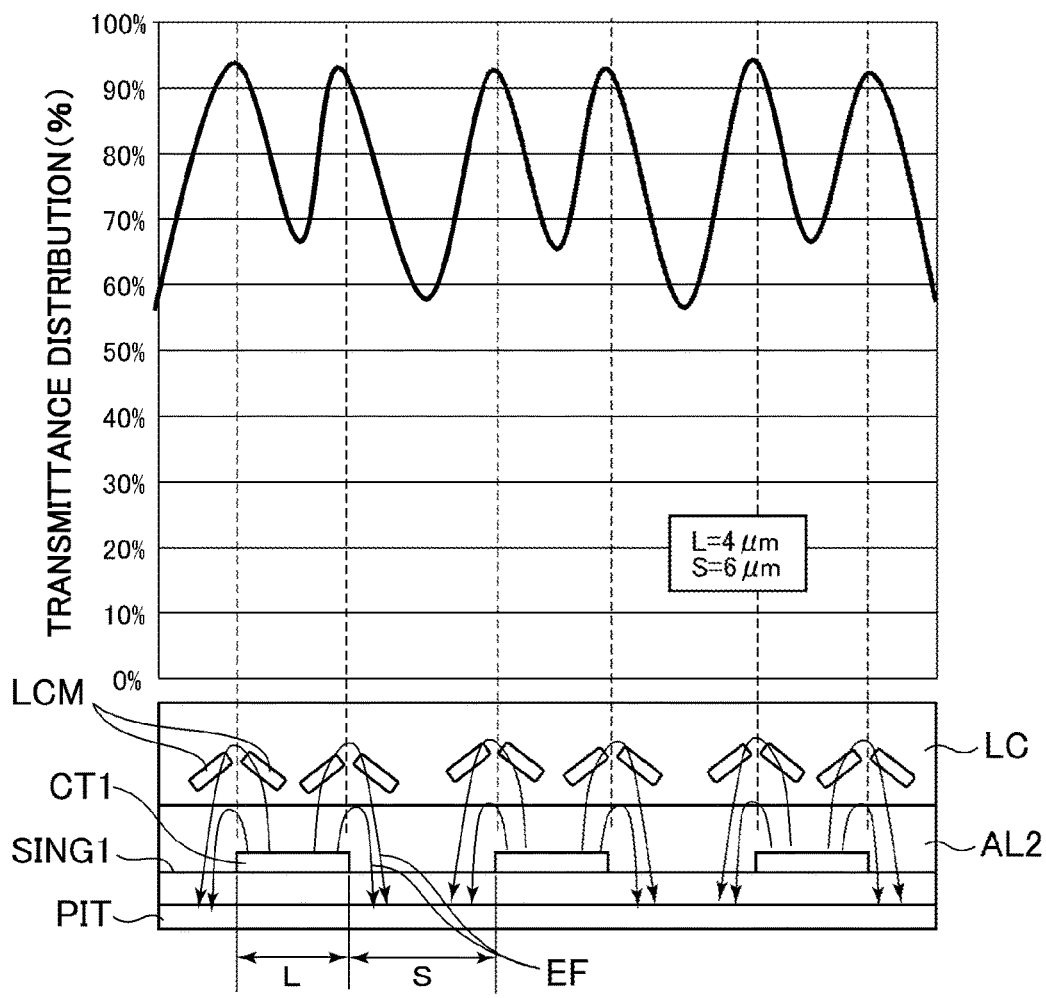
FIG. 78 is a diagram illustrating a calculation result of a transmittance distribution in opening regions shown in FIG. 77.

FIG. 78 illustrates a calculation result of the transmittance distribution in the opening region in FIG. 77. The electrode width L and the slit width S, which is the slit, of the first transparent common electrode CT1 are respectively 4 μm and 6 μm as illustrated in FIG. 77 in the present embodiment.

The transmittance is periodically increased and decreased in the transverse direction of the sectional structure. The transmittance is a relative value. The maximum transmittance is obtained at the end of the first transparent common electrode CT1. The electric field EF from the first transparent common electrode CT1 to the transparent pixel electrode PIT via the liquid crystal layer LC becomes the maximum at the end of the transparent common electrode CT1. On this portion, the rotation angle of the liquid crystal molecules in the liquid crystal layer LC becomes the maximum, so that the transmittance becomes the maximum. The portion where the transmittance is decreased is in the vicinity of the center of the electrode width L and the vicinity of the center of the slit width S, which is the slit, of the first transparent common electrode CT1. In this portion, the electric field EF becomes weak. The reason why the transmittance is the minimum in the vicinity of the center of the slit width S is because the intensity of the electric field EF is low.

Therefore, in order to enhance the transmittance, the portion where the electric field EF is strong is densely formed. Specifically, the electrode width L and the slit width S of the first transparent common electrode CT1 has to be set as small as possible within the range where the electric field can be formed between the upper and lower electrodes. In order to keep the relative transmittance illustrated in FIG. 78 as 50% or higher at all times, the first transparent common electrode CT1 has to be formed such that the electrode width L and the slit width S are equal to each other as much as possible.

Attention has to be similarly paid to the relationship described above for the light shielding region around the black matrix BM and the data line DL, the light shielding region greatly affecting the aperture ratio of the pixel region.

Figure 79A:
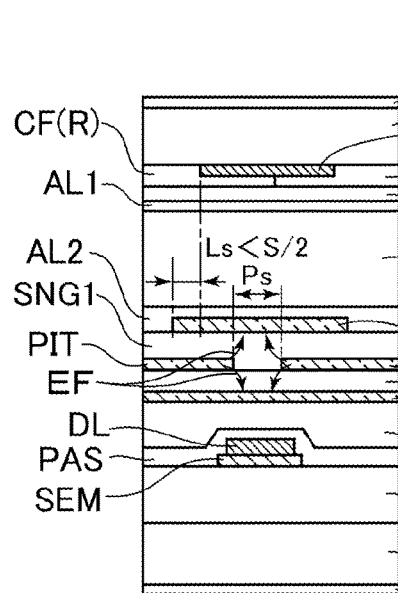
FIGS. 79A and 79B are sectional views around the data line shown in FIG. 77.
Figure 79B:
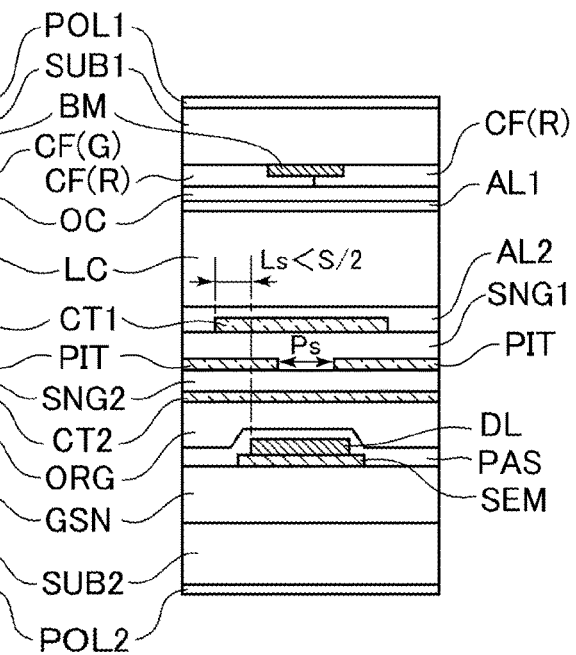
Figures 80A, 80B:
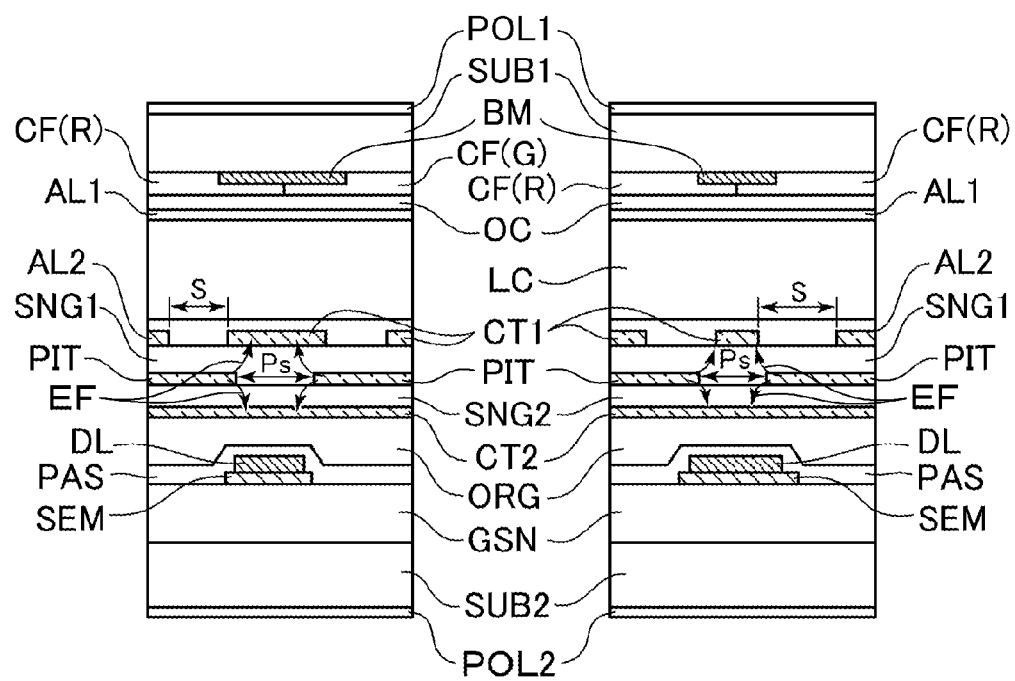
FIGS. 80A and 80B are sectional views around the data line shown in FIG. 77.

The structure of the pixel light shielding region of the black matrix BM or the data line DL will next be described. FIGS. 79 and 80 are sectional views illustrating the detail of the border between the adjacent pixels in a dotted frame in FIG. 77.

In order to improve the aperture ratio and transmittance, it is necessary to set a size of each electrode in the light shielding region illustrated in FIGS. 79 and 80 within a range not increasing other factors adversely affecting the display performance of the liquid crystal display device.

The factors for deteriorating the display performance include an influence of a wiring electric field in which an electric field generated from the data lines or gate lines leaks to the display region, an increase in coupling capacitance between each line and the pixel electrode due to the wiring electric field, an influence of an electric field leaking from the pixel electrode to the adjacent pixel region, and an increase in coupling capacitance between the adjacent pixel electrodes due to the electric field from the pixel electrode.

As illustrated in FIGS. 79 and 80, the second transparent common electrode CT2 superimposed on the whole surface of the display region with the protection insulating film PAS and the interlayer insulating film ORG interposed therebetween on the data line DL becomes a countermeasure against the wiring electric field in the present embodiment. The electric field from the data line DL is shielded by the relatively thick layer having the protection insulating film PAS and the interlayer insulating film ORG, and the second transparent common electrode CT2 formed thereon. Therefore, the electric field from the data line DL does not reach the liquid crystal layer LC. The generation of coupling capacitance between the data line DL and the transparent pixel electrode PIT is also prevented. The same applies to the gate line GL.

A countermeasure against the electric field from the pixel electrode will next be described. In order to increase the aperture ratio, it is preferable to increase the area of the transparent pixel electrode PIT in each pixel region as much as possible to decrease the distance Ps between the transparent pixel electrodes in the adjacent pixel regions. On the other hand, when the distance Ps between the adjacent pixel electrodes is decreased, coupling capacitance increases between the adjacent pixel electrodes.

In the present embodiment, the first transparent common electrode CT1 is disposed above the distance Ps on the border between the adjacent transparent pixel electrodes PIT, and the second transparent common electrode CT2 is disposed below the distance Ps. The thickness of the first insulating film SNG1 and the second insulating film SNG2 disposed above and below the transparent pixel electrode PIT is smaller (thinner) than the distance Ps. Therefore, the electric field EF generated from the transparent pixel electrode PIT directs toward the first transparent common electrode CT1 and the second transparent common electrode CT2, which are closer to the transparent pixel electrode PIT than the adjacent transparent pixel electrode, whereby the electric field directing toward the adjacent transparent pixel electrode is reduced. Accordingly, the coupling capacitance between the adjacent two pixel electrodes is difficult to be generated, which results in that the distance Ps can be decreased as much as possible. Consequently, the area of the transparent pixel electrode PIT in each pixel region can be increased as much as possible, which can contribute to an improvement of the aperture ratio.

Since the first transparent common electrode CT1 is disposed at the position superimposed with the portion between the adjacent two transparent pixel electrodes, the electric field from the transparent pixel electrode PIT can be shielded, whereby the leakage of the electric field to the liquid crystal layer LC in the adjacent pixel region can be prevented.

In order to further increase the transmittance, the dimensional relationship among the first transparent common electrode CT1, the black matrix BM, and the data line DL is also important as described above.

Part (a) of FIG. 79 illustrates the case where the black matrix BM in the light shielding region is wider than the data line DL (i.e., the black matrix BM serves as a light shielding region). This configuration is preferable for a high definition liquid crystal display device having a small screen size in which the wiring delay of the data line DL hardly becomes the problem.

The protruding size Ls of the first transparent common electrode CT1 wider than the black matrix BM (i.e., the distance between the edge of the slit of the first transparent common electrode CT1 and the edge of the black matrix BM in a plan view) is set to be smaller than a half of the slit width S, which is the slit of the first transparent common electrode CT1 and which is an unillustrated opening. Specifically, the opening of the pixel is formed just before the edge of the black matrix BM, whereby the transmittance can be maintained to be high. Accordingly, the configuration described above can realize not only a high aperture ratio but also high transmittance, whereby a bright liquid crystal display device with low power consumption can be provided.

Part (b) of FIG. 79 illustrates the case where the data line DL is wider than the black matrix BM in the similar cross-sectional structure (i.e., the data line DL has a function of the light shielding region). In this case, the protruding size Ls of the first transparent common electrode CT1 from the data line DL (i.e., the distance between the edge of the slit of the first transparent common electrode CT1 and the edge of the data line DL in a plan view) is set to be smaller than a half of the slit width S, which is the slit of the first transparent common electrode CT1 and which is an unillustrated opening. Specifically, the opening portion of the pixel is formed just before the edge of the data line DL, whereby the transmittance can be maintained to be high. Consequently, the aperture ratio of the opening portion can be maximized.

FIG. 80 illustrates the case where the space between the first transparent common electrodes CT1 on the data line DL is smaller than the black matrix BM or the data line DL.

In the case of FIG. 80, the end of the first transparent common electrode CT1 is inside the light shielding region formed by the black matrix BM or the data line DL, whereby the transmittance in the opening portion is enhanced.

Part (a) of FIG. 80 illustrates the case in which the relationship of black matrix BM>data line DL is established as in part (a) of FIG. 79, and the black matrix BM has a function of a light shielding film. In part (a) of FIG. 80, the space between the first transparent common electrodes CT1 above the data line DL is set smaller than the black matrix BM.

In this configuration, the area of the overlapping portion between the end of the first transparent common electrode CT1 and the transparent pixel electrode PIT on the data line DL is smaller than that in the configuration illustrated in part (a) of FIG. 79. Therefore, storage capacitance between the end of the first transparent common electrode CT1 and the transparent pixel electrode PIT is difficult to be formed. However, the distance Ps between the end of the first transparent common electrode CT1 and the transparent pixel electrode PIT above the data line DL (the thickness of the first insulating film SNG1) is smaller than the distance Ps between the adjacent two transparent pixel electrodes PIT. Therefore, this configuration has an effect of sufficiently reducing the coupling capacitance between the adjacent two transparent pixel electrodes PIT.

The slit of the first transparent common electrode CT1 is located at the end of the black matrix BM in the opening region. Therefore, the liquid crystal display device having high transmittance at the opening region can be provided.

Part (b) of FIG. 80 illustrates the case in which the relationship of black matrix BM<data line DL is established as in part (b) of FIG. 79, and the data line DL has a function of a light shielding film. In part (b) of FIG. 80, the width of the first transparent common electrodes CT1 above the data line DL is set smaller than the distance Ps between the adjacent transparent pixel electrodes PIT.

In this configuration, the first transparent common electrode CT1 and the transparent pixel electrode PIT are not directly overlapped with each other. Therefore, the storage capacitance between the end of the first transparent common electrode CT1 and the transparent pixel electrode PIT is more difficult to be formed than in the case illustrated in part (a) of FIG. 80. However, since the distance between the end of the first transparent common electrode CT1 and the transparent pixel electrode PIT above the data line DL (the thickness of the first insulating film SNG1) is sufficiently smaller than the distance Ps between the adjacent two transparent pixel electrodes PIT, the distance Ps between the end of the first transparent common electrode CT1 and the transparent pixel electrode PIT can be made smaller than the distance Ps between the adjacent two transparent pixel electrodes PIT. Therefore, this configuration also has the effect of sufficiently reducing the coupling capacitance between the adjacent two transparent pixel electrodes PIT.

Since the slit of the first transparent common electrode CT1 is located on the edge of the data line DL in the opening region, a liquid crystal display device having high transmittance at the opening region can be provided.

FIGS. 81A to 87B each illustrate a manufacturing process of the thin-film transistor TFT, the wiring region, and the opening region formed on the second transparent substrate SUB2 according to the present embodiment. FIGS. 81A, 82A, 83A, 84A, 85A, 86A, and 87A are plan views each illustrating one pixel region, and FIGS. 81B, 82B, 83B, 84B, 85B, 86B, and 87B are sectional views each taken along line b-b' in the corresponding plan view. FIGS. 81A to 87B each illustrate each photographic processing process (photo-process).

Figure 81A:
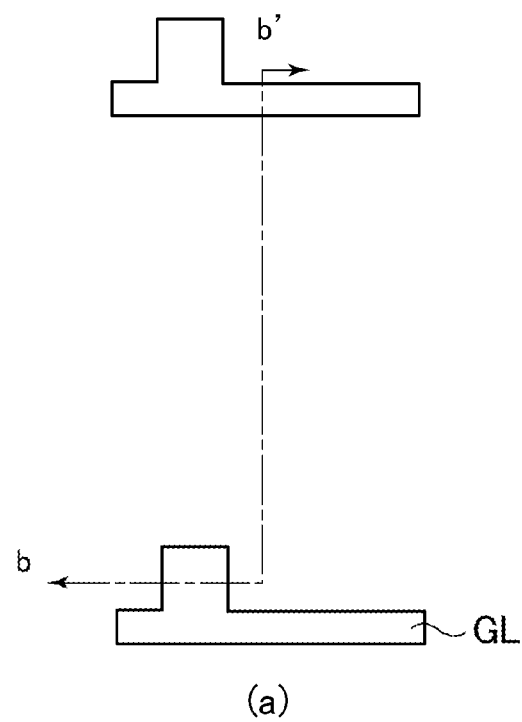
FIG. 81A is a plan view of one pixel in a liquid crystal display panel according to a twelfth embodiment when a first photo-process is completed.
Figure 81B:
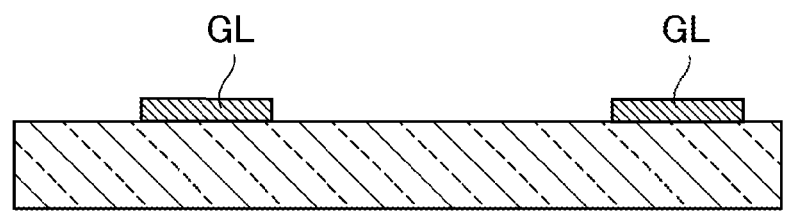
FIG. 81B is a sectional view taken along a line b-b' shown in FIG. 81A.

FIG. 81A is a plan view of one pixel region on the second transparent substrate SUB2, when a first photo-process is completed, and FIG. 81B is a sectional view taken along line b-b' in FIG. 81A. The adjacent gate lines GL are formed on the first transparent substrate by sputtering, and patterned by the first photo-process.

Figure 82A:
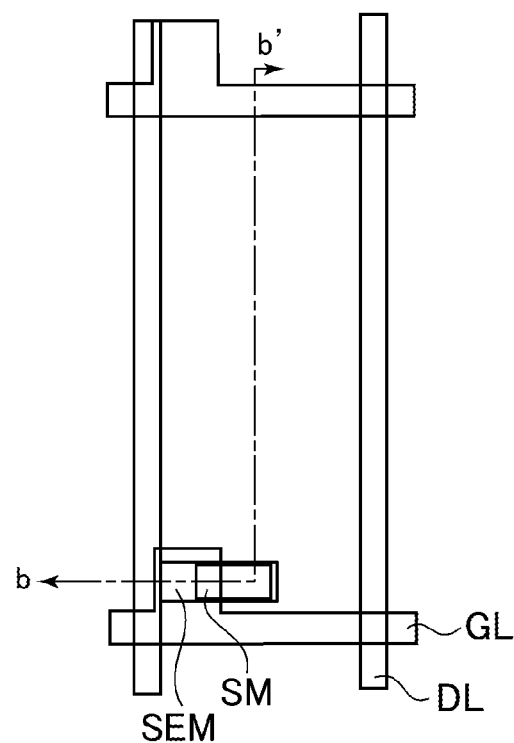
FIG. 82A is a plan view of one pixel in the liquid crystal display panel according to the twelfth embodiment when a second photo-process is completed.
Figure 82B:
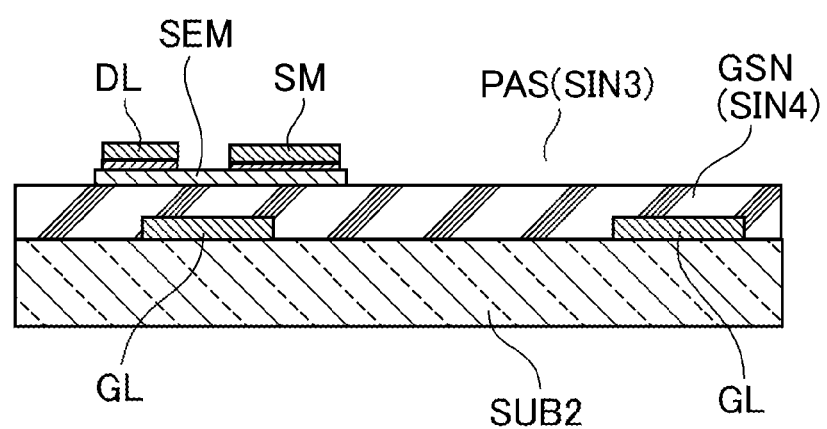
FIG. 82B is a sectional view taken along a line b-b' in shown FIG. 82A.

FIG. 82A is a plan view of one pixel region, when a second photo-process is completed, and FIG. 82B is a sectional view taken along line b-b' in FIG. 82A. The gate insulating film GSN and the semiconductor layer SEM are stacked on the gate lines GL by CVD. A metal line is formed on the semiconductor layer SEM by sputtering. The material of the metal line is identical to the material of the gate lines GL.

A photoresist is formed on the CVD film and the sputtering film, and this photoresist is exposed by use of a halftone photomask, whereby the region of the data line DL and the source electrode SM and the region of the semiconductor layer SEM can be formed.

Figure 83A:
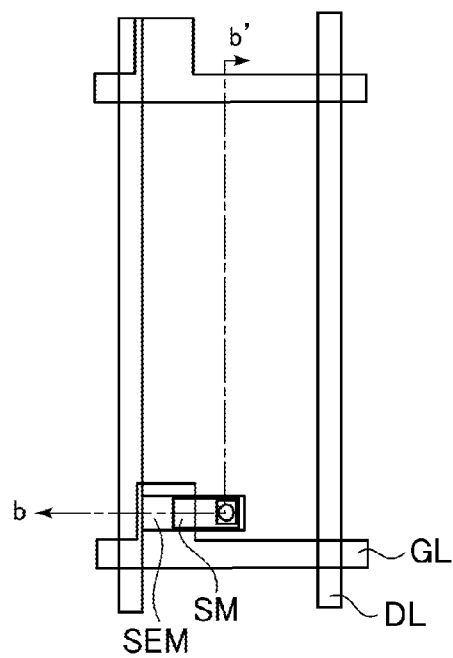
FIG. 83A is a plan view of one pixel in the liquid crystal display panel according to the twelfth embodiment when a third photo-process is completed.
Figure 83B:
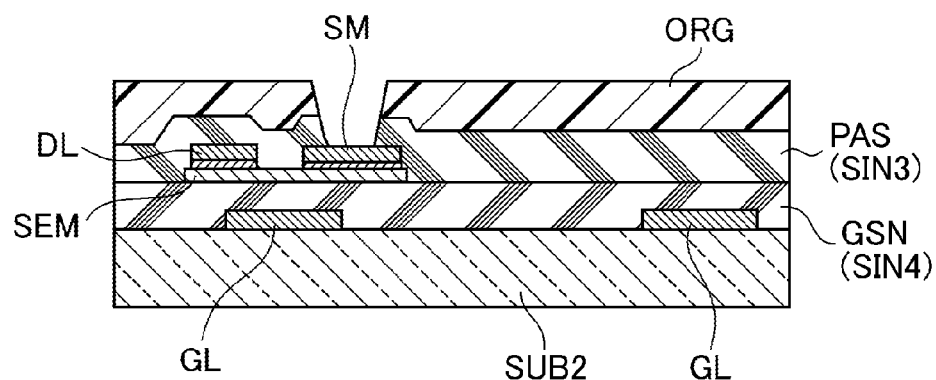

FIG. 83A is a plan view of one pixel region, when a third photo-process is completed, and FIG. 83B is a sectional view taken along line b-b' in FIG. 83A. The protection insulating film PAS is formed on the data line DL and the source electrode SM by CVD, and an interlayer insulating film ORG made of photosensitive acryl is further applied. The protection insulating film PAS is made of silicon nitride, and has a thickness of 200 nm to 400 nm. The material of the photosensitive acryl can be used as a resist in the photo process. Therefore, an opening region is formed on the source electrode SM by using a photomask for this resist by a development process. The protection insulating film PAS is processed by dry etching by using the interlayer insulating film ORG as a photomask, whereby a contact hole reaching the surface of the source electrode SM is formed.

Figure 84A:
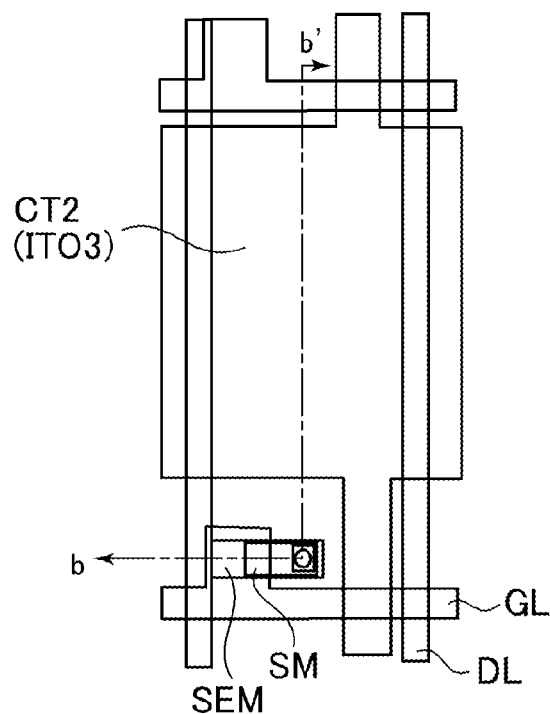
Figure 84B:
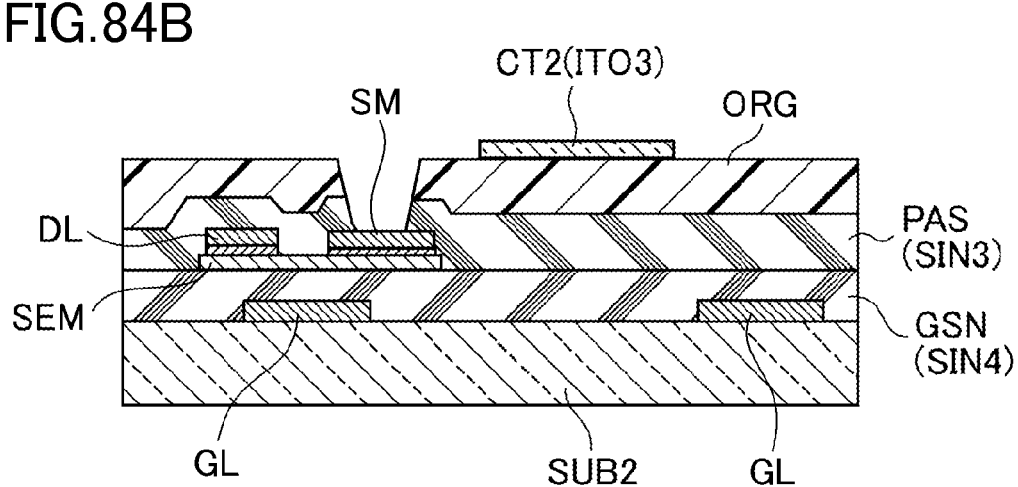

FIG. 84A is a plan view of one pixel region, when a fourth photo-process is completed, and FIG. 84B is a sectional view taken along line b-b' in FIG. 84A. A third transparent electrode material ITO3 is formed, and a photo-etching process is performed to the third transparent electrode material ITO3 to thereby form the second transparent common electrode CT2.

Figure 85A:
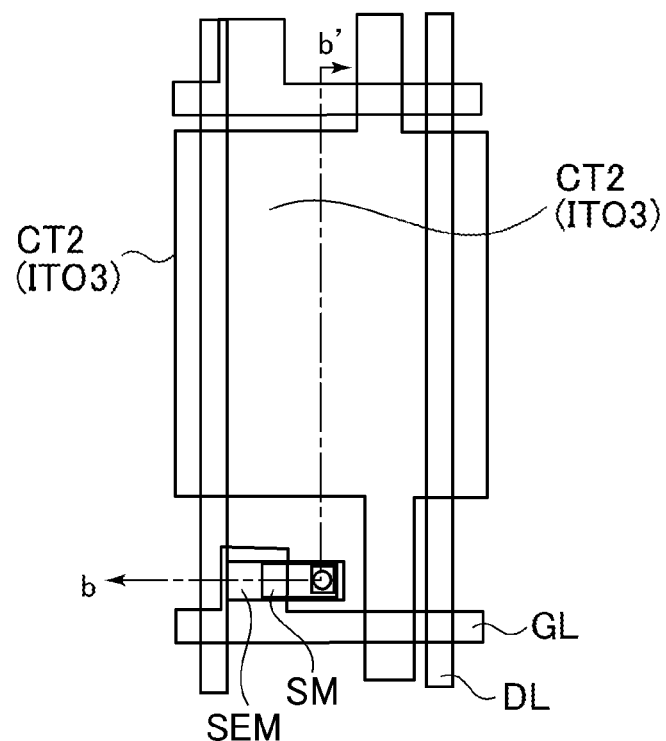
Figure 85B:
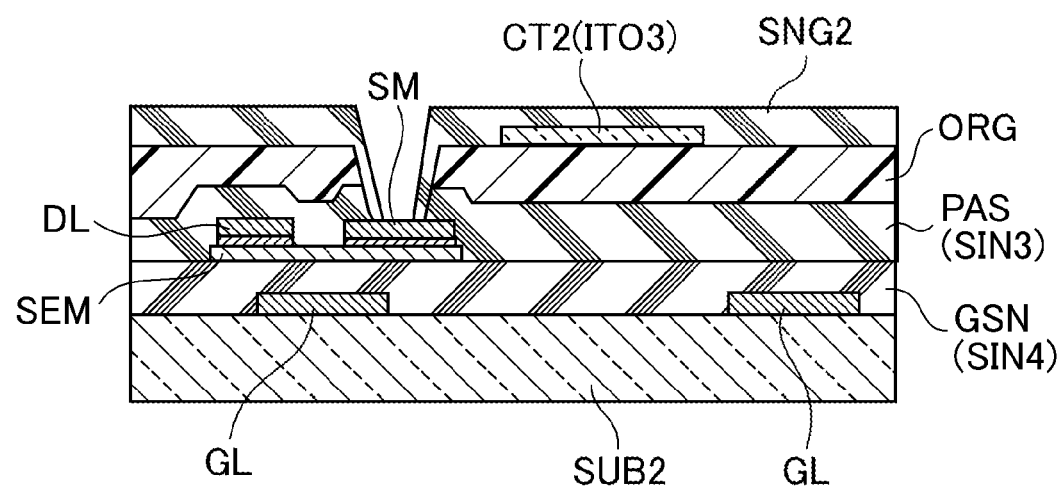

FIG. 85A is a plan view of one pixel region when a fifth photo-process is completed, and FIG. 85B is a sectional view taken along line b-b' in FIG. 85A. The second insulating film SNG2 is formed on the second transparent common electrode CT2 by CVD.

Figure 86A:
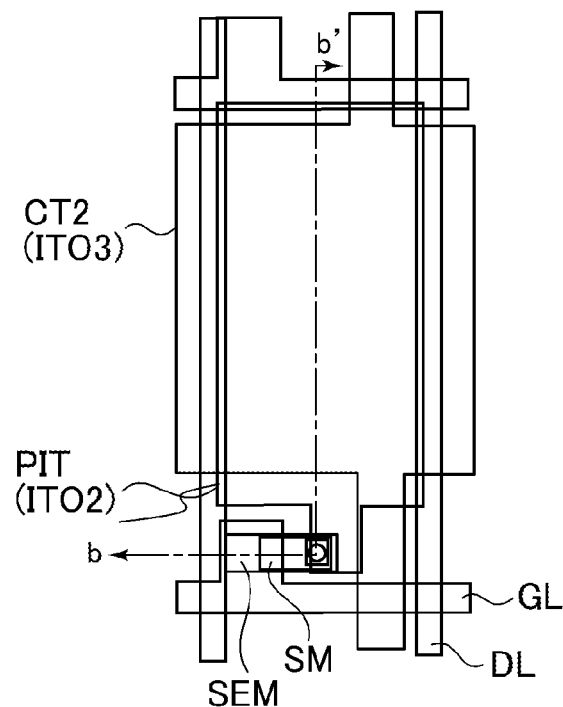
Figure 86B:
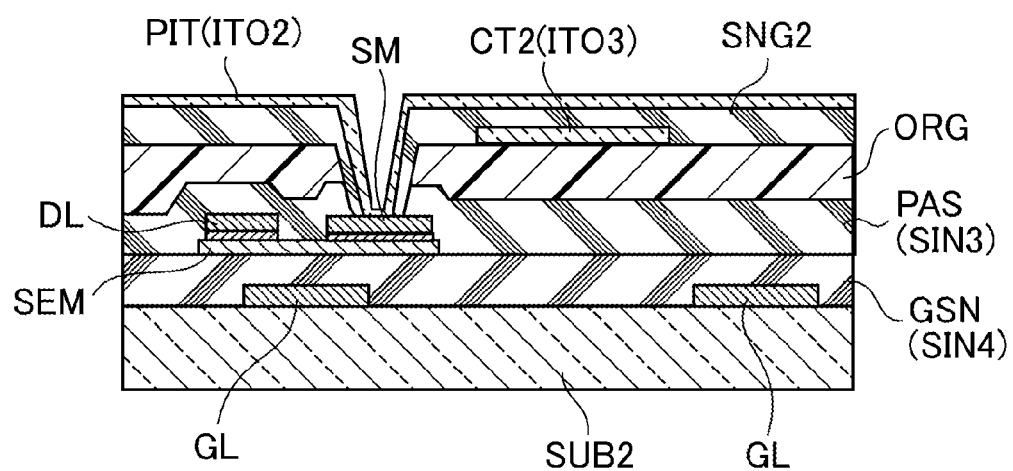

FIG. 86A is a plan view of one pixel region, when a sixth photo-process is completed, and FIG. 86B is a sectional view taken along line b-b' in FIG. 86A. The ITO2 is formed on the second insulating film SNG2, and this second insulating film SNG2 is photo-etched to process the transparent pixel electrode PIT. This transparent pixel electrode PIT is processed in a plane in one pixel, and is connected to the source electrode SM.

Figure 87A:
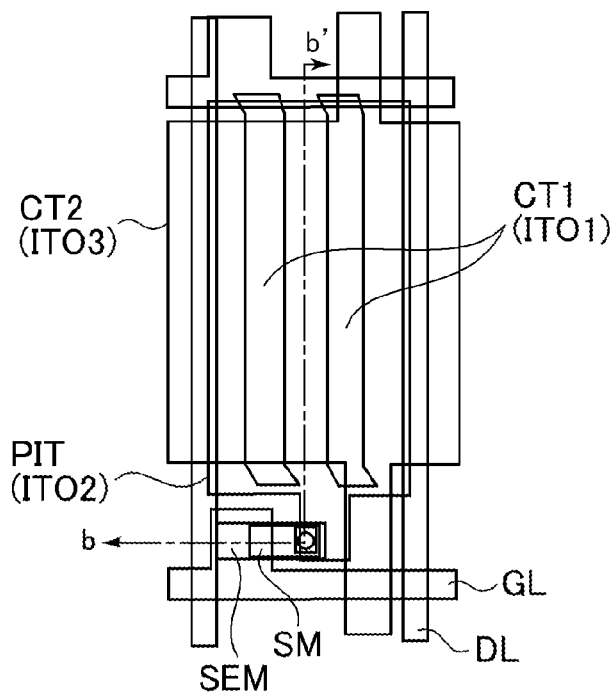
Figure 87B:
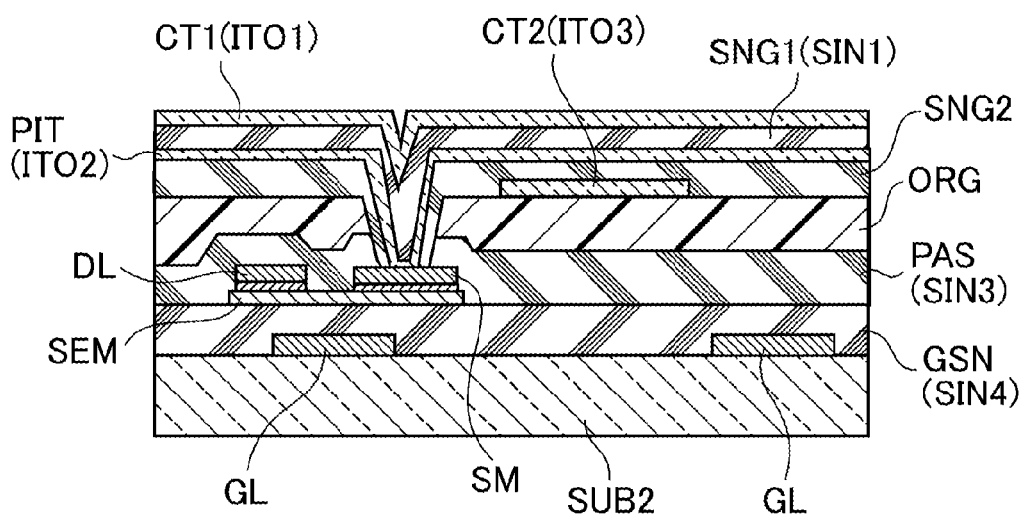

FIG. 87A is a plan view of one pixel region when seventh and eighth photo-processes are completed, and FIG. 87B is a sectional view taken along line b-b' in FIG. 87A. The first insulating film SNG1 is formed on the transparent pixel electrode PIT. An opening for extracting a terminal is formed on this first insulting film SNG1 with a terminal portion of the pixel region (not illustrated). This is the seventh photo-process. Thereafter, the ITO1 is formed, and this ITO1 is photo-etched to form the first transparent common electrode CT1.

As described above, the processing of the first transparent substrate SUB1 in the liquid crystal display device according to the present embodiment is completed through eight photo-etching processes in total.

Twelfth Embodiment

Figure 88:
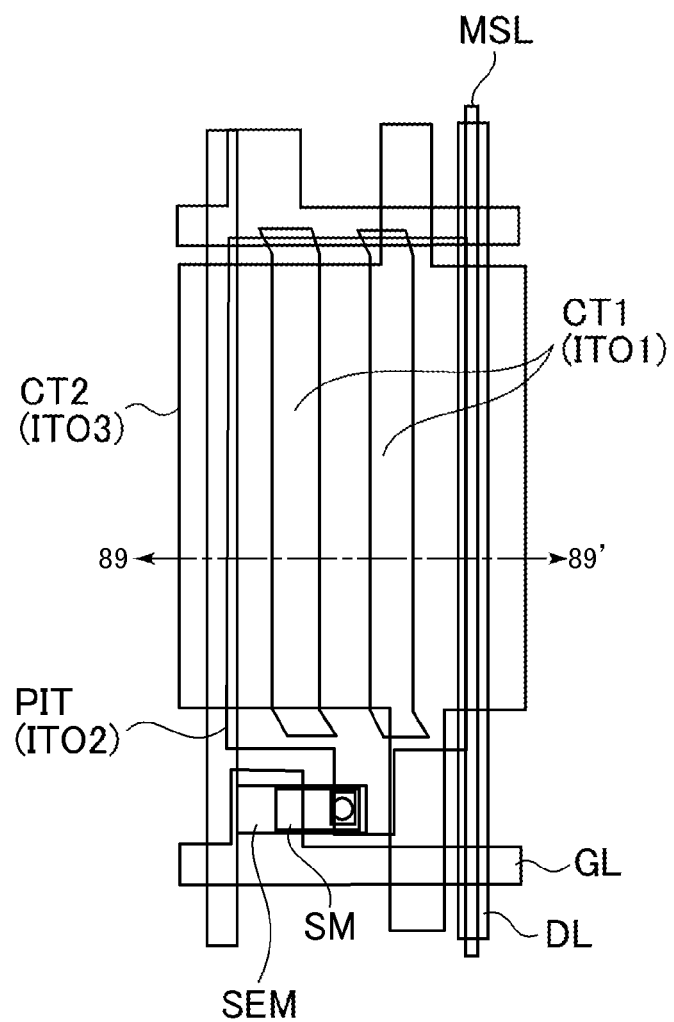
Figure 89:
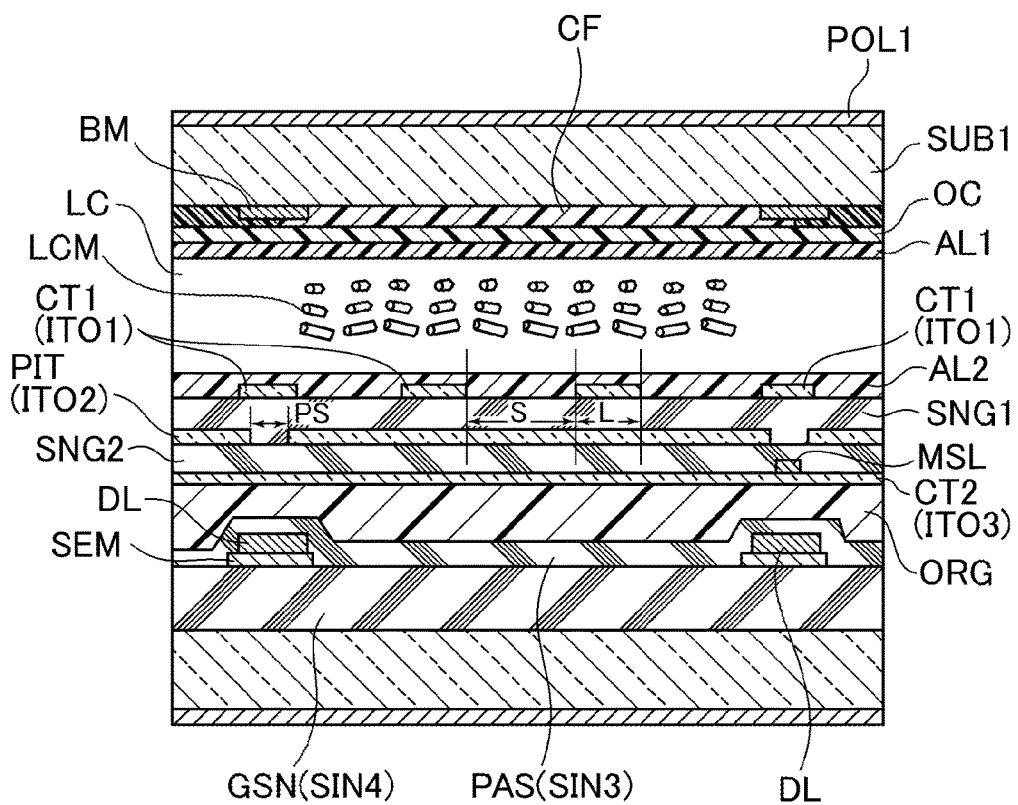

Referring to FIGS. 88 and 89, a liquid crystal panel of a twelfth embodiment will be described.

The configurations similar to the above eleventh embodiment are identified by the same numerals, and the detailed description will not be given. The different point between the twelfth embodiment and the above eleventh embodiment is that a common electrode metal line MSL is provided in the twelfth embodiment. This common electrode metal line MSL corresponds to a common line in a liquid crystal display device according to the present application.

The common electrode metal line MSL is made of a low-resistance metal, and formed on the second transparent common electrode CT2 (ITO3) in order to reduce the wiring delay of the second transparent common electrode CT2 (ITO3). The common electrode metal line MSL is disposed to be overlapped with the data line DL in a plan view in order to prevent the reduction in the aperture ratio in the pixel region. Due to the reduction in the resistance, a liquid crystal display device with a large screen having high brightness and low power consumption can be provided.

Thirteenth Embodiment

Referring to FIGS. 90-99, a liquid crystal panel of a thirteenth embodiment will be described.

FIGS. 90A and 90B are detailed plan views each illustrating one pixel region, FIG. 91 is a sectional view taken along line 91-91' in FIG. 90, and FIG. 92 is a sectional view taken along line 92-92' in FIG. 90.

FIGS. 90A and 90B are plan views each illustrating a thin-film transistor TFT, one pixel region enclosed by gate lines GL and data lines DL, and a part of the neighboring pixel region adjacent to this pixel region in FIG. 1. To facilitate understanding of the structure, FIG. 90A illustrates patterns of almost all layers, while FIG. 90B illustrates only a pattern of each transparent electrode and a projected position (broken line) of an opening of a black matrix BM. An inner side of the opening of the black matrix BM is a light transmittance region, and an outer side of the opening is a light shielding region.

The arrangement and function of each configuration in FIG. 90A will be described. Each of the gate lines GL is made of a low-resistance metal layer. The gate lines GL are connected to the scanning-line drive circuit in FIG. 1, and a scanning-voltage is applied to the gate lines GL from the scanning-line drive circuit. On the other hand, each of the data lines DL is also made of a low-resistance metal layer, and a video-data voltage is applied to the data lines DL. In the case where a gate-on voltage is applied to the gate lines GL, the resistance of a semiconductor layer SEM of the thin-film transistor becomes low, whereby the voltage of the data lines DL is transmitted to a source electrode SM made of a low-resistance metal layer, and also transmitted to a transparent pixel electrode PIT connected to the source electrode SM through a contact hole.

A common voltage that is another voltage applied to a liquid crystal layer is applied to a transparent common electrode CIT and a transparent storage capacitance electrode MIT from the common-electrode drive circuit in FIG. 1. The transparent pixel electrode PIT is stacked on the transparent storage capacitance electrode MIT with an insulating film interposed therebetween. The transparent common electrode CIT is also stacked on the transparent pixel electrode PIT with an insulating film interposed therebetween, wherein the transparent common electrode CIT has a plurality of slits formed therein. An electric field from the transparent pixel electrode PIT reaches the inside of the liquid crystal layer through the slits of the transparent common electrode CIT disposed on the transparent pixel electrode PIT, is folded in the liquid crystal layer, and finally reaches the transparent common electrode CIT. Thus, a transverse electric field is applied to the liquid crystal layer.

The transparent storage capacitance electrode MIT is also connected to the common-electrode drive circuit in FIG. 1, and the common voltage is applied to the transparent storage capacitance electrode MIT from the common-electrode drive circuit. The transparent storage capacitance electrode MIT is disposed below the transparent pixel electrode PIT with an insulating film interposed therebetween, and a storage capacitance STG is formed between the transparent pixel electrode PIT and the transparent storage capacitance electrode MIT. As described above, in the present embodiment, the transparent common electrode CIT having the slits, the transparent pixel electrode PIT, and the transparent storage capacitance electrode MIT are formed on the pixel region. These three transparent conductive films are formed by different processes. The transparent pixel electrode PIT is connected to the source electrode SM via the contact hole CONT formed on the insulating film, and disposed independently on each pixel region. On the other hand, the transparent storage capacitance electrode MIT and the transparent common electrode CIT are connected in the form of a network over the entire screen region DIA to cover the plurality of pixel regions.

The present embodiment is mainly characterized by planar patterns of the transparent common electrode CIT, the transparent storage capacitance electrode MIT, and the transparent pixel electrode PIT in one pixel region. Therefore, the relationship of these patterns will be described by comparing FIGS. 90A and 90B.

The pattern of the uppermost layer in FIG. 90B is the transparent common electrode CIT. The transparent common electrode CIT has a plurality of band-shaped portions C1 extending parallel to the data lines DL, and a plurality of slits CS are formed between the band-shaped portions C1. In the present embodiment, the longitudinal direction of the slit CS means the extending direction of the data lines DL, and the widthwise direction of the slit CS means the extending direction of the gate lines GL.

In a plan view, the transparent pixel electrode PIT can be seen through each slit CS of the transparent common electrode CIT. Among these slits CS, the slit CS located above the data line DL is formed to be wider than the other slits CS, and an outer boundary P1 of the transparent pixel electrode PIT is present in this slit CS, the outer boundary P1 being parallel to the longitudinal direction of the slit CS.

Specifically, two closely-adjacent outer boundaries P1 of two transparent pixel electrodes PIT that are adjacent to each other in the widthwise direction of the slit CS, and a space PS between these two closely-adjacent outer boundaries P1 are included in the slit CS located above the data line DL. In other words, the two closely-adjacent outer boundaries P1 of two transparent pixel electrodes PIT that are adjacent to each other in the widthwise direction of the slit CS, and the space PS between these two closely-adjacent outer boundaries P1 are not covered with the transparent common electrode CIT, i.e., not overlapped with the transparent common electrode CIT in a plan view.

A pair of edges C1s extending in the longitudinal direction of the slit CS located above the data line DL respectively crosses outer boundaries P2 of two transparent pixel electrodes PIT that are adjacent to each other in the widthwise direction of the slit CS in a plan view, the outer boundaries P2 being parallel to the widthwise direction of the slit CS.

The two closely-adjacent outer boundaries P1 of two transparent pixel electrodes PIT that are adjacent to each other in the widthwise direction of the slit CS and the space PS between the two closely adjacent outer boundaries P1 overlap the transparent storage capacitance electrode MIT disposed below the transparent pixel electrode PIT in a plan view. The two closely-adjacent outer boundaries P1 of two transparent pixel electrodes PIT that are adjacent to each other in the widthwise direction of the slit CS and the space PS between the two closely adjacent outer boundaries P1 also overlap the data line DL disposed below the transparent storage capacitance electrode MIT in a plan view.

The transparent common electrode CIT includes a plurality of connection portions C2 that connect the plurality of band-shaped portions C1 in the widthwise direction of the slit CS above the gate line GL. The connection portions C2 are disposed in a region where light is shielded by the black matrix BM. Therefore, the band-shaped portions C1 of the transparent common electrode CIT become a main electrode that drives the liquid crystal at the inside of the opening of the black matrix BM.

The transparent pixel electrode PIT has a planar pattern disposed independently in each pixel region. The transparent pixel electrode PIT and the source electrode SM are connected to each other via the contact hole CONT formed on the insulating film. The outer boundaries P1 and P2 of the adjacent transparent pixel electrodes PIT are separated across the data line DL and the gate line GL respectively.

The transparent storage capacitance electrode MIT is disposed below the transparent pixel electrode PIT with the insulating film interposed therebetween. The transparent storage capacitance electrode MIT is formed into a sheet shape spreading in a plane, and an opening MA is formed corresponding to each pixel region. FIGS. 90A and 90B illustrate an edge of the opening MA. The opening MA is formed to overlap the region between the two transparent pixel electrodes PIT that are adjacent to each other in the longitudinal direction of the slit CS. The contact hole CONT is formed in the opening MA. The transparent storage capacitance electrode MIT is disposed above the gate line GL and the data line DL with the insulating film interposed therebetween so as to cover the gate line GL and the data line DL. This structure prevents an electric field noise from the gate line GL or the data line DL from entering the liquid crystal layer LC.

It has been known that, in a liquid crystal display device of an IPS system, an aperture ratio can be enhanced by covering the data lines DL or the gate lines GL with a transparent electrode, to which a common voltage is applied, with an insulating film interposed therebetween. In this system, the uppermost transparent common electrode CIT extends in the direction in which the data lines DL extend, and is formed to have a large width to cover the data lines DL from above. In this case, the width of the transparent common electrode CIT covering the data lines DL is formed to be relatively larger than the width of the data line DL in order to form a margin for positioning during a TFT process. When the width of the transparent common electrode CIT is increased, a transverse electric field is not applied to this portion, even if the electrode is transparent. Therefore, this portion does not contribute to the display. In other words, the aperture ratio for the display cannot be enhanced.

In FIGS. 90A and 90B of the present embodiment, the space between the two transparent pixel electrodes PIT disposed in the horizontal direction is set to be small, and the transparent storage capacitance electrode MIT is disposed below the region between the transparent pixel electrodes PIT. In this case, the transparent storage capacitance electrode MIT functions as a shield for the data line DL, whereby the black matrix BM on the data line DL can be set to be small, and the aperture ratio can be increased. Specifically, the present embodiment aims to enhance the aperture ratio by arranging the transparent storage capacitance electrode MIT and not arranging the transparent common electrode CIT above the data line DL.

In FIG. 90, the transparent storage capacitance electrode MIT is disposed above most of the gate line GL extending in the horizontal direction. The transparent common electrode CIT has a plurality of long band-shaped portions, which extend in the perpendicular direction in which the data lines DL extend, over the plurality of pixel regions, and also has the connection portion disposed almost on the center of the black matrix BM, which covers the gate line GL, in the perpendicular direction, the connection portion extending in the horizontal direction for connecting the band-shaped portions. Thus, the transparent common electrode CIT has a mesh-like planar pattern. This structure provides an effect of maintaining the supply of the common voltage even if the band-shaped portions extending in the perpendicular direction is broken, and an effect of reducing a wiring resistance of the transparent common electrode CIT. In the region where light is shielded by the black matrix BM above the gate line GL, a pair of edges of the slit of the transparent common electrode CIT extending in the perpendicular direction crosses the outer boundary of the transparent pixel electrode PIT almost perpendicularly.

FIG. 91 is a sectional view taken along line 3-3' in FIG. 90. In similarly to the planar configuration in FIG. 90, a drive voltage is applied between the transparent pixel electrode PIT and the transparent common electrode CIT in the case where the liquid crystal layer LC is regarded as a capacitor in one pixel region. The common voltage identical to that for the transparent common electrode CIT is also applied to the transparent storage capacitance electrode MIT. Firstly, an on-voltage is applied to the gate line GL made of a metal layer. The gate insulating film GSN is formed on the gate lines GL. The semiconductor layer SEM is processed and disposed in an island shape on the gate line GL.

The data line DL and the source electrode SM are formed on the semiconductor layer SEM. The data line DL and the source electrode SM are made of a low-resistance metal material formed by the same process.

The protection insulating film PAS is formed on the data line DL and the source electrode SM. The interlayer insulating film ORG is formed on the protection insulating film PAS. A photosensitive organic material including acryl as a main composition is used for the interlayer insulating film ORG.

A set of the protection insulating film PAS and the interlayer insulating film ORG corresponds to a third insulating film in the liquid crystal display device according to the present application, and the interlayer insulating film ORG corresponds to an organic insulating film in the liquid crystal display device according to the present application.

The transparent storage capacitance electrode MIT and the transparent pixel electrode PIT form the storage capacitance STG in the pixel region across the insulating film SNG. The storage capacitance STG can prevent the attenuation of the video-data voltage, caused by the charges accumulated with the thin-film transistor TFT being turned on, during the storage operation period. The transparent storage capacitance electrode MIT corresponds to a first common electrode in the liquid crystal display device according to the present application, and the insulating film SNG corresponds to a first insulating film in the liquid crystal display device according to the present application.

The transparent pixel electrode PIT is electrically connected to the source electrode SM via the contact hole CONT formed on the protection insulating film PAS, the interlayer insulating film ORG, and the insulating film SNG.

The transparent common electrode CIT is disposed on the transparent pixel electrode PIT with an upper insulating film UPAS interposed therebetween.

When an on-voltage is applied to the gate line GL, the video-data voltage is applied to the transparent pixel electrode PIT via the data line DL, the semiconductor layer SEM, and the source electrode SM. The video-data voltage is charged in the capacitance between the transparent pixel electrode PIT and the transparent common electrode CIT and in the capacitance between the transparent pixel electrode PIT and the transparent storage capacitance electrode MIT, the transparent common electrode CIT and the transparent storage capacitance electrode MIT having the common potential. When an off-voltage is applied to the gate line GL, the period after the application of the off-voltage becomes a storage period, and the semiconductor layer SEM becomes a high resistance state. Therefore, the charged charges (voltage) are basically stored. However, the voltage of the transparent pixel electrode PIT might be varied due to the leakage by the resistance of the semiconductor layer SEM or the resistance of the liquid crystal layer LC.

In general, the holding characteristics are obtained by the capacitance formed by the stacked layers of the transparent common electrode CIT and the transparent pixel electrode PIT. In the present embodiment, a capacitance is also formed between the transparent pixel electrode PIT and the transparent storage capacitance electrode MIT, whereby the whole capacitance can be increased. Consequently, the holding characteristics can be satisfactorily maintained, so that a liquid crystal display device with excellent image quality can be provided.

FIG. 92 is a sectional view taken along line 92-92' in FIG. 90. FIG. 92 is a sectional view of three pixels with the data line DL being defined as a border. The pixel at the center corresponds to a green color filter CF(G) in a color filter CF disposed in a vertical stripe shape. The pixels at the left and at the right of the pixel at the center correspond to a red color filter CF(R) and a blue color filter CF(B), respectively. The black matrix BM is disposed on the inner surface of the first transparent substrate SUB1 on the border of the pixel regions, where the data line DL is located, across the liquid crystal layer LC.

In FIG. 92, the cross-sectional structure is divided into two regions in an in-plane direction, the two regions being a pixel shielding region where the black matrix BM or the data line DL that does not transmit light is located, and an opening region that transmits light. The structure and operation of the opening region will firstly be described.

The transparent storage capacitance electrode MIT is disposed to widely cover the data lines DL from above in the portion below the space between the adjacent transparent pixel electrodes PIT, the space being located above the data line DL. Accordingly, the electric field noise generated from the data line DL is shielded by the transparent storage capacitance electrode MIT, whereby the electric field noise to the liquid crystal layer LC is shielded. The transparent common electrode CIT is not disposed between the black matrix BM and the data line DL. In general, a common electrode is disposed to widely cover the space between the adjacent transparent pixel electrodes in the liquid crystal display device in which the transparent storage capacitance electrode MIT is not disposed, and the common electrode is disposed only on the uppermost layer. In this case, the width of the common electrode is large, so that the electric field for driving is weakened. Therefore, even if a transparent electrode material is used, transmittance is reduced. Alternatively, the width of the black matrix BM increases to reduce the aperture ratio. In the present embodiment, even if the transparent common electrode CIT is not present above the space between the adjacent two transparent pixel electrodes PIT, the data line DL is shielded by the transparent storage capacitance electrode MIT, whereby the aperture ratio can be increased.

FIGS. 93A to 99B each illustrate a manufacturing process of a stacked body including the thin-film transistor TFT formed on the first transparent substrate SUB1 according to the present embodiment. FIGS. 93A, 94A, 95A, 96A, 97A, 98A, and 99A are plan views each illustrating one pixel region, and FIGS. 93B, 94B, 95B, 96B, 97B, 98B, and 99B are sectional views each taken along line b-b' in the corresponding plan view. FIGS. 93A to 99B each illustrate each photographic processing process (photo-process).

FIG. 93A is a plan view of one pixel region, when a first photo-process is completed, and FIG. 93B is a sectional view taken along line b-b' in FIG. 93A. The gate lines GL are patterned by the first photo-process after being formed on the first transparent substrate SUB1 by sputtering.

FIG. 94A is a plan view of one pixel region, when a second photo-process is completed, and FIG. 94B is a sectional view taken along line b-b' in FIG. 94A. The gate insulating film GSN made of silicon nitride and the semiconductor layer SEM made of amorphous silicon are stacked on the gate lines GL by CVD. A stacked film of molybdenum Mo and copper Cu is also formed on the semiconductor layer SEM by sputtering.

The thicknesses of the gate insulating film GSN, the semiconductor layer SEM, and the data line DL/source electrode SM are respectively about 400 nm, 200 nm, and 300 nm. After the stacked film is formed by CVD and sputtering, a photoresist is formed on the stacked film. This photoresist is exposed by use of a halftone photomask, whereby the region of the data line DL and the source electrode SM and the region of the semiconductor layer SEM are formed.

FIG. 95A is a plan view of one pixel region, when a third photo-process is completed, and FIG. 95B is a sectional view taken along line b-b' in FIG. 95A. The protection insulating film PAS is formed on the data line DL and the source electrode SM by CVD, and the interlayer insulating film ORG that is made of photosensitive acryl is applied thereon. The protection insulating film PAS is made of silicon nitride, and has a thickness of 100 nm to 400 nm. The material of the photosensitive acryl can be used as a resist in the photo-process. Therefore, the opening OCONT is formed on the source electrode SM by a developing process using the photomask.

FIG. 96A is a plan view of one pixel region, when a fourth photo-process is completed, and FIG. 96B is a sectional view taken along line b-b' in FIG. 96A. After a film of indium tin oxide that is the transparent electrode material is formed, the photo-etching process is performed, whereby the transparent storage capacitance electrode MIT is formed.

FIG. 97A is a plan view of one pixel region, when a fifth photo-process is completed, and FIG. 97B is a sectional view taken along line b-b' in FIG. 97A. The insulating film SNG is formed on the transparent storage capacitance electrode MIT by CVD. The insulating film SNG is made of silicon nitride, and has a thickness of 200 nm to 600 nm. The photo-etching process is performed, whereby a contact hole PCONT that penetrates the interlayer insulating film SNG and the protection insulating film PAS is formed at the inside of the opening OCONT of the interlayer insulating film ORG.

FIG. 98A is a plan view of one pixel region, when a sixth photo-process is completed, and FIG. 98B is a sectional view taken along line b-b' in FIG. 98A. After a film of indium tin oxide that is the material for the transparent conductive film is formed on the insulating film SNG, the transparent pixel electrode PIT is processed by the photo-etching process. This transparent pixel electrode PIT is processed in each pixel region to be connected to the source electrode SM.

FIG. 99A is a plan view of one pixel region, when seventh and eighth photo-processes are completed, and FIG. 99B is a sectional view taken along line b-b' in FIG. 99A. The upper insulating film UPAS is formed on the transparent pixel electrode PIT. An opening for extracting a terminal is formed on the upper insulating film UPAS at the terminal portion of the screen region DIA (not illustrated). This is the seventh photo-process. Thereafter, a film of indium tin oxide that is the material for the transparent conductive film is formed, and the transparent common electrode CIT is formed by the photo-etching process.

As described above, the processing of the first transparent substrate SUB1 in the liquid crystal display device according to the present embodiment is completed through eight photo-etching processes in total.

Fourteenth Embodiment

Referring to FIGS. 100 and 101, a liquid crystal panel of a fourteenth embodiment will be described.

FIGS. 100A and 100B each illustrate a detailed plan view of one pixel region, and FIG. 101 is a sectional view taken along line 101-101' in FIG. 100.

FIG. 100A is a plan view illustrating a thin-film transistor TFT, one pixel region enclosed by gate lines GL and data lines DL, and a part of the neighboring pixel region adjacent to this pixel region. To facilitate understanding of the structure, FIG. 100A illustrates patterns of almost all layers, while FIG. 100B illustrates only a pattern of each transparent electrode and a projected position (broken line) of an opening of a black matrix BM.

In the above thirteenth embodiment, the arrangement of the color filters CF is the vertical stripe shape in which the red, green, and blue color layers are changed with the data line DL being defined as a border. However, in the present embodiment, the arrangement of the color filters CF is a horizontal stripe shape in which the red, green, and blue color layers are changed with the gate line GL being defined as a border. In the above thirteenth embodiment, the space between the adjacent two gate lines GL is almost three times as big as the space between the adjacent data lines DL. However, in the present embodiment, the space between the adjacent data lines DL is almost three times as big as the space between the adjacent gate lines GL.

The arrangement and functions of the components in FIG. 100A will be described. The functions of the gate lines GL and the data lines DL and the method of supplying a voltage to these lines are similar to those in the above thirteenth embodiment. In addition, the functions of the transparent pixel electrode PIT, the transparent common electrode CIT, and the transparent storage capacitance electrode MIT, which drive a liquid crystal layer LC, are similar to those in the above thirteenth embodiment.

The present embodiment is mainly characterized by planar patterns of the transparent common electrode CIT, the transparent storage capacitance electrode MIT, and the transparent pixel electrode PIT in one pixel region. Therefore, the relationship of these patterns will be described by comparing FIGS. 100A and 100B.

The pattern of the uppermost layer in FIG. 100B is the transparent common electrode CIT. The transparent common electrode CIT has a plurality of band-shaped portions C1 extending parallel to the gate lines GL, and a plurality of slits CS are formed between the band-shaped portions C1. In the present embodiment, the longitudinal direction of the slit CS means the extending direction of the gate lines GL, and the widthwise direction of the slit CS means the extending direction of the data lines DL.

In a plan view, the transparent pixel electrode PIT can be seen through each slit CS of the transparent common electrode CIT. Among these slits CS, the slit CS located above the gate line GL is formed to be wider than the other slits CS, and an outer boundary P1 of the transparent pixel electrode PIT parallel to the longitudinal direction of the slit CS is present in this slit CS.

Specifically, two closely-adjacent outer boundaries P1 of two transparent pixel electrodes PIT that are adjacent to each other in the widthwise direction of the slit CS, and a space PS between these two closely adjacent outer boundaries P1 are included in the slit CS located above the gate line GL. In other words, the two closely-adjacent outer boundaries P1 of two transparent pixel electrodes PIT that are adjacent to each other in the widthwise direction of the slit CS, and the space PS between these two closely adjacent outer boundaries P1 are not covered with the transparent common electrode CIT, i.e., not overlapped with the transparent common electrode CIT in a plan view.

A pair of edges C1s extending in the longitudinal direction of the slit CS located above the gate line GL respectively crosses outer boundaries P2 of two transparent pixel electrodes PIT that are adjacent to each other in the widthwise direction of the slit CS in a plan view, the outer boundaries P2 being parallel to the widthwise direction of the slit CS.

The two closely-adjacent outer boundaries P1 of two transparent pixel electrodes PIT that are adjacent to each other in the widthwise direction of the slit CS and the space PS between the two closely-adjacent outer boundaries P1 overlap the transparent storage capacitance electrode MIT disposed below the transparent pixel electrode PIT in a plan view. The two closely-adjacent outer boundaries P1 of two transparent pixel electrodes PIT that are adjacent to each other in the widthwise direction of the slit CS and the space PS between the two closely-adjacent outer boundaries P1 also overlap the gate lines GL disposed below the transparent storage capacitance electrode MIT in a plan view.

The transparent common electrode CIT includes a plurality of connection portions C2 that connect the plurality of band-shaped portions C1 in the widthwise direction of the slit CS above the data lines DL. The connection portions C2 are disposed in a region where light is shielded by the black matrix BM. Therefore, the band-shaped portions C1 of the transparent common electrode CIT become a main electrode that drives the liquid crystal in the opening of the black matrix BM.

The transparent pixel electrode PIT has a planar pattern disposed independently in each pixel region. The transparent pixel electrode PIT and the source electrode SM are connected to each other via a contact hole CONT formed on an insulating film, as in the above thirteenth embodiment. The outer boundaries P1 and P2 of the adjacent transparent pixel electrodes PIT are separated across the data line DL and the gate line GL respectively.

The transparent storage capacitance electrode MIT is disposed below the transparent pixel electrode PIT with an insulating film interposed therebetween. The transparent storage capacitance electrode MIT is formed into a sheet shape spreading in a plane, and an opening MA is formed corresponding to each pixel region, as in the above thirteenth embodiment. FIGS. 100A and 100B illustrate an edge of the opening MA. The opening MA is formed to overlap the region between the two transparent pixel electrodes PIT that are adjacent to each other in the longitudinal direction of the slit CS. The contact hole CONT is formed in the opening MA. The transparent storage capacitance electrode MIT is disposed above the gate lines GL and the data lines DL with an insulating film interposed therebetween to cover the gate lines GL and the data lines DL. This structure prevents an electric field noise from the gate lines GL or the data lines DL from entering the liquid crystal layer LC.

In FIGS. 100A and 100B of the present embodiment, the space between the two transparent pixel electrodes PIT disposed in the vertical direction is set to be small, and the transparent storage capacitance electrode MIT is disposed in the portion below the space between the two transparent pixel electrodes PIT. In this case, the transparent storage capacitance electrode MIT functions as a shield for the gate line GL, whereby the black matrix BM on the gate line GL can be set to be small, and the aperture ratio can be increased. Specifically, the present embodiment aims to enhance the aperture ratio by arranging the transparent storage capacitance electrode MIT and not arranging the transparent common electrode CIT above the gate line GL.

In the horizontal stripe color filter system, the length of the gate line GL in one pixel region is about three times the length of the data line DL. Therefore, the transparent storage capacitance electrode MIT is disposed above the gate line GL, the transparent pixel electrodes PIT adjacent to each other are disposed above the transparent storage capacitance electrode MIT, and the slits of the transparent common electrode CIT are disposed on the transparent pixel electrodes PIT (i.e., the band-shaped portions are not disposed), whereby the aperture ratio in the liquid crystal display device of a horizontal stripe color filter system can be enhanced.

In FIGS. 100A and 100B, the transparent storage capacitance electrode MIT is disposed above most of the data line DL extending in the vertical direction. The transparent common electrode CIT has a plurality of long band-shaped portions, which extend in the perpendicular direction in which the gate lines GL extend, over the plurality of pixel regions, and also has the connection portion disposed almost on the center of the black matrix BM, which covers the data lines DL, in the horizontal direction, the connection portion extending in the vertical direction for connecting the band-shaped portions. Thus, the transparent common electrode CIT has a mesh-like planar pattern. This structure provides an effect of maintaining the supply of the common voltage even if the band-shaped portions extending in the horizontal direction are broken, and an effect of reducing a wiring resistance of the transparent common electrode CIT.

FIG. 101 is a sectional view taken along line 101-101' in FIG. 100A. FIG. 101 is a sectional view of three pixels with the gate line GL being defined as a border. The pixel at the center corresponds to a green color filter CF(G) in the color filter CF disposed in a horizontal stripe shape. The pixels at the left and at the right of the pixel at the center correspond to a red color filter CF(R) and a blue color filter CF(B), respectively. The black matrix BM is disposed on the inner surface of the first transparent substrate SUB1 on the border of the pixel regions, where the gate line GL is located, across the liquid crystal layer LC.

The transparent storage capacitance electrode MIT is disposed to widely cover the gate lines GL from above in the portion below the space between the adjacent transparent pixel electrodes PIT, the space being located above the gate lines GL. Accordingly, the electric field noise generated from the gate lines GL is shielded by the transparent storage capacitance electrode MIT, whereby the electric field noise to the liquid crystal layer LC is shielded. The transparent common electrode CIT is not disposed between the black matrix BM and the gate line GL. In general, the common electrode is disposed to widely cover the space between the adjacent transparent pixel electrodes in the liquid crystal display device in which the transparent storage capacitance electrode MIT is not disposed, and the common electrode is disposed only on the uppermost layer. In this case, the width of the common electrode is large, so that the electric field for driving is weakened. Therefore, even if a transparent electrode material is used, transmittance is reduced. Alternatively, the width of the black matrix BM increases to reduce the aperture ratio. In the present embodiment, even if the transparent common electrode CIT is not present above the space between the adjacent transparent pixel electrodes PIT, the gate line GL is shielded by the transparent storage capacitance electrode MIT, whereby the aperture ratio can be increased.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A liquid crystal display device comprising:
    a first substrate;
    a second substrate; and
    a liquid crystal layer sandwiched between the first substrate and the second substrate, wherein:
        a plurality of data lines;
        a plurality of gate lines; and
        a plurality of pixel regions, each of which is enclosed by adjacent two data lines and adjacent two gate lines are disposed on the first substrate,
    each of the pixel regions includes:
        a thin-film transistor connected to a data line;
        a transparent conductive pixel electrode connected to the thin-film transistor;
        a first common electrode that is transparent and conductive, and disposed between the pixel electrode and the first substrate;
        a first insulating film disposed between the pixel electrode and the first common electrode to cover the first common electrode;
        a second insulating film that covers the pixel electrode;

a second common electrode that is transparent and conductive, is disposed on the second insulating film, and includes a plurality of slits formed therein; and a third insulating film disposed between the data line and the thin-film transistor, and the first common electrode to cover the data line and the thin-film transistor, the pixel electrode is connected to the thin-film transistor through a contact hole formed in the first insulating film and the third insulating film, and a space between two closely adjacent boundaries of a pair of pixel electrodes that are adjacent to each other in a longitudinal direction of the plurality of gate lines overlaps the first common electrode and the second common electrode in a plan view, and wherein, when larger one in a width of the data line and a black matrix that is disposed on the second substrate to correspond to the data line is defined as a light shielding region, an edge of the one of the plurality of slits of the second common electrode is located inside the light shielding region in a plan view.

2. The liquid crystal display device according to claim 1, wherein a thickness of the first insulating film and a thickness of the second insulating film are smaller than a distance in the space between the two boundaries.

3. The liquid crystal display device according to claim 1, wherein a boundary of the pixel electrode, the first common electrode, and the second common electrode overlap the data line in a plan view.

4. The liquid crystal display device according to claim 1,
wherein the two closely adjacent boundaries of the pair of pixel electrodes that are adjacent to each other in the longitudinal direction of the plurality of gate lines overlap the data line in a plan view, and the first common electrode and the second common electrode overlap the space between the two boundaries in a plan view.

5. The liquid crystal display device according to claim 1, wherein the third insulating film is made of an organic material having a dielectric constant lower than a dielectric constant of the first insulating film or the second insulating film.

6. The liquid crystal display device according to claim 1, wherein the third insulating film includes an organic insulating film that is made of an organic material and that is thicker than the first insulating film or the second insulating film.

7. A liquid crystal display device comprising:
a first substrate;
a second substrate; and a liquid crystal layer sandwiched between the first substrate and the second substrate, wherein:
a plurality of data lines;
a plurality of gate lines; and
a plurality of pixel regions, each of which is enclosed by adjacent two data lines and adjacent two gate lines are disposed on the first substrate, each of the pixel regions includes:
a thin-film transistor connected to a data line;
a transparent conductive pixel electrode connected to the thin-film transistor;
a first common electrode that is transparent and conductive, and disposed between the pixel electrode and the first substrate;
a first insulating film disposed between the pixel electrode and the first common electrode to cover the first common electrode;
a second insulating film that covers the pixel electrode;
a second common electrode that is transparent and conductive, is disposed on the second insulating film, and includes a plurality of slits formed therein; and
a third insulating film disposed between the data line and the thin-film transistor, and the first common electrode to cover the data line and the thin-film transistor, the pixel electrode is connected to the thin-film transistor through a contact hole formed in the first insulating film and the third insulating film, and a space between two closely adjacent boundaries of a pair of pixel electrodes that are adjacent to each other in a longitudinal direction of the plurality of gate lines overlaps the first common electrode and the second common electrode in a plan view, and wherein, when larger one in a width of the data line and a black matrix that is disposed on the second substrate to correspond to the data line is defined as a light shielding region, an edge of one of the plurality of slits of the second common electrode is located outside the light shielding region in a plan view, and the distance between the edge of the one of the plurality of slits of the second common electrode and an edge of the light shielding region in a plan view is smaller than a half of a width of the one of the plurality of slits of the second common electrode.

8. The liquid crystal display device according to claim 1, further comprising:
a common line that overlaps the data line in a plan view, is connected to the first common electrode, and has a higher conductivity than the first common electrode.

* * * * *